US006184362B1

(12) United States Patent
Shimada et al.

(10) Patent No.: US 6,184,362 B1
(45) Date of Patent: Feb. 6, 2001

(54) ELECTROPHOTOGRAPHIC PHOTOCONDUCTOR, AZO COMPOUNDS FOR USE IN THE SAME, AND INTERMEDIATES FOR PRODUCING THE AZO COMPOUNDS

(75) Inventors: Tomoyuki Shimada, Shizuoka-ken; Masaomi Sasaki, Susono; Chiaki Tanaka, Shizuoka-ken, all of (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/497,689

(22) Filed: Feb. 4, 2000

Related U.S. Application Data

(62) Division of application No. 09/312,714, filed on May 17, 1999, which is a division of application No. 08/562,408, filed on Nov. 24, 1995, now Pat. No. 5,981,124, which is a continuation-in-part of application No. 08/494,051, filed on Jun. 23, 1995, now abandoned.

(30) Foreign Application Priority Data

| | | |
|---|---|---|
| Jun. 23, 1994 | (JP) | 6-164535 |
| Aug. 31, 1994 | (JP) | 6-206820 |
| Nov. 25, 1994 | (JP) | 6-315723 |
| Dec. 7, 1994 | (JP) | 6-303602 |
| Jan. 19, 1995 | (JP) | 7-024679 |
| Jan. 19, 1995 | (JP) | 7-024681 |
| May 29, 1995 | (JP) | 7-153949 |
| May 29, 1995 | (JP) | 7-153954 |
| Jun. 1, 1995 | (JP) | 7-135186 |
| Jun. 2, 1995 | (JP) | 7-159789 |

(51) Int. Cl.[7] .......... C09B 35/023; C09B 35/037; C09B 35/039

(52) U.S. Cl. .......... 534/658

(58) Field of Search .......... 534/658

(56) References Cited

U.S. PATENT DOCUMENTS

| | | | |
|---|---|---|---|
| 4,721,745 | 1/1988 | Neef et al. | 524/94 |
| 4,830,943 | 5/1989 | Sasaki et al. | 430/59.2 |
| 5,283,935 * | 2/1994 | Suzuki et al. | 430/859 |
| 5,344,735 | 9/1994 | Sasaki et al. | 430/83 |
| 5,370,954 | 12/1994 | Ohta et al. | 430/59.3 |
| 5,488,101 | 1/1996 | Ogino et al. | 534/680 |
| 5,489,671 | 2/1996 | Ogino et al. | 534/664 |
| 5,569,747 | 10/1996 | Jager et al. | 534/630 |
| 5,569,749 | 10/1996 | Kouno et al. | 534/653 |
| 5,578,405 | 11/1996 | Ikegami et al. | 430/58.15 |
| 5,618,343 | 4/1997 | Hendi et al. | 106/498 |
| 5,623,062 | 4/1997 | Sasaki et al. | 534/653 |

* cited by examiner

*Primary Examiner*—Fiona T. Powers
(74) *Attorney, Agent, or Firm*—Oblon, Spivak, McClelland, Maier & Neustadt, P.C.

(57) ABSTRACT

An electrophotographic photoconductor includes an electroconductive support and a photoconductive layer formed thereon which contains a compound having a charge generating moiety and a charge transporting moiety in the molecule thereof. As such a compound for use in the electrophotographic photoconductor, various compounds having a charge generating moiety derived from an azo compound and a charge transporting moiety derived from a triarylamine compound are proposed. Bisazo and trisazo compounds serving as such compounds are also proposed, together with intermediates for producing the bisazo and trisazo compounds.

4 Claims, 39 Drawing Sheets

ELECTROPHOTOGRAPHIC PHOTOCONDUCTOR, AZO COMPOUNDS FOR USE IN THE SAME, AND INTERMEDIATES FOR PRODUCING THE AZO COMPOUNDS

This application is a Division of application Ser. No. 09/312,714 filed May 17, 1999, now pending, which is a divisional of 08/562,408 filed Nov. 24, 1995, now U.S. Pat. No. 5,981,124 which is a CIP of application Ser. No. 08/494,051 filed Jun. 23, 1995, now abandoned.

BACKGROUND OF THE INVENTION

1. Field of the Invention

The present invention relates to an electrophotographic photoconductor, and more particularly to an electrophotographic photoconductor comprising a photoconductive layer which contains a compound comprising a charge generating moiety and a charge transporting moiety in the molecule thereof, prepared by chemically bonding a molecule of a charge generating material and a molecule of a charge transporting material.

In addition, the present invention also relates to bisazo compounds and trisazo compounds which serve as the above-mentioned compounds with a charge generating moiety and a charge transporting moiety in the molecule thereof and work as the organic photoconductive materials for use in the electrophotographic photoconductor, and intermediates for producing the above-mentioned disazo and trisazo compounds.

2. Discussion of Background

There are conventionally known an inorganic electrophotographic photoconductor comprising selenium or alloys thereof, and an inorganic photoconductor in which zinc oxide sensitized by a dye is dispersed in a binder resin. As the organic electrophotographic photoconductor, on the other hand, there is well known a photoconductor comprising a charge transporting complex of 2,4,7-trinitro-9-fluorenone (hereinafter referred to as TNF) and poly-N-vinylcarbazole (hereinafter referred to as PVK).

However, while these photoconductors have many advantages, they have several shortcomings. For instance, a selenium photoconductor, which is widely used at present, has the shortcomings that the manufacturing conditions are difficult and, accordingly its production cost is high. In addition, it is difficult to work it into the form of a belt due to its poor flexibility, and it is so vulnerable to heat and mechanical shocks that it must be handled with the utmost care.

The production cost of a zinc oxide photoconductor can be decreased because the zinc oxide photoconductor can be obtained by merely applying a coating liquid containing cheap zinc oxide particles to a support. However, not only the photosensitivity of the zinc oxide photoconductor is low, but also the mechanical properties, such as surface smoothness, hardness, tensile strength and wear resistance are poor. Accordingly, when such a photoconductor is repeatedly used in a copying machine for plain paper, there are many problems in its durability.

The photosensitivity of the photoconductor comprising the previously mentioned TNF and PVK is low, so that it is difficult to employ this kind of photoconductor in the high speed copying machine.

To eliminate such shortcomings of the above-mentioned photoconductors, studies have been extensively conducted, and in particular, a variety of organic photoconductors have been proposed. Especially, some attentions have been paid to a laminated photoconductor as a photoconductor for use in the copying machine for plain paper because the photosensitivity of this type of photoconductor is higher and the chargeability is more stable than those of the conventional organic photoconductors. The aforementioned laminated photoconductor is prepared by providing a thin layer (i.e. a charge generation layer) comprising an organic dye on an electroconductive support, and then a layer (i.e. a charge transport layer) mainly comprising a charge transporting material on the charge generation layer. Some of the laminated organic photoconductors have been put to practical use.

To be more specific, the following Laminated photoconductors are well known:

(1) A laminated photoconductor as disclosed in U.S. Pat. No. 3,871,882, comprising a charge generation layer of a thin-layered type prepared by vacuum-deposition of a perylene derivative, and a charge transport layer comprising an oxadiazole derivative.

(2) A laminated photoconductor as disclosed in Japanese Patent Publication 55-42380, comprising a charge generation layer of a thin-layered type prepared by coating of an organic amine solution containing chlorodiane blue, and a charge transport layer comprising a hydrazone compound.

However, those conventional laminated photoconductors have their own drawbacks although they have many advantages.

For instance, the photosensitivity of the above-mentioned laminated photoconductor (1) comprising the perylene derivative and oxadiazole derivative is too low to be used in the high speed copying machine although the photoconductor (1) is applicable to the copying machine for general use. In addition, the perylene derivative, that is a charge generating material to control the spectral sensitivity of the photoconductor, has no absorption in the whole visible region, so that this kind of photoconductor cannot be used in a color copying machine.

The laminated photoconductor (2) comprising the chlorodiane blue and hydrazone compound has a relatively high photosensitivity, but it has the problems in the production conditions because an organic amine such as ethylenediamine which must be handled with great care is generally used as a solvent for the preparation of a coating liquid for the charge generation layer.

In general, the organic photoconductor comprises the charge generating material and the charge transporting material, as previously mentioned. As stated in "IS&T's 10th International Congress on Non-Impact Printing Technologies 1994, page 2397", the sensitizing effect of the charge generating material by the charge transporting material is known as a factor in determination of the high sensitivity of the organic photoconductor. In addition, according to the above-mentioned reference, a site for generating a charge carrier when exposed to light, namely a photo-carrier generation site or a charge carrier injection site is located on the interface between a charge generating molecule and a charge transporting molecule. However, the charge generating material for general use is only slightly soluble in most organic solvents, so that the charge generating material is dispersed in the form of particles in the charge generation layer. Therefore, the number of photo-carrier generation sites or charge carrier injection sites is limited because the charge generating material exists in the form of finely-divided particles although the charge transporting material is in the form of a molecule, thereby restraining the increase of sensitivity of the photoconductor. Conversely speaking, it is considered that the sensitivity of the photoconductor can be improved by increasing the number of sites where the charge generating molecule and the charge transporting molecule come in contact with each other, anyway.

It is conventionally known that various azo compounds are effective as charge generating materials in the previously mentioned laminated electrophotographic photoconductor. The laminated photoconductor is constructed in such a manner that (i) a charge generation layer comprising a charge generating material capable of generating charge carriers when exposed to light, and (ii) a charge transport layer comprising a charge transporting material capable of efficiently injecting the above-mentioned charge carriers in the charge transport layer and transporting the same, are successively overlaid on an electroconductive support. To prepare the charge generation layer, the charge generating material may be vacuum-deposited on the electroconductive support. Alternatively, a solution containing the charge generating material or a dispersion prepared by dispersing the finely-divided particles of the charge generating material in a resin solution may be coated on the electroconductive support. On the other hand, the charge transport layer generally comprises the charge transporting material and a binder resin.

As the azo compounds for use in the above-mentioned photoconductor, there are conventionally known benzidine bisazo compounds as disclosed in Japanese Laid-Open Patent Applications 47-37543 and 52-55643; and stilbene bisazo compounds as disclosed in Japanese Laid-Open Patent Application 52-8832.

However, the photosensitivity of the laminated electrophotographic photoconductors employing the aforementioned conventional azo compounds is generally low, so that such photoconductors are not suitable for the high-speed copying machine.

SUMMARY OF THE INVENTION

It is therefore a first object of the present invention to provide an electrophotographic photoconductor free from the above-mentioned conventional shortcomings, which can exhibit flat high sensitivities in a range from the visible region to the wavelength of the semiconductor laser beam, and which can be manufactured with no difficulty.

A second object of the present invention is to provide a bisazo compound employed as the compound having a charge generating moiety and a charge transporting moiety in the molecule thereof for use in the electrophotographic photoconductor.

A third object of the present invention is to provide a trisazo compound employed as the compound having a charge generating moiety and a charge transporting moiety in the molecule thereof for use in the electrophotographic photoconductor.

A fourth object of the present invention is to provide intermediates for producing any of the above-mentioned bisazo compounds and trisazo compounds.

The first object of the present intention is achieved by an electrophotographic photoconductor comprising an electroconductive support and a photoconductive layer formed thereon which comprises a compound comprising a charge generating, moiety and a charge transporting moiety in the molecule thereof.

In the above electrophotographic photoconductor of the present invention, it is preferable that the charge generating moiety of the compound be a moiety derived from an azo compound; and that the charge transporting moiety thereof be a moiety derived from a triarylamine compound.

Specific examples of the above compound for use in the electrophotographic photoconductor of the present invention are as follows:

(1-1) A compound with formula (1-1):

$$\underbrace{[Cp^2{-}N{=}N\,]_j\,X\,[\,N{=}N{-}Cp^1}_{A}\,\underbrace{(Y)_k}_{B}]_i \quad (1\text{-}1)$$

wherein X is a bivalent, trivalent or tetravalent aromatic cyclic hydrocarbon group or aromatic heterocyclic group, which may have a substituent; Y is a monovalent group derived from a charge transporting compound; $Cp^1$ is a 2- to 6-valent coupler radical; $Cp^2$ is a monovalent coupler radical; i is an integer of 1 to 4; j is an integer of 0 to 3; i+j is an integer of 2 to 4; k is an integer of 1 to 5; moiety A, $[Cp^2{-}N{=}N]_j\,X\,[N{=}N{-}Cp^1{-}]_i$, is the charge generating moiety; and moiety B, $(Y)_k$, is the charge transporting moiety.

(1-2) A compound with formula (1-2):

$$\underbrace{[Cp^2{-}N{=}N]_m{-}X}_{A}\,\underbrace{{-}(Y)_l}_{B} \quad (1\text{-}2)$$

wherein X is a bivalent, trivalent or tetravalent aromatic cyclic hydrocarbon group or aromatic heterocyclic group, which may have a substituent; Y is a monovalent group derived from a charge transporting compound; $Cp^2$ is a monovalent coupler radical; l is an integer of 1 to 3; m is an integer of 1 to 3; l+m is an integer of 2 to 4; moiety A,

[$Cp^2$—N=N—$]_m$X—, is the charge generating moiety; and moiety B, $-(Y)_l$, is the charge transporting moiety.

(1-3) A compound with formula (1-3):

(1-3)

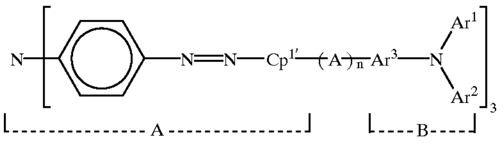

wherein $Cp^{1'}$ is a bivalent coupler radical; each of $Ar^1$ and $Ar^2$ is an aryl group which may have a substituent; $Ar^3$ is an arylene group which may have a substituent; A is selected from the group consisting of an ethylene group, a vinylene group, an oxygen atom and a sulfur atom; n is an integer of 0 to 2; moiety A,

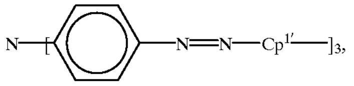

is the charge generating moiety; and moiety B,

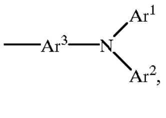

is the charge transporting moiety.

(1-4) A compound with formula (1-4):

(1-4)

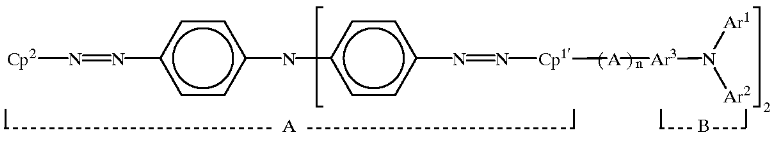

wherein $Cp^{1'}$ is a bivalent coupler radical; $Cp^2$ is a monovalent coupler radical; each of $Ar^1$ and $Ar^2$ is an aryl group which may have a substituent; $Ar^3$ is an arylene group which may have a substituent; A is selected from the group consisting of an ethylene group, a vinylene group, an oxygen atom and a sulfur atom; n is an integer of 0 to 2; moiety A,

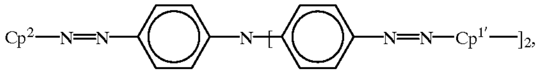

is the charge generating moiety; and moiety B,

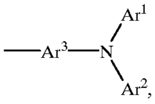

is the charge transporting moiety.

(1-5) A compound with formula (1-5):

(1-5)

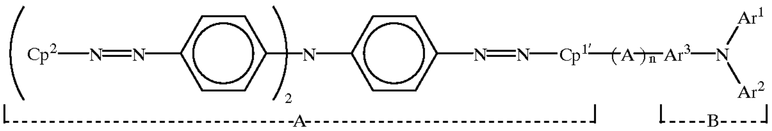

wherein $Cp^{1'}$ is a bivalent coupler radical; $Cp^2$ is a monovalent coupler radical; each of $Ar^1$ and $Ar^2$ is a n aryl group which may have a substituent; $Ar^3$ is an arylene group which may have a substituent; A is selected from the group consisting of an ethylene group, a vinylene group, an oxygen atom and a sulfur atom; n is an integer of 0 to 2; moiety A,

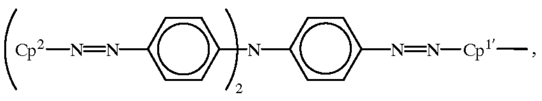

is the charge generating moiety; and moiety B,

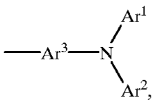

is the charge transporting moiety.

(1-6) A compound with formula (1-6):

(1-6)

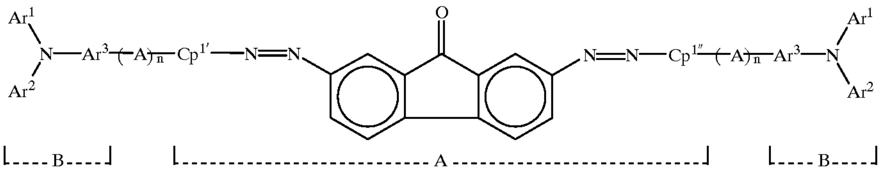

wherein $Cp^{1'}$ and $Cp^{1''}$ are each a bivalent coupler radical; each of $Ar^1$ and $Ar^2$ is an aryl group which may have a substituent; $Ar^3$ is an arylene group which may have a substituent; A is selected from the group consisting of an ethylene group, a vinylene group, an oxygen atom and a sulfur atom; n is an integer of 0 to 2; moiety A,

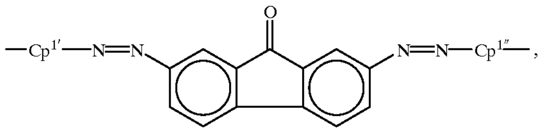

is the charge generating moiety; and each moiety B,

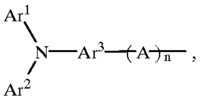

is the charge transporting moiety.

(1-7) A compound with formula (1-7):

(1-7)

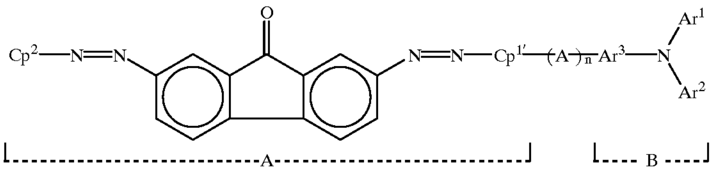

wherein $Cp^{1'}$ is a bivalent coupler radical; $Cp^2$ is a monovalent coupler radical; each of $Ar^1$ and $Ar^2$ is an aryl group which may have a substituent; $Ar^3$ is an arylene group which may have a substituent; A is selected from the group consisting of an ethylene group, a vinylene group, an oxygen atom and a sulfur atom; n is an integer 0to 2; moiety A,

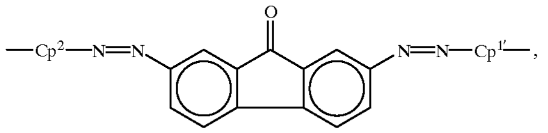

is the charge generating moiety; and moiety B,

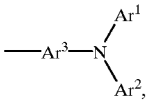

is the charge transporting moiety.

The second object of the present invention is achieved by any of the following bisazo compounds:

(2-1) A bisazo compound with formula (2-1):
(2-1)
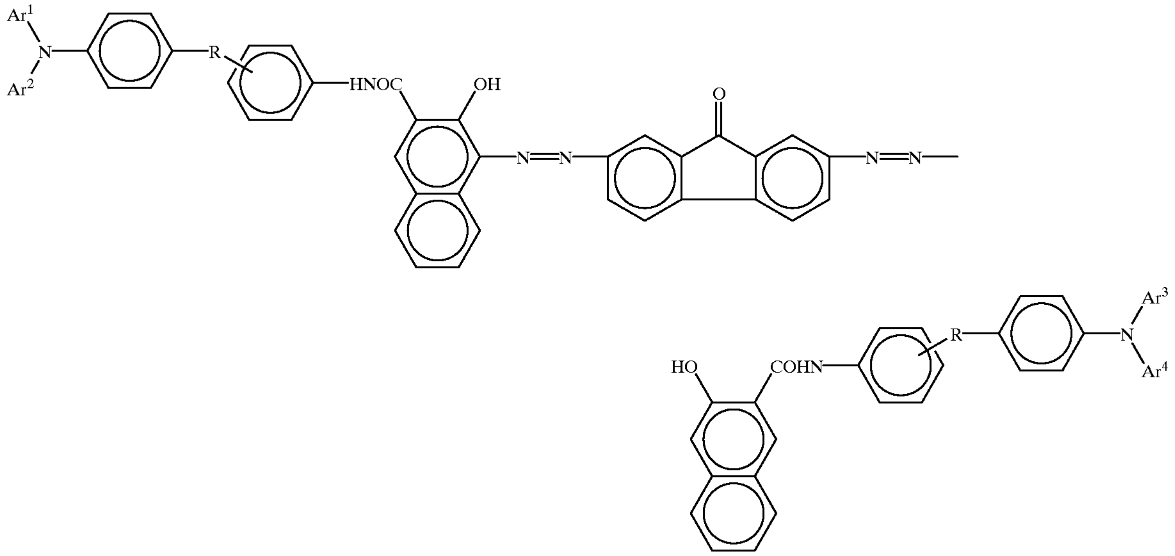
wherein $Ar^1$, $Ar^2$, $Ar^3$ and $Ar^4$ are each independently an aryl group which may have a substituent; and R is an ethylene group or a vinylene group.
(2-2) A bisazo compound with formula (2-2):
(2-2)
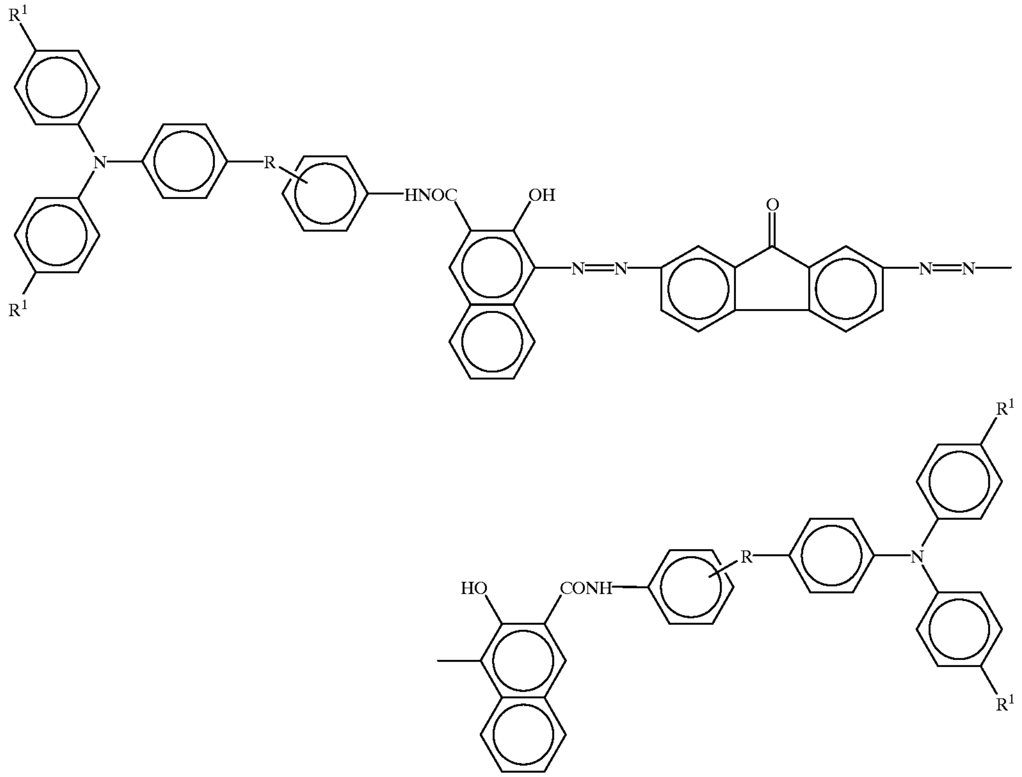
wherein $R^1$ is a hydrogen atom or an alkyl group having 1 to 4 carbon atoms; R is an ethylene or vinylene group.

(2-3) A bisazo compound with formula (2-3):

(2-3)

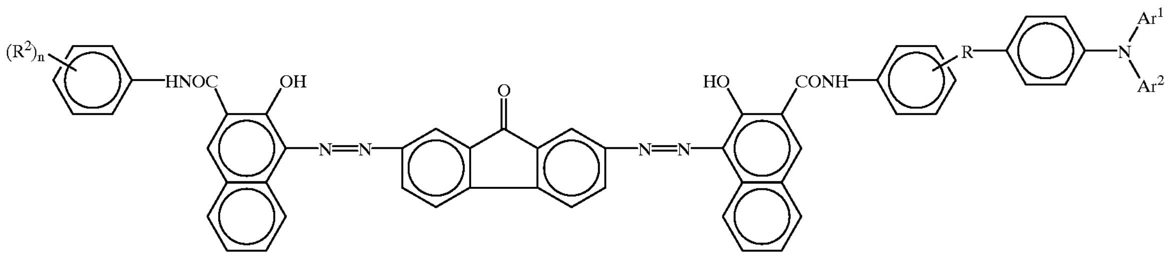

wherein $Ar^1$ and $Ar^2$ are each independently an aryl group which may have a substituent; $R^2$ is a hydrogen atom, an alkyl group having 1 to 4 carbon atoms, an alkoxyl group having 1 to 4 carbon atoms, a halogen atom, nitro group, or a dialkylamino group having 2 to 8 carbon atoms; R is an ethylene group or a vinylene group; when $R^2$ is not a hydrogen atom, n is an integer of 1 to 3, and each $R^2$ may be the same or different when n is 2 or 3.

(2-4) A bisazo compound with formula (2-4):

(2-4)

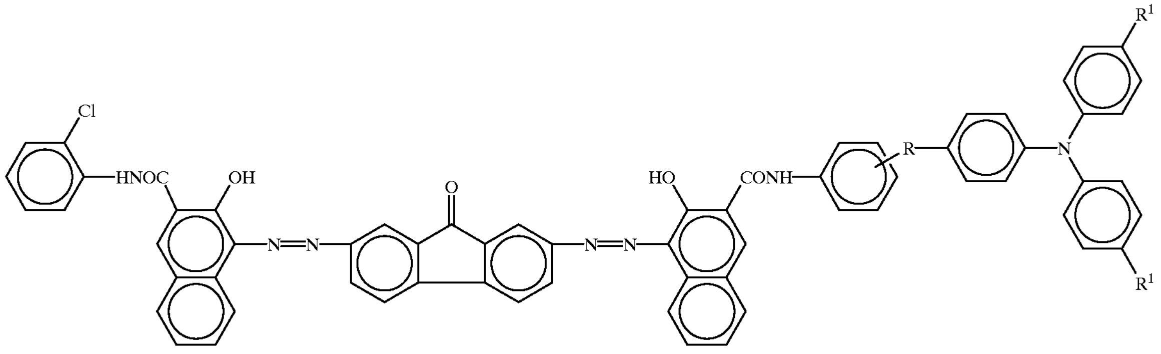

wherein $R^1$ is a hydrogen atom or an alkyl group having 1 to 4 carbon atoms; and R is an ethylene group or a vinylene group.

The third object of the present invention is achieved by any of the following trisazo compounds:

(3-1) A trisazo compound with formula (3-1):

(3-1)

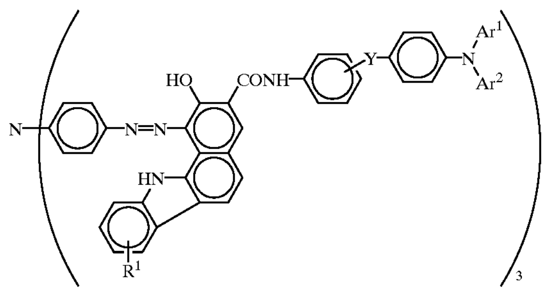

wherein $Ar^1$ and $Ar^2$ are each independently an aryl group which may have a substituent; $R^1$ is a hydrogen atom, an alkyl group having 1 to 4 carbon atoms, an alkoxyl group having 1 to 4 carbon atoms, or a halogen atom; and Y is an ethylene group or a vinylene group.

(3-2) A trisazo compound with formula (3-2):

(3-2)

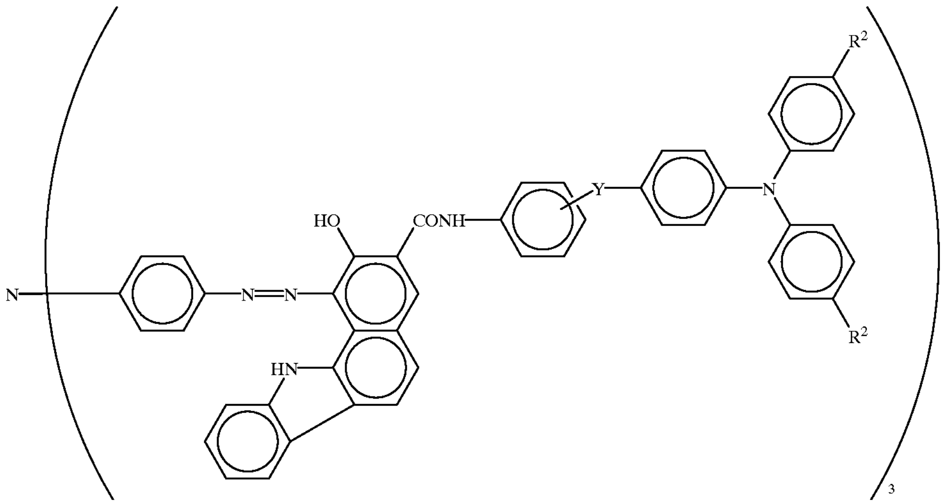

wherein $R^2$ is a hydrogen atom or an alkyl group having 1 to 4 carbon atoms; and Y is an ethylene group or a vinylene group.

(3-3) A trisazo compound with formula (3-3):

(3-3)

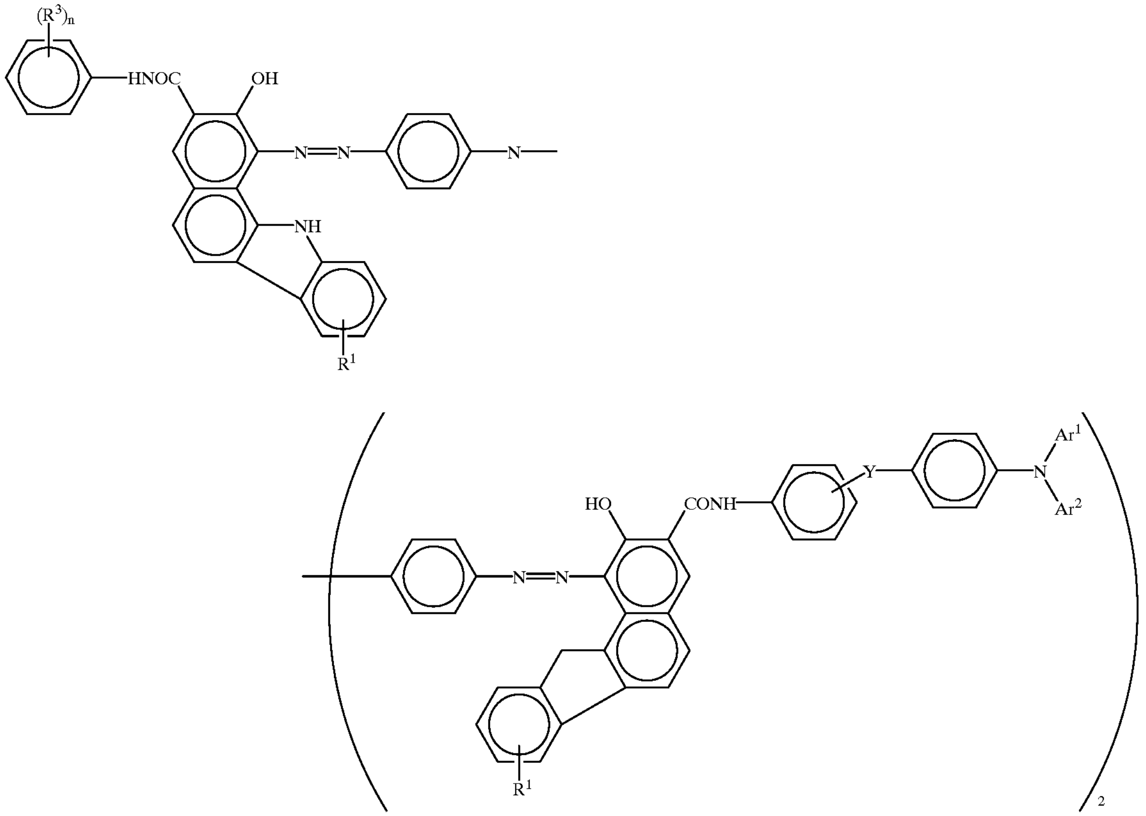

wherein $Ar^1$ and $Ar^2$ are each independently an aryl group which may have a substituent; $R^1$ is a hydrogen atom, an alkyl group having 1 to 4 carbon atoms, an alkoxyl group having 1 to 4 carbon atoms, or a halogen atom; $R^3$ is a hydrogen atom, an alkyl group having 1 to 4 carbon atoms, an alkoxyl group having 1 to 4 carbon atoms, a halogen atom, nitro group, or a dialkylamino group having 2 to 8 carbon atoms; Y is an ethylene group or a vinylene group; and n is an integer of 1 to 3, and when n is 2 or 3, each $R^3$ may be the same or different.

(3-4) A trisazo compound with formula (3-4):
(3-4)
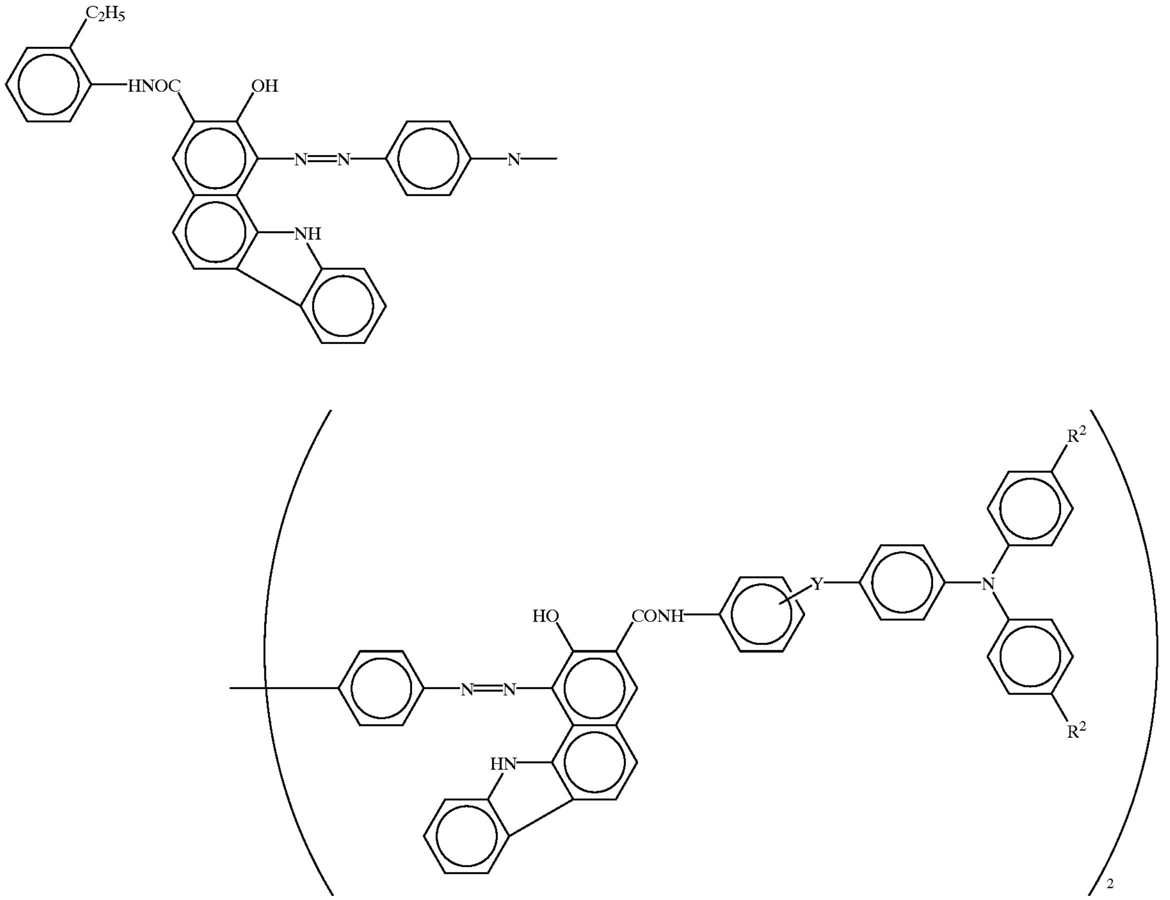
wherein $R^2$ is a hydrogen atom or an alkyl group having 1 to 4 carbon atoms; and Y is an ethylene group or a vinylene group.
(3-5) A trisazo compound with formula (3-5):
(3-5)
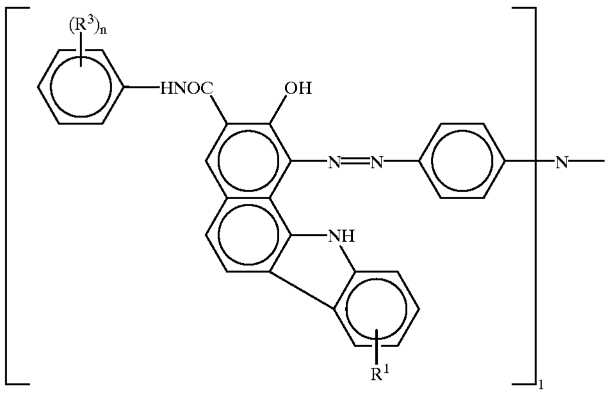

-continued

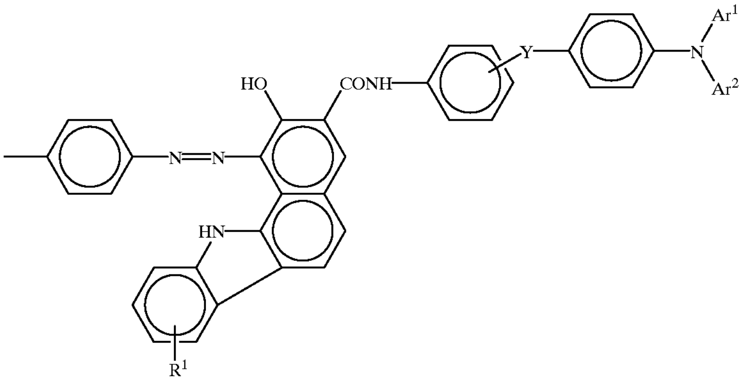

wherein $Ar^1$ and $Ar^2$ are each independently an aryl group which may have a substituent; $R^1$ is a hydrogen atom, an alkyl group having 1 to 4 carbon atoms, an alkoxyl group having 1 to 4 carbon atoms, or a halogen atom; $R^3$ is a hydrogen atom, an alkyl group having 1 to 4 carbon atoms, an alkoxyl group having 1 to 4 carbon atoms, a halogen atom, nitro group, or a dialkylamino group having 2 to 8 carbon atoms; Y is an ethylene group or a vinylene group; and n is an integer of 1 to 3, and when n is 2 or 3, each $R^3$ may be the same or different.

(3-6) A trisazo compound with formula (3-6):

(3-6)

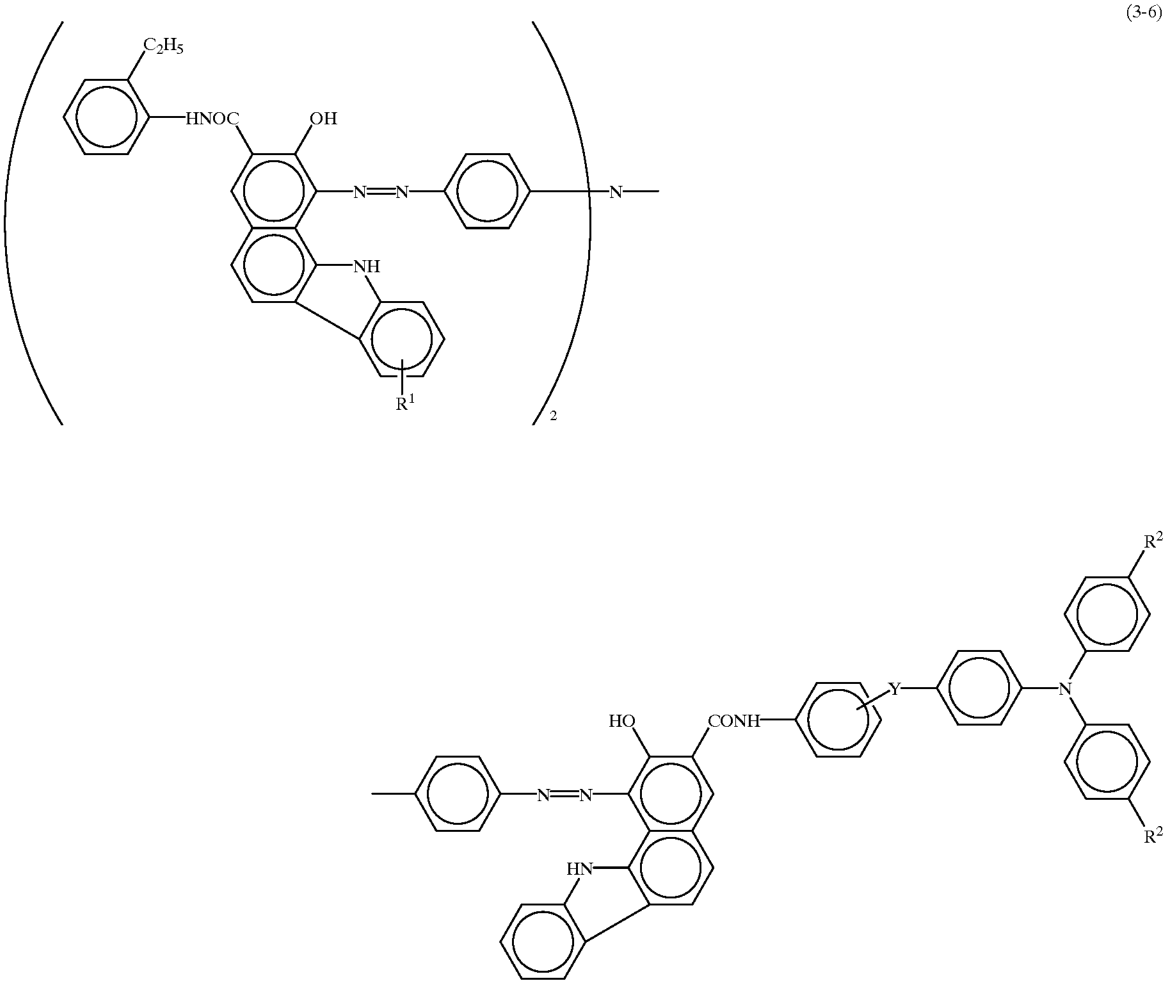

wherein $R^2$ is a hydrogen atom, or an alkyl group having 1 to 4 carbon atoms; and Y is an ethylene group or a vinylene group.

The fourth object of the present invention is achieved by the following intermediates for producing any of the above-mentioned bisazo compounds and trisazo compounds:

(4-1) A 2-hydroxy-3-phenylcarbamoylnaphthalene compound with formula (4-1):

(4-1)

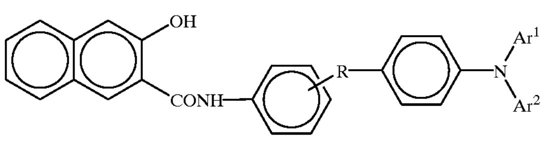

wherein $Ar^1$ and $Ar^2$ are each independently an aryl group which may have a substituent; and R is an ethylene group or a vinylene group.

(4-2) A 2-hydroxy-3-phenylcarbamoylnaphthalene compound with formula (4-2):

(4-2)

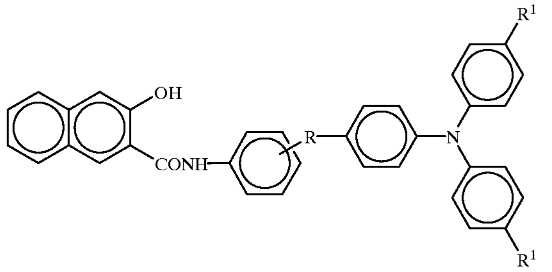

wherein $R^1$ is a hydrogen atom or an alkyl group having 1 to 4 carbon atoms; and R is an ethylene group or a vinylene group.

(4-3) A 2-hydroxy-3-phenylcarbamoyl-11H-benzo]a-carbazole compound with formula (4-3):

(4-3)

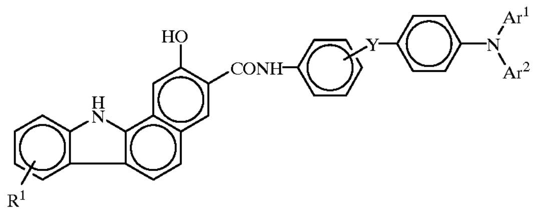

wherein $Ar^1$ and $Ar^2$ are each independently an aryl group which may have a substituent; $R^1$ is a hydrogen atom, an alkyl group having 1 to 4 carbon atoms, an alkoxyl group having 1 to 4 carbon atoms, or a halogen atom; and Y is an ethylene group or a vinylene group.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
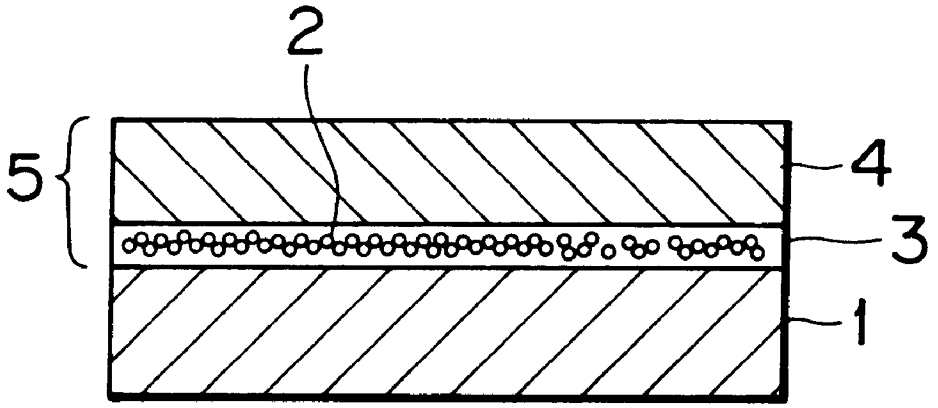
FIGS. 1 and 2 are schematic cross-sectional views which show the structural examples of the electrophotographic photoconductor according to the present invention.

The electrophotographic photoconductor according to the present invention comprises a photoconductive layer comprising a compound which comprises a charge generating moiety and a charge transporting moiety in the molecule thereof, so that the photoconductor obtained exhibits excellent photosensitivities in a range from the entire visible region to the wavelength of the semiconductor laser beam. In addition, the photoconductor of the present invention can be manufactured with no difficulty, and the durability of the obtained photoconductor is excellent.

The compound comprising a charge generating moiety and a charge transporting moiety in the molecule thereof for use in the photoconductor of the present invention can be obtained by chemical bonding of the molecule of a charge generating material or a precursor thereof and the molecule of a charge transporting material.

Examples of such a charge generating material include a perylene derivative, metal-free phthalocyanine, metallophthalocyanine, a variety of azo pigments such as chlorodiane blue, polycyclic quinone pigments, squarylium dye, azulenium dye, and thiapyrylium dye. Of those charge generating materials the azo pigments are preferred in the present invention.

As previously mentioned, the azo compounds of formulae (1-1) and (1-2) can be used as the compounds having in the molecule thereof a charge generating moiety and a charge transporting moiety. In this case, specific examples of X in the formulae (1-1) and (1-2), which constitutes the charge generating moiety A, include benzene, biphenyl, terphenyl, naphthalene, anthracene, phenanthrene, pyrene, pyridine, and the following bivalent, trivalent and tetravalent compounds which may have a substituent:

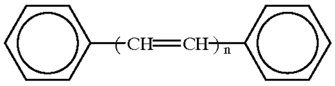, 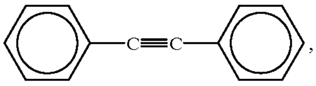, 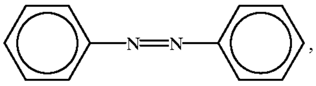,
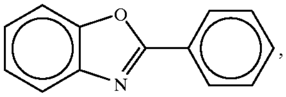, 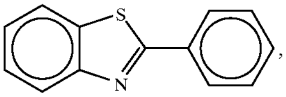, 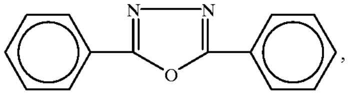,
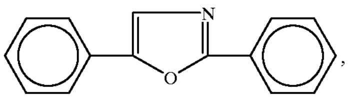, 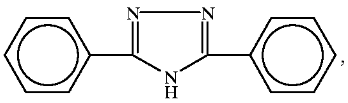, 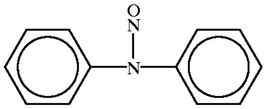,
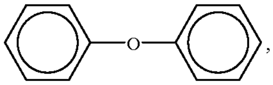, 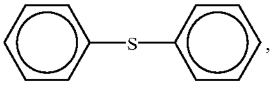, 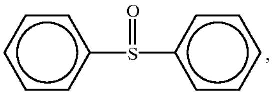, 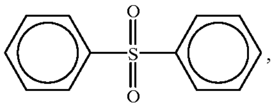,
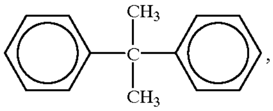, 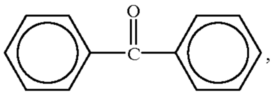,
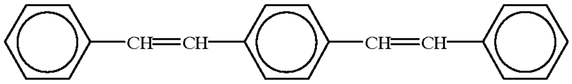, 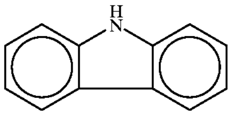, 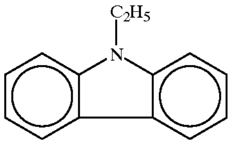,
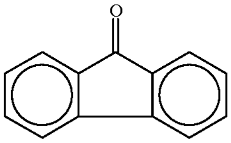, 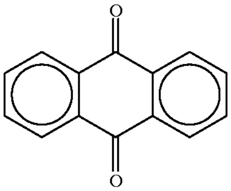, 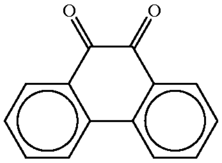, 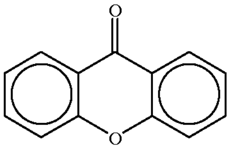,
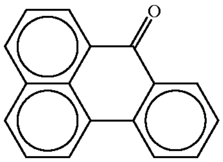, 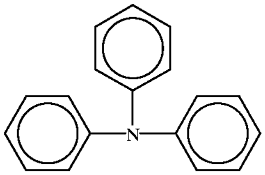, 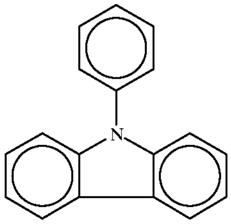, 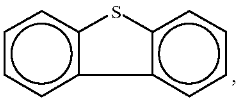,
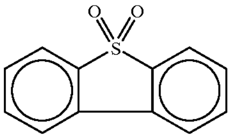, 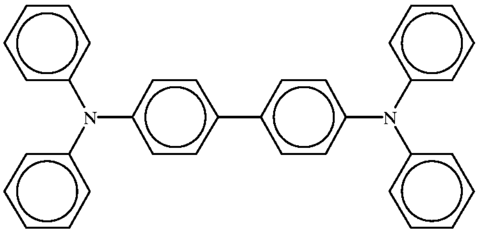,
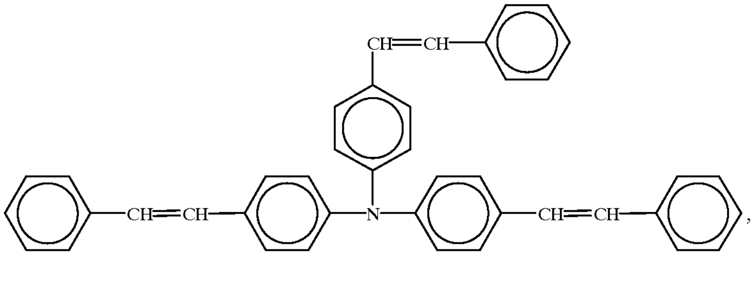, 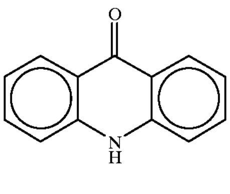, -continued

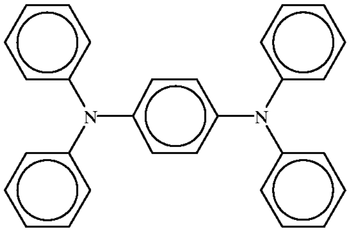

, and

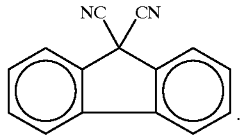

.

In particular, the bivalent, trivalent and tetravalent groups derived from triphenylamine and fluorenone are preferably employed.

As the charge transporting material for preparation of the compound having the charge generating moiety and the charge transporting moiety in its molecule for use in the present invention, there can be employed positive-hole-transporting materials and electron-transporting materials.

Examples of the positive-hole-transporting material are poly-N-carbazole and derivatives thereof; poly-γ-carbazolyl ethyl glutamate and derivatives thereof; a condensate of pyrene and formaldehyde, and derivatives thereof; polyvinylpyrene; polyvinylphenanthrene; oxazole derivatives; imidazole derivatives; triphenylamine derivatives; and the following compounds (a) to (r).

A compound (a) described in Japanese Laid-Open Patent Applications 55-154955 and 55-155954:

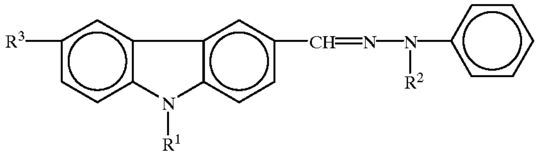

wherein $R^1$ represents methyl group, ethyl group, 2-hydroxyethyl group, or 2-chloroethyl group; $R^2$ represents methyl group, ethyl group, benzyl group or phenyl group; and $R^3$ represents hydrogen, chlorine, bromine, an alkyl group having I to 4 carbon atoms, an alkoxyl group having 1 to 4 carbon atoms, a dialkylamino group, or nitro group.

A compound (b) described in Japanese Laid-Open Patent Application 55-52063:

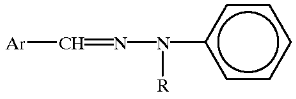

wherein Ar represents a naphthalene ring, an anthracene ring or a styryl ring, each of which may have a substituent, a pyridine ring, a furan ring, or a thiophene ring; and R represents an alkyl group or benzyl group.

A compound (c) described in Japanese Laid-Open Patent Application 56-81850:

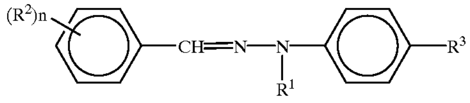

wherein $R^1$ represents an alkyl group, benzyl group, phenyl group, or naphthyl group; $R^2$ represents hydrogen, an alkyl group having 1 to 3 carbon atoms, an alkoxyl group having 1 to 3 carbon atoms, a dialkylamino group, a diaralkylamino group or a diarylamino group; n is an integer of 1 to 4; when n is 2 or more, $R^2$ may be the same or different; and $R^3$ represents hydrogen or methoxy group.

A compound (d) described in Japanese Patent Publication 51-10983:

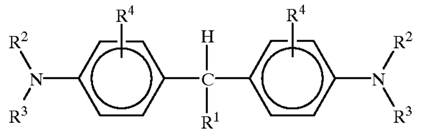

wherein $R^1$ represents an alkyl group having 1 to 11 carbon atoms, a substituted or unsubstituted phenyl group, or a heterocyclic group; $R^2$ and $R^3$ each independently represent hydrogen, an alkyl group having 1 to 4 carbon atoms, a hydroxyalkyl group, a chloroalkyl group, or a substituted or unsubstituted aralkyl group, $R^2$ and $R^3$ in combination may form a heterocyclic ring containing nitrogen; and $R^4$ represents hydrogen, an alkyl group having 1 to 4 carbon atoms, an alkoxyl group or a halogen, and each $R^4$ may be the same or different.

A compound (e) described in Japanese Laid-Open Patent Application 51-94829:

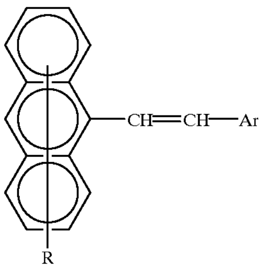

wherein R represents hydrogen or a halogen atom; Ar represents a phenyl group, naphthyl group, anthryl group or carbazolyl group, each of which may have a substituent.

A compound (f) described in Japanese Laid-Open Patent Application 52-128373:

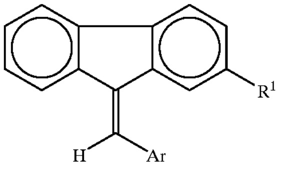

wherein $R^1$ represents hydrogen, a halogen atom, cyano group, an alkoxyl group having 1 to 4 carbon atoms, or an alkyl group having 1 to 4 carbon atoms; Ar represents

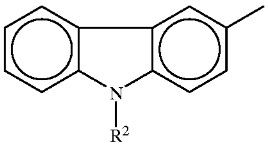

, or

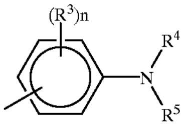

wherein $R^2$ represents an alkyl group having 1 to 4 carbon atoms; $R^3$ represents hydrogen, a halogen atom, an alkyl group having 1 to 4 carbon atoms, an alkoxyl group having 1 to 4 carbon atoms, or a dialkylamino group; n is an integer of 1 or 2; when n is 2, each $R^3$ may be the same or different; and $R^4$ and $R^5$ each represent hydrogen, a substituted or unsubstituted alkyl group having 1 to 4 carbon atoms or a substituted or unsubstituted benzyl group.

A compound (g) described in Japanese Laid-Open Patent Application 56-29245:

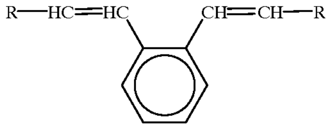

wherein R represents carbazolyl group, pyridyl group, thienyl group, indolyl group, furyl group, a phenyl group, styryl group, naphthyl group or anthryl group, each of which may have a substituent selected from the group consisting of a dialkylamino group, an alkyl group, an alkoxyl group, carboxyl group or an ester group thereof, a halogen atom, cyano group, an aralkylamino group, an N-alkyl-N-aralkylamino group, amino group, nitro group and acetylamino group.

A compound (h) described in Japanese Laid-Open Patent Application 58-58552:

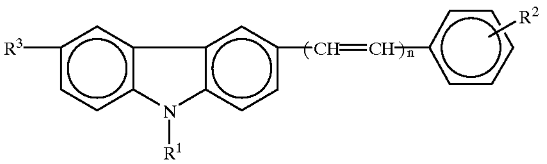

wherein $R^1$ represents a lower alkyl group, a substituted or unsubstituted phenyl group, or benzyl group; $R^2$ and $R^3$, each represents hydrogen, a lower alkyl group, a lower alkoxyl group, a halogen atom, nitro group, an amino group which may have as a substituent a lower alkyl group or benzyl group; and n is an integer of 1 or 2.

A compound (i) described in Japanese Laid-Open Patent Application 57-73075:

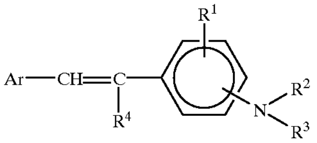

wherein $R^1$ represents hydrogen, an alkyl group, an alkoxyl group or a halogen atom; $R^2$ and $R^3$ each represent an alkyl group, a substituted or unsubstituted aralkyl group or a substituted or unsubstituted aryl group; $R^4$ represents hydrogen, a lower alkyl group, or a substituted or unsubstituted phenyl group; and Ar represents a substituted or unsubstituted phenyl group or naphthyl group.

A compound (j) described in Japanese Laid-Open Patent Application 58-198043:

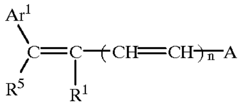

wherein n is an integer of 0 or 1, and when n is 0, A and $R^1$ may form a ring in combination; $R^1$ is hydrogen, an alkyl group or a substituted or unsubstituted phenyl group; $Ar^1$ is a substituted or unsubstituted aryl group; $R^5$ is a substituted or unsubstituted alkyl group, or a substituted or unsubstituted aryl group; A represents 9-anthryl group or a substituted or unsubstituted carbazolyl group of the following formulae:

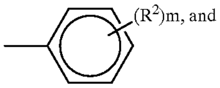

and

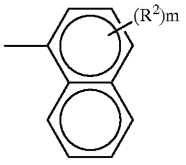

in which $R^2$ is hydrogen, an alkyl group, an alkoxyl group, a halogen atom, or

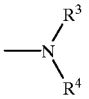

in which $R^3$ and $R^4$ may be the same or different and $R^4$ may form a ring, and each is an alkyl group, a substituted or unsubstituted aralkyl group, or a substituted or unsubstituted aryl group; and m is an integer of 0 to 3, and when m is 2 or more, each $R^2$ may be the same or different.

A compound (k) described in Japanese Laid-Open Patent Application 49-105537:

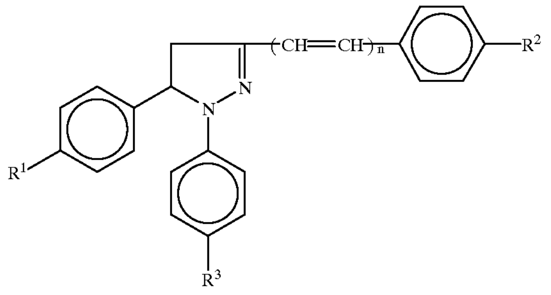

wherein $R^1$, $R^2$ and $R^3$ each represent hydrogen, a lower alkyl group, a lower alkoxyl group, a dialkylamino group or a halogen atom; and n is an integer of 0 or 1.

A compound (l) described in Japanese Laid-Open Patent Application 52-139066:

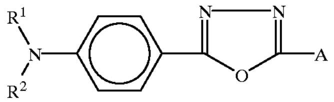

wherein $R^1$ and $R^2$ each represent a substituted or unsubstituted alkyl group, or a substituted or unsubstituted aryl group; and A is a substituted amino group, a substituted or unsubstituted aryl group, or allyl group.

A compound (m) described in Japanese Laid-Open Patent Application 52-139065:

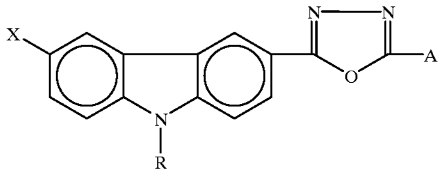

wherein X is hydrogen, a lower alkyl group or a halogen atom; R is a substituted or unsubstituted alkyl group, or a substituted or unsubstituted aryl group; and A is a substituted amino group, or a substituted or unsubstituted aryl group.

A compound (n) described in Japanese Patent Publication 58-32372:

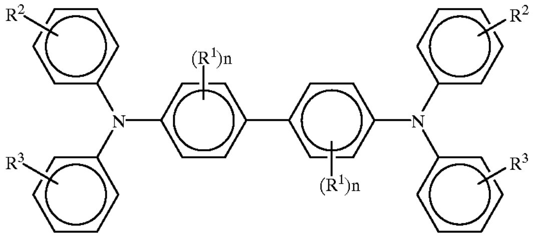

wherein $R^1$ is a lower alkyl group, a lower alkoxyl group or a halogen atom; n is an integer of 0 to 4; and $R^2$ and $R^3$, which may be the same or different, each is hydrogen, a lower alkyl group, a lower alkoxyl group or a halogen atom.

A compound (o) described in Japanese Laid-Open Patent Application 2-178669:

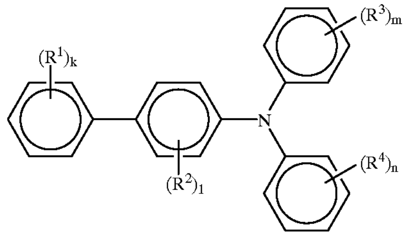

wherein $R^1$, $R^3$ and $R^4$, each is hydrogen, amino group, an alkoxyl group, a thioalkoxyl group, an aryloxy group, methylenedioxy group, a substituted or unsubstituted alkyl group, a halogen atom, or a substituted or unsubstituted aryl group; $R^2$ is hydrogen, an alkoxyl group, a substituted or unsubstituted alkyl group, or a halogen atom, except that $R^1$, $R^2$, $R^3$ and $R^4$ are hydrogen at the same time; and k, l, m and n are integers of 1 to 4, and when each is an integer of 2, 3 or 4, $R^1$, $R^2$, $R^3$ and $R^4$ may be the same or different.

A compound (p) described in Japanese Patent Application 1-77839:

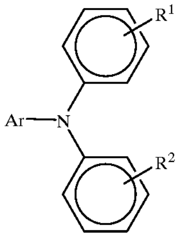

wherein Ar is a condensation polycyclic hydrocarbon group having 18 carbon atoms or less; and $R^1$ and $R^2$, which may be the same or different, each is hydrogen, a halogen atom, a substituted or unsubstituted alkyl group, an alkoxyl group, or a substituted or unsubstituted phenyl group.

A compound (q) described in Japanese Patent Application 62-98394:

A—CH═CH—Ar—CH═CH—A wherein Ar is a substituted or unsubstituted aromatic hydrocarbon group; and A is

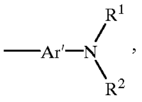

in which Ar' is a substituted or unsubstituted aromatic hydrocarbon group; and $R^1$ and $R^2$, each is a substituted or unsubstituted alkyl group, or a substituted or unsubstituted aryl group.

A compound (r) described in Japanese Patent Application 2-94812:

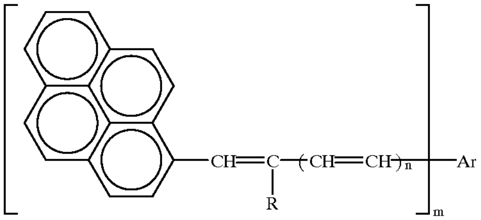

wherein Ar is an aromatic hydrocarbon group; R is hydrogen, a substituted or unsubstituted alkyl group, or an aryl group; n is an integer of 0 or 1; and m is an integer of 1 or 2, and when n=0 and m=1, Ar and R may form a ring in combination.

Specific examples of the compound (a) are 9-ethylcarbazole-3-aldehyde-1-methyl-1-phenylhydrazone, 9-ethylcarbazole-3-aldehyde-1-benzyl-1-phenylhydrazone, and 9-ethylcarbazole-3-aldehyde-1,1-diphenylhydrazone.

Specific examples of the compound (b) are 4-diethylaminostyryl-β-aldehyde-1-methyl-1-phenyl-hydrazone, and 4-methoxynaphthalene-1-aldehyde-1-benzyl-1-phenylhydrazone.

Specific examples of the compound (c) are 4-methoxybenzaldehyde-1-methyl-1-phenylhytirazone, 2,4-dimethoxybenzaldehyde-1-benzyl-1-phenylhydrazone, 4-diethylaminobenzaldehyde-1,1-diphenylhydrazone, 4-methoxybenzaldehyde-1-benzyl-1-(4-methoxy)phenyl-hydrazone, 4-diphenylaminobenzaldehyde-1-benzyl-1-phenylhydrazone, and 4-dibenzylaminobenzaldehyde-1,1-diphenylhydrazone.

Specific examples of the compound (d) are 1,1-bis(4-dibenzylaminophenyl)propane, tris(4-diethyl-aminophenyl) methane, 1,1-bis(4-dibenzylaminophenyl)propane, and 2,2'-dimethyl-4,4'-bis(diethylamino)-triphenylmethane.

Specific examples of the compound (e) are 9-(4-diethylaminostyryl)anthracene, and 9-bromo-10-(4-diethylaminostyryl)anthracene.

Specific examples of the compound (f) are 9-(4-dimethylaminobenzylidene)fluorene, and 3-(9-fluorenylidene)-9-ethylcarbazole.

Specific examples of the compound (g) are 1,2-bis(4-diethylaminostyryl)benzene, and 1,2-bis(2,4-dimethoxystyryl)benzene.

Specific examples of the compound (h) are 3-styryl-9-ethylcarbazole, and 3-(4-methoxystyryl)-9-ethylcarbazole.

Specific examples of the compound (i) are 4-diphenylaminostilbene, 4-dibenzylaminostilbene, 4-ditolyllaminostilbene, 1-(4-diphenylaminostyryl)-naphthalene, and 1-(4-diethylaminostyryl)naphthalene.

Specific examples of the compound (j) are 4'-diphenylamino-α-phenylstilbene, and 4,-bis(4-methylphenyl)amino-α-phenylstilbene.

Specific examples of the compound (k) are 1-phenyl-3-(4-diethylaminostyryl)-5-(4-diethyl-aminophenyl) pyrazoline, and 1-phenyl-3-(4-dimethylamino-styryl)-5-(4-dimethylaminophenyl)pyrazoline.

Specific examples of the compound (l) are 2,5-bis(4-diethylaminophenyl)-1,3,4-oxadiazole, 2-N,N-diphenylamino-5-(4-diethylaminophenyl)-1,3,4-oxadiazole and 2-(4-dimethylaminophenyl)-5-(4-diethylaminophenyl)-1,3,4-oxadiazole.

Specific examples of the compound (m) are 2-N,N-diphenylamino-5-(N-ethylcarbazole-3-yl)-1,3,4-oxadiazole and 2-(4-diethylaminophenyl)-5-(N-ethylcarbazole-3-yl)-1,3,4-oxadiazole.

Specific examples of the benzidine compound (n) are N,N'-diphenyl-N,N'-bis(3-methylphenyl)-[1,1'-biphenyl]-4,4'-diamine, and 3,3'-dimethyl-N,N,N',N'-tetrakis(4-methylphenyl)-[1,1'-biphenyl]-4,4'-diamine.

Specific examples of the biphenylamine compound (o) are 4'-methoxy-N,N-diphenyl-[1,1'-biphenyl]-4-amine, 4'-methyl-N,N-bis(4-methylphenyl)-[1,1'-biphenyl]-4-amine, and 4'-methoxy-N,N-bis(4-methylphenyl)-[1,1'-biphenyl]-4-amine.

Specific examples of the triarylamine compound (p) are 1-diphenylaminopyrene and 1-di(p-tolylamino)pyrene.

Specific examples of the diolefin aromatic compound (q) are 1,4-bis(4-diphenylaminostyryl)benzene and 1,4-bis[4-di (p-tolyl)aminostyryl]benzene.

Specific examples of the styrylpyrene compound (r) are 1-(4-diphenylaminostyryl)pyrene and 1-[4-di(p-tolyl) aminostyryl)pyrene.

Examples of the electron-transporting material are chloroanil, bromoanil, tetracyanoethylene, tetracyanoquinodimethane, 2,4,7-trinitro-9-fluorenone, 2,4,5,7-tetranitro-9-fluorenone, 2,4,5,7-tetranitro-xanthone, 2,4,8-trinitrothioxanthone, 2,6,8-trinitro-4H-indeno(1,2-b] thiophene-4-one, and 1,3,7-trinitrodibenzo-thiophene-5,5-dioxide.

In the azo compounds of formulae (1-1) and (1-2) for use in the present invention, each of which comprises a charge generating moiety and a charge transporting moiety in the molecule thereof, Y represents a monovalent group derived from the molecule of the above-mentioned charge transporting materials.

As previously mentioned, the electrophotographic photoconductor according to the present invention comprises an electroconductive support and a photoconductive layer formed thereon which comprises a compound comprising a charge generating moiety and a charge transporting moiety in the molecule thereof.

In the electrophotographic photoconductor of the present invention, it is preferable that the charge generating moiety of the compound be a moiety derived from an azo compound; and that the charge transporting moiety thereof be a moiety derived from a triarylamine compound.

Specific examples of the above compound for use in the electrophotographic photoconductor of the present invention are as follows:

(1-1) A compound with formula (1-1):

$$\underbrace{[Cp^2-N{=}N\!\!\rfloor_j\!-X-\!\!\lfloor N{=}N-Cp^1}_{A}\underbrace{-(Y)_k]_i}_{B} \qquad (1\text{-}1)$$

wherein X is a bivalent, trivalent or tetravalent aromatic cyclic hydrocarbon group or aromatic heterocyclic group, which may have a substituent; Y is a monovalent group derived from a charge transporting compound; $Cp^1$ is a 2- to 6-valent coupler radical; $Cp^2$ is a monovalent coupler radical; i is an integer of 1 to 4; j is an integer of 0 to 3; i+j is an integer of 2 to 4; k is an integer of 1 to 5; moiety A, $[Cp^2-N{=}N\rfloor_j X \lfloor N{=}N\text{-}Cp^1\text{-}]_i$, is the charge generating moiety; and moiety B, $-(Y)_k$, is the charge transporting moiety.

(1-2) A compound with formula (1-2):

(1-2)

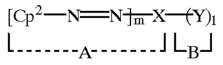

wherein X is a bivalent, trivalent or tetravalent aromatic cyclic hydrocarbon group or aromatic heterocyclic group, which may have a substituent; Y is a monovalent group derived from a charge transporting compound; $Cp^2$ is a monovalent coupler radical; l is an integer of 1 to 3; m is an integer of 1 to 3; l+m is an integer of 2 to 4; moiety A, $[Cp^2—N{=}N\frac{}{}]_m X—$, is the charge generating moiety; and moiety B, $-(Y)_l$, is the charge transporting moiety.

(8)

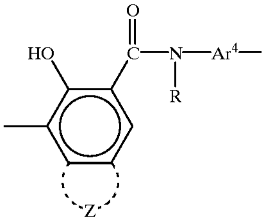

wherein $Ar^4$ is an arylene group which may have a substituent; R is a hydrogen atom or an alkyl group having 1 to 4 carbon atoms; and Z is ay,. atomic group which constitutes an aromatic cyclic hydrocarbon group or aromatic heterocyclic group which may have a substituent.

(1-4) A compound with formula (1-4):

(1-4)

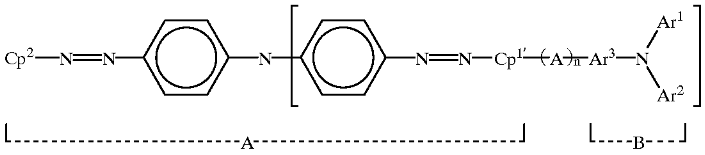

(1-3) A compound with formula (1-2):

(1-3)

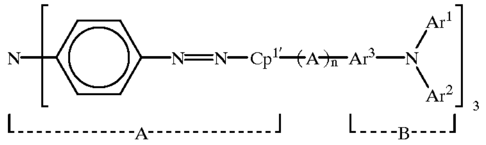

wherein $Cp^{1'}$ is a bivalent coupler radical; each of $Ar^1$ and $Ar^2$ is an aryl group which may have a substituent; $Ar^3$ is an arylene group which may have a substituent; A is selected from the group consisting of an ethylene group, a vinylene group, an oxygen atom and a sulfur atom; n is an integer of 0 to 2; moiety A,

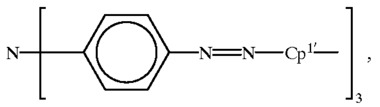

is the charge generating moiety; and moiety B,

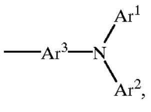

is the charge transporting moiety.

In this compound with formula (1-3), $Cp^{1'}$ may be a moiety with the following formula (8):

wherein $Cp^{1'}$ is a bivalent coupler radical; $Cp^2$ is a monovalent coupler radical; each of $Ar^1$ and $Ar^2$ is an aryl group which may have a substituent; $Ar^3$ is an arylene group which may have a substituent; A is selected from the group consisting of an ethylene group, a vinylene group, an oxygen atom and a sulfur atom; n is an integer of 0 to 2; moiety A,

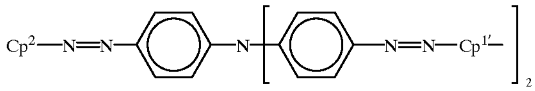

is the charge generating moiety; and moiety B,

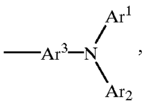

is the charge transporting moiety.

In this compound with formula (1-4), $Cp^{1'}$ may be the same as the previously mentioned moiety with formula (8).

(1-5) A compound with formula (1-5):

(1-5)

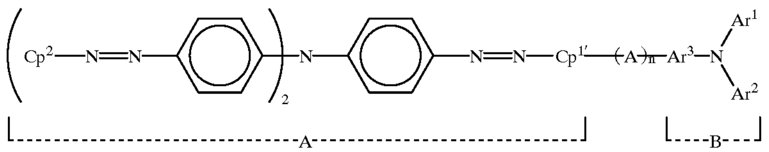

wherein $Cp^{1'}$ is a bivalent coupler radical; $Cp^2$ is a monovalent coupler radical; each of $Ar^1$ and $Ar^2$ is an aryl group which may have a substituent, $Ar^3$ is an arylene group which may have a substituent; A is selected from the group consisting of an ethylene group, a vinylene group, an oxygen atom and a sulfur atom; n is an integer of 0 to 2; moiety A,

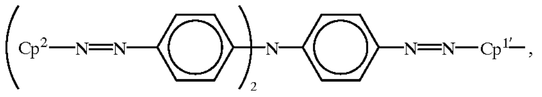

is the charge generating moiety; and moiety B,

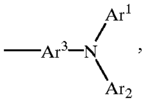

is the charge transporting moiety.

In this compound with formula (1-5), $Cp^{1'}$ may be the same as the previously mentioned moiety with formula (8).

(1-6) A compound with formula (1-6):

(1-6)

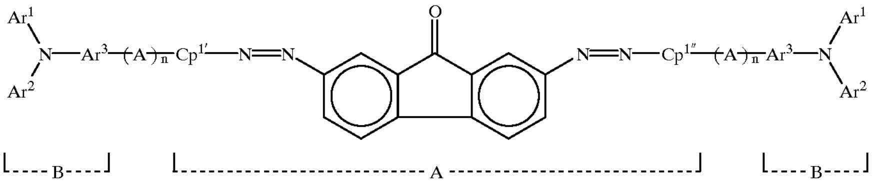

wherein $Cp^{1'}$ and $Cp^{1''}$ are each a bivalent coupler radical; each of $Ar^1$ and $Ar^2$ is an aryl group which may have a substituent; $Ar^3$ is an arylene group which may have a substituent; A is selected from the group consisting of an ethylene group, a vinylene group, an oxygen atom and a sulfur atom; n is an integer of 0 to 2; moiety A,

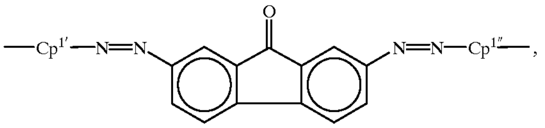

is the charge generating moiety; and each moiety B,

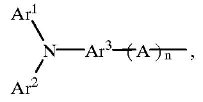

is the charge transporting moiety.

In this compound with formula (1-6); $Cp^{1'}$ and Cp" may be respectively the following moiety with formula (8-1) and moiety with formula (8-2):

(8-1)

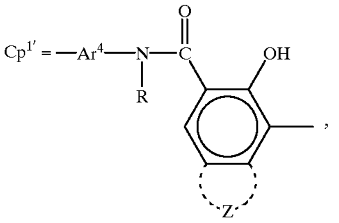

-continued (8-2)

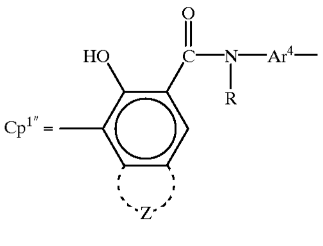

wherein $Ar^4$ is an arylene group which may have a substituent; R is a hydrogen atom or an alkyl group having 1 to 4 carbon atoms; and Z is an atomic group which constitutes an aromatic cyclic hydrocarbon group or aromatic heterocyclic group which may have a substituent.

(1-7) A compound with formula (1-7):

(1-7)

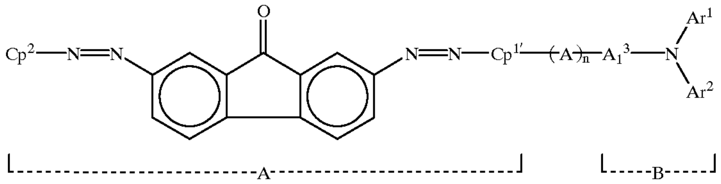

wherein $Cp^{1'}$ is a bivalent coupler radical; $Cp^2$ is a monovalent coupler radical; each of $Ar^1$ and $Ar^2$ is an aryl group which may have a substituent; $Ar^3$ is an arylene group which may have a substituent; A is selected from the group consisting of an ethylene group, a vinylene group, an oxygen atom and a sulfur atom; n is an integer of 0 to 2; moiety A,

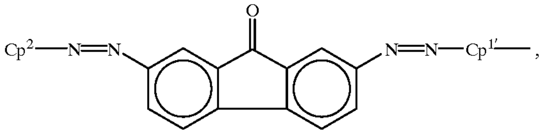

is the charge generating moiety; and moiety B,

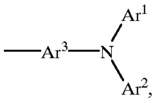

is the charge transporting moiety.

In this compound with formula (1-7), $Cp^{1'}$ may be the same as the previously mentioned moiety with formula (8).

Examples of the coupler radical represented by $Cp^1$ and $Cp^2$ in the azo compound of formula (1-1) include radicals derived from an aromatic hydrocarbon compound having hydroxyl group and a heterocyclic compound having hydroxyl group, such as phenols and naphthols; an aromatic hydrocarbon compound having amino group and a heterocyclic compound having amino group; an aromatic hydrocarbon compound having hydroxyl group and amino group and a heterocyclic compound having hydroxyl group and amino group, such as aminonaphthols; and an aliphatic or aromatic compound having a ketone group of enol form, that is, a compound with an active methylene group.

Preferable examples of the monovalent coupler radical represented by $Cp^2$ are as follows:

(A)

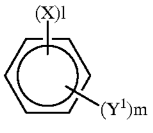

-continued (B)

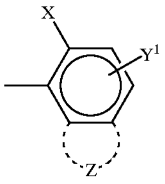

(C)

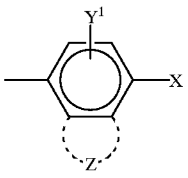

(D)

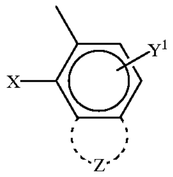

wherein:

X is —OH, $—N(R^1)(R^2)$, or $—NHSO_2—R^3$,
in which $R^1$ and $R^2$, each is hydrogen, or a substituted or unsubstituted alkyl group; and $R^3$ is a substituted or unsubstituted alkyl group, or a substituted or unsubstituted aryl group;

$Y^1$ is hydrogen, a halogen atom, a substituted or unsubstituted alkyl group, a substituted or unsubstituted alkoxyl group, carboxyl group, sulfone group, a substituted or unsubstituted sulfamoyl group, $—CON(R^4)(Y^2)$ or $—CONHCON(R^4)(Y^2)$,
in which $R^4$ is hydrogen, a substituted or unsubstituted alkyl group, or a substituted or unsubstituted phenyl group; and $Y^2$ is a substituted or unsubstituted cyclic hydrocarbon group, a substituted or unsubstituted heterocyclic group, or $—N=C(R^5)(R^6)$,
in which $R^5$ is a substituted or unsubstituted cyclic hydrocarbon group, a substituted or unsubstituted heterocyclic group, or substituted or unsubstituted styryl group; and $R^6$ is hydrogen, a substituted or unsubstituted alkyl group, or a substituted or unsubstituted phenyl group, and $R^5$ and $R^6$ may form a ring together with carbon atoms bonding thereto;

Z is an atom group for constituting a substituted or unsubstituted aromatic hydrocarbon ring, or a substituted or unsubstituted aromatic heterocyclic ring;

l is an integer of 1 or 2; and m is an integer of 1 or 2.

(E)

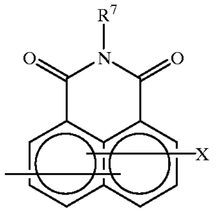

wherein $R^7$is a substituted or unsubstituted hydrocarbon group; and X is the same as that previously defined.

(F)

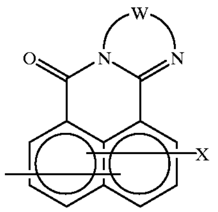

wherein W is a bivalent aromatic hydrocarbon group or a bivalent heterocyclic group containing nitrogen atom therein, and the ring may have a substituent; and X is the same as that previously defined.

(G)

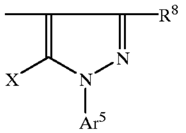

wherein $R^8$ is an alkyl group, carbamoyl group, or carboxyl group or an ester group thereof; $Ar^5$ is a substituted or unsubstituted cyclic hydrocarbon group; and X is the same as that previously defined.

(H)

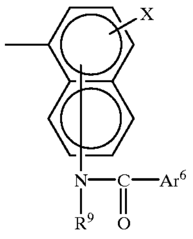

(I)

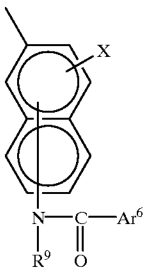

wherein $R^9$ is hydrogen, or a substituted or unsubstituted hydrocarbon group; and $Ar^6$ is a substituted or unsubstituted cyclic hydrocarbon group.

In the previously mentioned formulae (8), (8-1) and (8-2), and the formulae (B), (C) and (D), Z represents a hydrocarbon ring such as benzene ring or naphthalene ring; or a heterocyclic ring such as indole ring, carbazole ring, benzofuran ring or dibenzofuran ring. The ring represented by Z may have as a substituent a halogen atom, such as chlorine or bromine.

Specific examples of the cyclic hydrocarbon group represented by $Y^2$ or $R^5$ in the formulae (A) to (D) include phenyl group, naphthyl group, anthryl group, and pyrenyl group; and specific examples of the heterocyclic group represented by $Y^2$ or $R^5$ include pyridyl group, thienyl group, furyl group, indolyl group, benzofuranyl group, carbazolyl group, and dibenzofuranyl group. Further, $R^5$ and $R^6$ may form in combination a ring such as fluorene ring. Specific examples of the substituent of the cyclic hydrocarbon group or heterocyclic group represented by $Y^2$ or $R^5$, or the substituent of the ring formed by the combination of $R^5$ and $R^6$ include an alkyl group such as methyl group, ethyl group, propyl group and butyl group; an alkoxyl group such as methoxy group, ethoxy group, propoxy group and butoxy group; a halogen atom such as chlorine and bromine; a dialkylamino group such as dimethylamino group and diethylamino group; a halomethyl group such as trifluoromethyl group; nitro group; cyano group; carboxyl group and an ester group thereof; hydroxyl group; and sulfonate group such as $—SO_3Na$.

As a substituent of the phenyl group represented by $R^4$ in the formulae (A) to (D), there can be employed a halogen atom such as chlorine and bromine. Examples of the hydrocarbon group represented by $R^7$ or $R^9$ in the formulae (E) to (I) include an alkyl group such as methyl group, ethyl group, propyl group and butyl group; and an aryl group such as phenyl group, which may have a substituent. Examples of the substituent of the hydrocarbon group represented by $R^7$ or $R^9$ include an alkyl group such as methyl group, ethyl group, propyl group and butyl group; an alkoxyl group such as methoxy group, ethoxy group, propoxy group and butoxy group; a halogen atom such as chlorine and bromine; hydroxyl group; and nitro group.

Examples of the cyclic hydrocarbon group represented by $Ar^5$ or $Ar^6$ in formulae (G) to (I) are phenyl group and naphthyl group. Examples of the substituent of the cyclic hydrocarbon group represented by $Ar^5$ or $Ar^6$ are an alkyl group such as methyl group, ethyl group, propyl group and butyl group; an alkoxyl group such as methoxy group, ethoxy group, propoxy group and butoxy group; nitro group; a halogen atom such as chlorine and bromine; cyano group; and a dialkylamino group such as dimethylamino group and diethylamino group.

In addition, hydroxyl group is particularly preferably as X in the previously mentioned formulae (A) to (I).

Of the above-mentioned coupler radicals the coupler radicals of formulae (B), (E), (F), (G), (H) and (I) are preferable in the present invention, and in particular, the above-mentioned coupler radicals in which X represents hydroxyl group are more preferable. Further, in the case where X is hydroxyl group, the following coupler radical of formula (J) is preferable, and the coupler radical of formula (K) is more preferable:

(J)

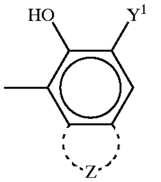

wherein $Y^1$ and Z are the same as those previously defined.

(K)

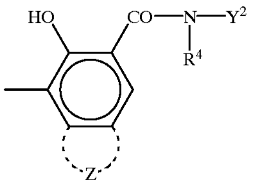

wherein Z, $Y^2$, and $R^4$ are the same as those previously defined.

Furthermore, the following coupler radical of formula (L) or (M) is particularly preferable:

(L)

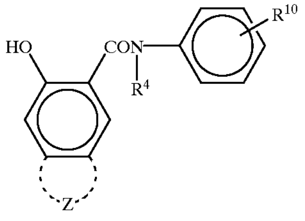

(M)

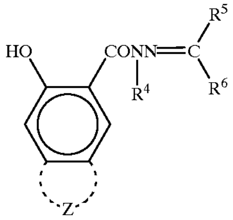

wherein Z, $R^4$, $R^5$ and $R^6$ are the same as those previously defined; and $R^{10}$ represents the same substituent as that for $Y^2$.

The bivalent coupler radical $-Cp^{1'}-$ for use in the compounds comprising the charge generating moiety and the charge transporting moiety in the molecule thereof is a bivalent radical derived from the monovalent radicals having the previously mentioned formulae (A) to (M), which are shown as the monovalent coupler radicals represented by $-Cp^2$. In particular, the following bivalent coupler radicals of formulae (N) and (0) are preferable as $-Cp^{1'}-$:

(N)

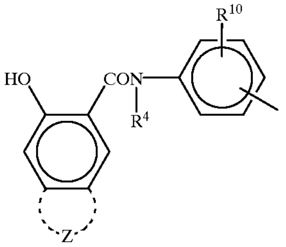

(O)

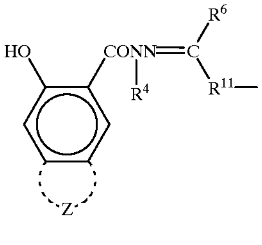

wherein Z, $R^4$ and $R^6$ are the same as those previously defined; $R^{10}$ represents the same substituent as that for $Y^2$; and $R^{11}$ represents a bivalent group derived from any of the previously mentioned groups represented by $R^2$.

Specific examples of the coupler in the form of $H-Cp^{1'}-H$ and $Cp^2-H$, which is used for the compounds for use in the present invention are shown in the following Tables 1 to 16:

TABLE 1

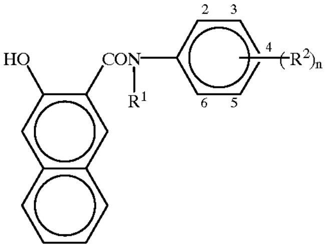

| Coupler No. | $R^1$ | $(R^2)_n$ | Melting Point (° C.) |
|---|---|---|---|
| 1 | H | H | 243~244 |
| 2 | H | $2-NO_2$ | 194~196 |
| 3 | H | $3-NO_2$ | 246~247 |
| 4 | H | $4-NO_2$ | 266~267.5 |
| 5 | H | $2-CF_3$ | 178~179 |
| 6 | H | $3-CF_3$ | 237.5~238.5 |
| 7 | H | $4-CF_3$ | 279~281 |
| 8 | H | 2-CN | 221~222.5 |
| 9 | H | 3-CN | 256.5~258.5 |
| 10 | H | 4-CN | 274.5~277 |
| 11 | H | 2-I | 199~199.5 |
| 12 | H | 3-I | 258.5~259.5 |
| 13 | H | 4-I | 261.5~262 |
| 14 | H | 2-Br | 217~218 |
| 15 | H | 3-Br | 254~255 |
| 16 | H | 4-Br | 265~268 |
| 17 | H | 2-Cl | 228~230 |
| 18 | H | 3-Cl | 256.5~257 |
| 19 | H | 4-Cl | 264~266 |

TABLE 1-continued

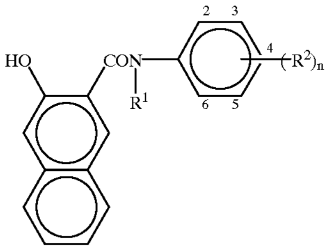

| Coupler No. | $R^1$ | $(R^2)_n$ | Melting Point (° C.) |
|---|---|---|---|
| 20 | H | 2-F | 223.0~224.0 |
| 21 | H | 3-F | 250.0~251.0 |
| 22 | H | 4-F | 265.0~267.0 |
| 23 | H | 2-$CH_3$ | 195.5~198.0 |
| 24 | H | 3-$CH_3$ | 214.5~216.5 |
| 25 | H | 4-$CH_3$ | 227.0~229.0 |
| 26 | H | 2-$C_2H_5$ | 168.5~169.5 |
| 27 | H | 4-$C_2H_5$ | 203.0~204.5 |
| 28 | H | 2-$OCH_3$ | 167~168 |
| 29 | H | 3-$OCH_3$ | 195.5~198.0 |
| 30 | H | 4-$OCH_3$ | 229~230 |
| 31 | H | 2-$OC_2H_5$ | 157~158 |
| 32 | H | 3-$OC_2H_5$ | 188.5~189.0 |
| 33 | H | 4-$OC_2H_5$ | 225.0~225.5 |
| 34 | H | 4-$N(CH_3)_2$ | 232.0~233.5 |
| 35 | —$CH_3$ | H | 189.5~190.5 |
| 36 | 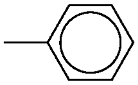 | H | 182.0~183.0 |
| 37 | H | 2-$OCH_3$, 5-$OCH_3$ | 186.0~188.0 |
| 38 | H | 2-$OC_2H_5$, 5-$OC_2H_5$ | 173.0~173.5 |
| 39 | H | 2-$CH_3$, 5-$CH_3$ | 207.0~208.5 |
| 40 | H | 2-Cl, 5-Cl | 253.5~254.5 |
| 41 | H | 2-$CH_3$, 5-Cl | 245~247 |
| 42 | H | 2-$OCH_3$, 4-$OCH_3$ | 151.0~152.0 |
| 43 | H | 2-$CH_3$, 4-$CH_3$ | 226~228 |
| 44 | H | 2-$CH_3$, 4-Cl | 244~245 |
| 45 | H | 2-$NO_2$, 4-$OCH_3$ | 179.5~181.0 |
| 46 | H | 3-$OCH_3$, 5-$OCH_3$ | 180.5~182.0 |
| 47 | H | 2-$OCH_3$, 5-Cl | 219.0~220.0 |
| 48 | H | 2-$OCH_3$, 5-$OCH_3$, 4-Cl | 193.5~195.5 |
| 49 | H | 2-$OCH_3$, 4-$OCH_3$, 5-Cl | 193~194 |
| 50 | H | 3-Cl, 4-Cl | 272.5~273.5 |
| 51 | H | 2-Cl, 4-Cl, 5-Cl | 257.5~258.5 |
| 52 | H | 2-$CH_3$, 3-Cl | 227.5~228.5 |
| 53 | H | 3-Cl, 4-$CH_3$ | 259.5~260.5 |
| 54 | H | 2-F, 4-F | 246.0~246.5 |
| 55 | H | 2-F, 5-F | 259.0~260.0 |
| 56 | H | 2-Cl, 4-$NO_2$ | 283.0~284.0 |
| 57 | H | 2-$NO_2$, 4-Cl | 226.5~227.5 |
| 58 | H | 2-Cl, 3-Cl, 4-Cl, 5-Cl | 280.0~281.5 |
| 59 | H | 4-OH | 268 |

TABLE 2

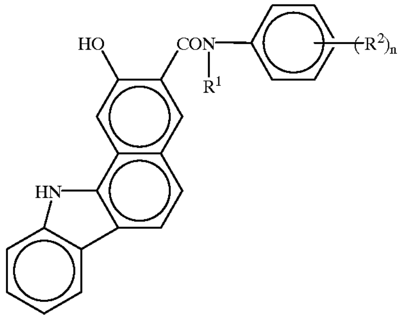

| Coupler No. | $R^1$ | $(R^2)_n$ | Melting Point (° C.) |
|---|---|---|---|
| 60 | H | H | >300 |
| 61 | H | 2-$NO_2$ | 283~284 |
| 62 | H | 3-$NO_2$ | >300 |
| 63 | H | 4-$NO_2$ | >300 |
| 64 | H | 2-Cl | >300 |
| 65 | H | 3-Cl | >300 |
| 66 | H | 4-Cl | >300 |
| 67 | H | 2-$CH_3$ | >300 |
| 68 | H | 3-$CH_3$ | >300 |
| 69 | H | 4-$CH_3$ | >300 |
| 70 | H | 2-$C_2H_5$ | 271~273 |
| 71 | H | 4-$C_2H_5$ | >300 |
| 72 | H | 2-$OCH_3$ | 276~278 |
| 73 | H | 3-$OCH_3$ | >300 |
| 74 | H | 4-$OCH_3$ | >300 |
| 75 | H | 2-$OC_2H_5$ | 273.5~275.0 |
| 76 | H | 4-$OC_2H_5$ | >300 |
| 77 | H | 2-$CH_3$, 4-$OCH_3$ | 296 |
| 78 | H | 2-$CH_3$, 4-$CH_3$ | >300 |
| 79 | H | 2-$CH_3$, 5-$CH_3$ | 274.0~276.0 |
| 80 | H | 2-$CH_3$, 6-$CH_3$ | >300 |
| 81 | H | 2-$OCH_3$, 4-$OCH_3$ | 296.5~298.5 |
| 82 | H | 2-$OCH_3$, 5-$OCH_3$ | 284.5~286.5 |
| 83 | H | 3-$OCH_3$, 5-$OCH_3$ | 300.5~302.0 |
| 84 | H | 2-$CH_3$, 3-Cl | 296.0~297.5 |
| 85 | H | 2-$CH_3$, 4-Cl | >300 |
| 86 | H | 2-$CH_3$, 5-Cl | 290.5~292.0 |
| 87 | H | 4-NH 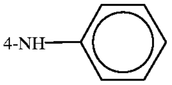 | 304 |
| 88 | H | 2-$CH(CH_3)_2$ | 239.0~240.0 |

TABLE 3

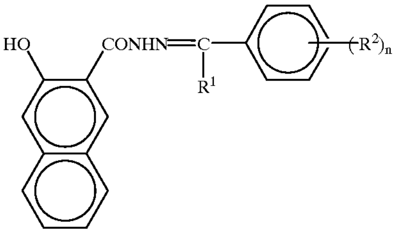

| Coupler No. | $R^1$ | $(R^2)_n$ | Melting Point (° C.) |
|---|---|---|---|
| 89 | H | H | 228.0~230.0 |
| 90 | H | 4-$N(CH_3)_2$ | 238.5~240.0 |
| 91 | H | 2-$OCH_3$ | 218.0~222.0 |
| 92 | H | 3-$OCH_3$ | 186.5~188.5 |

TABLE 3-continued
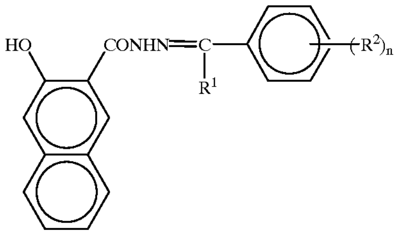
| Coupler No. | $R^1$ | $(R^2)_n$ | Melting Point (° C.) |
|---|---|---|---|
| 93 | H | 4-$OCH_3$ | 224.5~225.0 |
| 94 | H | 4-$OC_2H_5$ | 236.0~237.5 |
| 95 | H | 2-$CH_3$ | 227.0~228.0 |
| 96 | H | 3-$CH_3$ | 212.5~214.0 |
| 97 | H | 4-$CH_3$ | 233.0~236.0 |
| 98 | H | 2-F | 233.0~233.5 |
| 99 | H | 3-F | 248.5 |
| 100 | H | 4-F | 239.5~240.0 |
| 101 | H | 2-Cl | 254.0~255.0 |
| 102 | H | 3-Cl | 226.5~230.0 |
| 103 | H | 4-Cl | 265.5~269.0 |
| 104 | H | 2-Br | 243.0 |
| 105 | H | 3-Br | 231.0~231.5 |
| 106 | H | 4-Br | 259.0 |
| 107 | H | 2-Cl, 4-Cl | 251.5~252.0 |
| 108 | H | 3-Cl, 4-Cl | 260.0~261.0 |
| 109 | H | 2-CN | 175.0~176.5 |
| 110 | H | 4-CN | 267.5~268.0 |
| 111 | H | 2-$NO_2$ | 240.0 |
| 112 | H | 3-$NO_2$ | 255.5~257.0 |
| 113 | H | 4-$NO_2$ | 260.0~261.0 |
| 114 | H | 2-$CH_3$, 4-$CH_3$ | 234.5~236.5 |
| 115 | H | 2-$OCH_3$, 5-$OCH_3$ | 221.5~222.0 |
| 116 | H | 2-$OCH_3$, 3-$OCH_3$, 4-$OCH_3$ | 191.0~192.0 |
| 117 | $-CH_3$ | H | 248.5~250.0 |
| 118 | 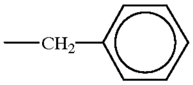 | H | 182.5~185.0 |
| 119 | 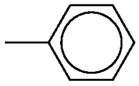 | H | 213.0~214.5 |
| 120 | H | 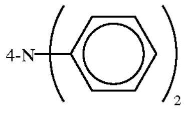 | 237.0~237.5 |
TABLE 4
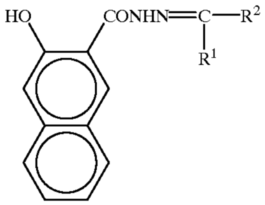
| Coupler No. | $R^1$ | $R^2$ | Melting Point (° C.) |
|---|---|---|---|
| 121 | $-CH_3$ | $-CH_3$ | 232.5~233.0 |
| 122 | H | 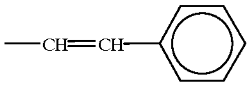 | 108.5~209.0 |
| 123 | H | 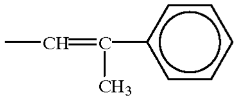 | 224.0~224.5 |
| 124 | H | 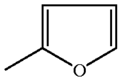 | 197.5~199.0 |
| 125 | H | 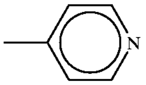 | 188.0~188.5 |
| 126 | H | 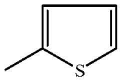 | 227.0~228.0 |
| 127 | $-CH_3$ | 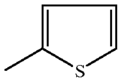 | 225.5~226.0 |
| 128 | H | 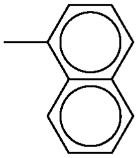 | 212.5~214.0 |
| 129 | H | 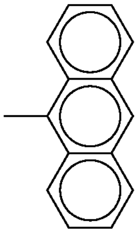 | 257 |

TABLE 4-continued

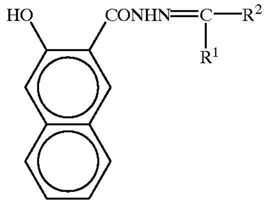

| Coupler No. | $R^1$ | $R^2$ | Melting Point (° C.) |
|---|---|---|---|
| 130 | H | 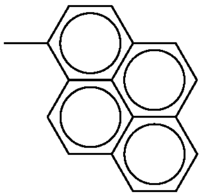 | 250 |
| 131 | H | 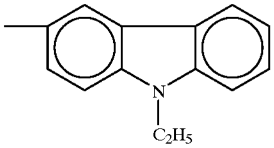 | 232.5~236.0 |
| 132 | H | 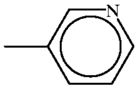 | 240.5~241.5 |

TABLE 5

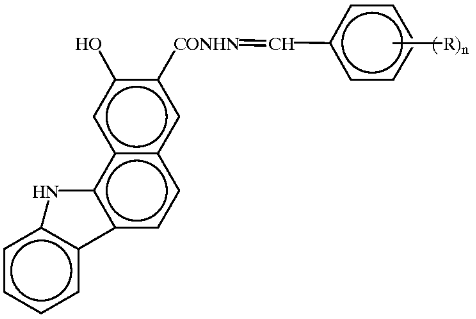

| Coupler No. | $(R)_n$ | Melting Point (° C.) |
|---|---|---|
| 133 | H | >300 |
| 134 | 2-$OCH_3$ | 268 |
| 135 | 3-$OCH_3$ | 281.0~283.0 |
| 136 | 4-$OCH_3$ | 293 |
| 137 | 2-$CH_3$ | 297 |
| 138 | 3-$CH_3$ | 296 |
| 139 | 4-$CH_3$ | >300 |
| 140 | 4-Cl | >300 |
| 141 | 2-$NO_2$ | >300 |
| 142 | 4-$NO_2$ | >300 |
| 143 | 2-OH | >300 |
| 144 | 2-OH, 3-$NO_2$ | >300 |
| 145 | 2-OH, 5-$NO_2$ | >300 |
| 146 | 2-OH, 3-$OCH_3$ | >300 |

TABLE 6

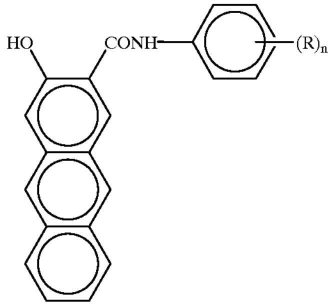

| Coupler No. | $(R)_n$ | Melting Point (° C.) |
|---|---|---|
| 147 | 4-Cl | >300 |
| 148 | 2-$NO_2$ | 268~274 |
| 149 | 3-$NO_2$ | >300 |
| 150 | 4-$NO_2$ | >300 |
| 151 | 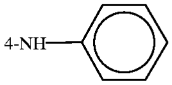 | 296 |
| 152 | H | 300~307 |
| 153 | 2-$OCH_3$ | 242~248 |
| 154 | 3-$OCH_3$ | 269~275 |
| 155 | 4-$OCH_3$ | 312 |
| 156 | 2-$CH_3$ | 265~270 |
| 157 | 3-$CH_3$ | 270~278 |
| 158 | 4-$CH_3$ | 304 |
| 159 | 2-Cl | 283~288 |
| 160 | 3-Cl | 281~287 |

TABLE 7

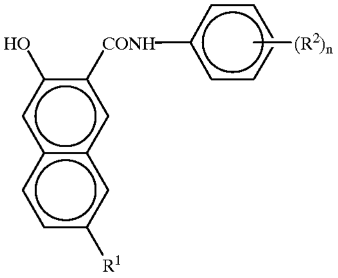

| Coupler No. | $R^1$ | $(R^2)_n$ | Melting Point (° C.) |
|---|---|---|---|
| 161 | H | 2-$OCH_3$, 4-Cl, 5-$CH_3$ | 208.0~208.5 |
| 162 | —$OCH_3$ | H | 230.5~231.5 |
| 163 | —$OCH_3$ | 2-$CH_3$ | 205.5~206.0 |
| 164 | —$OCH_3$ | 2-$OCH_3$, 5-$OCH_3$, 4-Cl | 245.5~246.0 |

TABLE 8
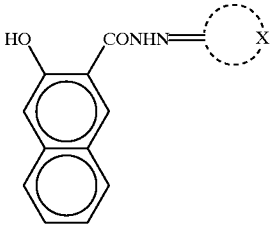
| Coupler No. | X | Melting Point (° C.) |
|---|---|---|
| 165 | 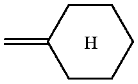 | 207.0~209.0 |
| 166 | 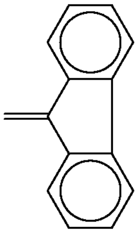 | 257.0~259.0 |
| 167 | 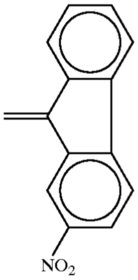 | 290 |
TABLE 9
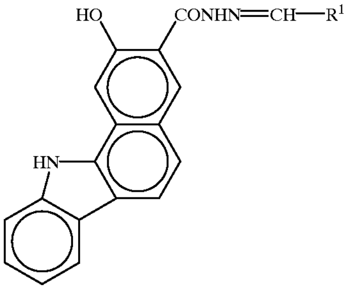
| Coupler No. | $R^1$ | Melting Point (° C.) |
|---|---|---|
| 168 | 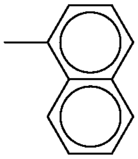 | >300 |
TABLE 9-continued
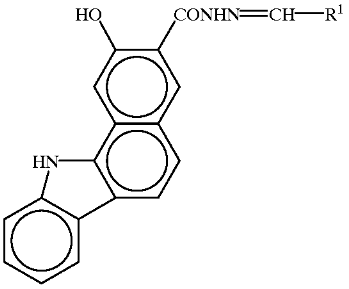
| Coupler No. | $R^1$ | Melting Point (° C.) |
|---|---|---|
| 169 | 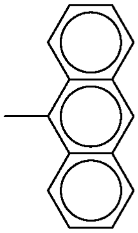 | >300 |
| 170 | 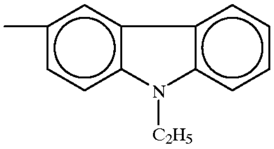 | >300 |
| 171 | 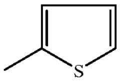 | 298 |
TABLE 10
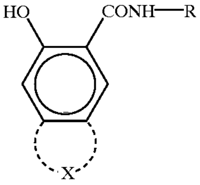
| Coupler No. | X | R | Melting Point (° C.) |
|---|---|---|---|
| 172 | 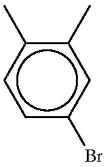 | 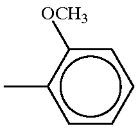 | 180~183 |
| 173 | 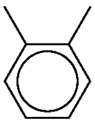 | 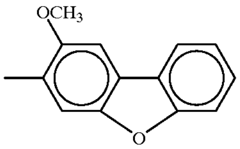 | 228.5~229.5 |

TABLE 10-continued
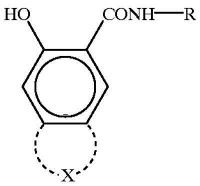
| Coupler No. | X | R | Melting Point (° C.) |
|---|---|---|---|
| 174 | 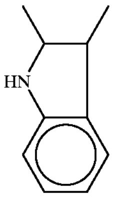 | 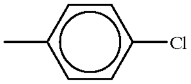 | >262 |
| 175 | 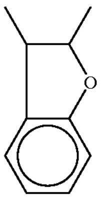 | 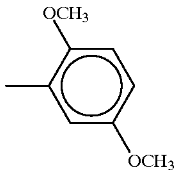 | 226.5~227.0 |
| 176 | 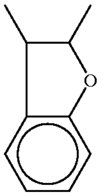 | 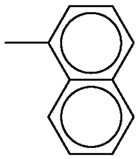 | 308~310 |
TABLE 10-continued
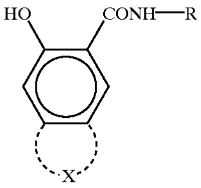
| Coupler No. | X | R | Melting Point (° C.) |
|---|---|---|---|
| 177 | 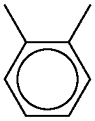 | 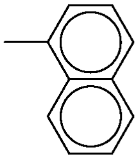 | 222~223 |
TABLE 11
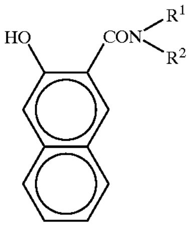
| Coupler No. | $R^1$ | $R^2$ | Melting Point (° C.) |
|---|---|---|---|
| 178 | H | H | 220.5~221.5 |
| 179 | $-CH_3$ | H | 190.5~192.5 |
| 180 | $-CH_3$ | $-CH_3$ | 196.0~198.0 |
| 181 | H | 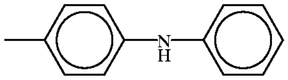 | 222.0~223.0 |
TABLE 12
| Coupler No. | Chemical Structure | Melting Point (° C.) |
|---|---|---|
| 182 | 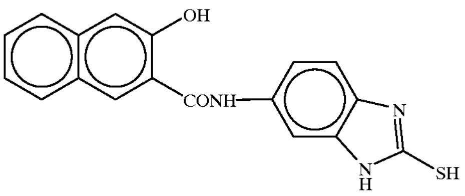 | >300 |
| 183 | 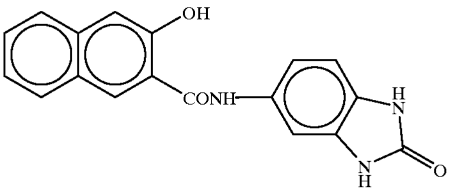 | >300 |

TABLE 12-continued
| Coupler No. | Chemical Structure | Melting Point (° C.) |
| --- | --- | --- |
| 184 | 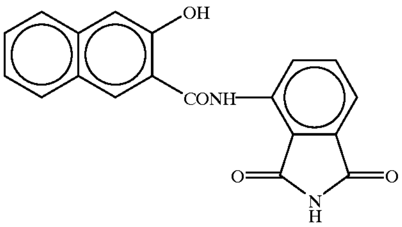 | >300 |
| 185 | 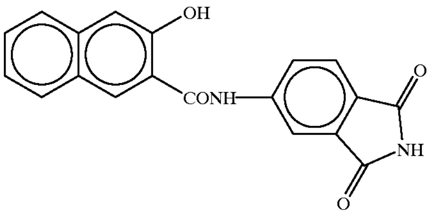 | >300 |
| 186 | 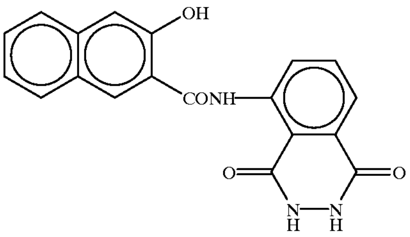 | >300 |
| 187 | 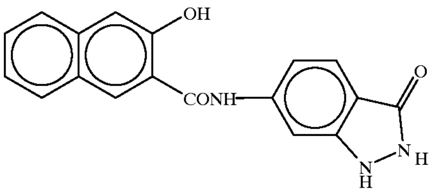 | >300 |
| 188 | 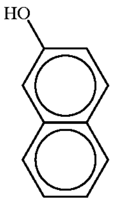 | 122.0~122.5 |
| 189 | 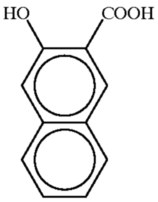 | 222.5~224.0 |

TABLE 12-continued
| Coupler No. | Chemical Structure | Melting Point (° C.) |
| --- | --- | --- |
| 190 | 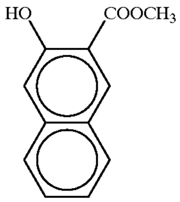 | 74.5~75.5 |
| 191 | 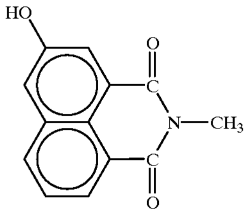 | 275.5~276.5 |
| 192 | 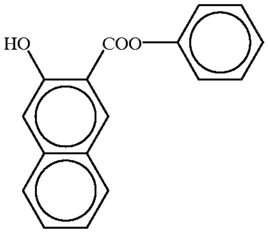 | 130.5~131.5 |
| 193 | 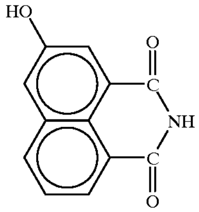 | >300 |
| 194 | 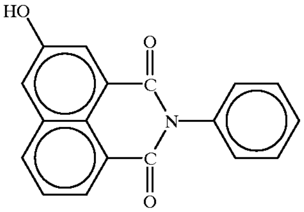 | >300 |
| 195 | 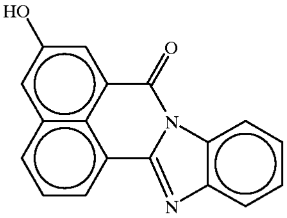 | >300 |

TABLE 12-continued
| Coupler No. | Chemical Structure | Melting Point (° C.) |
|---|---|---|
| 196 | 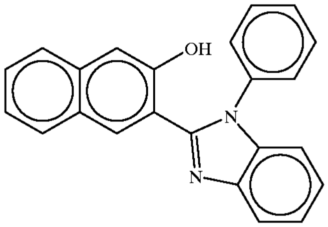 | 172.5~173.5 |
| 197 | 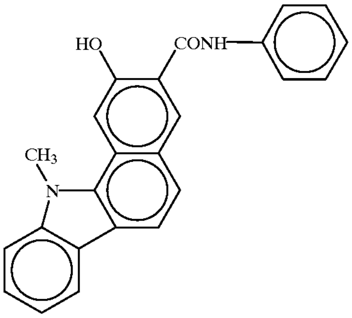 | 262.5~265.5 |
| 198 | 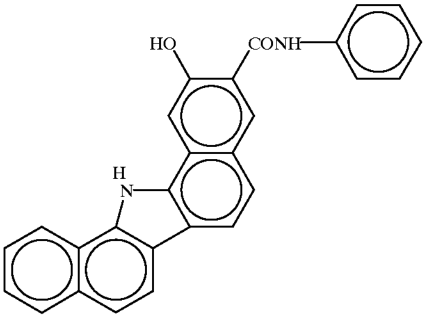 | >300 |
| 199 | 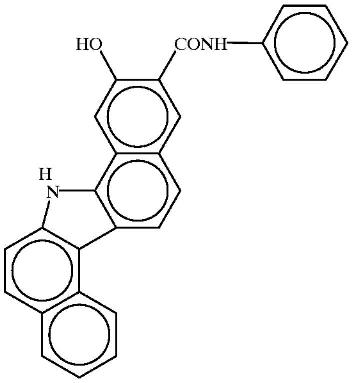 | >300 |
| 200 | 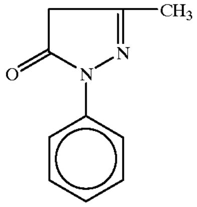 | 128.0~129.0 |

TABLE 13

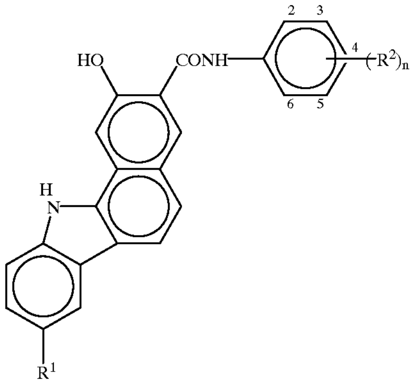

| Coupler No. | $R^1$ | $(R^2)_n$ | Melting Point (° C.) |
|---|---|---|---|
| 201 | Cl | H | >300 |
| 202 | Cl | $2\text{-}OCH_3$ | >300 |
| 203 | Cl | $3\text{-}OCH_3$ | >300 |
| 204 | Cl | $4\text{-}OCH_3$ | >300 |
| 205 | Cl | $2\text{-}CH_3$ | >300 |
| 206 | Cl | $3\text{-}CH_3$ | >300 |
| 207 | Cl | $4\text{-}CH_3$ | >300 |
| 208 | Cl | 2-Cl | >300 |
| 209 | Cl | 3-Cl | >300 |
| 210 | Cl | 4-Cl | >300 |
| 211 | Cl | $2\text{-}NO_2$ | >300 |
| 212 | Cl | $3\text{-}NO_2$ | >300 |
| 213 | Cl | $4\text{-}NO_2$ | >300 |
| 214 | Cl | $2\text{-}CH_3$, 4-Cl | >300 |
| 215 | Cl | $2\text{-}CH_3$, $4\text{-}CH_3$ | >300 |
| 216 | Cl | $2\text{-}C_2H_5$ | 299.0~301.0 |
| 217 | $CH_3$ | H | >300 |
| 218 | $CH_3$ | $2\text{-}OCH_3$ | 297 |
| 219 | $CH_3$ | $3\text{-}OCH_3$ | >300 |
| 220 | $CH_3$ | $4\text{-}OCH_3$ | >300 |
| 221 | $CH_3$ | $2\text{-}CH_3$ | >300 |
| 222 | $CH_3$ | $3\text{-}CH_3$ | >300 |
| 223 | $CH_3$ | $4\text{-}CH_3$ | >300 |
| 224 | $CH_3$ | 2-Cl | >300 |
| 225 | $CH_3$ | 3-Cl | >300 |
| 226 | $CH_3$ | 4-Cl | >300 |
| 227 | $CH_3$ | $2\text{-}NO_2$ | >300 |
| 228 | $CH_3$ | $3\text{-}NO_2$ | >300 |
| 229 | $CH_3$ | $4\text{-}NO_2$ | >300 |
| 230 | $CH_3$ | $2\text{-}CH_3$, 4-Cl | >300 |
| 231 | $CH_3$ | $2\text{-}CH_3$, $4\text{-}CH_3$ | >300 |
| 232 | $CH_3$ | $2\text{-}C_2H_5$ | 268.5~270.0 |
| 233 | $OCH_3$ | H | 289.0 |
| 234 | $OCH_3$ | $2\text{-}OCH_3$ | 268.0~270.0 |
| 235 | $OCH_3$ | $3\text{-}OCH_3$ | >300 |
| 236 | $OCH_3$ | $4\text{-}OCH_3$ | >300 |
| 237 | $OCH_3$ | $2\text{-}CH_3$ | 284.5~285.5 |
| 238 | $OCH_3$ | $3\text{-}CH_3$ | >300 |
| 239 | $OCH_3$ | $4\text{-}CH_3$ | >300 |
| 240 | $OCH_3$ | 2-Cl | >300 |
| 241 | $OCH_3$ | 3-Cl | >300 |
| 242 | $OCH_3$ | 4-Cl | >300 |
| 243 | $OCH_3$ | $2\text{-}NO_2$ | >300 |
| 244 | $OCH_3$ | $3\text{-}NO_2$ | >300 |
| 245 | $OCH_3$ | $4\text{-}NO_2$ | >300 |
| 246 | $OCH_3$ | $2\text{-}C_2H_5$ | 264.5~266.5 |

TABLE 14

| Coupler No. | Chemical Structure |
|---|---|
| 247 | 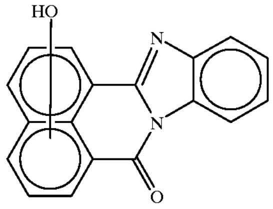 |
| 248 | 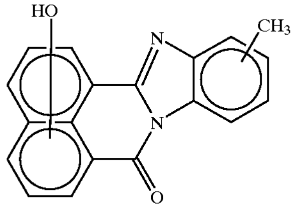 |
| 249 | 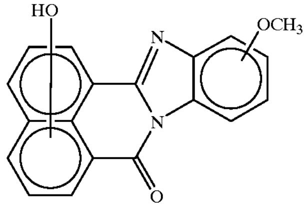 |
| 250 | 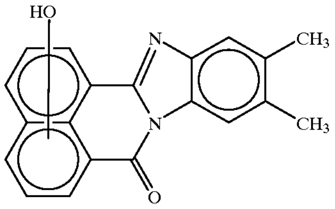 |
| 251 | 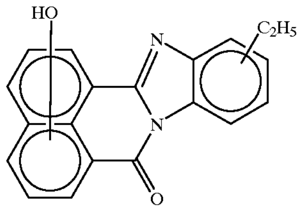 |
| 252 | 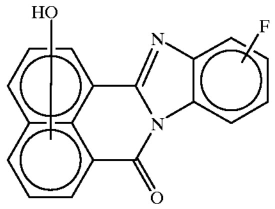 |
| 253 | 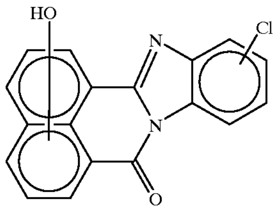 |

TABLE 14-continued

| Coupler No. | Chemical Structure |
|---|---|
| 254 | 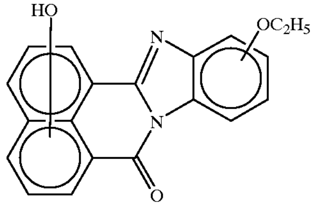 |
| 255 | 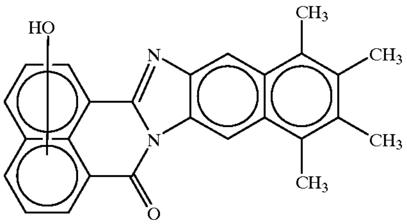 |
| 256 | 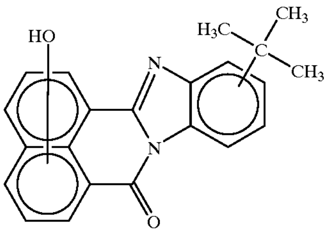 |
| 257 | 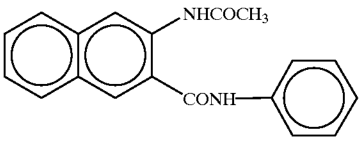 |
| 258 | 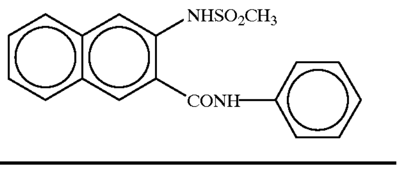 |

TABLE 15

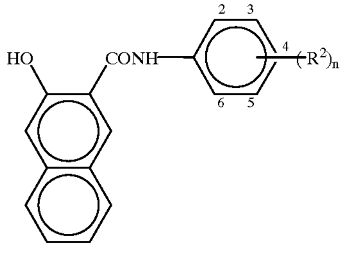

| Coupler No. | $(R^2)_n$ |
|---|---|
| 259 | 2-Cl, 3-Cl |
| 260 | 2-Cl, 4-Cl |
| 261 | 3-Cl, 5-Cl |

TABLE 16

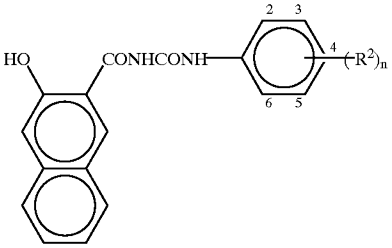

| Coupler No. | $(R^2)_n$ |
|---|---|
| 262 | 4-$CH_3$ |
| 263 | 3-$NO_2$ |
| 264 | 2-Cl |
| 265 | 3-Cl |
| 266 | 4-Cl |
| 267 | 2-Cl, 3-Cl |
| 268 | 2-Cl, 4-Cl |
| 269 | 3-Cl, 5-Cl |
| 270 | 2-Cl, 5-Cl |
| 271 | 3-Cl, 4-Cl |

Specific examples of the aryl group represented by $Ar^1$, $Ar^2$, $Ar^3$ and $Ar^4$ in the formulae (1-3) through (1-7) for use in the present invention include an aromatic cyclic hydrocarbon group or an aromatic heterocyclic group.

Specific examples of the aryl group are phenyl group, biphenylyl group, terphenylyl group, pentalenyl group, indenyl group, naphthyl group, azulenyl group, heptalenyl group, biphenylenyl group, as-indacenyl group, fluorenyl group, s-indacenyl group, acenaphthylenyl group, pleiadenyl group, acenaphthenyl group, phenalenyl group, phenanthryl group, anthryl group, fluoranthenyl group, acephenanthrylenyl group, aceanthrylenyl group, triphenylenyl group, pyrenyl group, chrysenyl group, naphthacenyl group, styrylphenyl group, pyridyl group, pyrimidyl group, pyrazinyl group, triazinyl group, furyl group, pyrrolyl group, thienyl group, quinolyl group, coumarinyl group, benzofuranyl group, benzimidazolyl group, benzoxazolyl group, dibenzofuranyl group, benzothienyl group, dibenzothionyl group, indolyl group, carbazolyl group, pyrazolyl group, imidazolyl group, oxazolyl group, isooxazolyl group, thiazolyl group, indazolyl group, benzothiazolyl group, pyridazinyl group, cinnolinyl group, quinazolinyl group, (iuinoxalyl group, phthalazinyl group, phthalazinedionyl group, chromonyl group, naphtholactonyl group, quinolonyl group, o-sulfobenzoic acid imidyl group, maleic acid imidyl group, naphthalidinyl group, benzimidazolonyl group, benzoxazolonyl group, benzothiazolonyl group, benzothiazothionyl group, quinazolonyl group, quinoxalonyl group, phthalazonyl group, dioxopyridinyl group, pyridonyl group, isoquinolonyl group, isoquinolyl group, isothiazolyl group, benzisooxazolyl group, benzisothiazolyl group, indazolonyl group, acridinyl group, acridonyl group, quinazolinedionyl group, quinoxalinedionyl group, benzoxazinedionyl group, benzoxazinyl group and naphthalimidyl group.

The arylene group represented by $Ar^1$, $Ar^2$, $Ar^3$ and $Ar^4$ in the formulae (1-3) through (1-7) represents a bivalent group derived from the above-mentioned aryl group. Specific examples of the arylene group include phenylene group, biphenylene group, pyrenylene group, N-ethylcarbazolylene group and stilbene group.

Specific examples of the substituent of the aryl group or arylene group represented by $Ar^1$, $Ar^2$, $Ar^3$ and $Ar^4$ include an alkyl group such as methyl group, ethyl group, propyl group and butyl group; an alkoxyl group such as methoxy group, ethoxy group, propoxy group and butoxy group; nitro group; a halogen atom such as chlorine and bromine; cyano group; a dialkylamino group such as dimethylamino group and diethylamino group; a styryl group such as β-phenylstyryl group; and the aryl group as previously defined.

The alkyl group represented by R in formulae (8), (8-1) and (8-2) has 1 to 4 carbon atoms, such as methyl group, ethyl group, propyl group and butyl group.

By employing any of the above-mentioned compounds (1-1) to (1-7) comprising a charge generating moiety and a charge transporting moiety in the molecule thereof in the present invention, the electrophotographic photoconductor with remarkably high photosensitivity can be easily obtained.

For instance, the compound having formula (1-1) for use in the photoconductor can be obtained by allowing a diazonium salt compound of formula (101) to react with a coupler of formula (102) in the case where j is 0 in the formula (1-1):

$X-(N_2^{\oplus}.W^{\ominus})_i$ (101)

wherein X and i are the same as those previously defined; and W is an anionic functional group; and $H-Cp^1-(Y)_k$ (102)

wherein $Cp^1$, Y and k are the same as those previously defined.

In the case where j is an integer of 1 to 3 in the compound of formula (1-1), the diazonium salt compound of formula (101) is successively allowed to react with the above-mentioned coupler of formula (102) and a coupler of the following formula (103) by two steps:

$H-Cp^2$ (103)

wherein $Cp^2$ is the same as that previously defined.

Alternatively, a diazonium salt compound of the following formula (104) or a diazonium salt compound of the following formula (105) obtained by the first coupler reaction is isolated, and then the diazonium salt compound thus isolated is allowed to react with the coupler other than that used in the first coupling reaction:

$(W^{\ominus}.N_2^{\oplus})_j X-[N{=}N-Cp^1-(Y)_k]_i$ (104)

wherein $Cp^1$, W, X, Y, i, j and k are the same as those previously defined; and $[Cp^2-N{=}N]_j X-(N_2^{\oplus}.W^{\ominus})_i$ (105)

wherein $Cp^2$, W, X, i and j are the same as those previously defined.

The compound having formula (1-2) for use in the photoconductor can be obtained by allowing a diazonium salt compound of the following formula (106) to react with the coupler of the previously mentioned formula (103):

$(W^{\ominus}.N_2^{\oplus})_m X-(Y)_l$ (106)

wherein W, X, Y, m and l are the same as those previously defined.

In the electrophotographic photoconductor of the present invention the previously mentioned compound comprising a charge generating moiety and a charge generating moiety in the molecule thereof, for example, the compound with formula (1-1) or (1-2), can be used as a charge generating material in the photoconductive layer.

Figure 2:
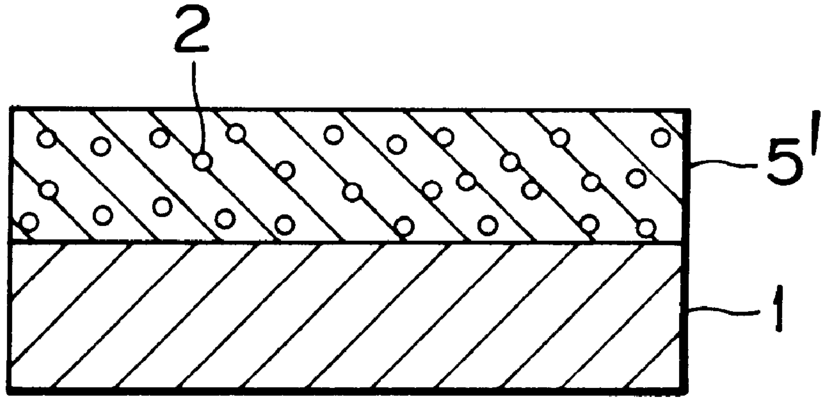

The representative examples of the structure of an electrophotographic photoconductor according to the present invention are illustrated in FIGS. 1 and 2.

As shown in FIG. 1, there is formed on an electroconductive support 1 a two-layered photoconductive layer 5 comprising a charge generation layer 3 containing the previously mentioned compound 2 having a charge generating moiety and a charge transporting moiety in its molecule, and a charge transport layer 4 containing a charge transporting material. In this photoconductor, the light which has passed through the charge transport layer 4 reaches the charge generation layer 3, where charge carriers are generated in the compound 2. The charge carriers which are necessary for the light decay are generated by the compound 2, and the charge carriers are accepted and transported by the charge transport layer 4. The overlaying order of the charge generation layer 3 and the charge transport layer 4 may be reversed.

In an electrophotographic photoconductor as shown in FIG. 2, a photoconductive layer 5' is formed on an electroconductive support 1, which photoconductive layer 5' comprises a compound 2 comprising a charge generating moiety and a charge transporting moiety in the molecule thereof, a charge transporting material, and an insulating binder agent. In this case, the charge transporting material may be contained or not.

In the photoconductor as shown in FIG. 1, it is preferable that the thickness of the charge generation layer 3 be in a range of 0.01 to 5 μm, more preferably in a range of 0.05 to 2 μm. When the thickness of the charge generation layer 3 is within the above-mentioned range, the charge carriers can be sufficiently generated, and the increase of the residual potential can be prevented. The thickness of the charge transport layer 4 is preferably in a range of 3 to 50 μm, more preferably in a range of 5 to 20 μm. When the thickness of the charge transport layer 4 is within the above-mentioned range, a sufficient charge quantity can be obtained, and the increase of the residual potential 7 an be prevented.

The charge generation layer 3 of tie photoconductor as shown in FIG. 1 comprises the compound 2, and in addition, a binder agent and a plasticizer may be added thereto. It is preferable that the amount of the compound 2 in the charge generation layer 3 be 30 wt. % or more, more preferably 50 wt. % or more of the total weight of the charge generation layer 3.

The charge transport layer 4 comprises the charge transporting material and the binder agent as the main components. Further, the plasticizer may be added to the charge transport layer 4. It is preferable that the 5', amount of the charge transporting material in the charge transport layer 4 be in a range of 10 to 95 wt. %, more preferably in a range of 30 to 90 wt. % of the total weight of the charge transport layer 4. When the amount of the charge transporting material is within the above range, the charge can be transported in good condition and the mechanical strength of the surface of the photoconductor is sufficient for practical use.

In the photoconductor as shown in FIG. 2,it is preferable that the thickness of the photoconductive layer 5' be in a range of 3 to 50 μm, more preferably in a range of 5 to 20 μm. The amount of the compound 2 in the photoconductive layer 5' is preferably 50 wt. % or less, more preferably 20 wt. % or less; and the amount of the charge transporting material in the photoconductive layer 5' is preferably in a range of 10 to 95 wt. %, more preferably in a range of 30 to 90 wt. % of the total weight of the photoconductive layer 5'.

Examples of the material for the electroconductive support 1 include a metallic plate of aluminum, copper or zinc; a plastic sheet or film on which an electroconductive material such as aluminum or $SnO_2$ is deposited; and a sheet of paper which has been treated so as to be electroconductive.

Specific examples of the binder agent used in the preparation of the photoconductor include condensation resins such as polyamide, polyurethane, polyester, epoxy resin, polyketone, polycarbonate and polyacetal; and vinyl polymers such as polyvinylketone, polystyrene, poly-N-vinylcarbazole and polyacrylamide. All the resins having insulating properties and adhesive force can be employed.

Examples of the plasticizer for use in the photoconductor of the present invention are halogenated paraffin, polybiphenyl chloride, dimethylnaphthalene and dibutyl phthalate. In addition, a silicone oil may be used to improve the surface properties of the photoconductor.

Furthermore, in the electrophotographic photoconductor according to the present invention, an adhesive layer or a barrier layer may be interposed between the electroconductive support and the photoconductive layer when necessary. Examples of the material for use in the adhesive layer or barrier layer are polyamide, nitrocellulose and aluminum oxide. The thickness of the adhesive layer or barrier layer is preferably 1 μm or less.

To prepare the photoconductor as shown in FIG. 1, the compound 2 comprising a charge generating moiety and a charge transporting moiety in the molecule thereof may be vacuum-deposited on the electroconductive support 1 in accordance with the methods as stated in U.S. Pat. Nos. 3,973,959 and 3,996,049. Alternatively, the compound 2 in the form of finely-divided particles is dispersed in a proper solvent in which a binder agent is dissolved, and the dispersion thus obtained is coated on the electroconductive support 1 and dried. Thus, a charge generation layer 3 was formed on the electroconductive support 1. When necessary, the charge generation layer 3 is subjected to surface treatment by buffing and adjustment of the thickness thereof. On the thus formed charge generation layer 3, a coating liquid comprising a charge transporting material and a binder agent is coated and dried, so that a charge transport layer 4 was formed on the charge generation layer 3.

When the photoconductor as shown in FIG. 2 is prepared, finely-divided particles of the compound 2 are dispersed in a solution prepared by dissolving a charge transporting material and a binder agent in a proper solvent, and then the dispersion thus obtained is coated on the electroconductive support 1 and dried. Thus, a photoconductive layer 5' is provided on the electroconductive support 1.

In any case, the compound 2 is pulverized by using, for example, a ball mill so that the particle diameter of the compound 2 may be decreased to 5 μm or less, preferably 2 μm or less. The application of the coating liquid thus prepared may be carried out by the conventional method using a doctor blade or wire bar, or dip coating may be adopted.

When copying is performed by use of the photoconductor according to the present invention, the surface of the photoconductor is uniformly charged to a predetermined polarity in the dark. The charged photoconductor is exposed to a light image to form a latent electrostatic image thereon, and the latent electrostatic image thus formed is developed to a visible image. The developed image can be transferred to a sheet of paper when necessary.

Because the electrophotographic photoconductor according to the present invention comprises the compound, for example, the compound of formula (1-1) or (1-2), as the charge generating material, which comprises a charge generating moiety and a charge transporting moiety in the molecule thereof, the photoconductor exhibits not only high photosensitivity, but also flat photosensitivities in a range from the entire visible region to the wavelength of the semiconductor laser beam. In addition, the photoconductor of the present invention can be easily manufactured, and the properties of the photoconductor are stable when it is repeatedly used.

Furthermore, according to the present invention, there can be provided novel bisazo compounds which effectively serve as the organic photoconductive materials for use in the electrophotographic photoconductor, in particular, in the two-layered photoconductor. These bisazo compounds of the present invention are shown below, each of which comprises a charge generating moiety derived from an azo compound and a charge transporting moiety derived from a triarylamine compound in the molecule thereof:

A bisazo compound with formula (2-1):

(2-1)

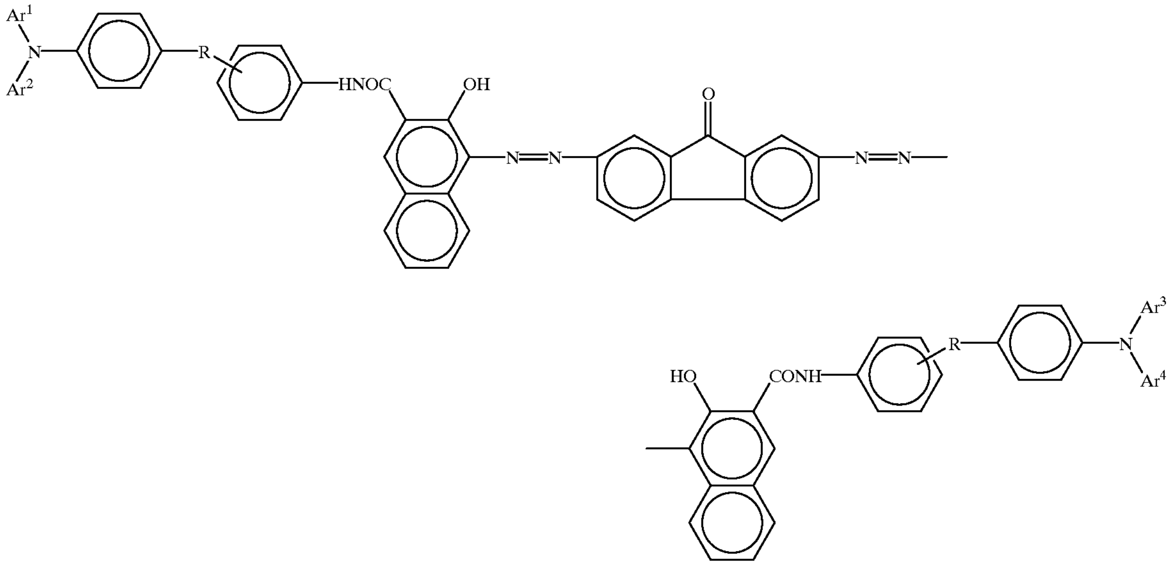

wherein $Ar^1$, $Ar^2$, $Ar^3$ and $Ar^4$ are each in-dependently an aryl group which may have a substituent; and R is an ethylene group or a vinylene group.

A bisazo compound with formula (2-2):

(2-2)

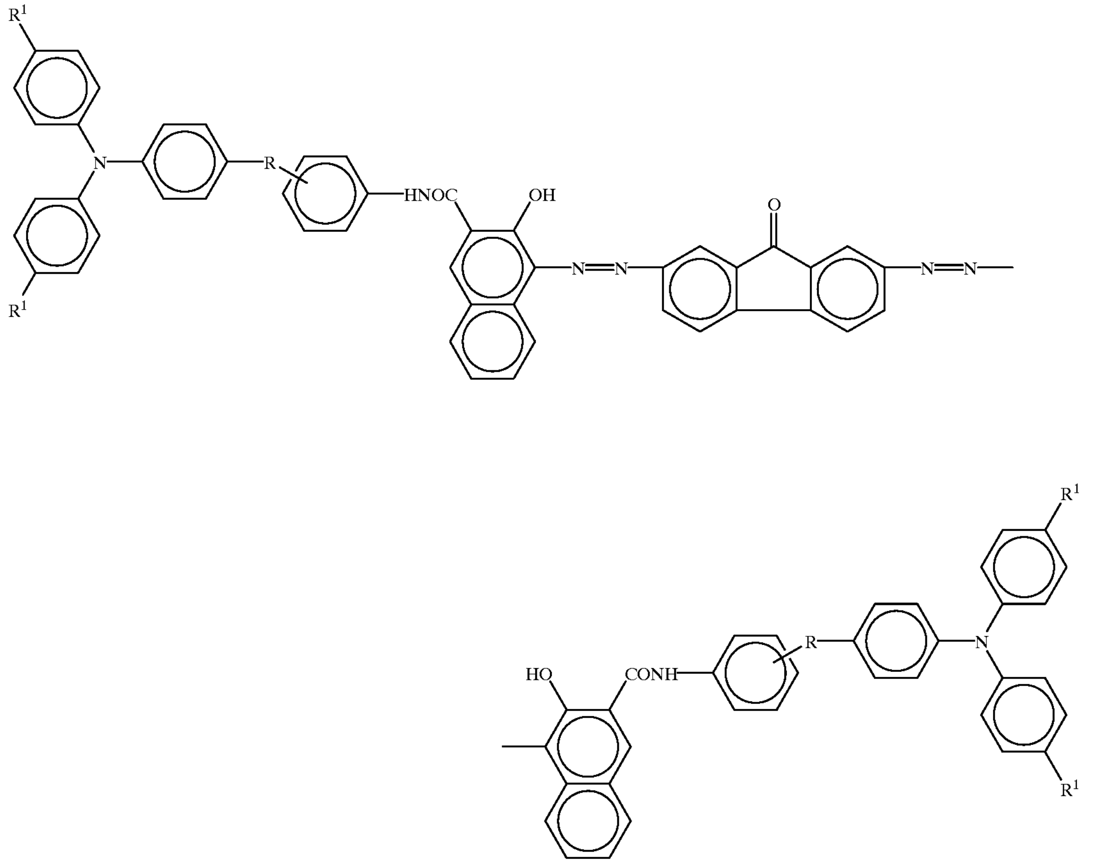

wherein $R^1$ is a hydrogen atom or an alkyl group having 1 to 4 carbon atoms; and R is an ethylene or vinylene group.

A bisazo compound with formula (2-3):

(2-3)

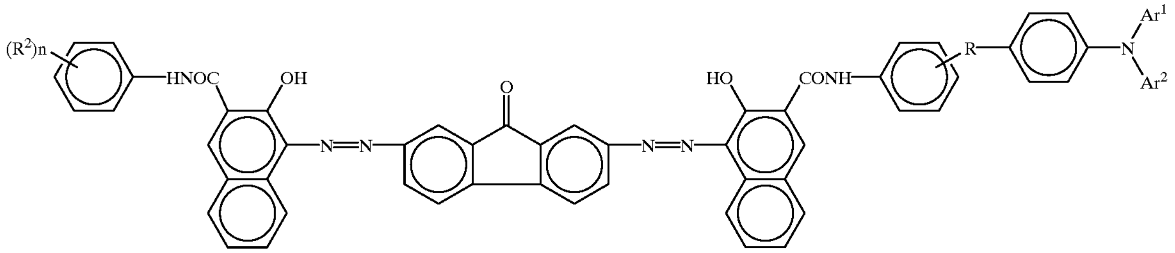

wherein $Ar^1$ and $Ar^2$ are each independently an aryl group which may have a substituent; $R^2$ is a hydrogen atom, an alkyl group having 1 to 4 carbon atoms, an alkoxyl group having 1 to 4 carbon atoms, a halogen atom, nitro group, or a dialkylamino group having 2 to 8 carbon atoms; R is an ethylene group or a vinylene group; and when $R^2$ is not a hydrogen atom, n is an integer of 1 to 3, and each $R^2$ may be the same or different when n is 2 or 3.

A bisazo compound with formula (2-4):

(2-4)

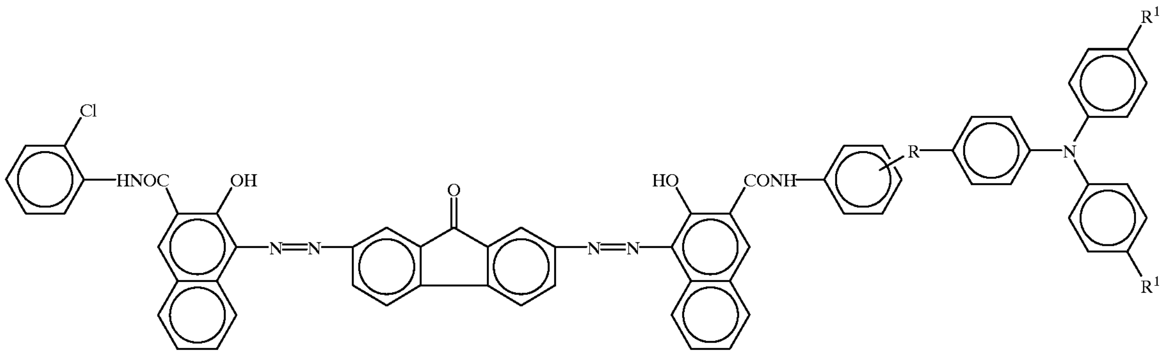

wherein $R^1$ is a hydrogen atom or an alkyl group having 1 to 4 carbon atoms; and R is an ethylene group or a vinylene group.

The above-mentioned bisazo compounds of formulae (2-1) to (2-4) are prepared using intermediates, for example, 2-hydroxy-3-phenylcarbamoylnaphthalene compounds of the following formulae (4-1) and (4-2), which are novel compounds:

A 2-hydroxy-3-phenylcarbamoylnaphthalene compound with formula (4-1):

(4-1)

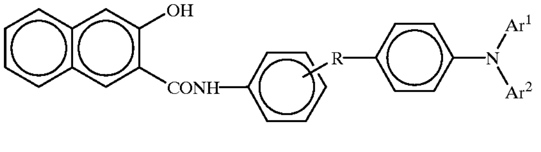

wherein $Ar^1$ and $Ar^2$ are each independently an aryl group which may have a substituent; and R is an ethylene group or a vinylene group.

A 2-hydroxy-3-phenylcarbamoylnaphthalene compound with formula (4-2):

(4-2)

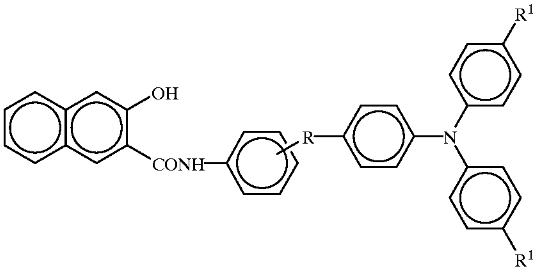

wherein $R^1$ is a hydrogen atom or an alkyl group having 1 to 4 carbon atoms; and R is an ethylene group or a vinylene group.

The above-mentioned 2-hydroxy-3-phenylcarbamoylnaphthalene compound of formula (4-1) can be obtained by allowing an aniline compound of formula (4-1-1) to react with 2-hydroxy-3-naphthoic acid of formula (4-1-2):

(4-1-1)

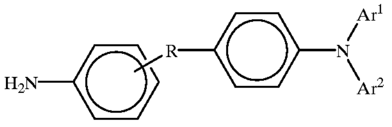

wherein $Ar^1$ and $Ar^2$ are each independently an aryl group which may have a substituent; and R is an ethylene group or a vinylene group; and (4-1-2)

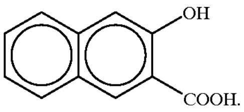

To be more specific, the aforementioned 2-hydroxy-3-phenylcarbamoylnaphthalene compound of formula (4-1) is prepared by the following method: 2-hydroxy-3-naphthoic acid of formula (4-1-2) is dissolved or dispersed in an organic solvent such as benzene, toluene or dioxane, and an agent for inducing halogenation such as phosphorus pentachloride, phosphorus trichloride or thionyl chloride is added to the above prepared solution or dispersion, so that a halide of an acid can be obtained. The halide thus obtained may be subjected to isolation or not, and thereafter allowed to react with the aniline compound of formula (4-1-1).

As previously mentioned, the bisazo compounds of formulae (2-1) to (2-4) are effectively employed as the charge generating materials in the two-layered electrophotographic photoconductor. Further, such bisazo compounds can serve as the charge generating materials in a single-layered photoconductor of which photoconductive layer comprises a resin, and a charge generating material and a charge transporting material dispersed in the resin; and as the photoconductive materials in an electrophotographic photoconductor of which photoconductive layer comprises a resin and a photoconductive material dispersed in the resin.

The bisazo compound of formula (2-1) according to the present invention can be obtained by allowing a bis (diazonium salt) compound of the following formula (201) to react with the 2-hydroxy-3-phenylcarbamoylnaphthalene compound of formula (4-1):

(201)

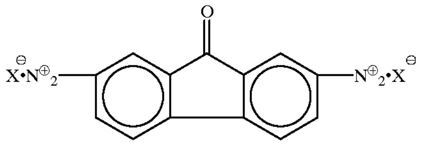

wherein X is an anionic functional group.

The bisazo compound of formula (2-3) according to the present invention can be obtained by successively allowing the aforementioned bis(diazonium salt) compound of formula (201) to react with the 2-hydroxy-3-phenylcarbamoylnaphthalene compound of the previously mentioned formula (4-1) or the following formula (202) by two steps.

(202)

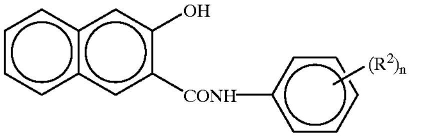

wherein $R^2$ is hydrogen, an alkyl group having 1 to 4 carbon atoms, an alkoxyl group having 1 to 4 carbon atoms, a halogen atom, nitro group or a dialkylamino group having 2 to 8 carbon atoms; and n is an integer of 1 to 3 except when $R^2$ is hydrogen, and each $R^2$ may be the same or different when n is 2 or 3.

Alternatively, a diazonium salt compound of the following formula (203) or (204) obtained by the first coupling reaction is isolated, and then the isolated diazonium salt compound is allowed to react with the corresponding 2-hydroxy-3-phenylcarbarmoylnaphthalene compound, thereby obtaining the bisazo compound of formula (2-3).

(204)

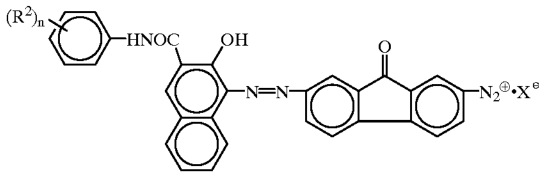

wherein $R^2$ is hydrogen, an alkyl group having 1 to 4 carbon atoms, an alkoxyl group having 1 to 4 carbon atoms, a halogen atom, nitro group or a dialkylamino group having 2 to 8 carbon atoms; X is an anionic functional group; and n is an integer of 1 to 3 except when $R^2$ is hydrogen, and each $R^2$ may be the same or different when n is 2 or 3.

To synthesize the bisazo compound of formula (2-1) practically, 2-hydroxy-3-phenylcarbamoylnaphthalene compound of formula (4-1) is dissolved in an organic solvent such as N,N-dimethylformamide (DMF) or dimethyl sulfoxide (DMSO). The bis(diazonium salt) compound of formula (201) is added to the above prepared solution, and the coupling reaction of the mixture is completed by the addition of a basic material such as an aqueous solution of sodium acetate or an organic amine. The preferable reaction temperature is in a range of about –20° C. to 40° C.

To obtain the bisazo compound of formula (2-3) according to the present invention, 2-hydroxy-3-phenylcarbamoylnaphthalene compound of formula (4-1) or (202) which is used in the coupling reaction of the first step is previously dissolved in an organic solvent such as N,N-dimethylformamide (DMF) or dimethyl sulfoxide (DMSO). The bis(diazonium salt) compound of formula (201) is added to the above prepared solution, and the first coupling reaction of the mixture is completed by the addition of a basic material such as an aqueous solution of sodium acetate or an organic amine when necessary. The preferable reaction temperature is in a range of about –20° C. to 40° C.

The second coupling reaction is carried out in such a manner that the 2-hydroxy-3-phenylcarbamoylnaphthalene compound of formula (4-1) or (202) which is different from that employed in the first coupling reaction is further added to the reaction mixture obtained by the above-mentioned first coupling reaction. The second coupling reaction is completed similarly by the addition of a basic material such as an aqueous solution of sodium acetate or an organic amine. Or water or an acid aqueous solution such as dilute hydrochloric acid is added to the reaction mixture obtained (203)

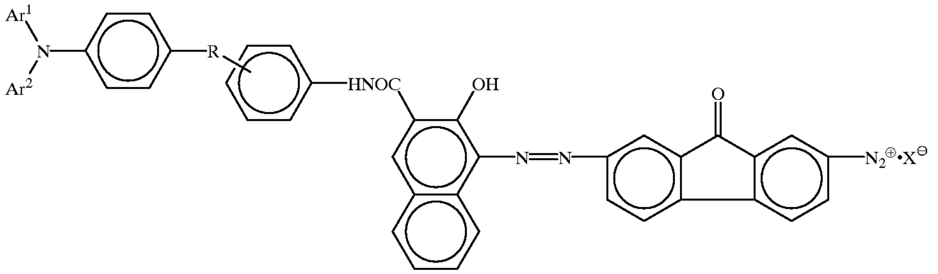

wherein $Ar^1$ and $Ar^2$ are each independently an aryl group which may have a substituent; X is an anionic functional group; and R is an ethylene group or a vinylene group.

by the first coupling reaction. In this case, it is necessary that the reaction mixture be sufficiently cooled, preferably cooled to 10° C. or less so as not to decompose the diazonium salt compound of formula (203) or (204) generated by the reaction. The diazonium salt compound of formula (203) or (204) is isolated by filtration, and the diazonium salt compound thus obtained is allowed to react with the 2-hydroxy-3-phenylcarbamoylnaphthalene compound of formula (4-1) or (202) which is different from that employed in the first coupling reaction in the same manner as in the first coupling reaction.

In any case, the crystals which separate out after the completion of the reaction are filtered off, and purified by an appropriate method such as washing with water and/or an organic solvent or recrystallization, so that the bisazo compound of formula (2-3) can be obtained.

In the formulae (2-1) to (2-4), (4-1), (4-2), (4-1-1), (202), (203) and (204), examples of the aryl group are phenyl group, biphenyl group, naphthyl group, anthryl group, and pyrenyl group.

Specific examples of the alkyl group are methyl group, ethyl group, propyl group, and butyl group.

Specific examples of the alkoxyl group are methoxy group, ethoxy group, propoxy group, and butoxy group.

Specific examples of the halogen atom are fluorine, chlorine, bromine and iodine.

There can be employed as the substituent of the aryl group represented by $Ar^1$ and $Ar^2$ the above-mentioned aryl group, alkyl group, alkoxyl group and halogen atom.

Furthermore, X in the formulae (201), (203) and (204) represents an anionic functional group such as tetrafluoroborate, perchlorate, iodate, chloride, bromide, sulfate, hexafluorophosphate, hexafluoroantimonate, periodate, and p-toluenesulfonate.

In the present invention, there are also provided the following novel trisazo compounds with formulae (3-1) to (3-6), each of which serves as the previously mentioned compound comprising a charge generating moiety derived from an azo compound and a charge transporting moiety derived from a triarylamine compound in the molecule thereof:

A trisazo compound with formula (3-1):

(3-1)

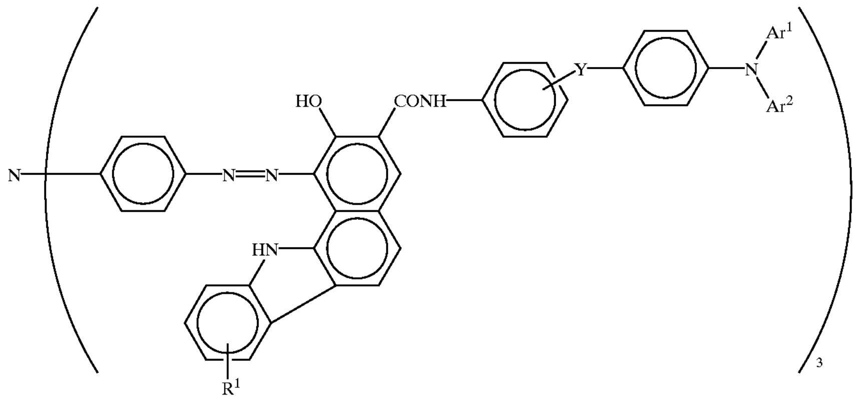

wherein $Ar^1$ and $Ar^2$ are each independently an aryl group which may have a substituent; $R^1$ is a hydrogen atom, an alkyl group having 1 to 4 carbon atoms, an alkoxyl group having 1 to 4 carbon atoms, or a halogen atom; and Y is an ethylene group or a vinylene group.

A trisazo compound with formula (3-2):

(3-2)

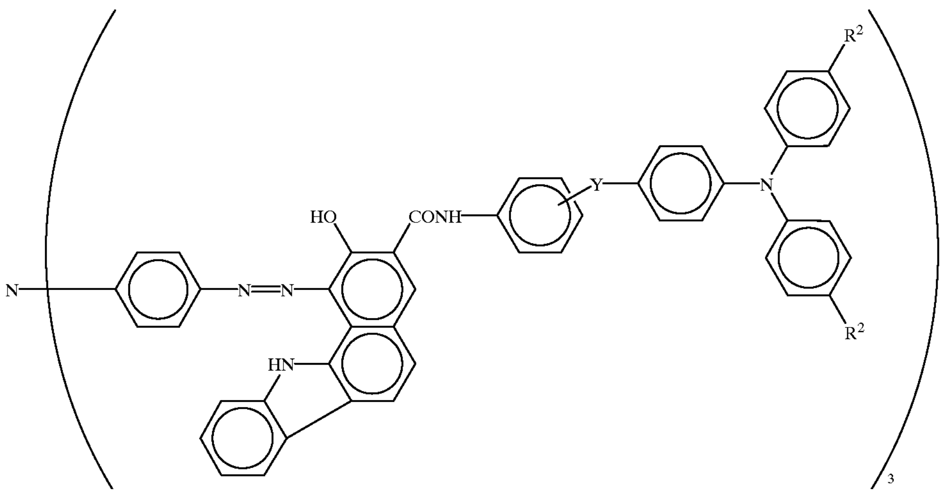

wherein $R^2$ is a hydrogen atom or an alkyl group having 1 to 4 carbon atoms; and Y is an ethylene group or a vinylene group.

A trisazo compound with formula (3-3):

(3-3)

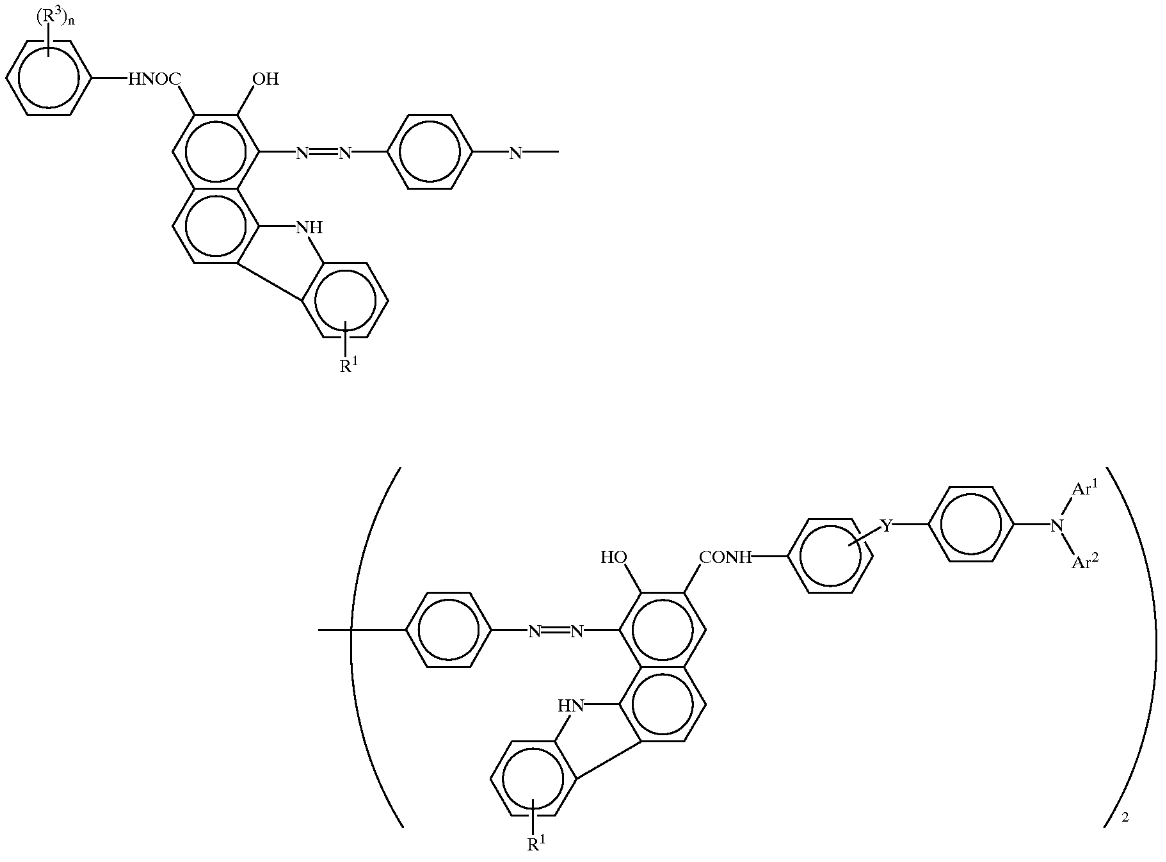

wherein $Ar^1$ and $Ar^2$ are each independently an aryl group which may have a substituent; $R^1$ is a hydrogen atom, an alkyl group having 1 to 4 carbon atoms, an alkoxyl group having 1 to 4 carbon atoms, or a halogen atom; $R^3$ is a hydrogen atom, an alkyl group having 1 to 4 carbon atoms, an alkoxyl group having 1 to 4 carbon atoms, a halogen atom, nitro group, or a dialkylamino group having 2 to 8 carbon atoms; Y is an ethylene group or a vinylene group; and n is an integer of 1 to 3, and when n is 2 or 3, each $R^3$ may be the same or different.

A trisazo compound with formula (3-4):

(3-4)

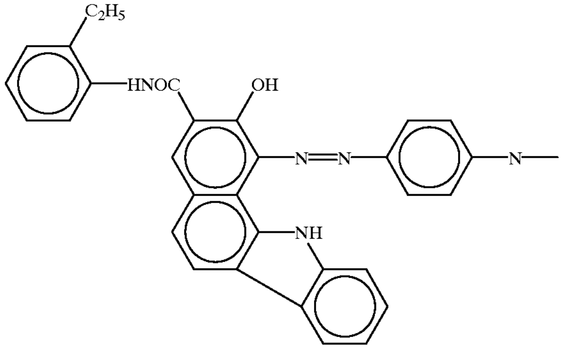

-continued

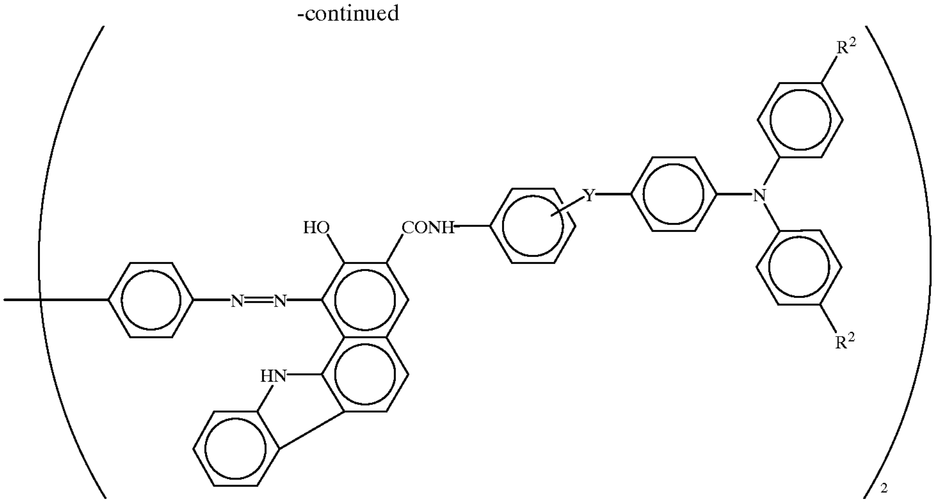

wherein $R^2$ is a hydrogen atom or an alkyl group having 1 to 4 carbon atoms; and Y is an ethylene group or a vinylene group.

A trisazo compound with formula (3-5):

(3-5)

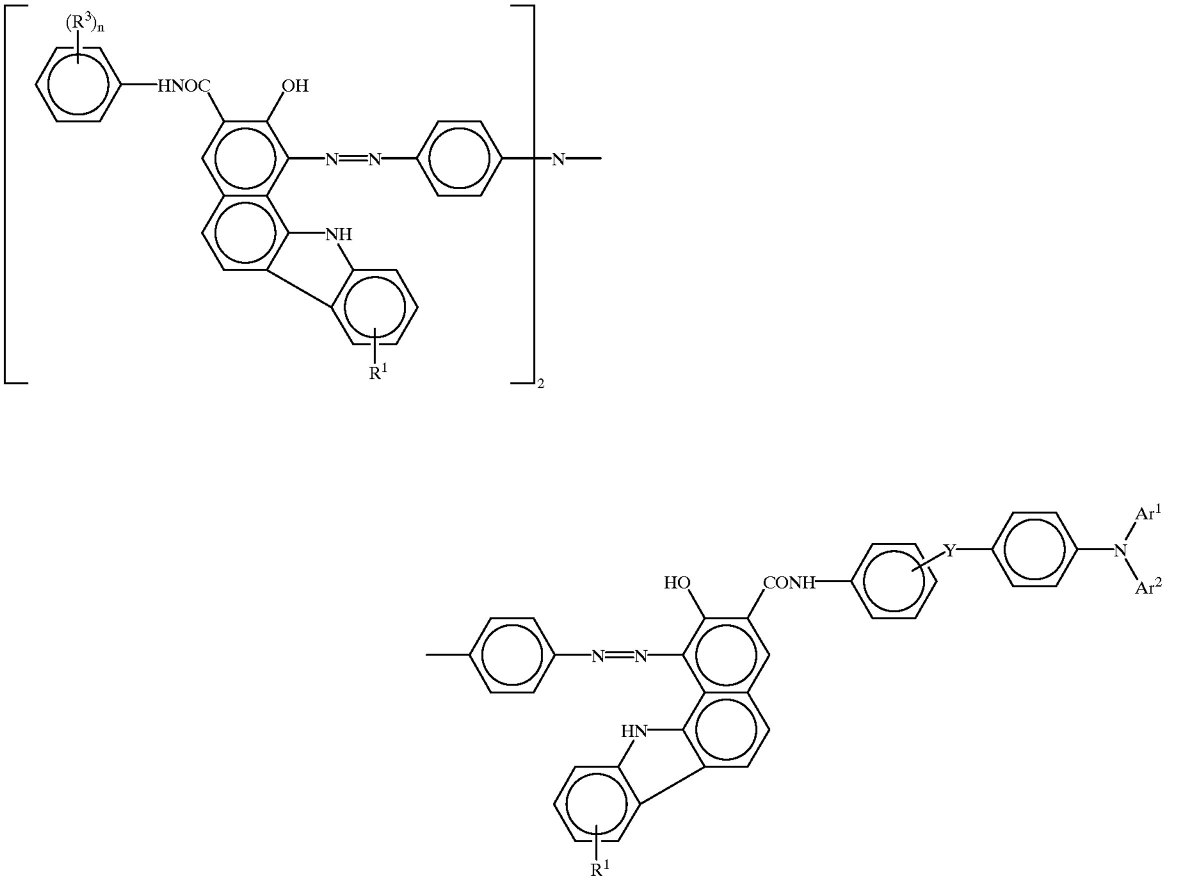

wherein $Ar^1$ and $Ar^2$ are each independently an aryl group which may have a substituent; $R^1$ is a hydrogen atom, an alkyl group having 1 to 4 carbon atoms, an alkoxyl group having 1 to 4 carbon atoms, or a halogen atom; $R^3$ is a hydrogen atom, an alkyl group having 1 to 4 carbon atoms, an alkoxyl group having 1 to 4 carbon atoms, a halogen atom, nitro group, or a dialkylamino group having 2 to 8 carbon atoms; Y is an ethylene group or a vinylene group; and n is an integer of 1 to 3, and when n is 2 or 3, each $R^3$ may be the same or different.

A trisazo compound with formula (3-6):

(3-6)

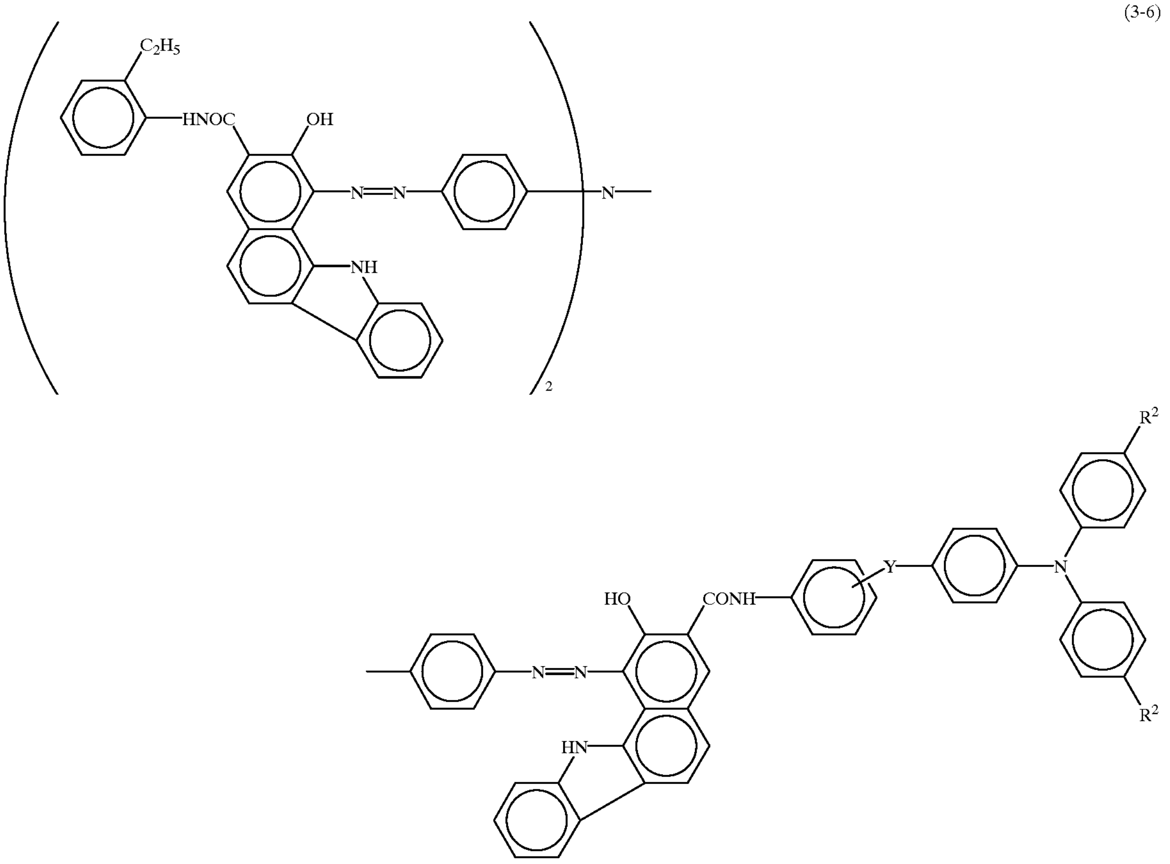

wherein $R^2$ is a hydrogen atom, or an alkyl group having 1 to 4 carbon atoms; and Y is an ethylene group or a vinylene group.

The above-mentioned trisazo compounds can also effectively serve as the charge generating materials in the charge generation layer of the two-layered photoconductor. In addition, each of the above trisazo compounds serves as not only the charge generating material in the single-layered photoconductive layer in which the charge generating material and the charge transporting material are dispersed in a resin, but also a photoconductive material in the photoconductive layer in which the photoconductive material is dispersed in the resin.

For instance, the above-mentioned trisazo compound of formula (3-1) according to the present invention can be obtained by allowing a tris(diazonium salt) compound of formula (301) to react with a coupler of formula (4-3), that is a 2-hydroxy-3-phenylcarbamoyl-11H-benzo[a]carbazole compound:

(301)

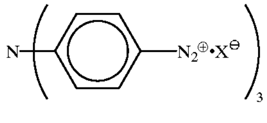

wherein X is an anionic functional group; and (4-3)

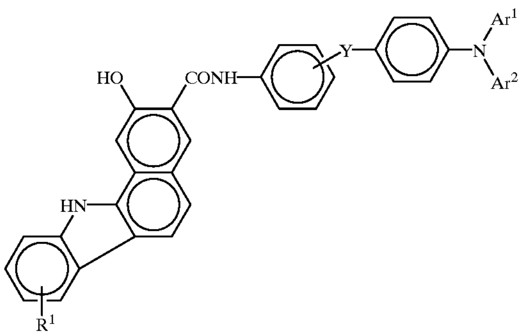

wherein $Ar^1$ and $Ar^2$ are each independently an aryl group which may have a substituent; $R^1$ is a hydrogen atom, an alkyl group having 1 to 4 carbon atoms, an alkoxyl group having 1 to 4 carbon atoms, or a halogen atom; and Y is an ethylene group or a vinylene group.

The above-mentioned trisazo compound of formula (3-3) or (3-5) is obtained by successively allowing the tris (diazonium salt) compound of formula (301) to react with the previously mentioned coupler of formula (4-3) and a coupler of the following formula (302) by two steps:

(302)

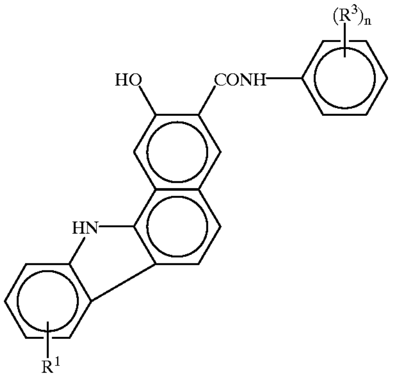

wherein $R^1$ is a hydrogen atom, an alkyl group, an alkoxyl group, or a halogen atom; $R^3$ is a hydrogen atom, an alkyl group, an alkoxyl group, a halogen atom, nitro group, or a dialkylamino group; n is an integer of 1 to 3, and when n is 2 or 3, each R may be the same or different.

Alternatively, a diazonium salt compound having the following formula (303) or (304) obtained by the first coupling reaction is isolated, and the diazonium salt compound thus isolated is then allowed to react with the coupler other than the coupler used in the first coupling reaction:

(303)

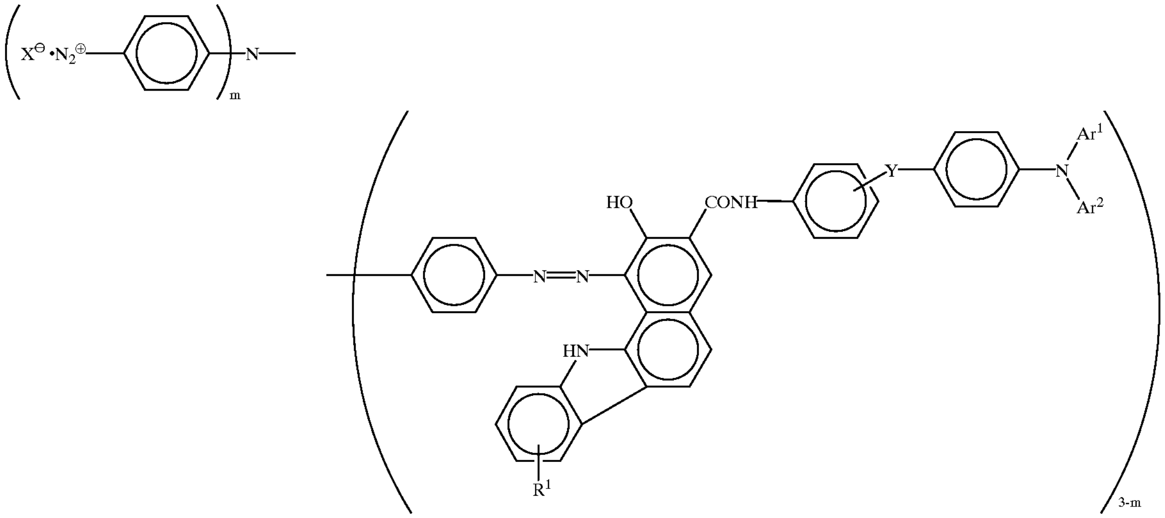

wherein $Ar^1$ and $Ar^2$ are each independently an aryl group which may have a substituent; $R^1$ is a hydrogen atom, an alkyl group, an alkoxyl group, or a halogen atom; X is an anionic functional group; Y is an ethylene group or a vinylene group; and m is an integer of 1 or 2.

(304)

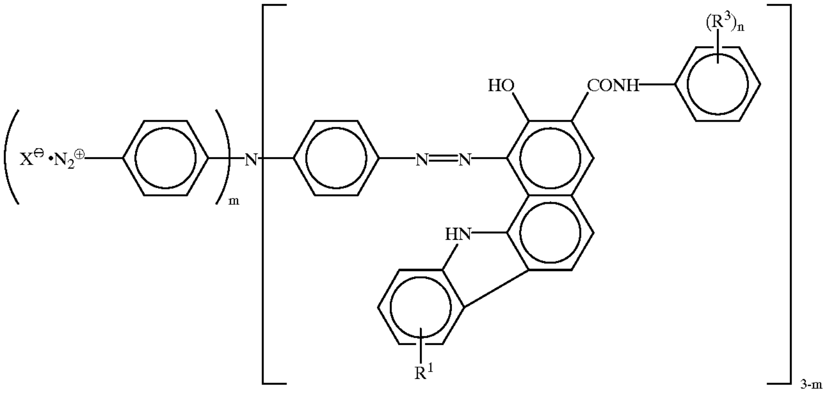

wherein $R^1$ is a hydrogen atom, an alkyl group, an alkoxyl group or a halogen atom; $R^3$ is a hydrogen atom, an alkyl group, an alkoxyl group, a halogen atom, nitro group or a dialkylamino group; X is an anionic functional group; n is an integer of 1 to 3, and when n is 2 or 3, each $R^3$ may be the same or different; and m is an integer of 1 or 2.

To synthesize the trisazo compound of formula (3-1) practically, the coupler, that is, 2-hydroxy-3-phenylcarbamoyl-11H-benzo[a]carbazole compound of formula (4-3) is dissolved in an organic solvent such as N,N-dimethylformamide (DMF) or dimethyl sulfoxide (DMSO). The tris(diazonium salt) compound of formula (301) is added to the above prepared solution, and the coupling reaction of the mixture is completed by the addition of a basic material such as an aqueous solution of sodium acetate or an organic amine. The preferable reaction temperature is in a range of about −20° C. to 40° C.

To obtain the trisazo compound of formula (3-3) or (3-5) according to the present invention, the coupler of formula (4-3) or (302) which is used in the coupling reaction of the first step is previously dissolved in an organic solvent such as N,N-dimethylformamide (DMF) or dimethyl sulfoxide (DMSO). The tris(diazonium salt) compound of formula (301) is added to the above prepared solution, and the first coupling reaction of the mixture is completed by the addition of a basic material such as an aqueous solution of sodium acetate or an organic amine. The preferable reaction temperature is in a range of about −20° C. to 40° C.

The second coupling reaction is carried out in such a manner that the coupler of formula (4-3) or (302) which is different from that employed in the first coupling reaction is further added to the reaction mixture obtained by the above-mentioned first coupling reaction. The second coupling reaction is completed similarly by the addition of a basic material such as an aqueous solution of sodium acetate or an organic amine. Or water or an acid aqueous solution such as dilute hydrochloric acid is added to the reaction mixture contained by the first coupling reaction. In this case, it is necessary that the reaction mixture be sufficiently cooled, preferably cooled to 10° C. or less so as not to decompose the diazonium salt compound of formula (303) or (304) generated by the reaction. The diazonium salt compound of formula (303) or (304) is isolated by filtration, and the diazonium salt compound thus obtained is allowed to react with the coupler of formula (4-3) or (302) which is different from that employed in the first coupling reaction in the same manner as in the first coupling reaction.

In any case, the crystals which separate out after the completion of the reaction are filtered off, and purified by an appropriate method such as washing with water and/or an organic solvent or recrystallization, so that the trisazo compound of formula (3-1), (3-3) or (3-5) can be obtained.

Examples of $R^1$, $R^2$, $R^3$, $Ar^1$ and $Ar^2$, and the substituents thereof in the formulae (3-1) to (3-4), (4-3), and (302) to (304) will now be explained below.

Specific examples of the aryl group are phenyl group, biphenyl group, naphthyl group, anthryl group, and pyrenyl group.

Specific examples of the alkyl group are methyl group, ethyl group, propyl group, and butyl group.

Specific examples of the alkoxyl group are methoxy group, ethoxy group, propoxy group, and butoxy group.

Specific examples of the halogen are fluorine, chlorine, bromine and iodine.

Furthermore, X in the formulae (301), (303) and (304) represents an anionic functional group such as tetrafluoroborate, perchlorate, iodate, chloride, bromide, sulfate, hexafluorophosphate, hexafluoroantimonate, periodate, and p-toluenesulfonate.

The previously mentioned 2-hydroxy-3-phenylcarbamoyl-11H-benzo[a]carbazole compound of formula (4-3), which is a novel compound and serves as an intermediate for preparation of the azo compound. Such a 2-hydroxy-3-phenylcarbamoyl-11H-benzo[a]carbazole compound of formula (4-3) according to the present invention can be obtained by allowing an aniline compound of formula (4-3-1) to react with a 2-hydroxy-3-carboxy-11H-benzo[a]carbazole compound of formula (4-3-2).

(4-3-1)

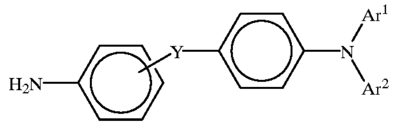

wherein $Ar^1$ and $Ar^2$ are each independently an aryl group which may have a substituent; and Y is an ethylene group or a vinylene group.

(4-3-2)

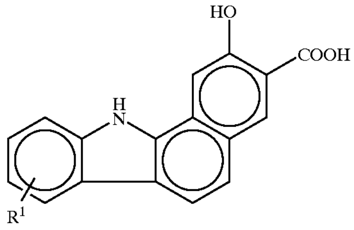

wherein $R^1$ is a hydrogen atom, an alkyl group having 1 to 4 carbon atoms, an alkoxyl group having 1 to 4 carbon atoms, or a halogen atom.

To be more specific, the aforementioned 2-hydroxy-3-phenylcarbamoyl-11H-benzo[a]carbazole compound of formula (4-3) is prepared by the following method: 2-hydroxy-3-carboxy-11H-benzo[a]carbazole compound of formula (4-3-2) is dissolved or dispersed in an organic solvent such as benzene, toluene or dioxane, and an alkaline metal hydroxide such as potassium hydroxide or sodium hydroxide is added to the above prepared solution or dispersion to prepare an alkaline metal salt of carboxylic acid. Then, with the addition of an agent for inducing halogenation such as phosphorus pentachloride, phosphorus trichloride or thionyl chloride, the alkaline metal salt of carboxylic acid is turned to a halide of acid. The halide thus obtained may be subjected to isolation or not, and thereafter allowed to react with the aniline compound of formula (4-3-1).

In the formulae (4-3), (4-3-1) and (4-3-2), specific examples of the aryl group represented by $Ar^1$ or $Ar^2$ are phenyl group, biphenyl group, naphthyl group, anthryl group, and pyrenyl group.

Specific examples of the alkyl group represented by $R^1$ in formulae (4-3) and (4-3-2) are methyl group, ethyl group, propyl group, and butyl group.

Specific examples of the alkoxyl croup represented by $R^1$ in formulae (4-3) and (4-3-2) are ,ethoxy group, ethoxy group, propoxy group, and butoxy group.

Specific examples of the halogen atom represented by $R^1$ in formulae (4-3) and (4-3-2) are fluorine, chlorine, bromine and iodine.

Thereafter, the reaction mixture was cooled to room temperature, poured into iced water, and then neutralized with sodium carbonate. The resulting precipitate was filtered off, successively washed with water and methanol, and dried by the application of heat thereto under reduced pressure, so that pale brown-yellow crude crystals were obtained. Then, the crude material was chromatographed on a silica gel column using a mixture of toluene and ethyl acetate with a mixing ratio by volume of 3:1 as an eluting solution, and the product thus obtained was recrystallized from a mixed solvent of N,N-dimethylformamide and ethanol, so that a desired compound, 2-hydroxy-3-phenylcarbamoyl-11H-benzo[a]carbazole compound of formula (4-3-a) was obtained as yellow crystals in the form of needles. The yield was 10.90 g (33.4%).

(4-3-a)

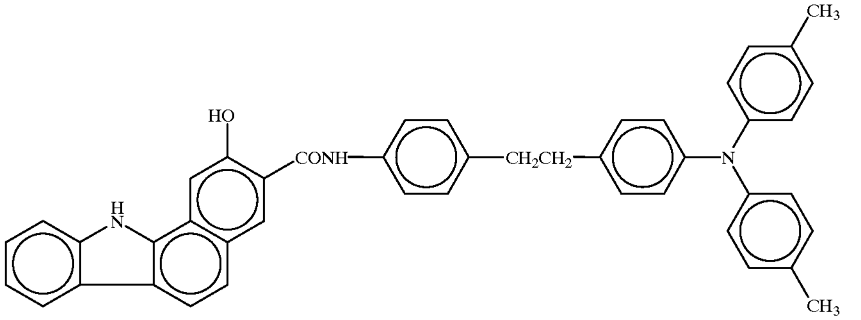

There can be employed as the substituent of the aryl group represented by $Ar^1$ and $Ar^2$ in formulae (4-3) and (4-3-1) the above-mentioned aryl group, alkyl group, alkoxyl group and halogen atom.

Other features of this invention will become apparent in the course of the following description of exemplary embodiments, which are given for illustration of the invention and are not intended to be limiting thereof.

SYNTHESIS EXAMPLE 1-1

Synthesis of 2-Hydroxy-3-Phenylcarbamoyl-11H-Benzo[a]Carbazole Compound of Formula (4-3-a)

13.86 g (50.0 mmol) of 2-hydroxy-3-carboxy-11H-benzo[a]carbazole was dispersed in 140 ml of 1,4-dioxane to prepare a dispersion. A solution prepared by dissolving 3.26 g (50.00 mmol) of 86% potassium hydroxide in 10 ml of methanol was added to the above prepared dispersion. The mixture thus obtained was heated to about 90° C. over a period of 2 hours with stirring to distill away the solvent from the mixture.

After 80 ml of 1,4-dioxane was further added to the above reaction mixture, a solution prepared by diluting 4.53 g (33.0 mmol) of phosphorus trichloride with 5 ml of 1,4-dioxane was added dropwise to the reaction mixture at about 80° C. over a period of 15 minutes, and the reaction mixture was refluxed with stirring for one hour.

To the above reaction mixture, a solution prepared by dissolving 19.63 g (50.0 mmol) of 4-(4-aminophenetyl)-4',4''-dimethyltriphenylamine in 30 ml of 1,4-dioxane was added dropwise over a period of 15 minutes, and the reaction mixture was further refluxed with stirring for 11 hours.

The melting point of the above carbazole compound was 289° C.

The results of the elemental analysis of the thus obtained compound were as follows:

| | % C | % H | % N |
|---|---|---|---|
| Calculated | 82.92 | 5.72 | 6.45 |
| Found | 83.15 | 5.73 | 6.42 |

Figure 36:
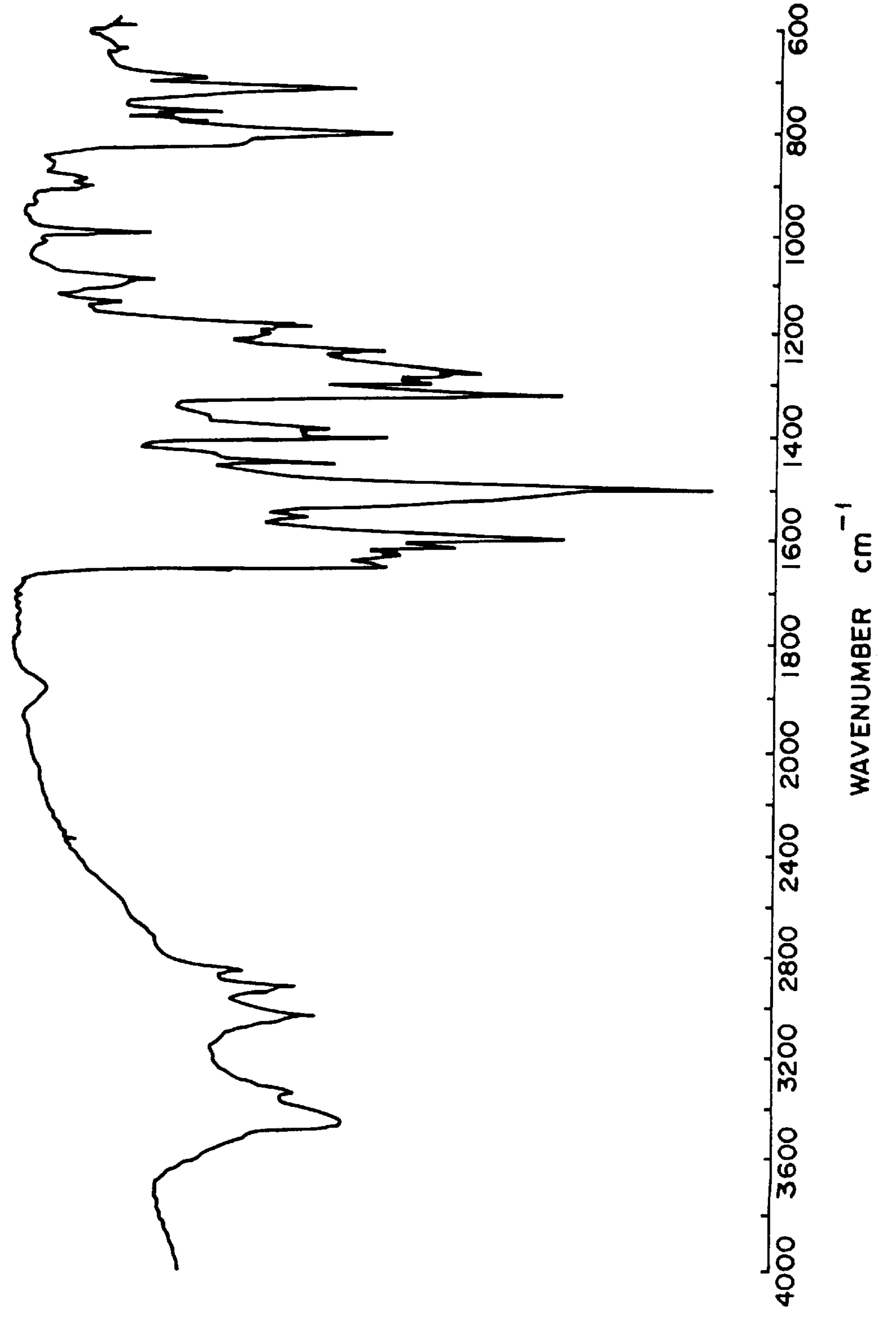
FIGS. 36 to 40 are the IR spectra of 2-hydroxy-3-phenylcarbamoyl-11H-benzo[a]carbazole compounds according to the present invention, taken by use of a KBr tablet.

FIG. 36 shows an infrared spectrum of the above prepared carbazole compound, taken by use of a KBr tablet.

SYNTHESIS EXAMPLE 1-2

Preparation of 2-Hydroxy-3-Phenylcarbamoyl-11H-Benzo[a]Carbazole Compound of Formula (4-3-b)

A 2-hydroxy-3-phenylcarbamoyl-11H-benzo[a]carbazole compound of formula (4-3-b) was obtained in a 24% yield in accordance with the method as described in Synthesis Example 1-1.

(4-3-b)

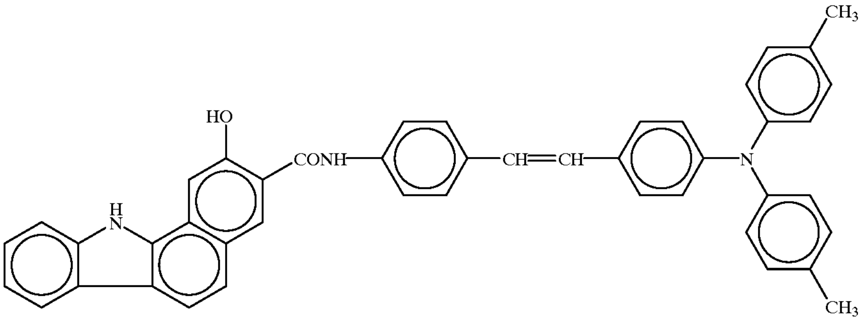

The melting point of the above carbazole compound was 280° C. or more.

The results of the elemental analysis of the thus obtained compound were as follows:

| | % C | % H | % N |
|---|---|---|---|
| Calculated | 83.18 | 5.73 | 6.47 |
| Found | 83.26 | 5.34 | 6.55 |

Figure 37:
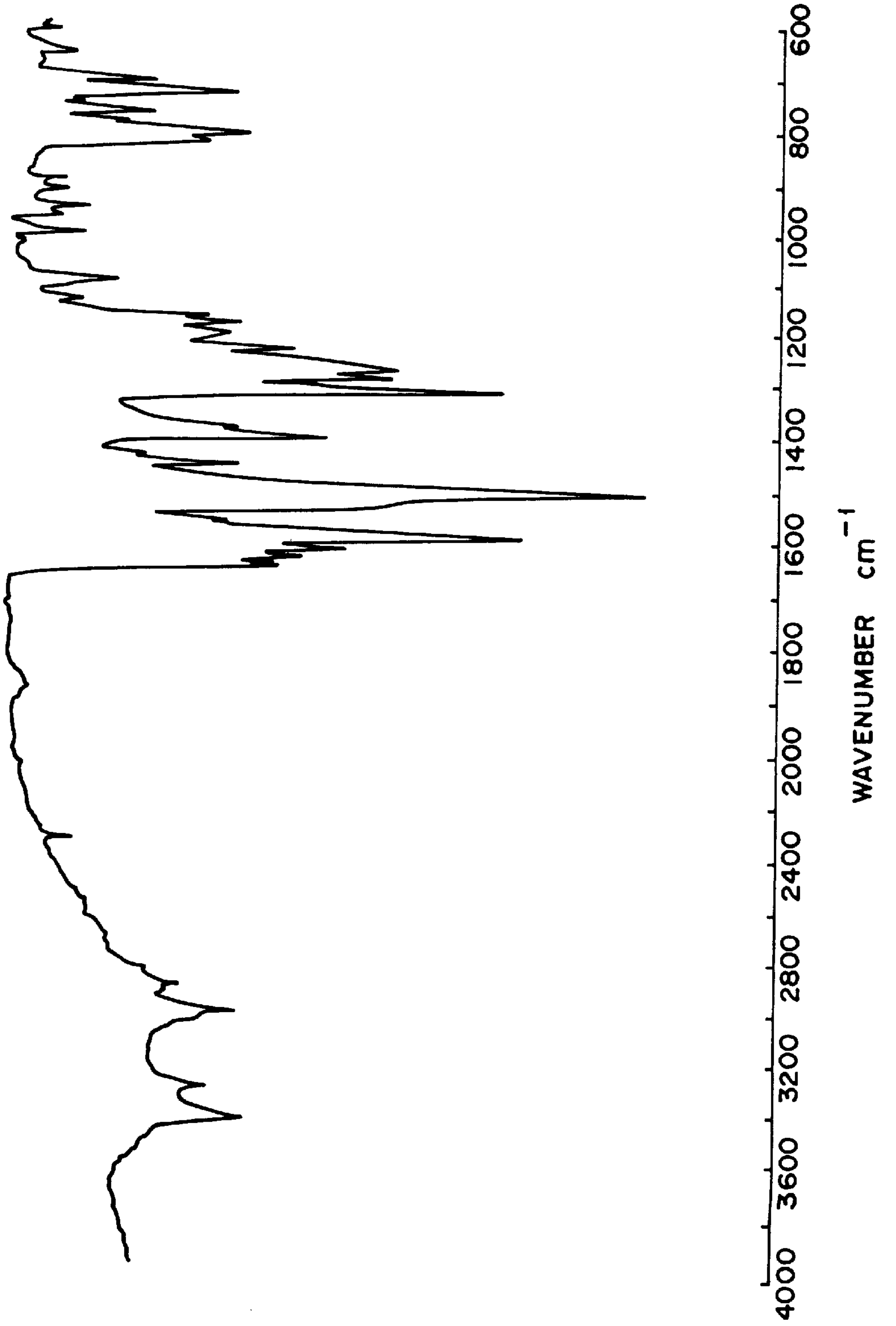

FIG. 37 shows an infrared spectrum of the above prepared carbazole compound, taken by use of a KBr tablet.

SYNTHESIS EXAMPLE 1-3

Preparation of 2-Hydroxy-3-Phenylcarbamoyl-11H-Benzo[a]Carbazole Compound of Formula (4-3-c)

A 2-hydroxy-3-phenylcarbamoyl-11H-benzo[a]carbazole compound of formula (4-3-c) was obtained in a 15% yield in accordance with the method as described in Synthesis Example 1-1.

The melting point of the above carbazole compound was 289.0–291.0° C.

The results of the elemental analysis of the thus obtained compound were as follows:

| | % C | % H | % N |
|---|---|---|---|
| Calculated | 82.80 | 5.33 | 6.74 |
| Found | 82.87 | 5.27 | 6.84 |

Figure 38:
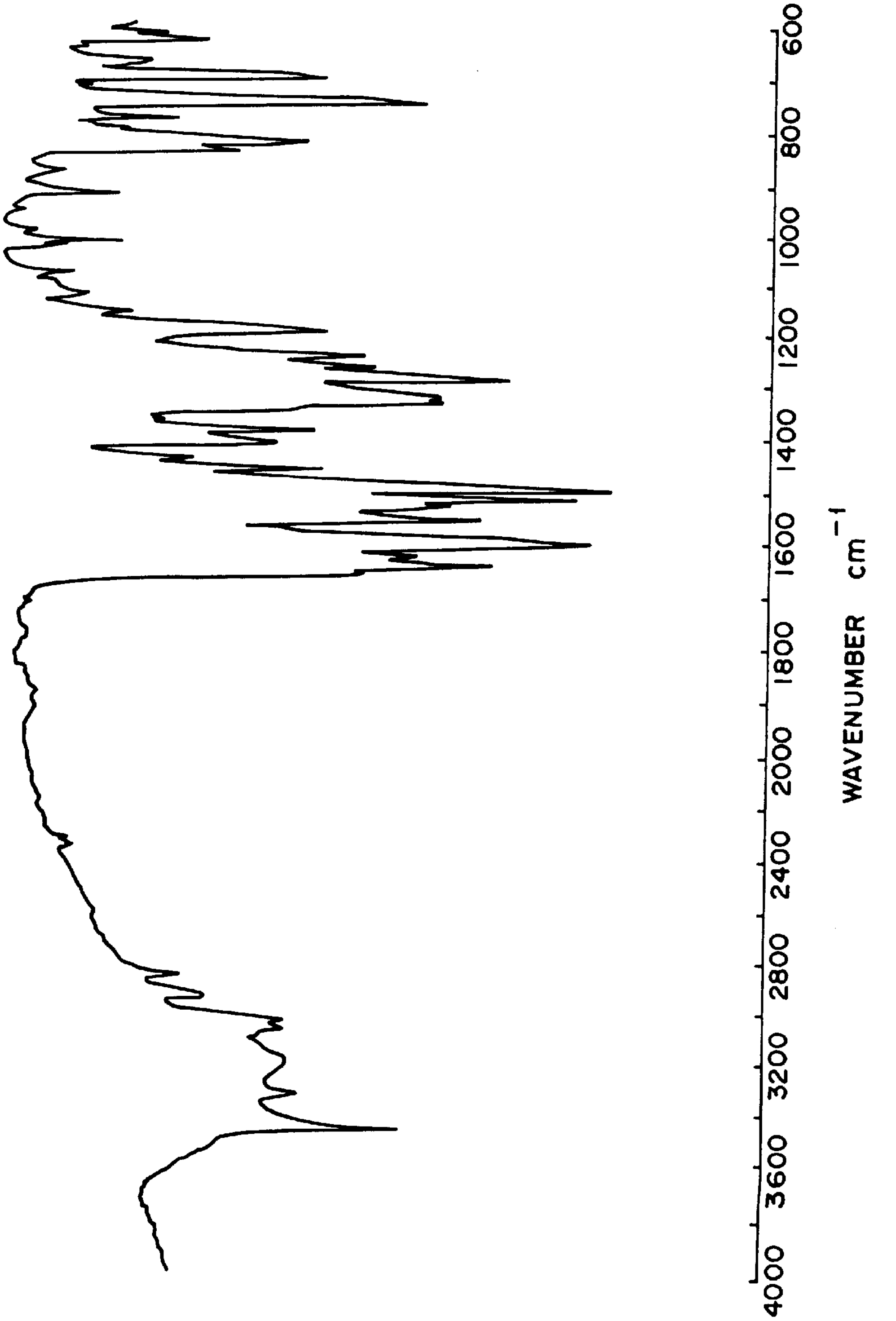

FIG. 38 shows an infrared spectrum of the above prepared carbazole compound, taken by use of a KBr tablet.

SYNTHESIS EXAMPLE 1-4

Preparation of 2-Hydroxy-3-Phenylcarbamoyl-11H-Benzo[a]Carbazole Compound of Formula (4-3-d)

A 2-hydroxy-3-phenylcarbamoyl-11H-benzo[a]carbazole compound of formula (4-3-d) was obtained in a 19% yield in accordance with the method as described in Synthesis Example 1-1.

(4-3-c)

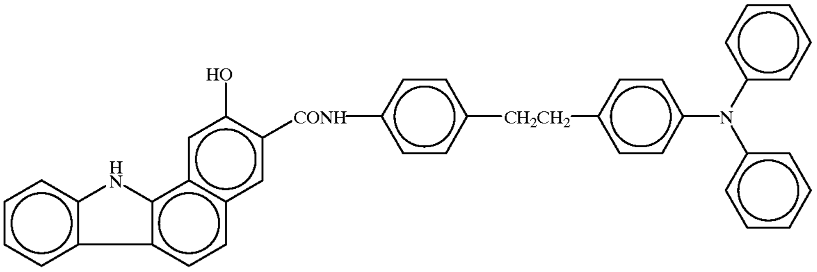

(4-3-d)

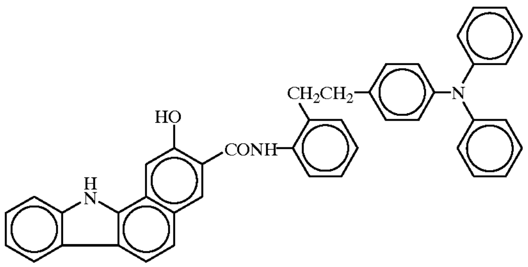

The melting point of the above carbazole compound was 234.5–236.5° C.

The results of the elemental analysis of the thus obtained compound were as follows:

| | % C | % H | % N |
|---|---|---|---|
| Calculated | 82.80 | 5.33 | 6.74 |
| Found | 83.20 | 5.22 | 6.64 |

Figure 39:
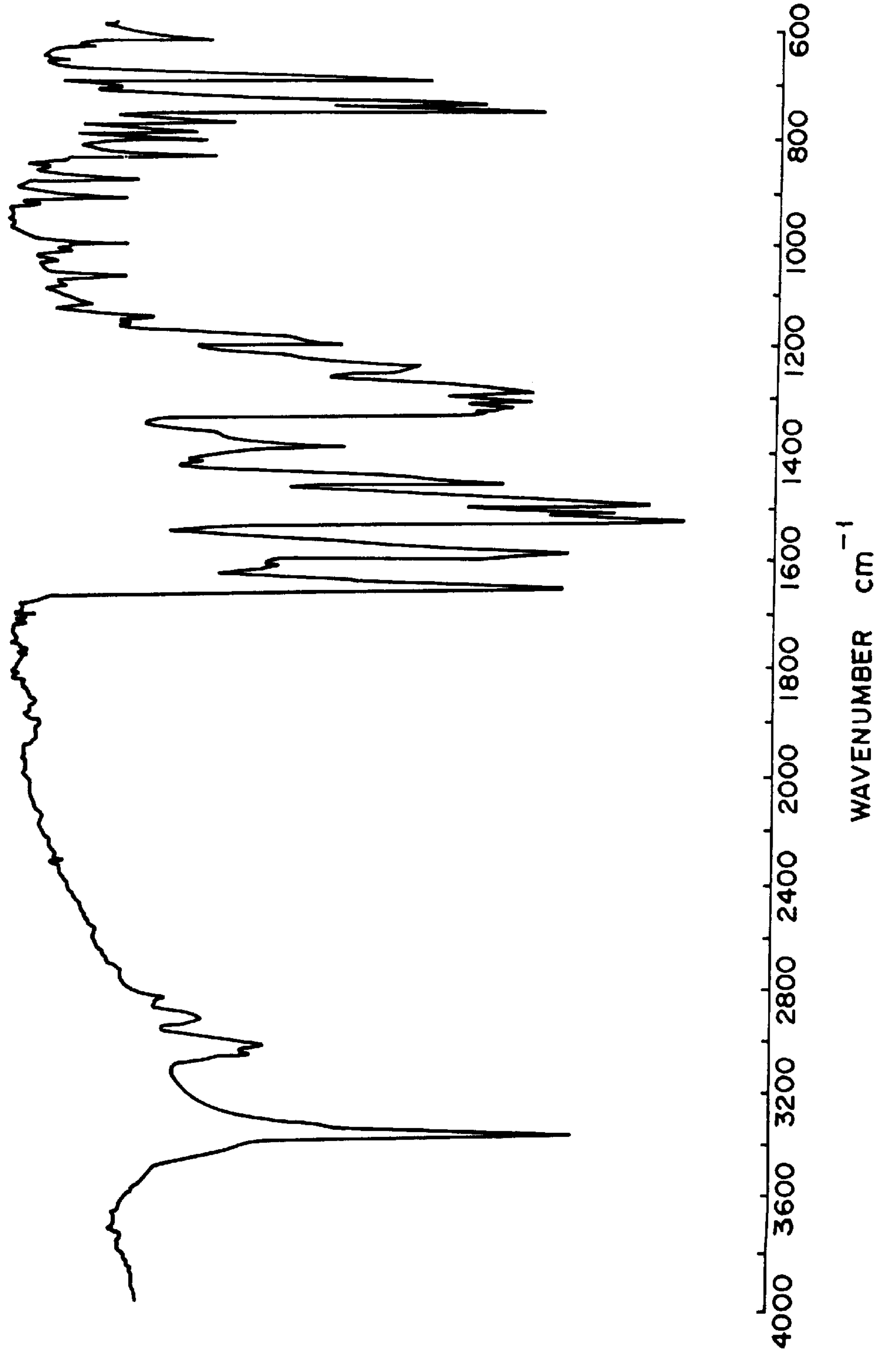

FIG. 39 shows an infrared spectrum of the above prepared carbazole compound, taken by use of a KBr tablet.

SYNTHESIS EXAMPLE 1-5

Preparation of 2-Hydroxy-3-Phenylcarbamoyl-11H-Benzo[a]Carbazole Compound of Formula (4-3-e)

A 2-hydroxy-3-phenylcarbamoyl-11H-benzo[a]carbazole compound of formula (4-3-e) was obtained in a 30% yield in accordance with the method as described in Synthesis Example 1-1.

The melting point of the above carbazole compound was 277.0° C.

The results of the elemental analysis of the thus obtained compound were as follows:

| | % C | % H | % N |
|---|---|---|---|
| Calculated | 82.92 | 5.72 | 6.45 |
| Found | 83.19 | 5.66 | 6.47 |

Figure 40:
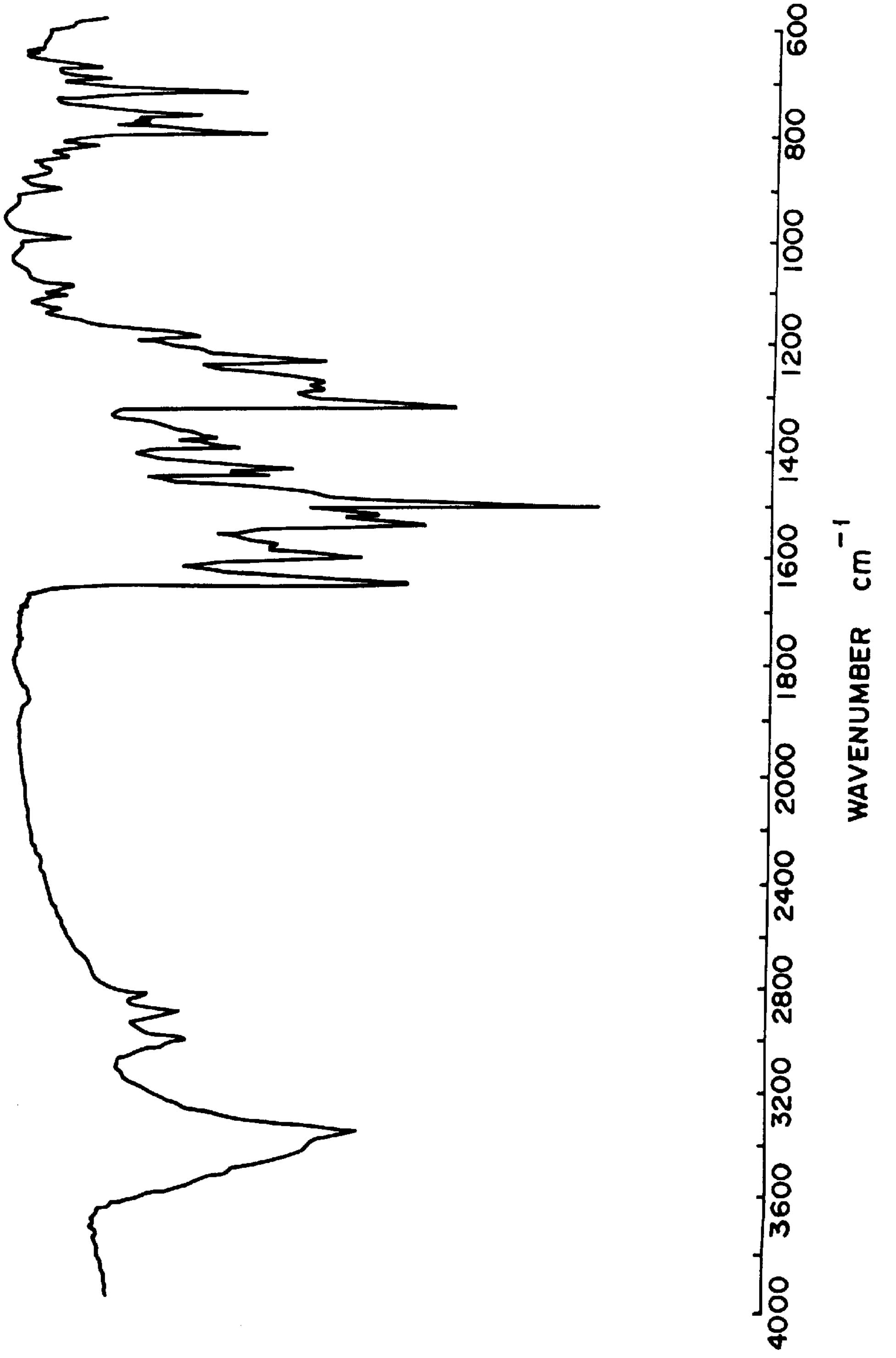

FIG. 40 shows an infrared spectrum of the above prepared carbazole compound, taken by use of a KBr tablet.

PREPARATION EXAMPLE 1

Preparation of Trisazo Compound No. 1

2.93 g (4.5 mmol) of 2-hydroxy-3-[4-(4-di-p-tolylaminophenetyl)phenyl]carbamoyl-11H[a]carbazole was dissolved in 150 ml of dimethylformamide (DMF). 0.88 g (1.5 mmol) of triphenylamine-4,4',4"-tris (diazoniumtetrafluoroborate) was added to the above prepared mixture at room temperature. Then, a solution prepared by dissolving 1.22 g (9 mmol) of trihydrate of sodium acetate in 6 ml of water was added dropwise to the above reaction mixture over a period of 20 minutes, and the reaction mixture was stirred at room temperature for 3 hours. The resulting precipitate was obtained by filtration, successively washed with 150 ml of DMF of 80° C. three times, and then with 150 ml of water twice, and dried at 120° C. under reduced pressure, so that 1.31 g of a trisazo compound No. 1 of formula (305) according to the present invention was obtained in a yield of 38.3%.

(4-3-e)

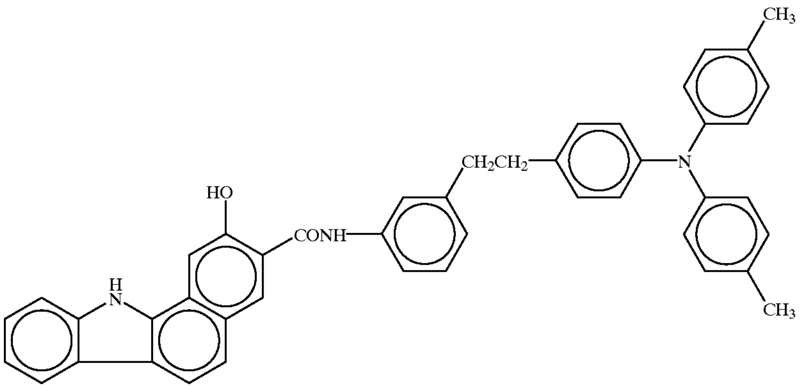

(305)

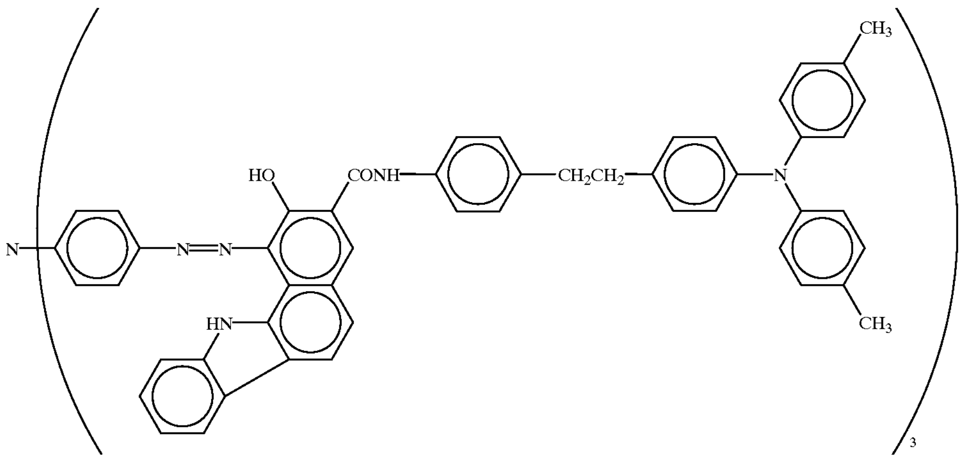

The melting point of the above trisazo compound was 280° C. or more.

The results of the elemental analysis of the thus obtained trisazo compound were as follows:

| | % C | % H | % N |
|---|---|---|---|
| Calculated | 80.65 | 5.31 | 9.84 |
| Found | 80.58 | 5.14 | 9.65 |

Figure 3:
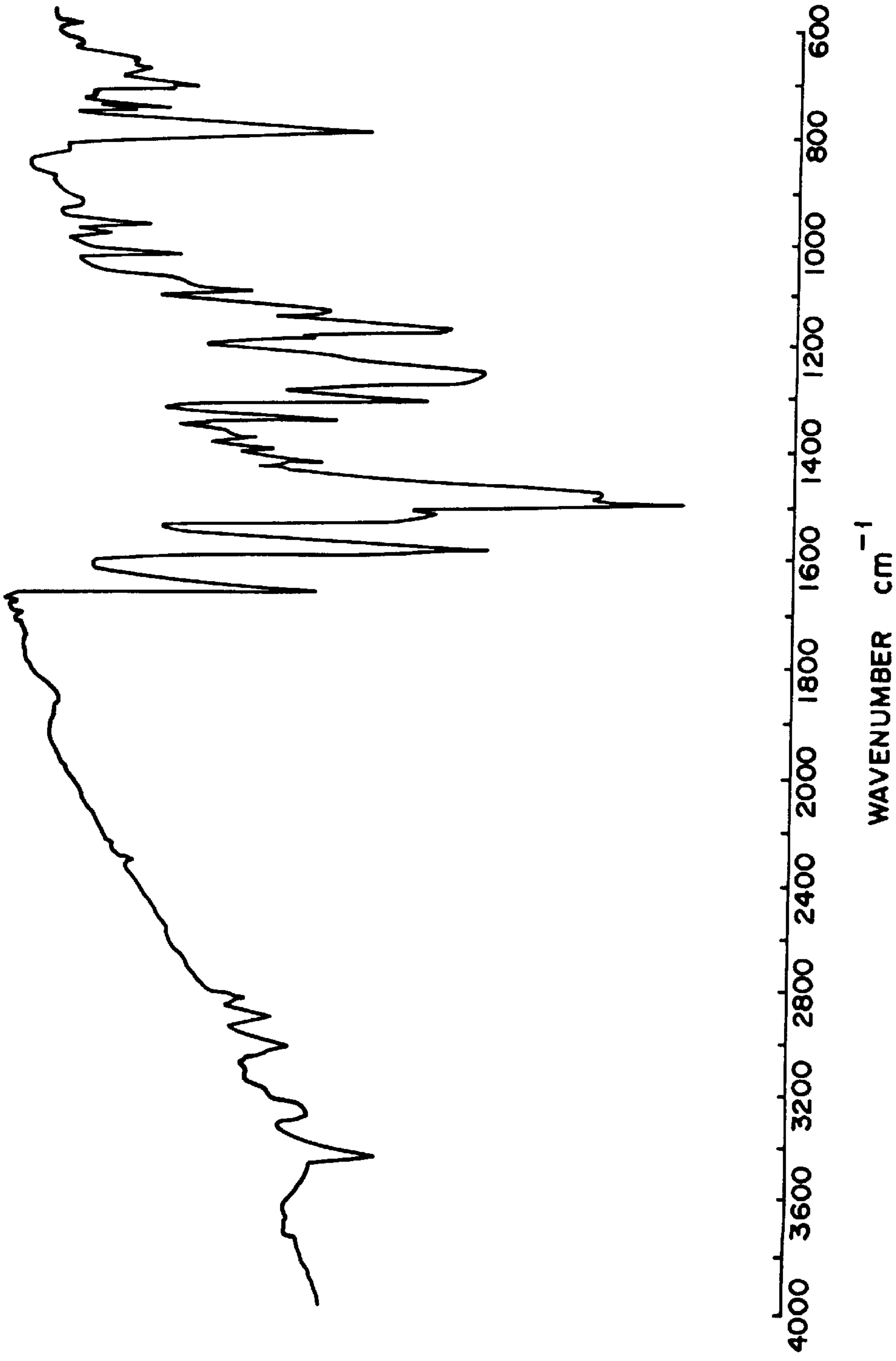
FIGS. 3 to 17 are the IR spectra of trisazo compounds according to the present invention, taken by use of a KBr tablet.

FIG. 3 shows an infrared spectrum of the above prepared trisazo compound, taken by use of a KBr tablet.

PREPARATION EXAMPLE 2

Preparation of Trisazo Compound No. 2

0.57 g (1.5 mmol) of 2-hydroxy-3-(2-ethylphenyl)-carbamoyl-11H-benzo[a]carbazole was dissolved in 50 ml of dimethylformamide (DMF). 0.88 g (1.5 mmol) of triphenylamine-4,4',4"-tris(diazoniumtetrafluoroborate) was added to the above prepared mixture at room temperature. The above prepared mixture was stirred at room temperature for 10 minutes. Then, to the above reaction mixture, a solution of 1.96 g (3 mmol) of 2-hydroxy-3-[4-(4-di-p-tolylaminophenethyl)phenyl]-carbamoyl-11H-benzo[a]carbazole and 100 ml of DMF was added and thereafter a solution prepared by dissolving 1.22 g (9 mmol) of trihydrate of sodium acetate in 6 ml of water was added dropwise over a period of 20 minutes, and the reaction mixture was stirred at room temperature for 3 hours. The resulting precipitate was obtained by filtration, successively washed with 150 ml of DMF of 80° C. three times, and then with 150 ml of water twice, and dried at 120° C. under reduced pressure, so that 0.65 g of a trisazo compound No. 2 of formula (306) according to the present invention was obtained in a yield of 22%.

(306)

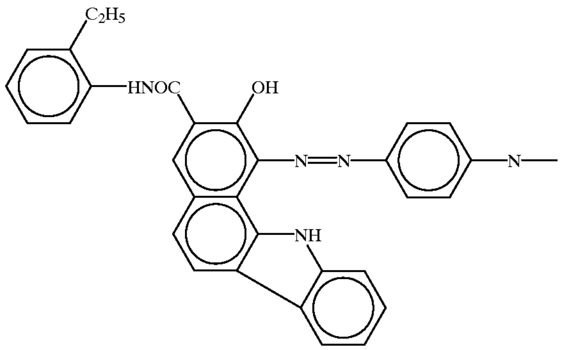

-continued

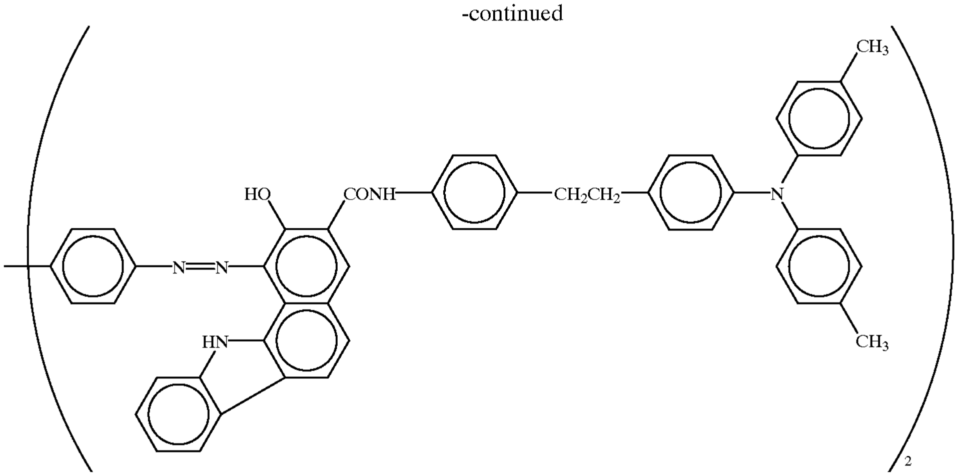

The melting point of the above trisazo compound was 280° C. or more.

The results of the elemental analysis of the thus obtained trisazo compound were as follows:

| | % C | % H | % N |
|---|---|---|---|
| Calculated | 79.58 | 5.17 | 10.47 |
| Found | 78.48 | 5.08 | 10.40 |

Figure 4:
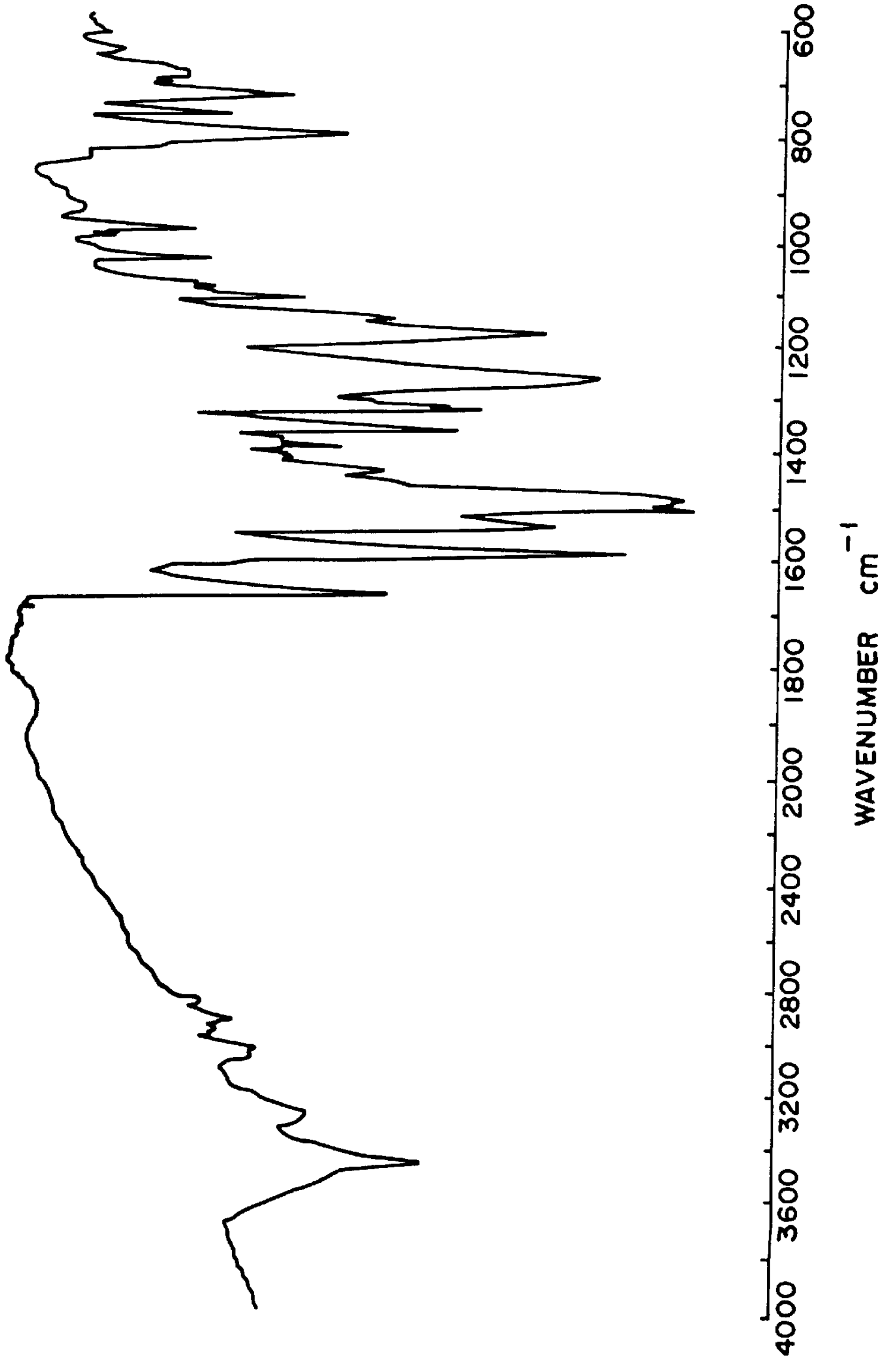

FIG. 4 shows an infrared spectrum of the above prepared trisazo compound, taken by use of a KBr tablet.

PREPARATION EXAMPLE 3

Preparation of Trisazo Compound No. 3

1.14 g (3 mmol) of 2-hydroxy-3-(2-ethylphenyl)-carbamoyl-11H-benzo[a]carbazole was dissolved in 100 ml of dimethylformamide (DMF). 0.88 g (1.5 mmol) of triphenylamine-4,4',4"-tris(diazoniumtetrafluoroborate) was added to the above prepared mixture at room temperature. The above prepared mixture was stirred at room temperature for 10 minutes. Then, to the above reaction mixture, a solution of 0.98 g (1.5 mmol) of 2-hydroxy-3-[4-(4-di-p-tolylaminophenethyl)phenyl]-carbamoyl-11H-benzo[a] carbazole and 50 ml of DMF was added and thereafter a solution prepared by dissolving 1.22 g (9 mmol) of trihydrate of sodium acetate in 6 ml of water was added dropwise over a period of 20 minutes, and the reaction mixture was stirred at room temperature for 3 hours. The resulting precipitate was obtained by filtration, successively washed with 150 ml of DMF of 80° C. three times, and then with 150 ml of water twice, and dried at 120° C. under reduced pressure, so that 0.99 g of a trisazo compound No. 3 of formula (307) according to the present invention was obtained in a yield of 38%.

(307)

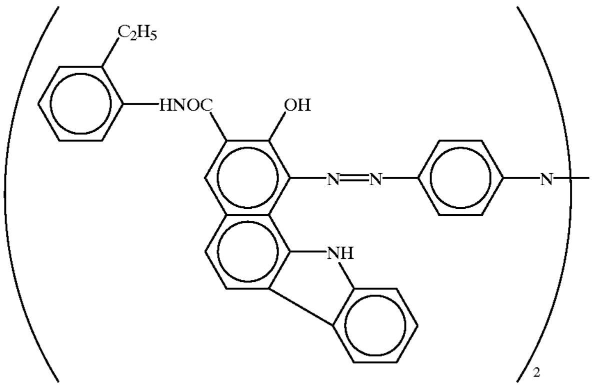

-continued

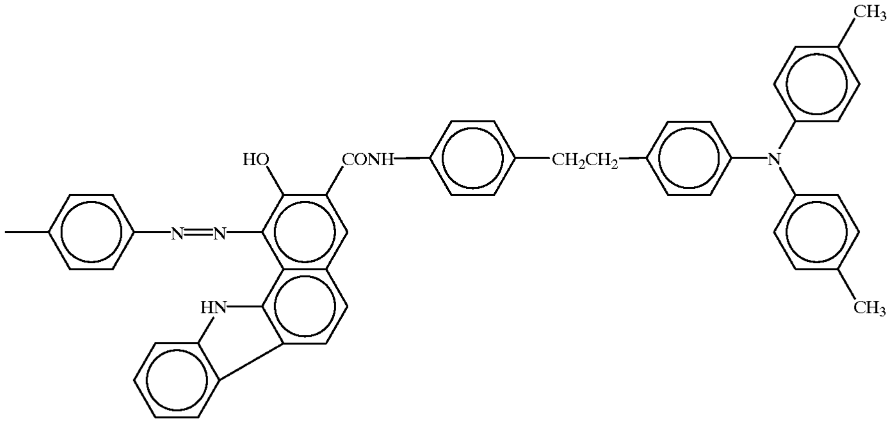

The melting point of the above trisazo compound was 280° C. or more.

The results of the elemental analysis of the thus obtained trisazo compound were as follows:

| | % C | % H | % N |
|---|---|---|---|
| Calculated | 78.18 | 4.99 | 11.30 |
| Found | 76.59 | 4.87 | 11.26 |

Figure 5:
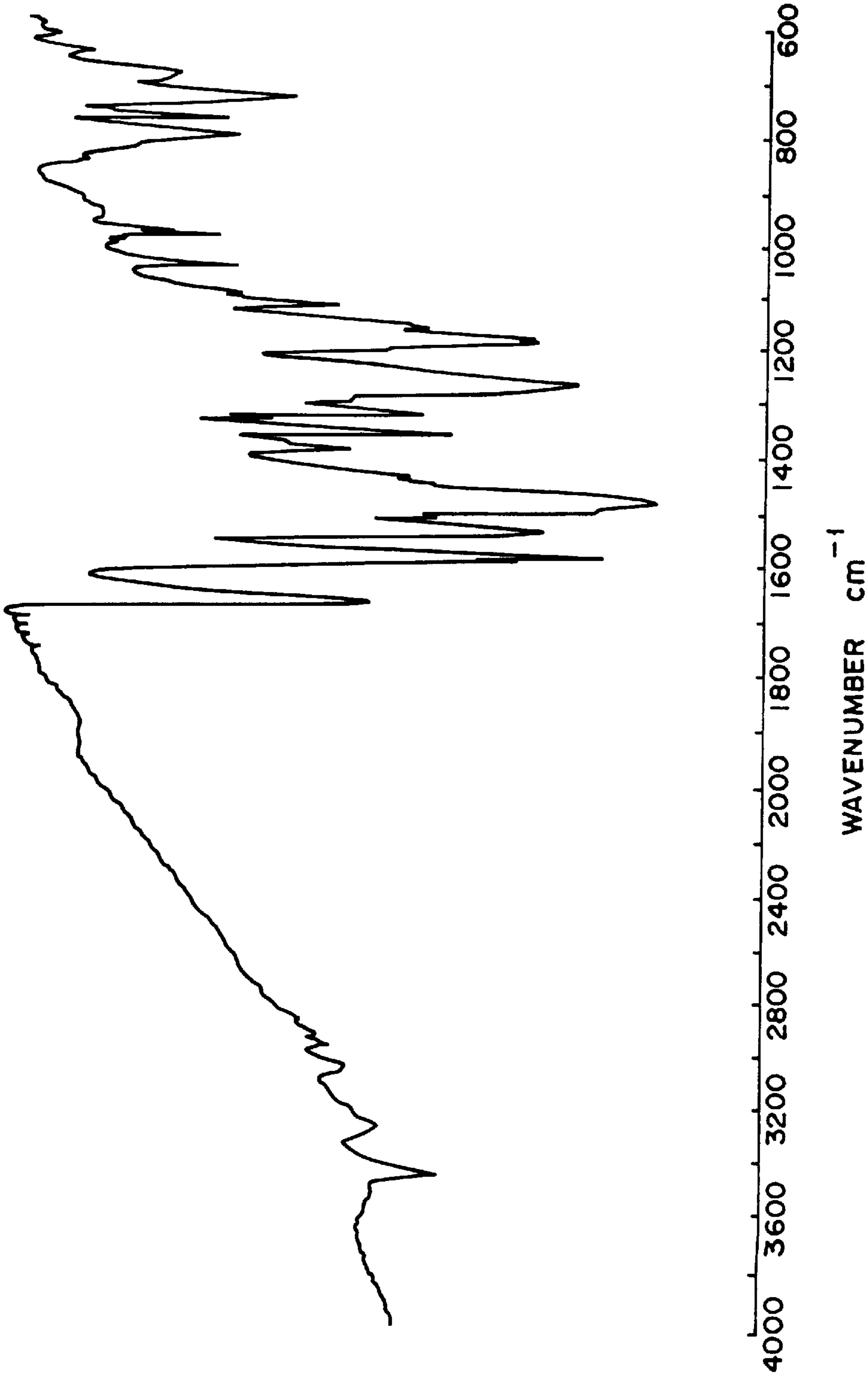

FIG. 5 shows an infrared spectrum of the above prepared trisazo compound, taken by use of a KBr tablet.

PREPARATION EXAMPLES 4 TO 6

Preparation of Trisazo Compounds Nos. 4 to 6

Trisazo compounds Nos. 4 to 6 with formulae (308) to (310) were obtained similarly in accordance with the methods as described in Preparation Examples 1 to 3.

(308)

[Trisazo compound No. 4]

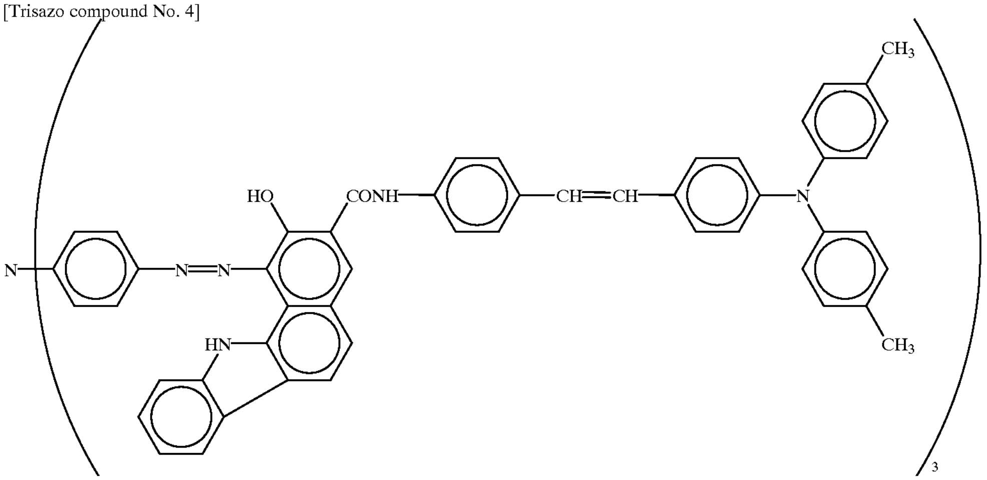

-continued
(309)
[Trisazo compound No. 5]
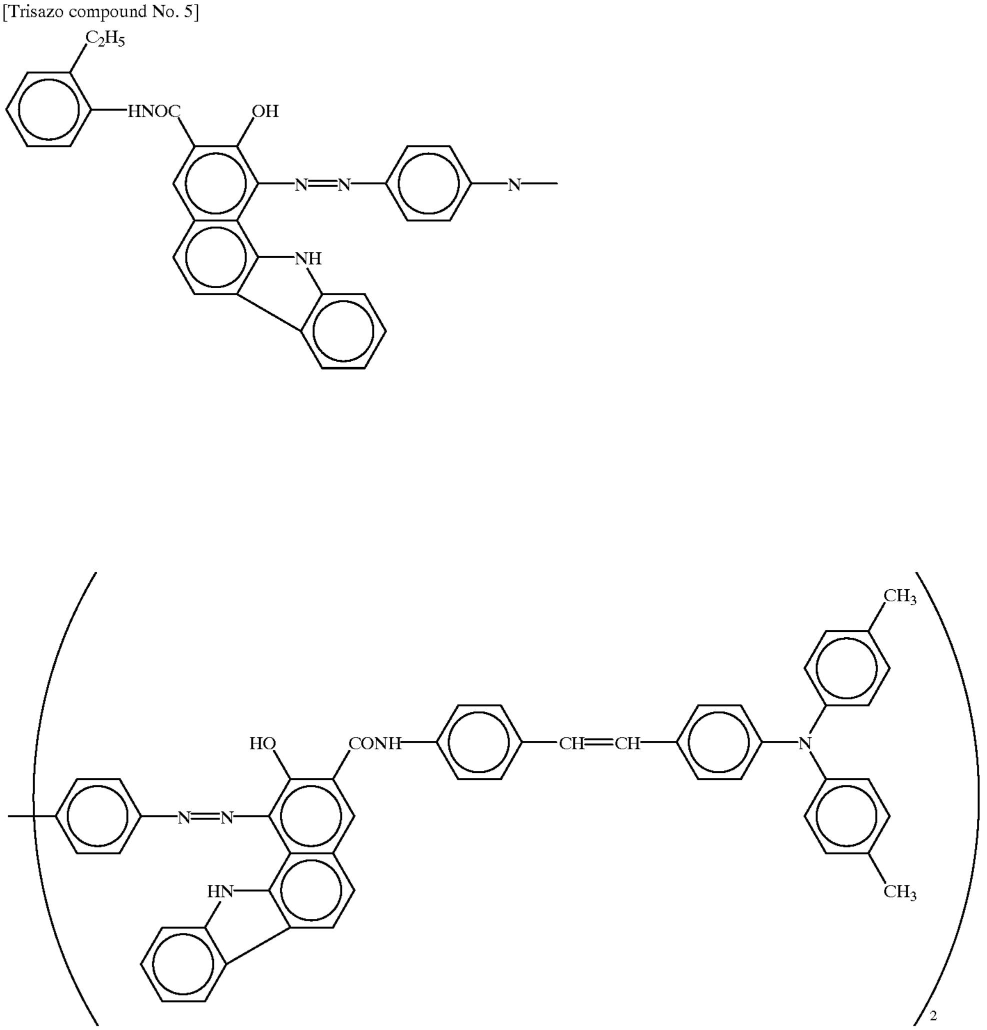
(310)
[Trisazo compound No. 6]
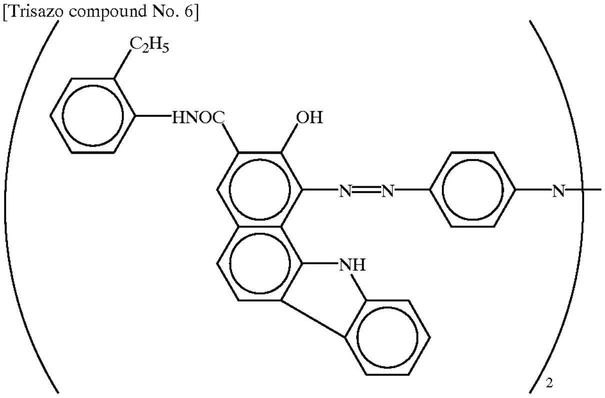

-continued

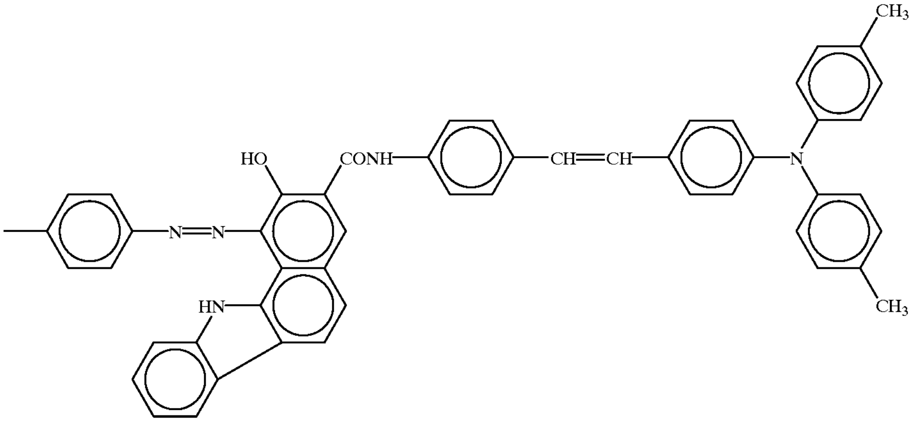

The yields, the melting points, and the results of the elemental analysis of the trisazo compounds Nos. 4 to shown in Table 17.

Figure 6:
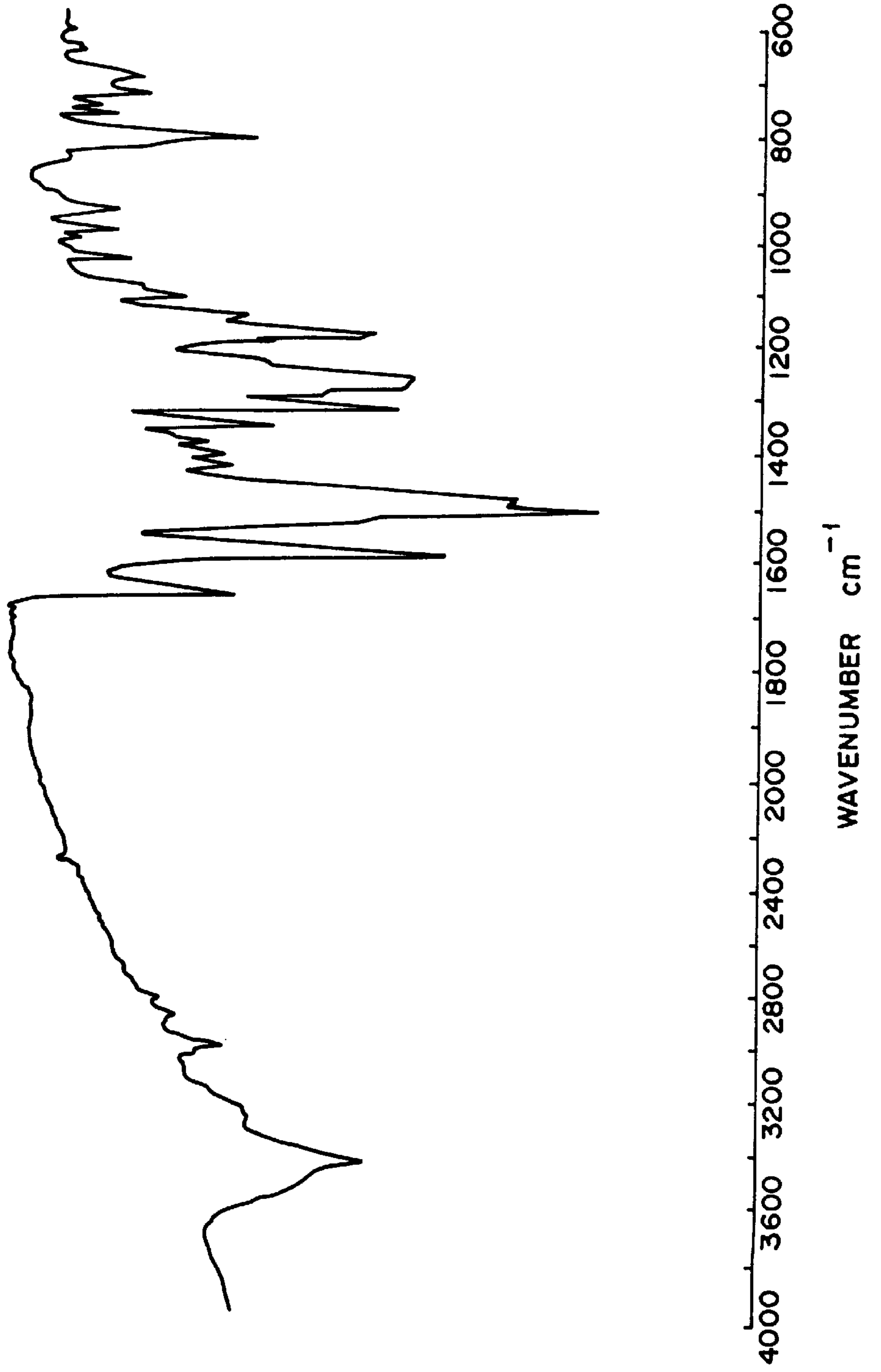
Figure 7:
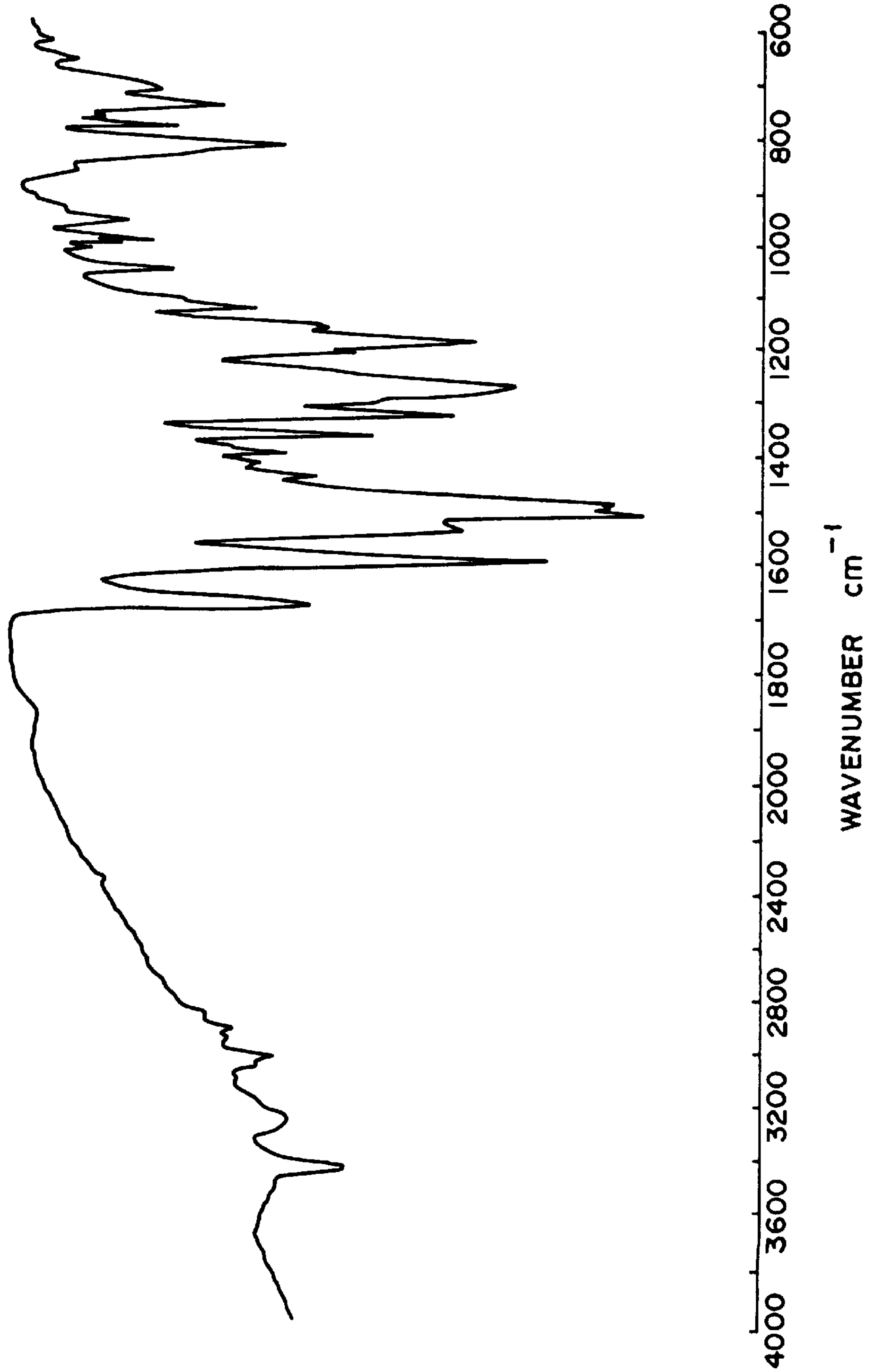
Figure 8:
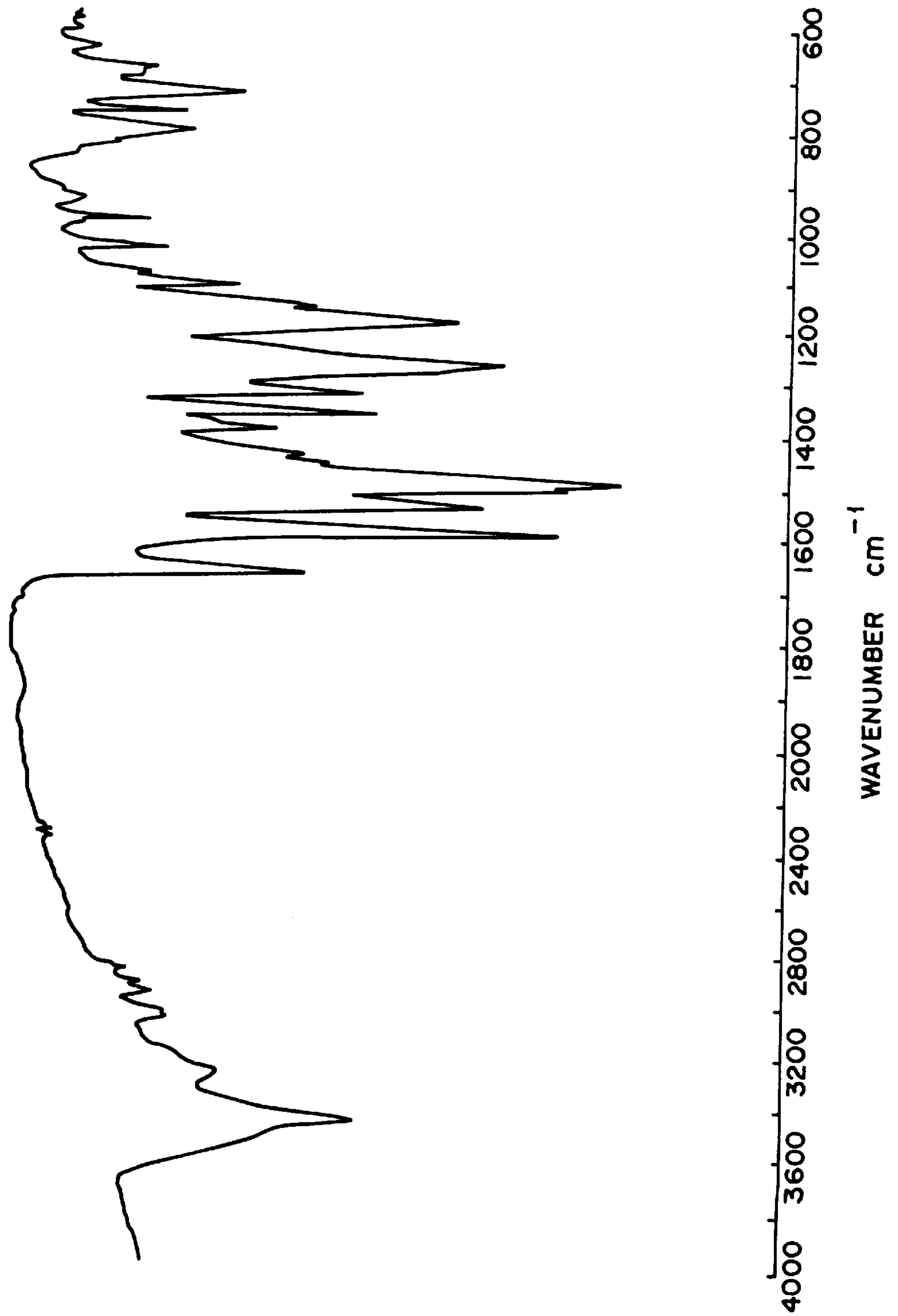
Figure 9:
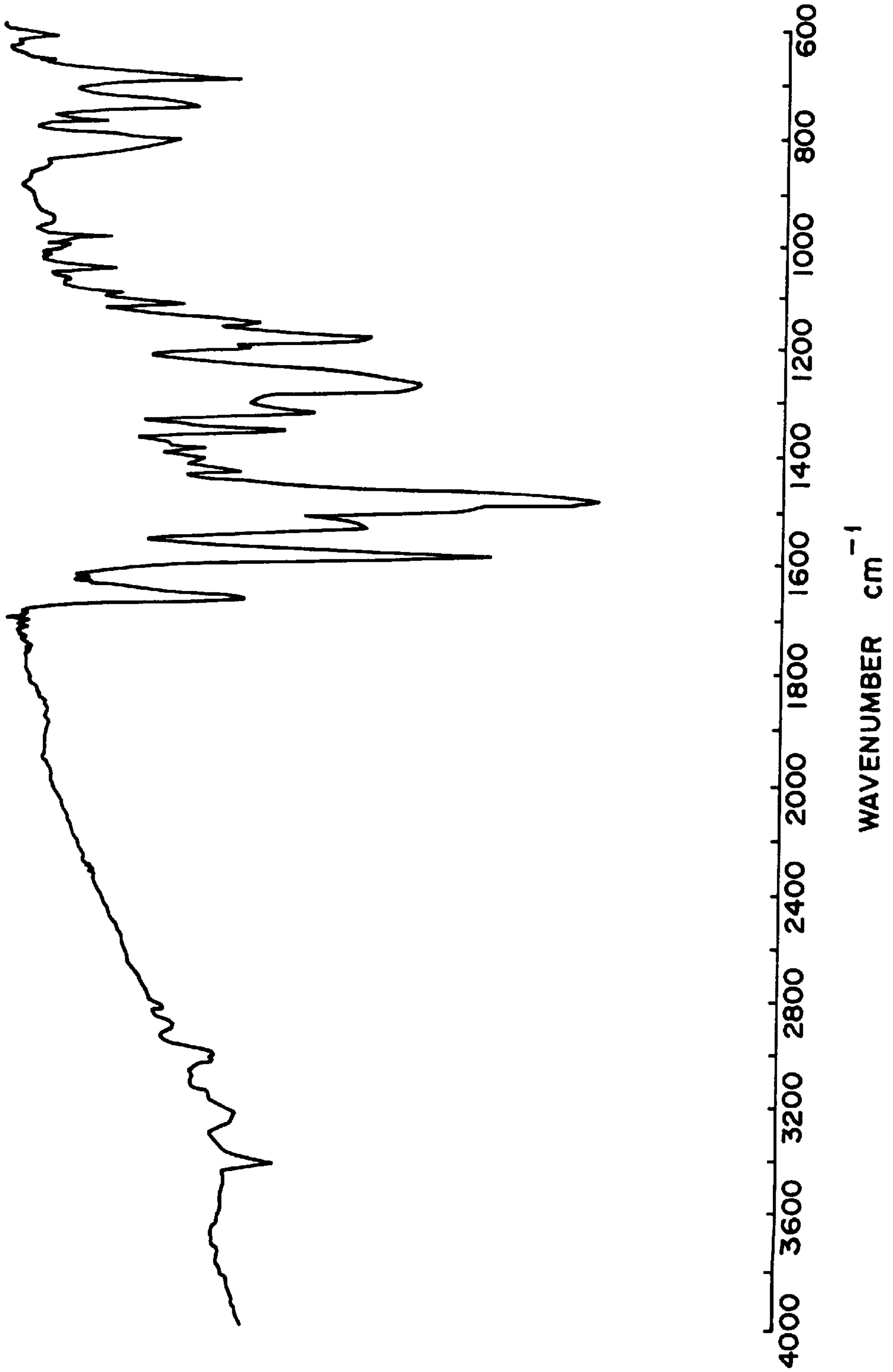
Figure 10:
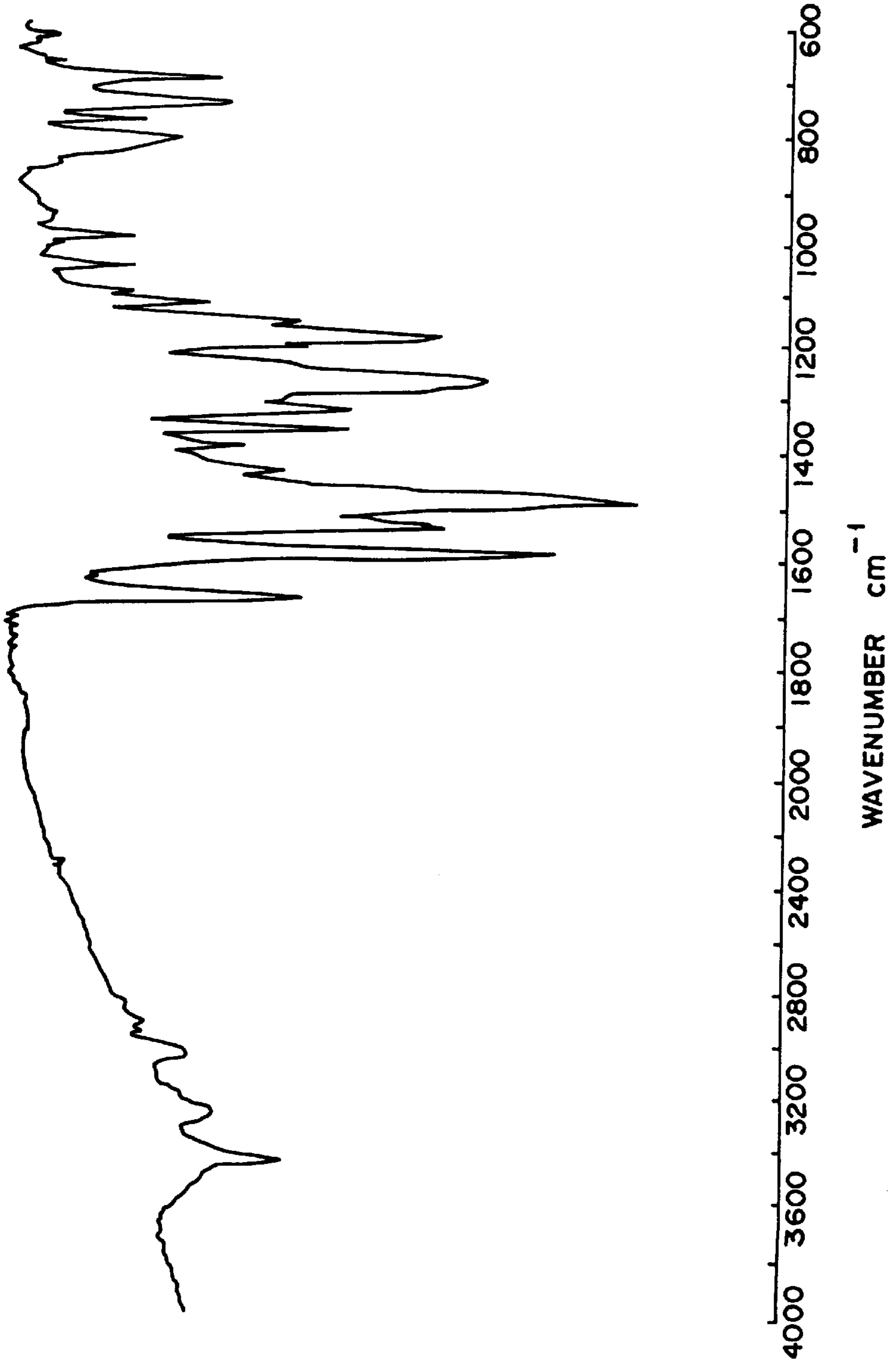
Figure 11:
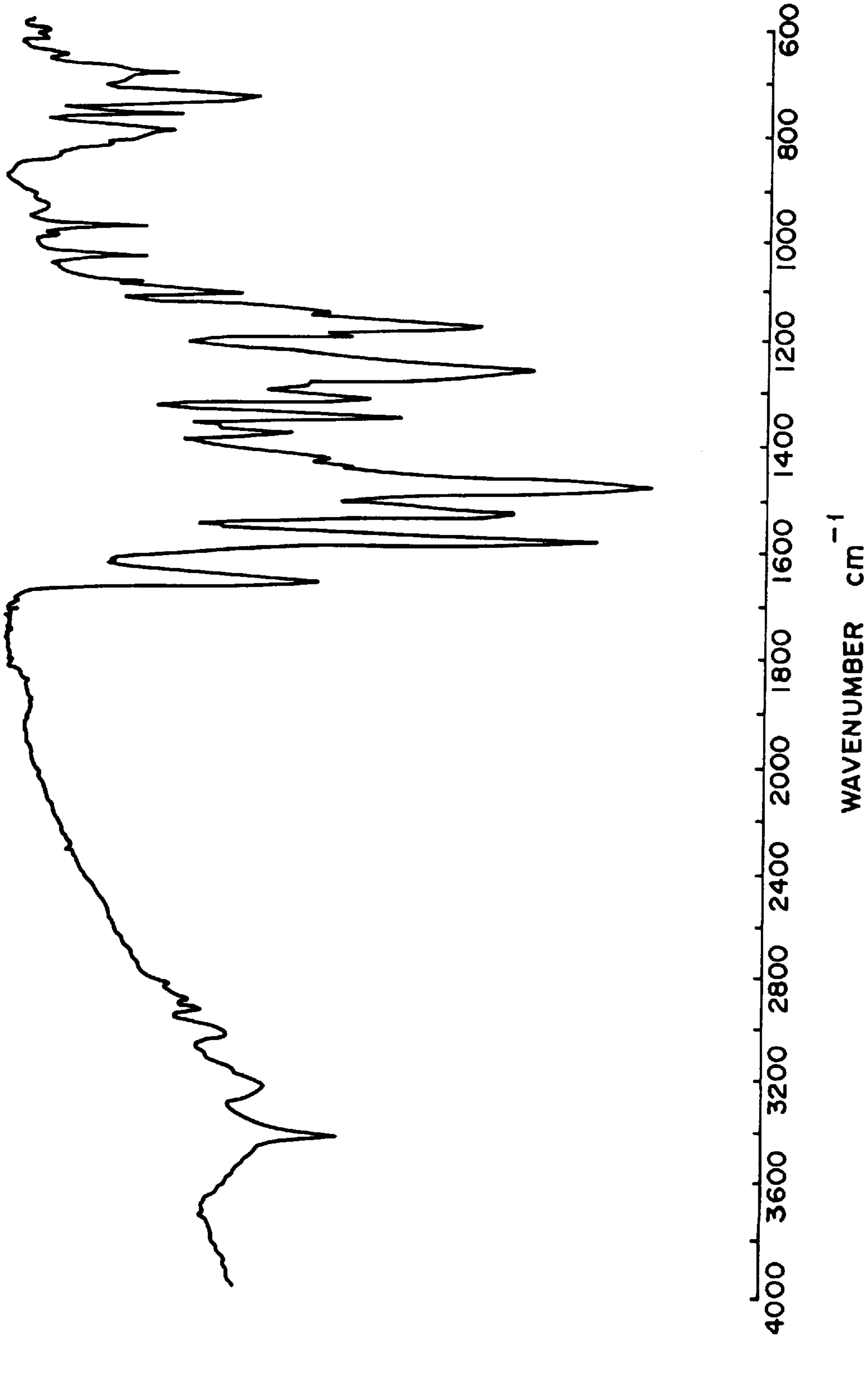
Figure 12:
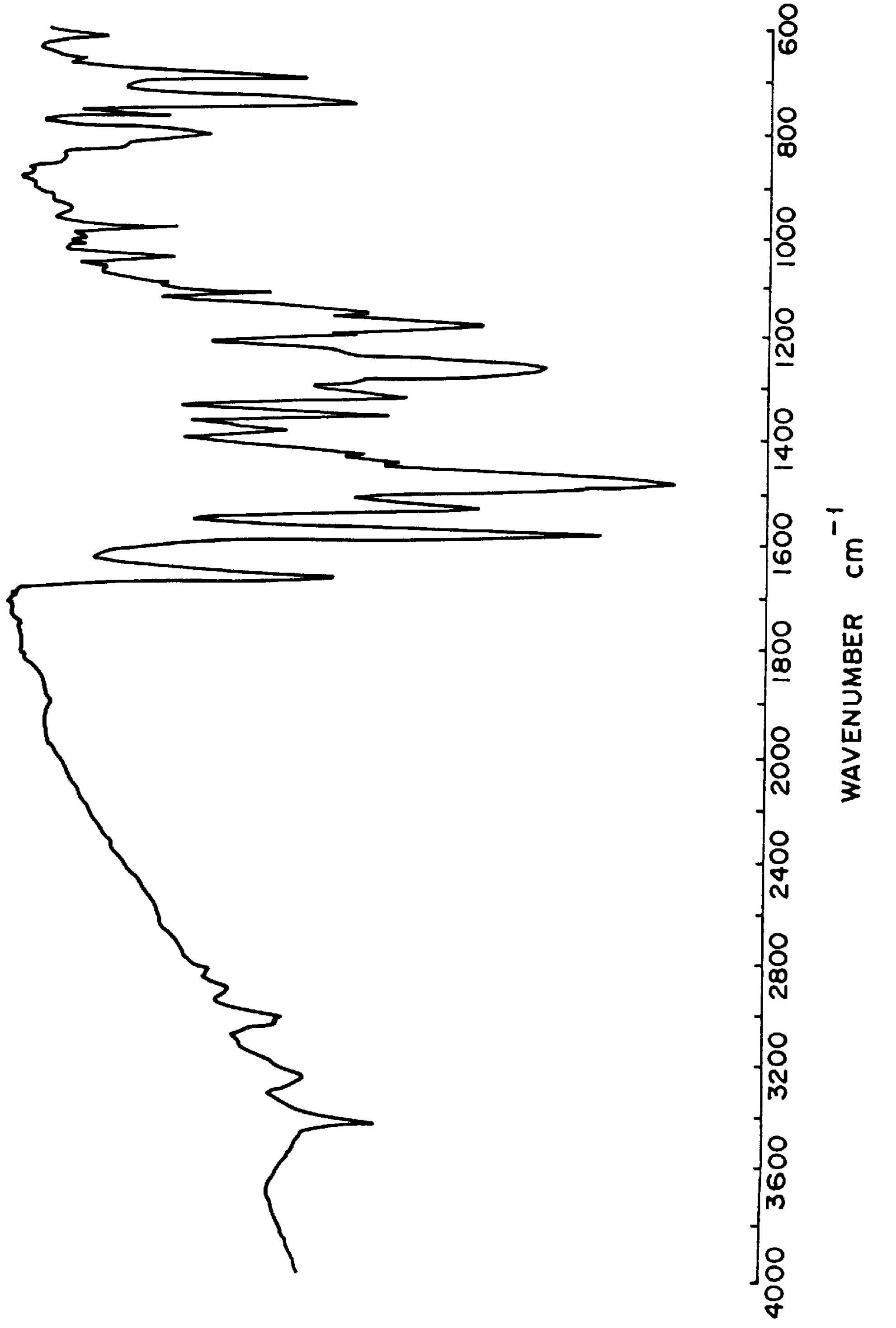
Figure 13:
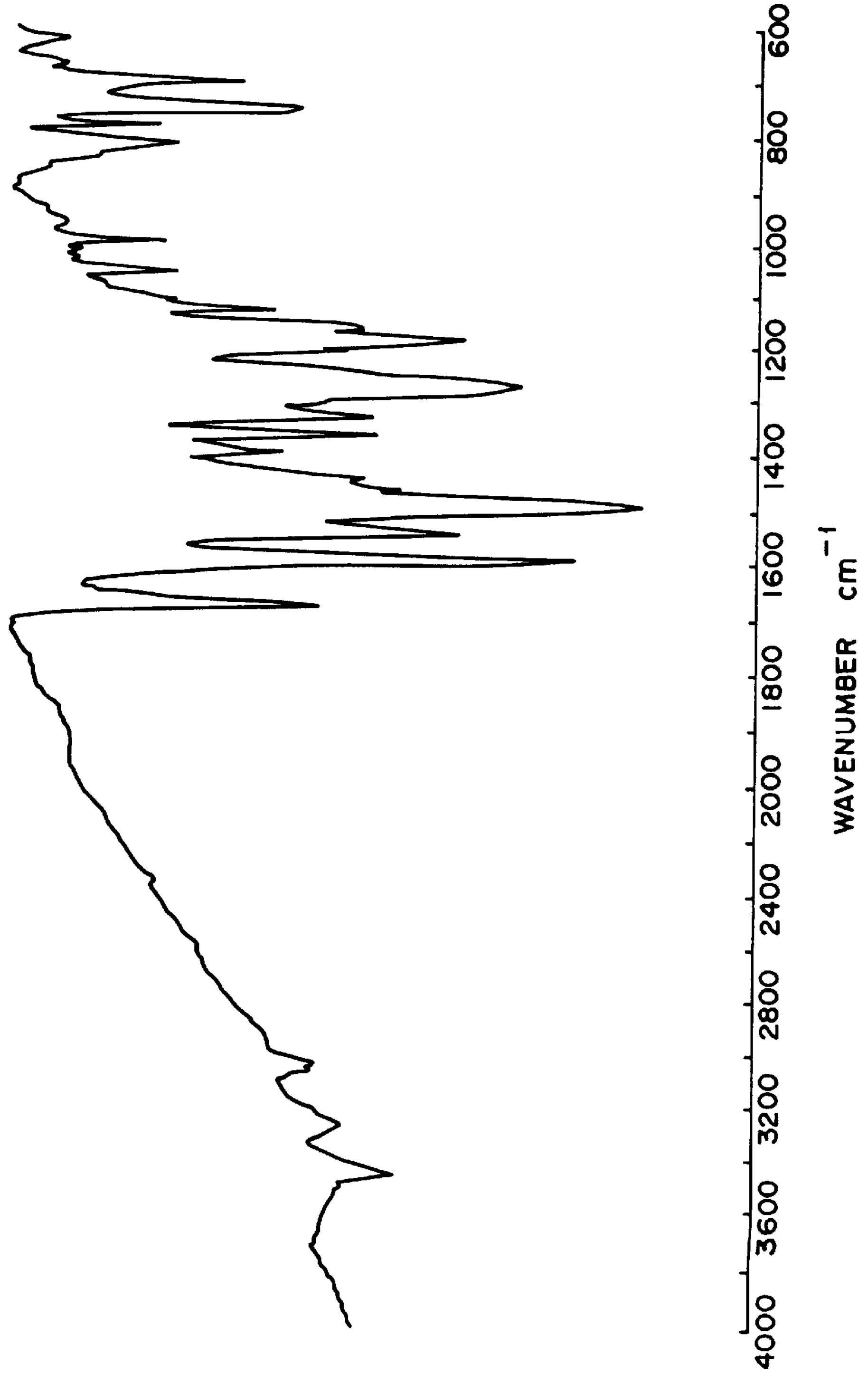
Figure 14:
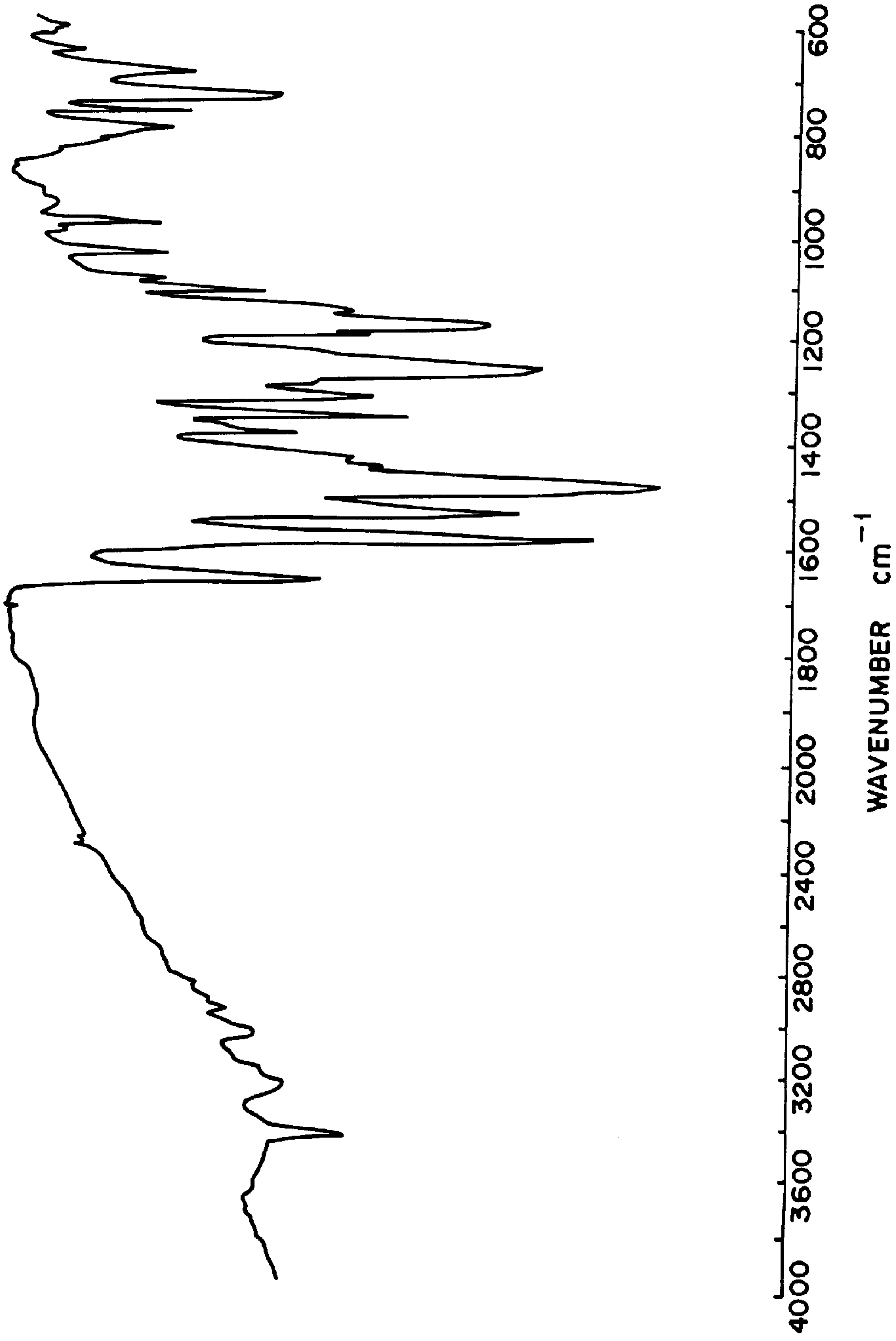
Figure 15:
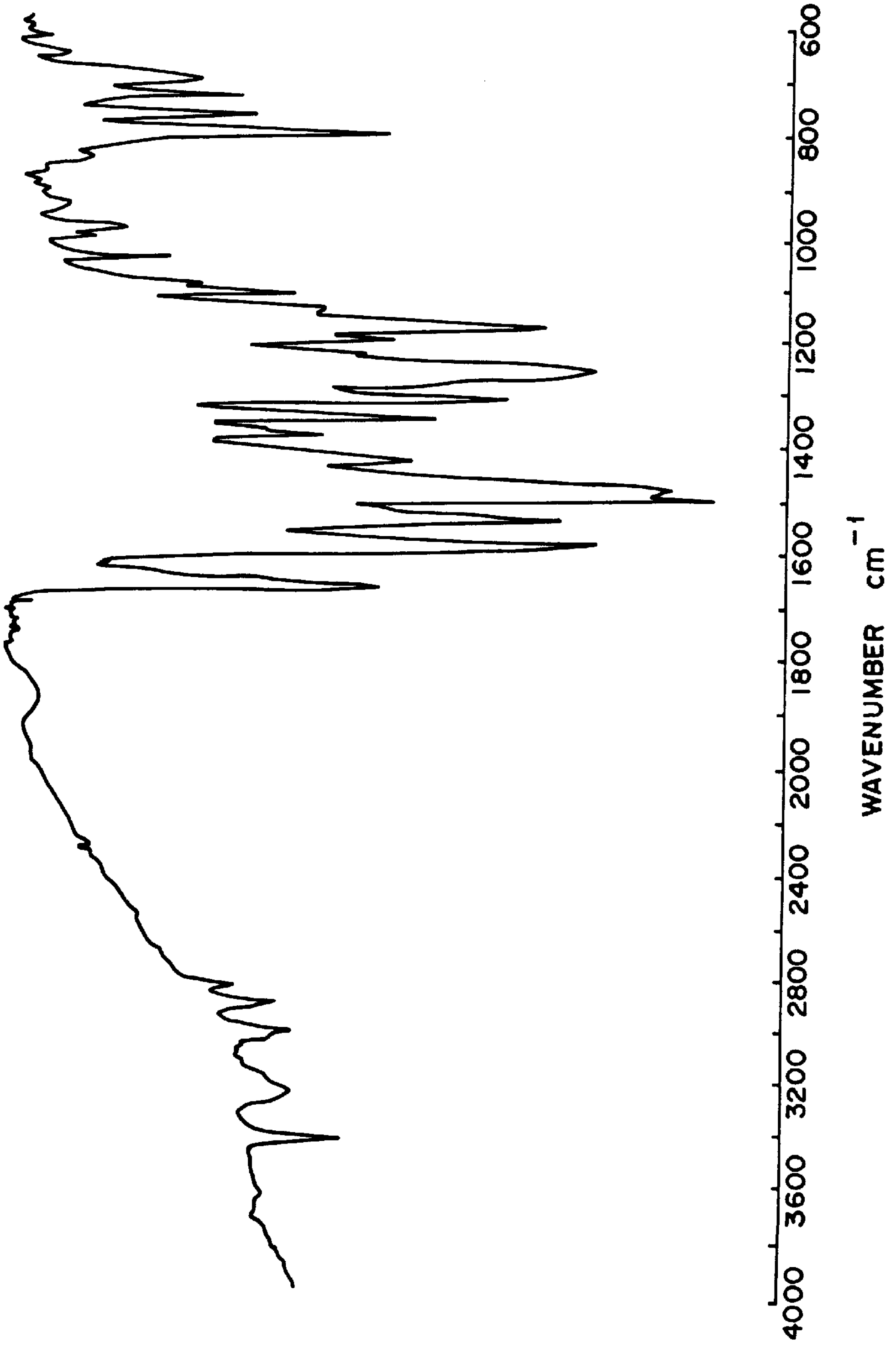
Figure 16:
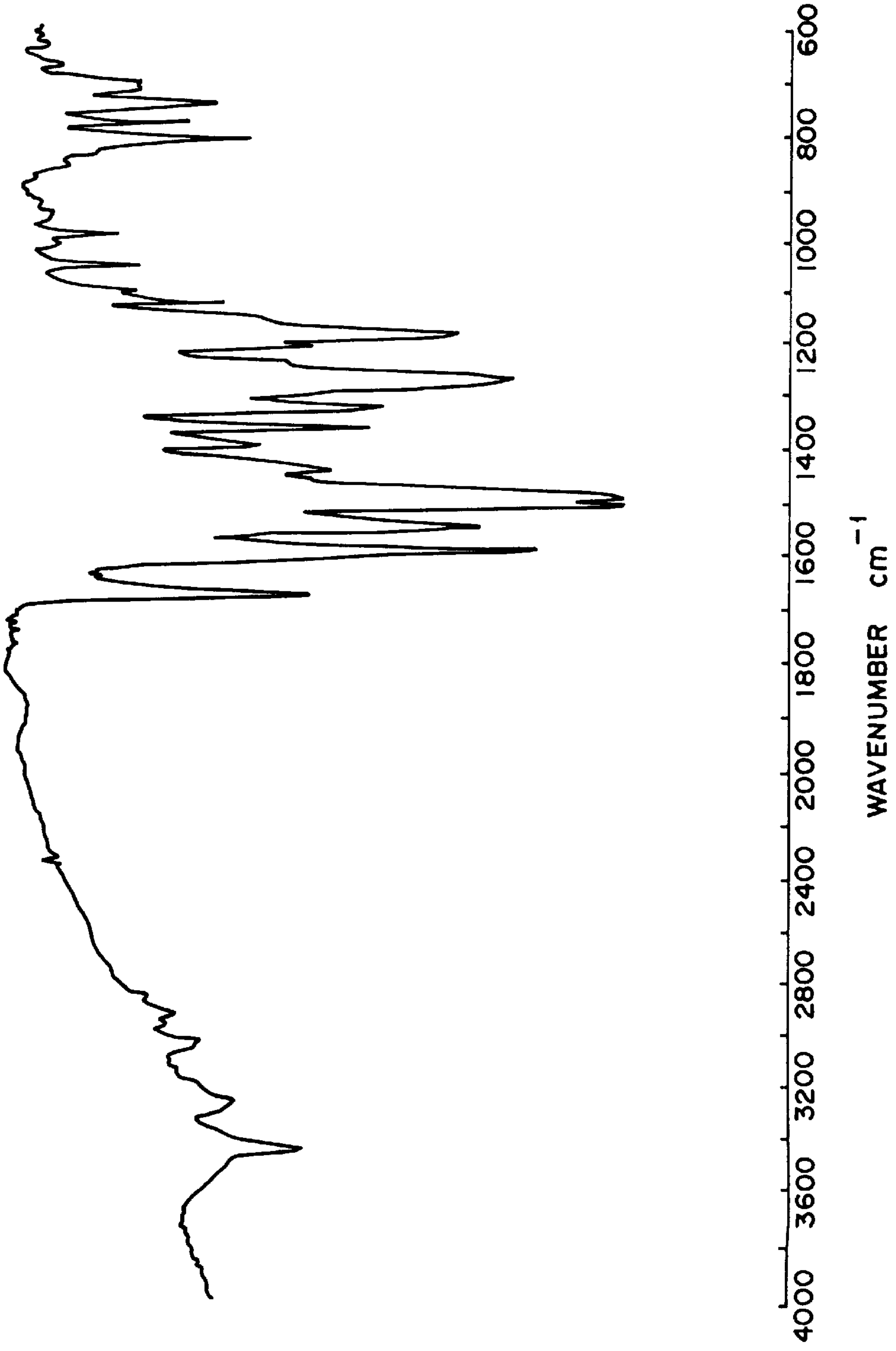
Figure 17:
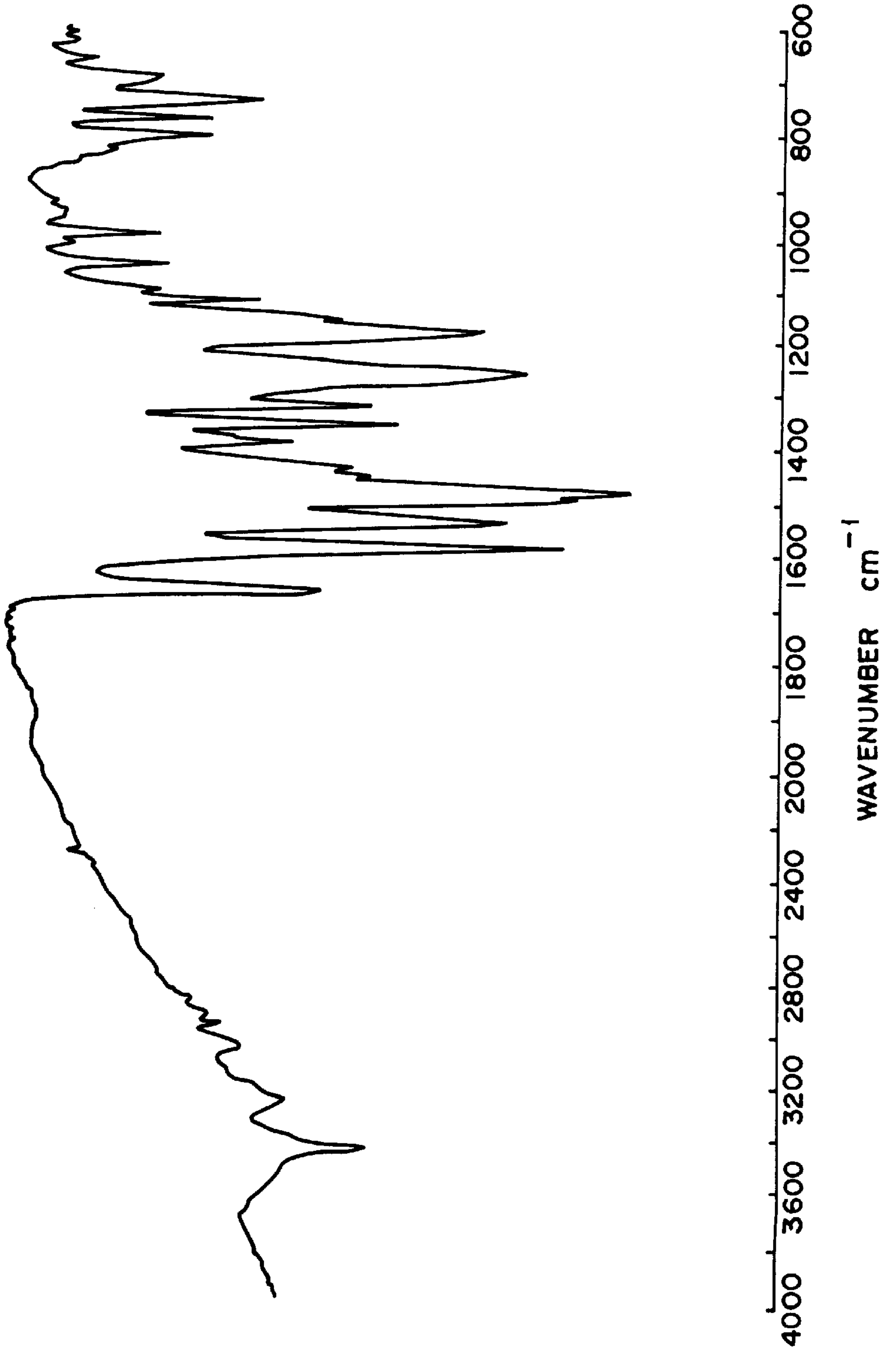

FIGS. 6 to 8 respectively show infrared spectra of the above prepared trisazo compounds Nos. 4 to 6, taken of a KBr tablet.

TABLE 17

| Preparation Example No. | Triazo Compound No. | Yield (%) | Melting Point (° C.) | Elemental Analysis Found (Calculated) % C | % H | % N |
|---|---|---|---|---|---|---|
| 4 | 4 | 21 | >280 | 80.66 (80.86) | 4.93 (5.06) | 9.76 (9.86) |
| 5 | 5 | 42 | >280 | 79.12 (79.74) | 4.83 (4.98) | 10.48 (10.49) |

TABLE 17-continued

| Preparation Example No. | Triazo Compound No. | Yield (%) | Melting Point (° C.) | Elemental Analysis Found (Calculated) % C | % H | % N |
|---|---|---|---|---|---|---|
| 6 | 6 | 40 | >280 | 77.60 (78.27) | 4.70 (4.88) | 11.64 (11.31) |

PREPARATION EXAMPLES 7 TO 15

Preparation of Trisazo Compounds Nos. 7 to 15

Trisazo compounds Nos. 7 to 15 with formulae (311) to (319) were obtained similarly in accordance with the methods as described in Preparation Examples 1 to 3.

[Trisazo compounds No. 7]

(311)

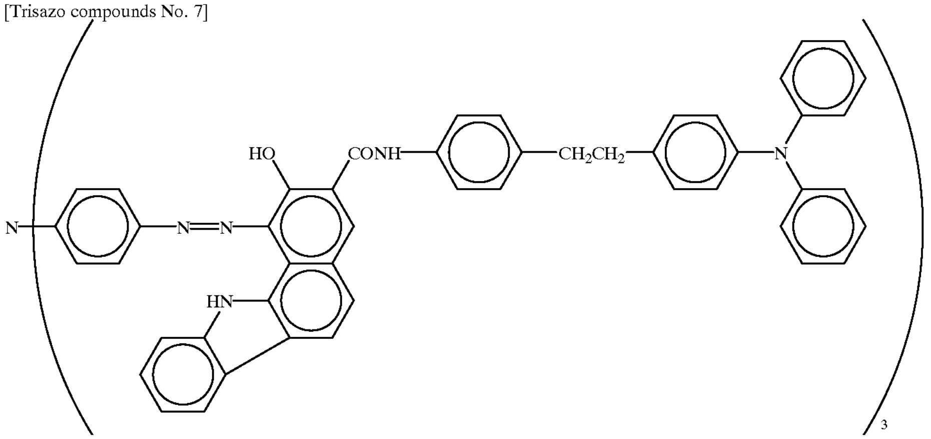

-continued
(312)
[Trisazo compound No. 8]
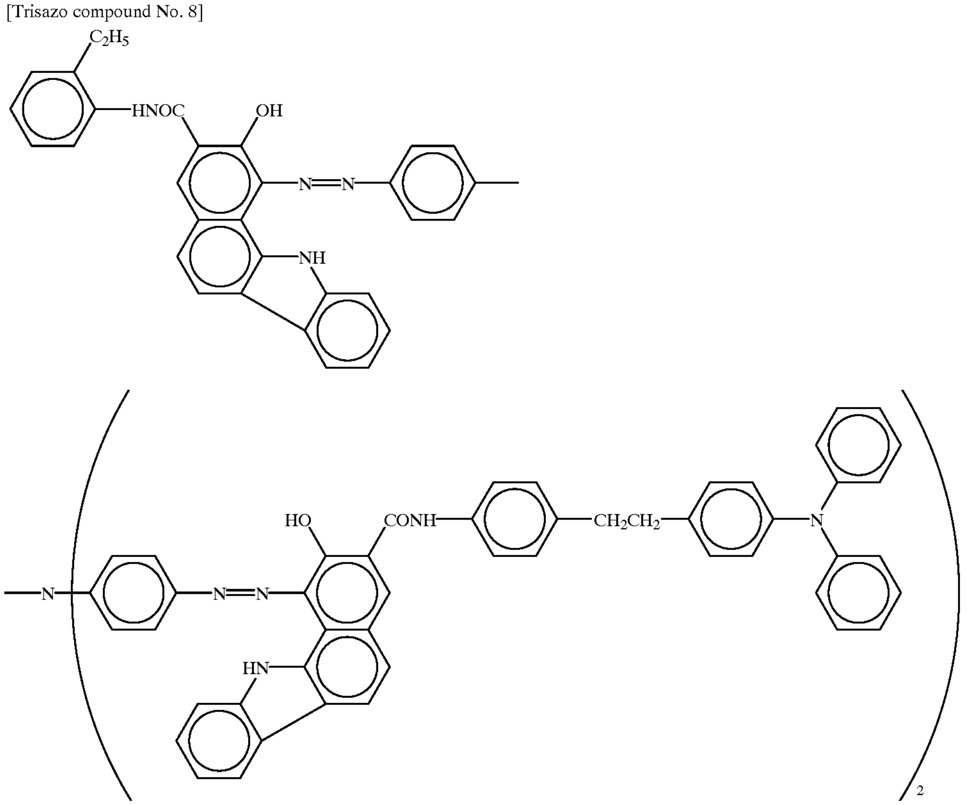
(313)
[Trisazo compound No. 9]
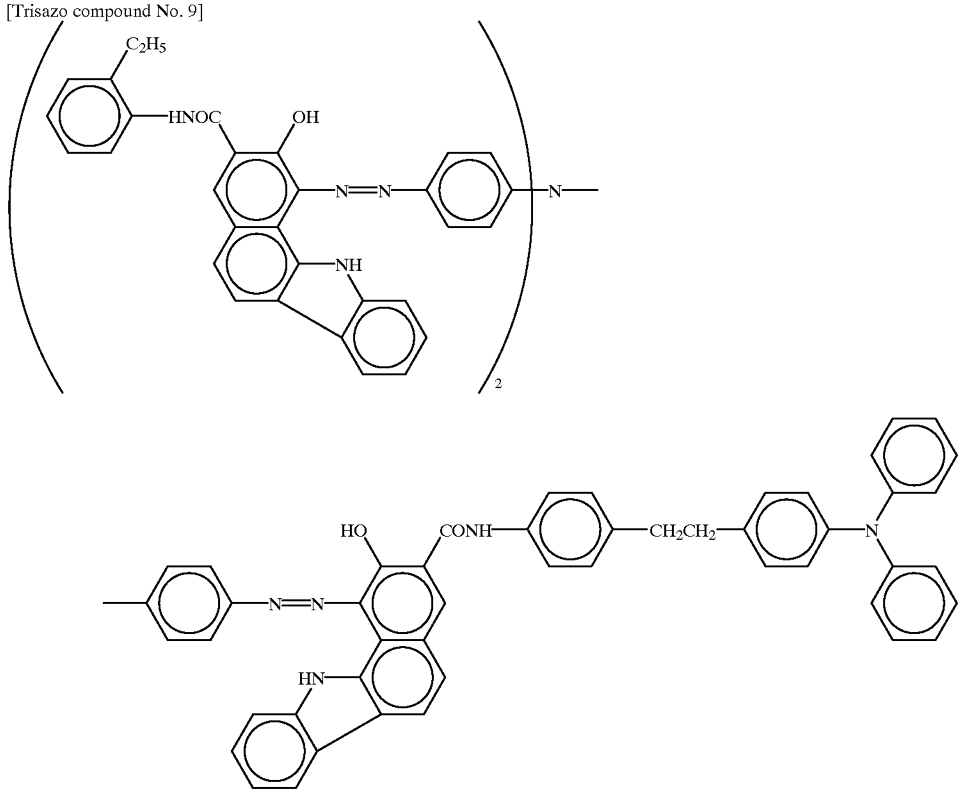

-continued
(314)
[Trisazo compound No. 10]
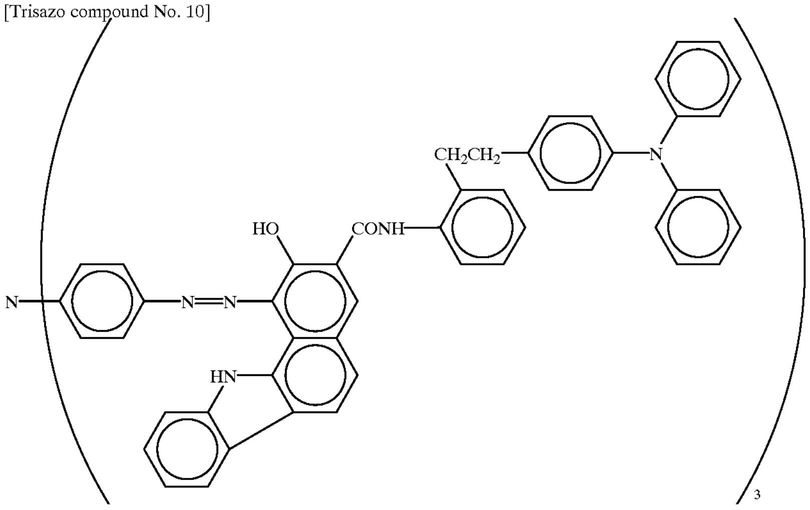
(315)
[Trisazo compound No. 11]
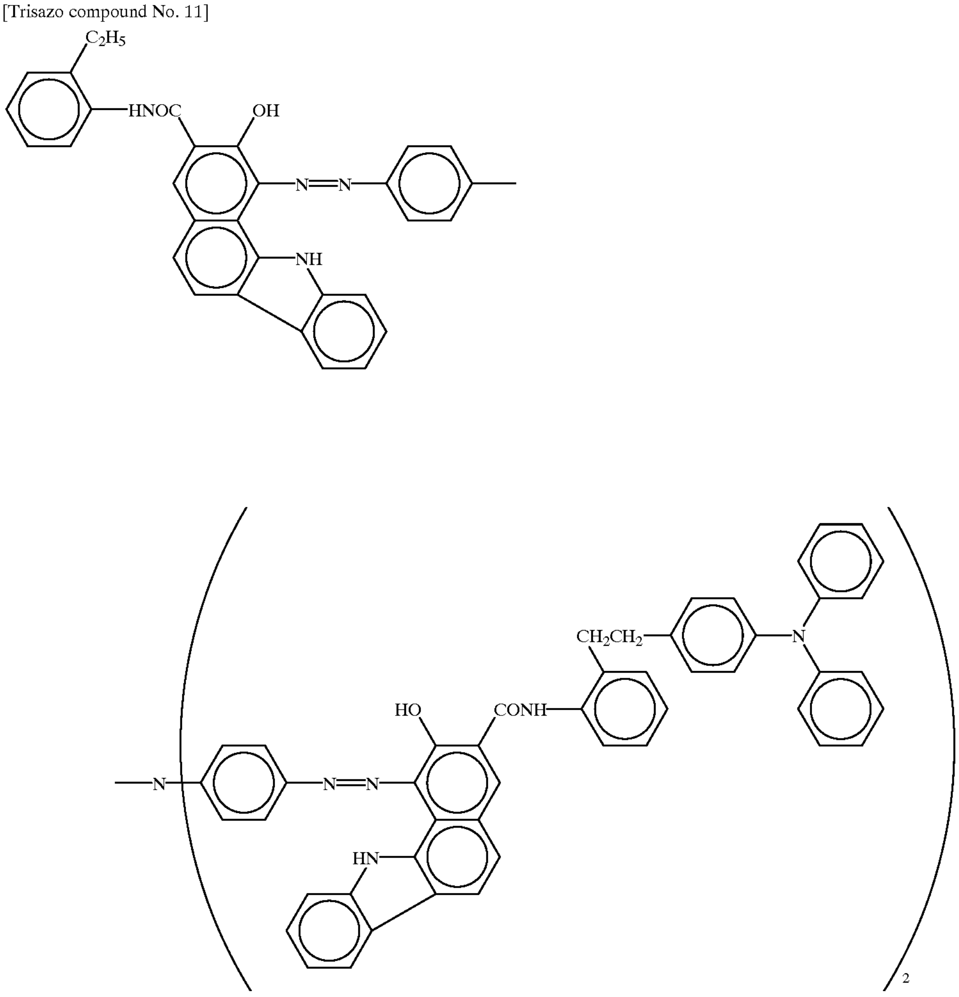

-continued
(316)
[Trisazo compound No. 12]
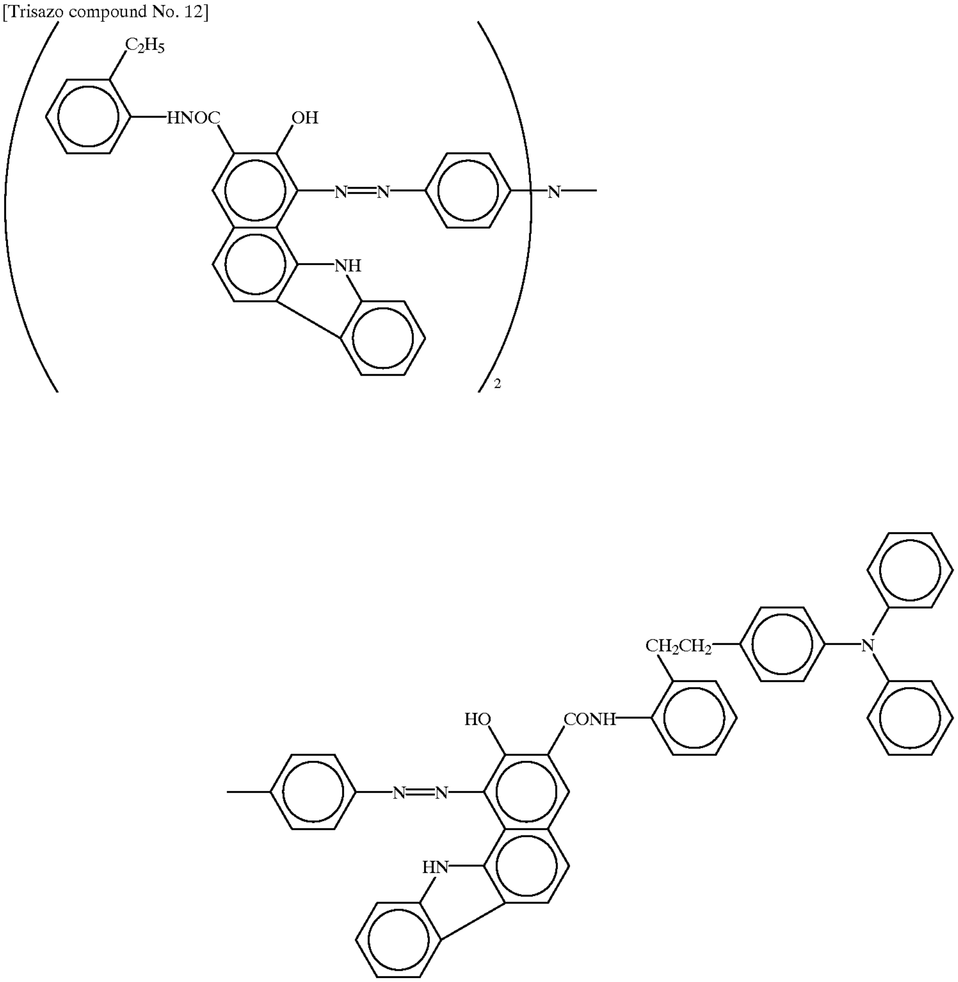
(317)
[Trisazo compound No. 13]
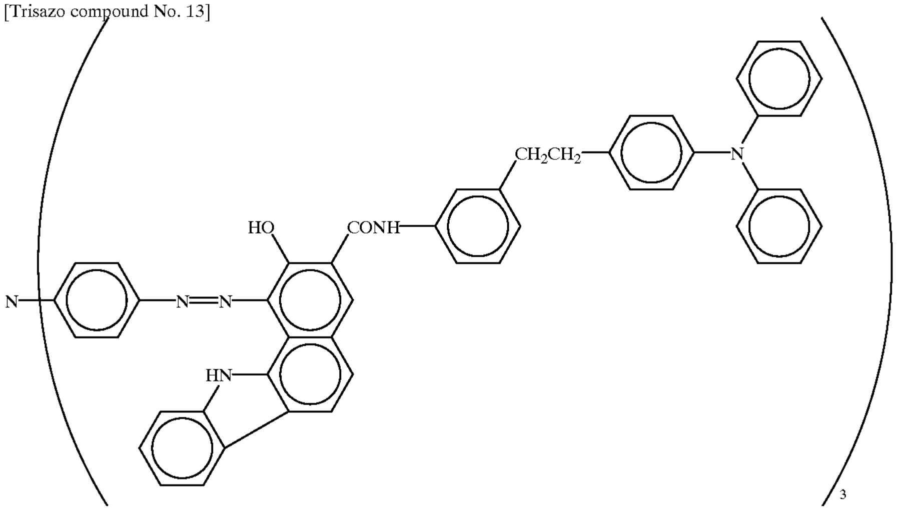

-continued
(318)
[Trisazo compound No. 14]
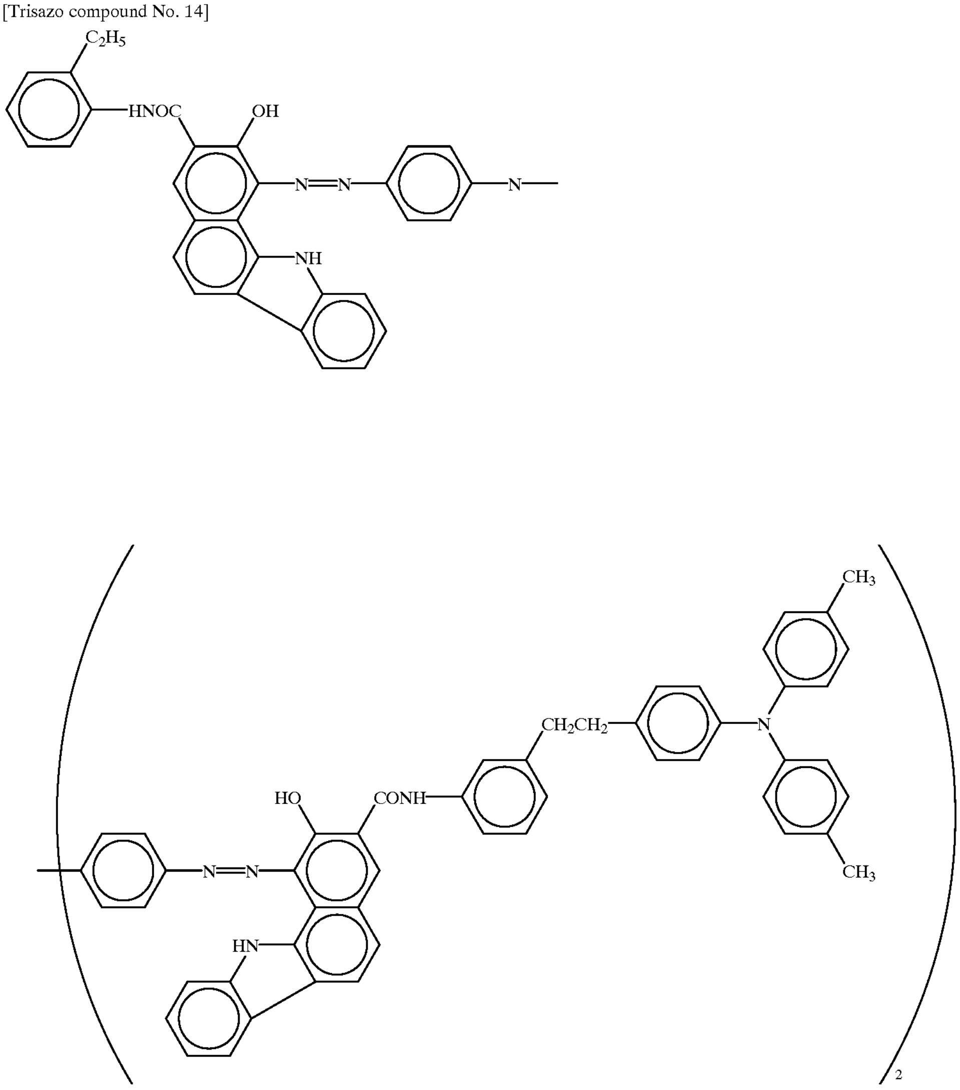
(319)
[Trisazo compound No. 15]
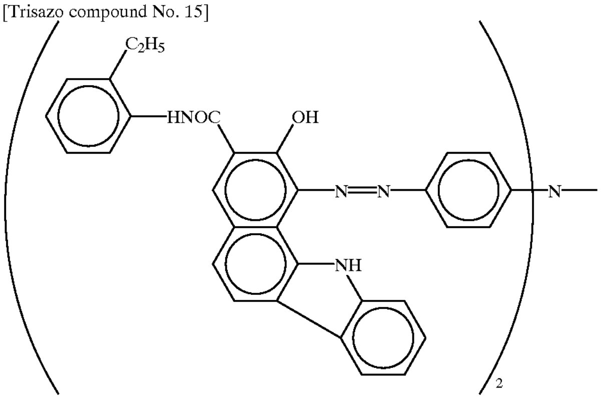

-continued

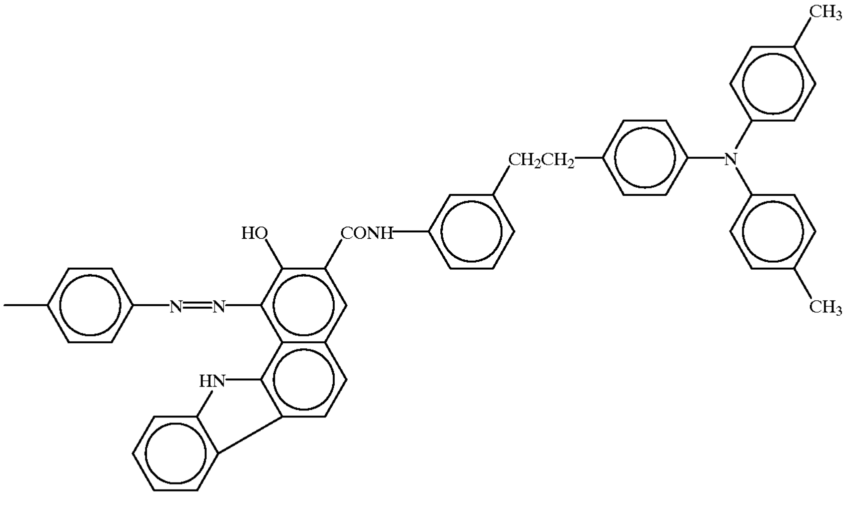

The yields, the melting points, and the results of the elemental analysis of the trisazo compounds Nos. 7 to 15 are shown in Table 18.

FIGS. 9 to 17 respectively show infrared spectra of the above prepared trisazo compounds Nos. 7 to 15, taken by use of a KBr tablet.

TABLE 18

| Preparation Example No. | Triazo Compound No. | Yield (%) | Melting Point (° C.) | Elemental Analysis Found (Calculated) % C | % H | % N |
|---|---|---|---|---|---|---|
| 7 | 7 | 55 | >300 | 80.04 (80.45) | 4.80 (4.96) | 10.14 (10.21) |
| 8 | 8 | 38 | >300 | 78.60 (79.41) | 4.73 (4.91) | 10.84 (10.77) |
| 9 | 9 | 62 | >300 | 77.12 (78.06) | 4.66 (4.84) | 11.48 (11.48) |
| 10 | 10 | 55 | >300 | 80.11 (80.45) | 4.82 (4.96) | 10.16 (10.21) |
| 11 | 11 | 55 | >300 | 78.88 (79.41) | 4.82 (4.91) | 10.80 (10.77) |
| 12 | 12 | 60 | >300 | 77.55 (78.06) | 4.69 (4.84) | 11.44 (11.48) |
| 13 | 13 | 53 | >300 | 80.38 (80.65) | 5.18 (5.31) | 9.73 (9.84) |
| 14 | 14 | 19 | >300 | 78.57 (79.58) | 4.89 (5.17) | 10.68 (10.47) |
| 15 | 15 | 48 | >300 | 76.84 (78.18) | 4.68 (4.99) | 11.59 (11.30) |

Synthesis Example 2-1
Preparation of 2-Hydroxy-3-Phenylcarbamoylnaphthalene Compound of Formula (4-2-a)

2.34 g (12.4 mmol) of 2-hydroxy-3-naphthoic acid and 4.88 g (12.4 mmol) of 4-(3-aminophenetyl)-4',4"-dimethyltriphenylamine were dissolved in 30 ml of 1,4-dioxane. A solution prepared by diluting 0.85 g (6.2 mmol) of phosphorus trichloride with 5 ml of 1,4-dioxane was added dropwise to the above prepared mixture at room temperature over a period of 10 minutes, and the reaction mixture was refluxed with stirring for three hours.

Thereafter, the reaction mixture was cooled to room temperature, poured into iced water, and then neutralized with sodium carbonate. The resulting precipitate was obtained by filtration, successively washed with water and methanol, and dried by the application of heat thereto under reduced pressure, so that 6.70 g of pale brown crude crystals was obtained in a yield of 95.7%. Then, the crude material was chromatographed on a silica gel column using a mixture of toluene and ethyl acetate with a mixing ratio by volume of 5:1 as an eluting solution, and the product thus obtained was recrystallized from a mixed solvent of ethyl acetate and ethanol, so that a desired compound, 2-hydroxy-3-phenylcarbamoylnaphthalene of formula (4-2-a) was obtained as colorless crystals. The yield was 4.20 g (60.0%).

(4-2-a)

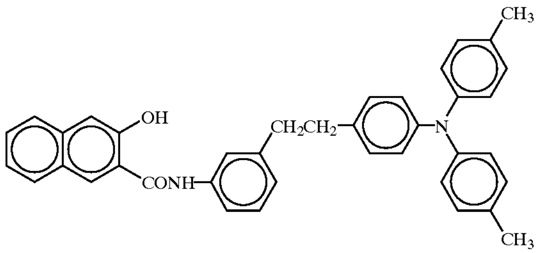

The melting point of the above compound was 181.0 to 182.0° C.

The results of the elemental analysis of the thus obtained compound were as follows:

| | % C | % H | % N |
|---|---|---|---|
| Calculated | 83.24 | 6.09 | 4.98 |
| Found | 83.44 | 6.32 | 5.04 |

Figure 30:
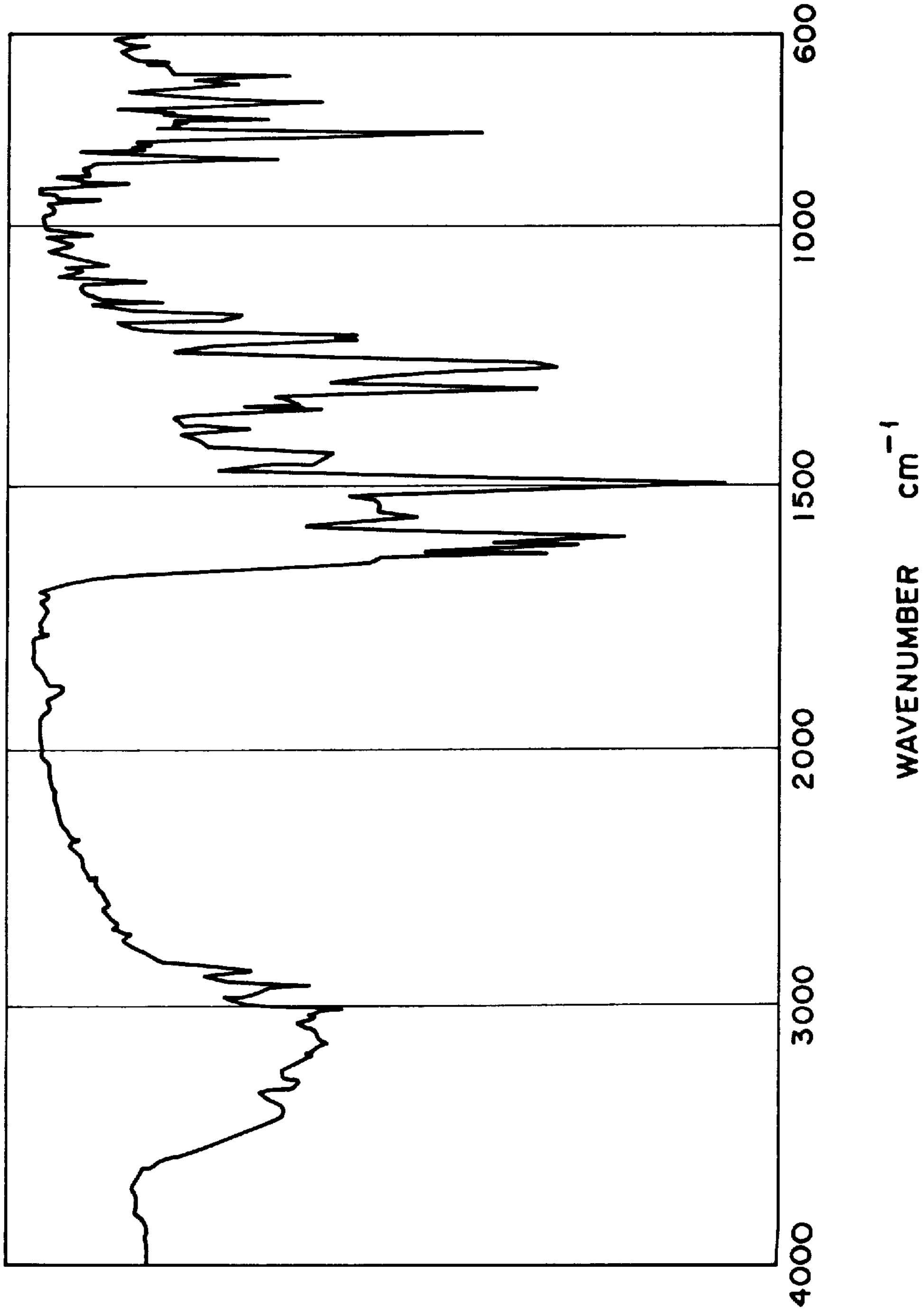
FIGS. 30 to 35 are the IR spectra of 2-hydroxy-3-phenylcarbamoylnaphthalene compounds according to the present invention, taken by use of a KBr tablet.

FIG. 30 shows an infrared spectrum of the above prepared 2-hydroxy-3-phenylcarbamoylnaphthalene compound, taken by use of a KBr tablet.

SYNTHESIS EXAMPLE 2-2

Preparation of 2-Hydroxy-3-Phenylcarbamoylnaphthalene Compound of Formula (4-2-b)

A 2-hydroxy-3-phenylcarbamoylnaphthalene compound of formula (4-2-b) was obtained in a 62% yield in accordance with the method as described in Synthesis Example 2-1.

(4-2-b)

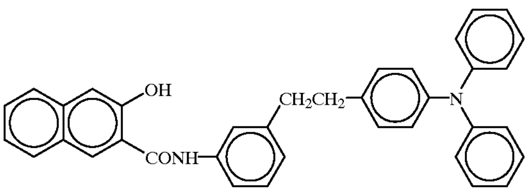

The melting point of the above compound was 204.5 to 205.5° C.

The results of the elemental analysis of the thus obtained 2-hydroxy-3-phenylcarbamoylnaphthalene compound were as follows:

| | % C | % H | % N |
|---|---|---|---|
| Calculated | 83.12 | 5.66 | 5.24 |
| Found | 83.29 | 5.79 | 5.47 |

Figure 31:
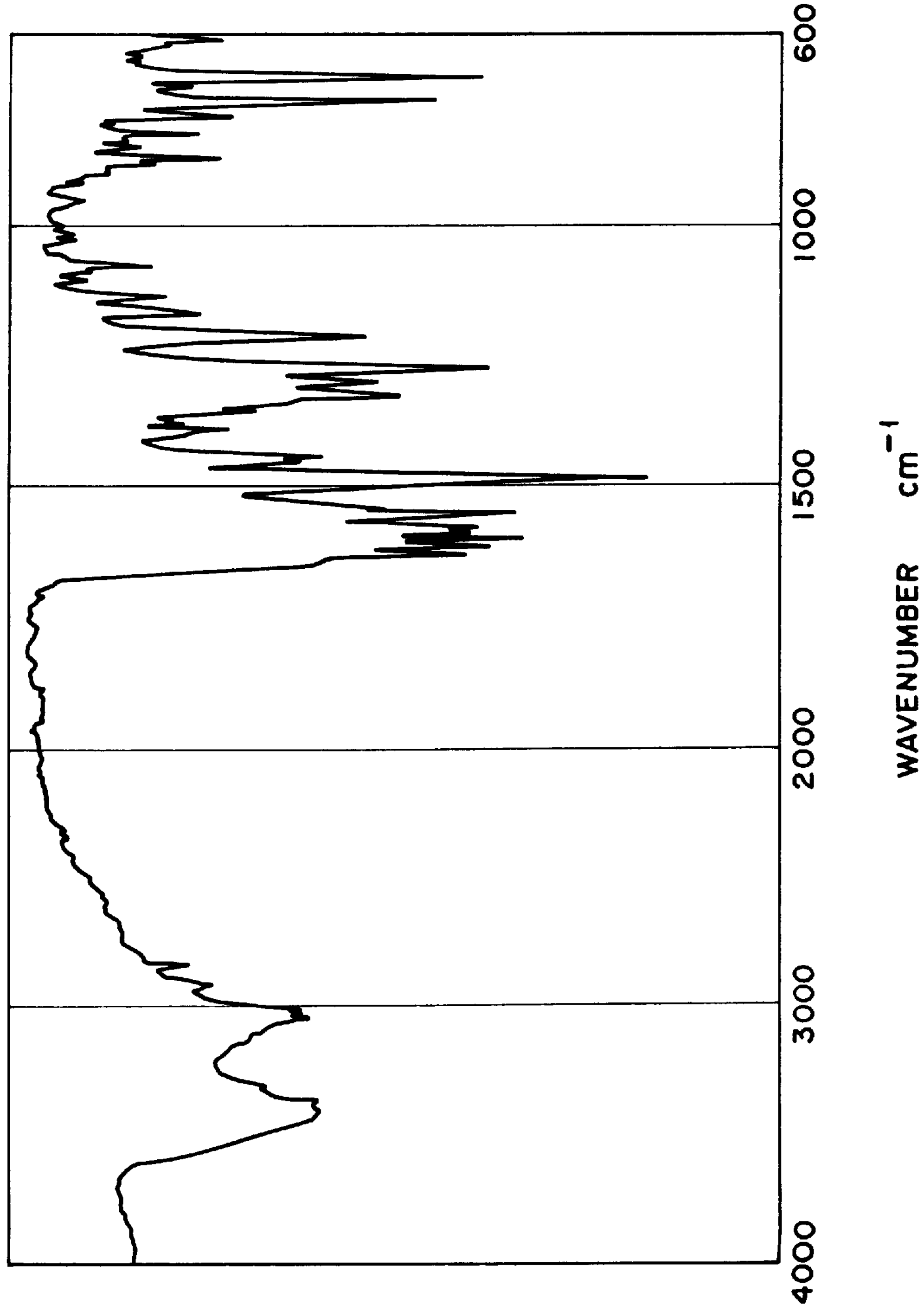

FIG. 31 shows an infrared spectrum of the above prepared compound, taken by use of a KBr tablet.

SYNTHESIS EXAMPLE 2-3

Preparation of 2-Hydroxy-3-Phenylcarbamoylnaphthalene Compound of Formula (4-2-c)

A 2-hydroxy-3-phenylcarbamoylnaphthalene compound of formula (4-2-c) was obtained in a 48% yield in accordance with the method as described in Synthesis Example 2-1.

(4-2-c)

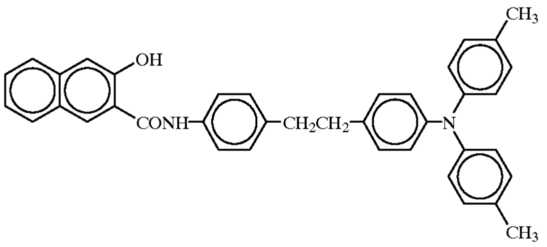

The melting point of the above compound was 213.0 to 216.0° C.

The results of the elemental analysis of the thus obtained compound were as follows:

| | % C | % H | % N |
|---|---|---|---|
| Calculated | 83.24 | 6.09 | 4.98 |
| Found | 83.38 | 6.20 | 5.01 |

Figure 32:
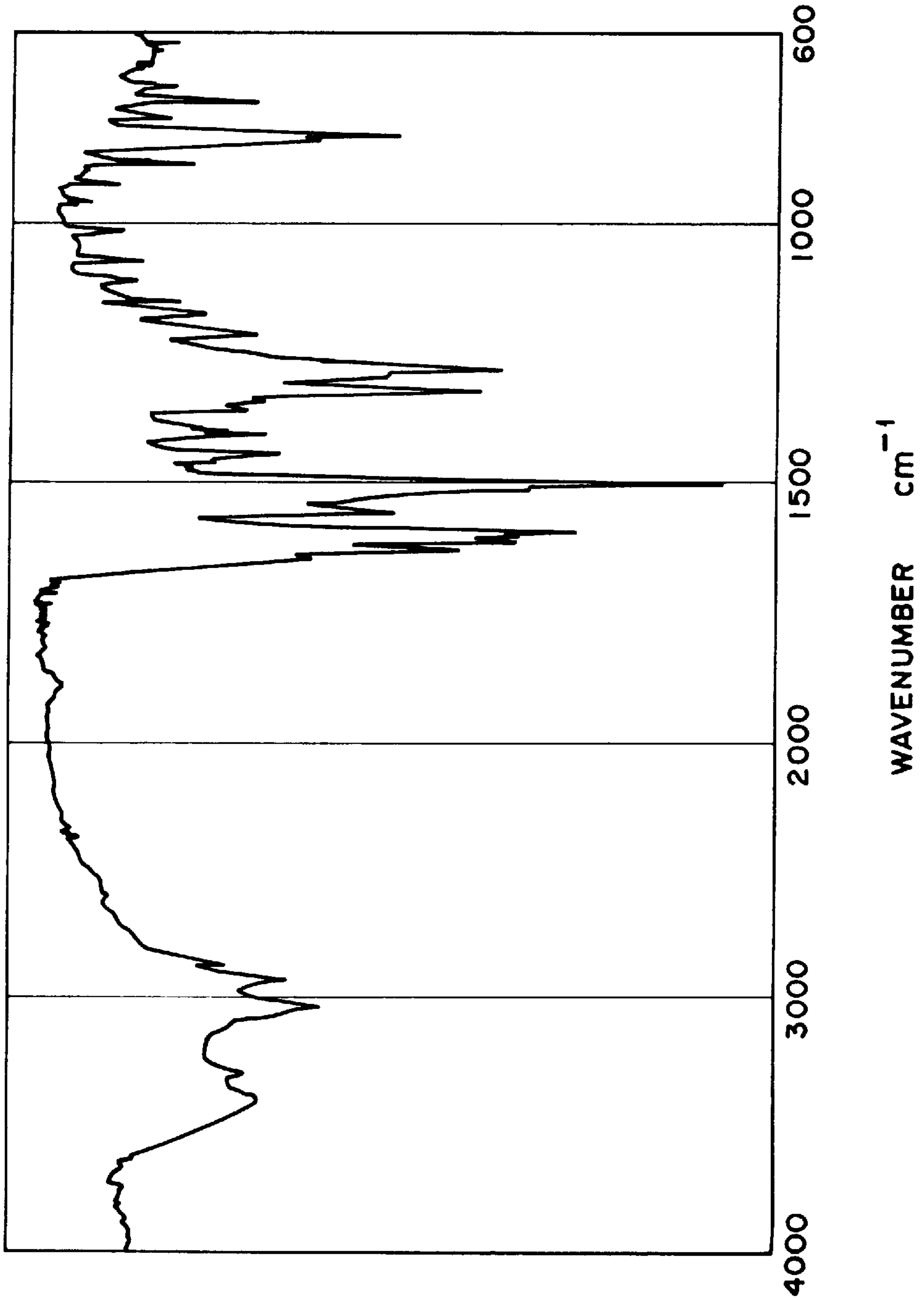

FIG. 32 shows an infrared spectrum of the above prepared 2-hydroxy-3-phenylcarbamoylnaphthalene compound, taken by use of a KBr tablet.

SYNTHESIS EXAMPLE 2-4

Preparation of 2-Hydroxy-3-Phenylcarbamoylnaphthalene Compound of Formula (4-2-d)

A 2-hydroxy-3-phenylcarbamoylnaphthalene compound of formula (4-2-d) was obtained in a 26% yield in accordance with the method as described in Synthesis Example 2-1.

(4-2-d)

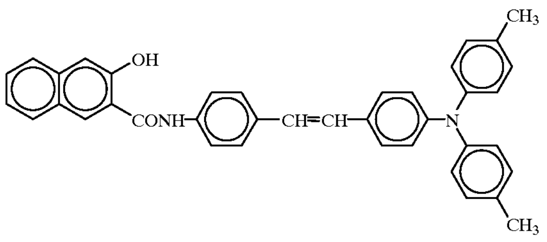

The melting point of the above compound was 275.0 to 278.0° C.

The results of the elemental analysis of the thus obtained compound were as follows:

| | % C | % H | % N |
|---|---|---|---|
| Calculated | 83.55 | 5.75 | 5.00 |
| Found | 83.75 | 5.70 | 5.26 |

Figure 33:
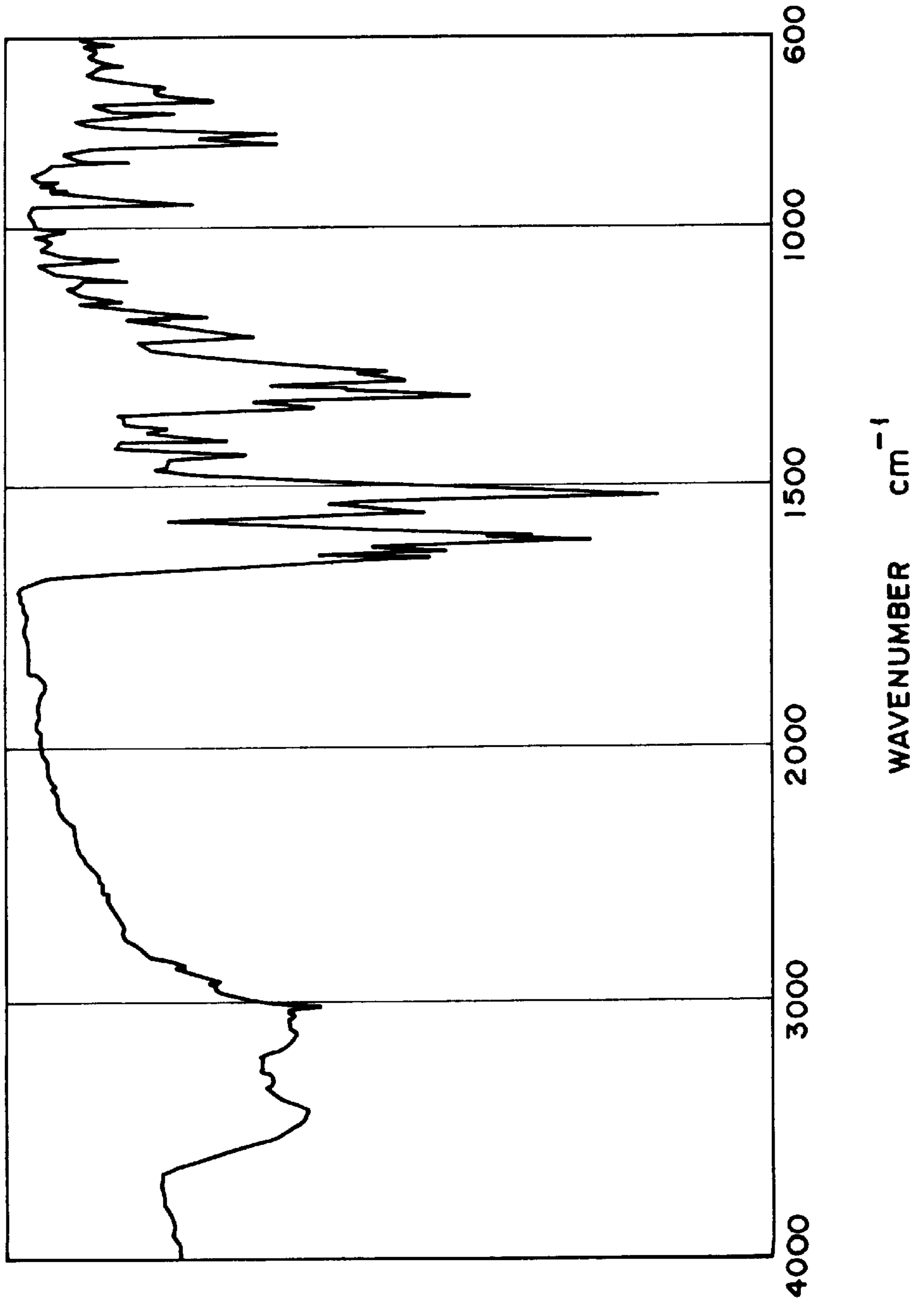

FIG. 33 shows an infrared spectrum of the above prepared 2-hydroxy-3-phenylcarbamoylnaphthalene compound, taken by use of a KBr tablet.

SYNTHESIS EXAMPLE 2-5

Preparation of 2-Hydroxy-3-Phenylcarbamoylnaphthalene Compound of Formula (4-2-e)

A 2-hydroxy-3-phenylcarbamoylnaphthalene compound of formula (4-2-e) was obtained in a 44% yield in accordance with the method as described in Synthesis Example 2-1.

(4-2-e)

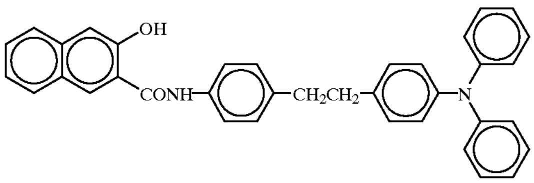

The melting point of the above compound was 212.0 to 213.0° C.

The results of the elemental analysis of the thus obtained compound were as follows:

| | % C | % H | % N |
|---|---|---|---|
| Calculated | 83.12 | 5.66 | 5.24 |
| Found | 83.43 | 5.63 | 5.24 |

Figure 34:
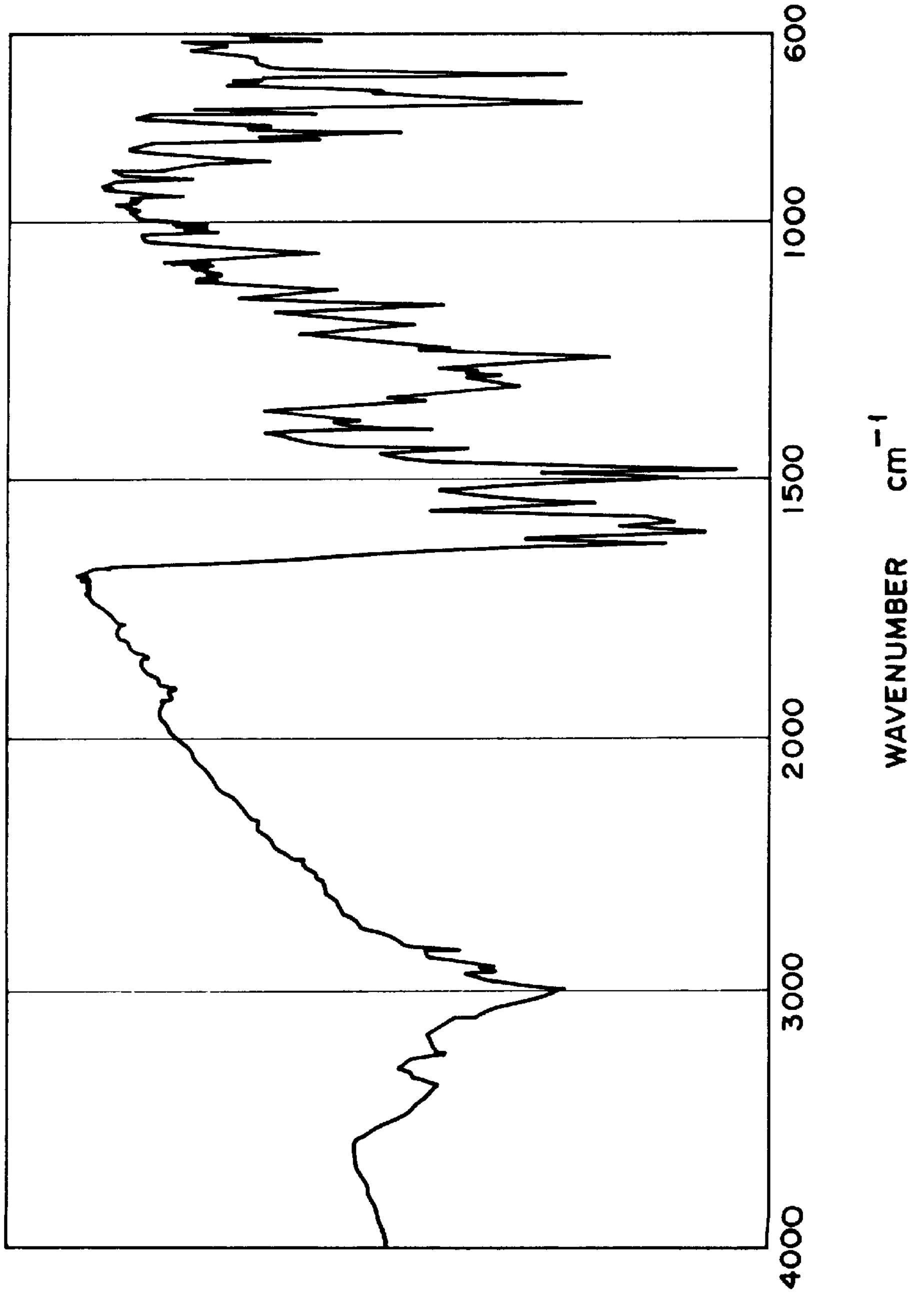

FIG. 34 shows an infrared spectrum of the above prepared 2-hydroxy-3-phenylcarbamoylnaphthalene compound, taken by use of a KBr tablet.

SYNTHESIS EXAMPLE 2-6

Preparation of 2-Hydroxy-3-Phenylcarbamoylnaphthalene Compound of Formula (4-2-f)

A 2-hydroxy-3-phenylcarbamoylnaphthalene compound of formula (4-2-f) was obtained in a 44% yield in accordance with the method as described in Synthesis Example 2-1.

(4-2-f)

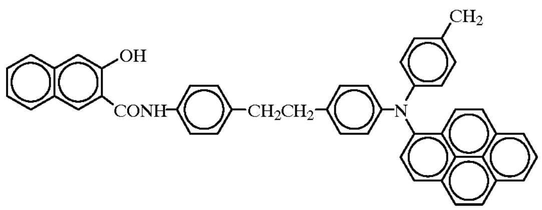

The melting point of the above compound was 252.0 to 257.0° C.

The results of the elemental analysis of the thus obtained compound were as follows:

| | % C | % H | % N |
|---|---|---|---|
| Calculated | 85.69 | 5.39 | 4.16 |
| Found | 85.26 | 5.43 | 4.29 |

Figure 35:
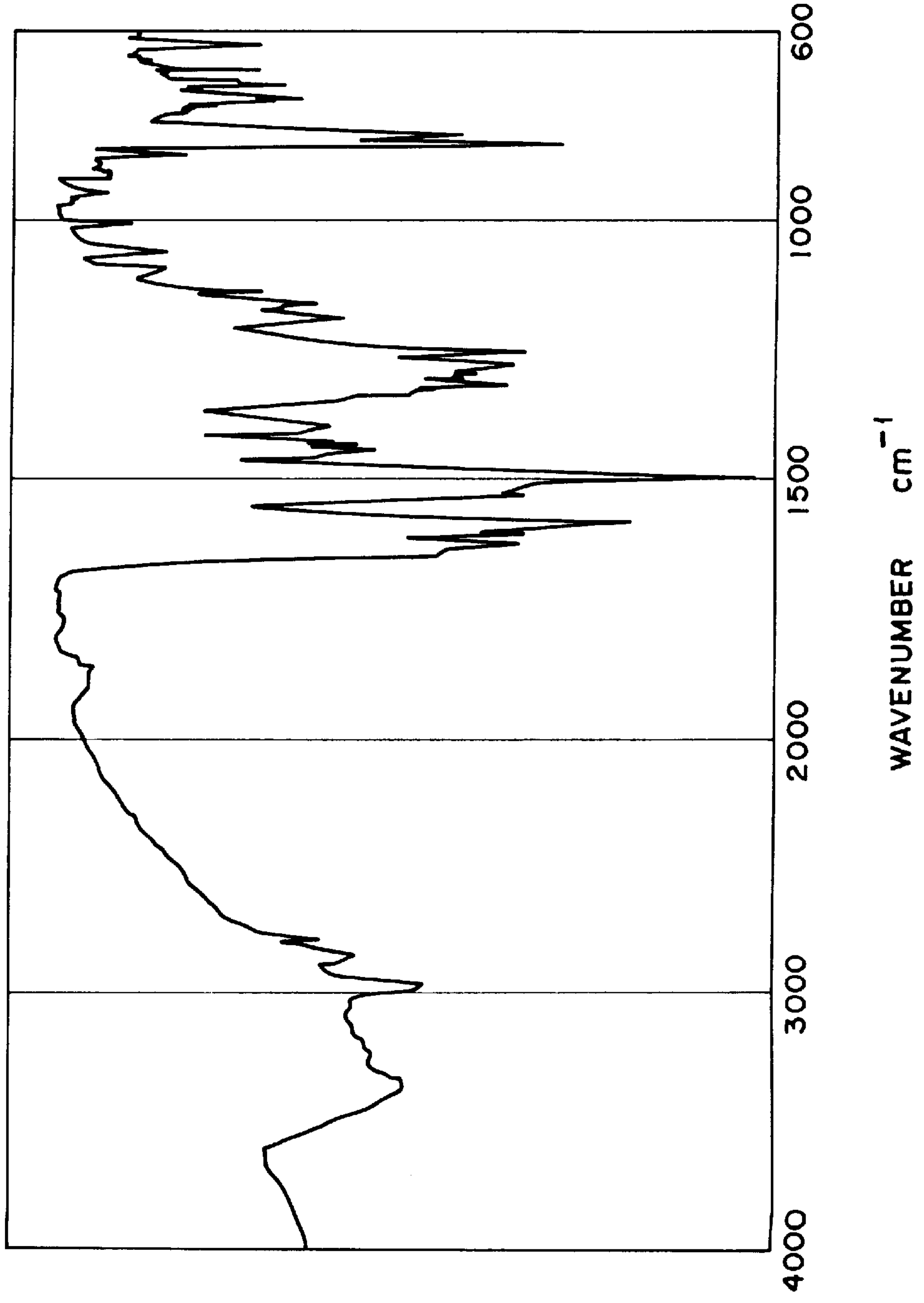

FIG. 35 shows an infrared spectrum of the above prepared 2-hydroxy-3-phenylcarbamoylnaphthalene compound, taken by use of a KBr tablet.

PREPARATION EXAMPLE 16

Preparation of Bisazo Compound No. 1

3.38 g (6 mmol) of 2-hydroxy-3-[3-(4-di-p-tolyl-aminophenetyl)phenyl]carbamoylnaphthalene was dissolved in 240 ml of dimethylformamide (DMF). 1.22 g (3 mmol) of 9-fluorenone-2,7-bis(diazonium tetrafluoroborate) was added to the above prepared mixture at room temperature. Then, a solution prepared by dissolving 1.63 g (12 mmol) of trihydrate of sodium acetate in 9 ml of water was added dropwise to the above reaction mixture over a period of 20 minutes, and the reaction mixture was stirred at room temperature for 2 hours. The resulting precipitate was obtained by filtration, successively washed with 250 ml of DMF of 80° C. three times, and then with 250 ml of water twice, and dried at 120° C. under reduced pressure, so that 2.78 g of a bisazo compound No. 1 of formula (205) according to the present invention was obtained in a yield of 68.3%.

(205)

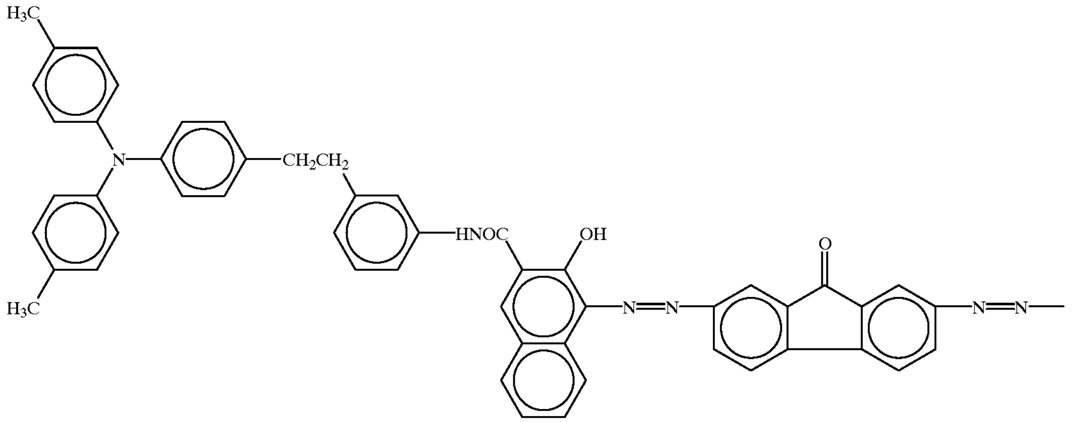

-continued

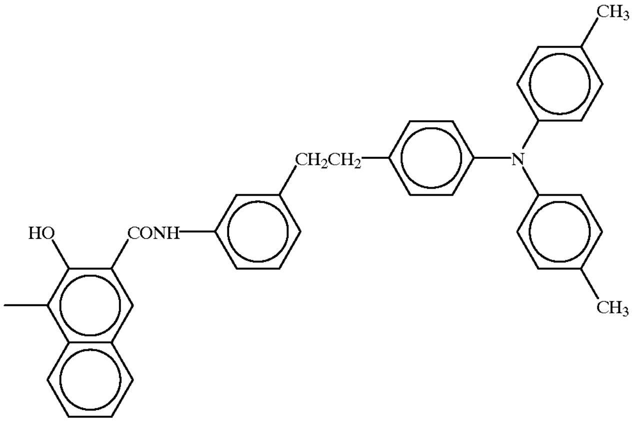

The melting point of the above bisazo compound was 280° C. or more.

The results of the elemental analysis of the thus obtained bisazo compound were as follows:

| | % C | % H | % N |
|---|---|---|---|
| Calculated | 80.51 | 5.35 | 8.25 |
| Found | 80.62 | 5.38 | 8.26 |

Figure 18:
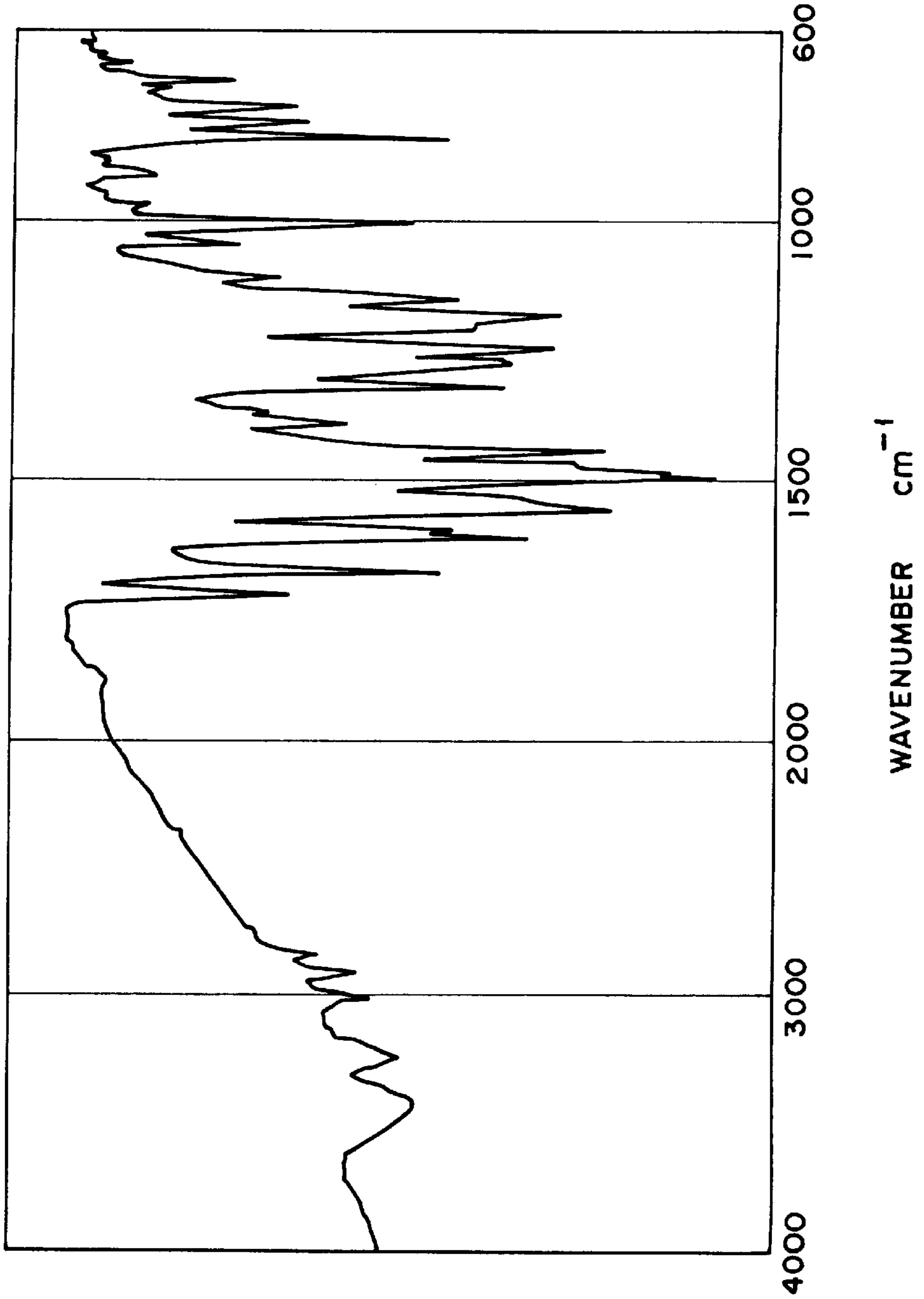
FIGS. 18 to 29 are the IR spectra of bisazo compounds according to the present invention, taken by use of a KBr tablet.

FIG. 18 shows an infrared spectrum of the above prepared bisazo compound, taken by use of a KBr tablet.

PREPARATION EXAMPLE 17

Preparation of Bisazo Compound No. 2

0.89 g (3 mmol) of 2-hydroxy-3-(2-chlorophenyl)-carbamoylnaphthalene was dissolved in 120 ml of dimethylformamide (DMF). 1.22 g (3 mmol) of 9-fluorenone-2,7-bis(diazonium tetrafluoroborate) was added to the above mixture at room temperature. After the above prepared mixture was stirred at room temperature for 10 minutes, 1.69 g (3 mmol) of 2-hydroxy-3-[3-(4-di-p-tolylaminophenetyl) phenyl]carbamoylnaphthalene and 120 ml of DMF were added to the above reaction mixture. Then, a solution prepared by dissolving 1.63 g (12 mmol) of trihydrate of sodium acetate in 9 ml of water was added dropwise to the above reaction mixture over a period of 20 minutes, and the reaction mixture was stirred at room temperature for 2 hours. The resulting precipitate was obtained by filtration, successively washed with 240 ml of DMF of 80° C. three times, and then with 240 ml of water twice, and dried at 120° C. under reduced pressure, so that 2.03 g of a bisazo compound No. 2 of formula (206) according to the present invention was obtained in a yield of 61.9%.

(206)

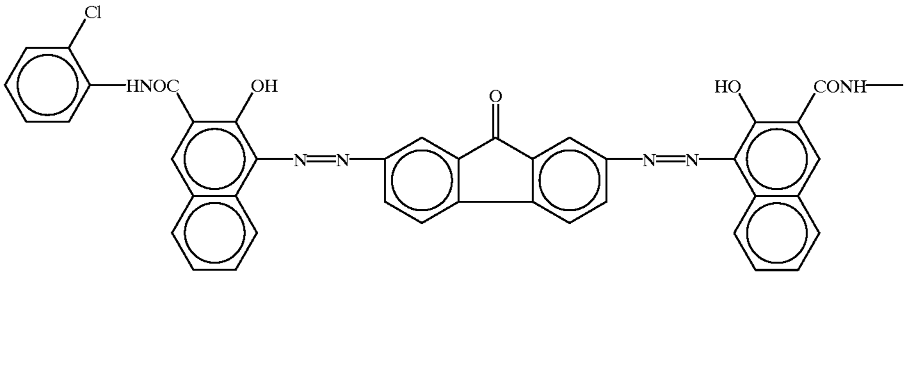

-continued

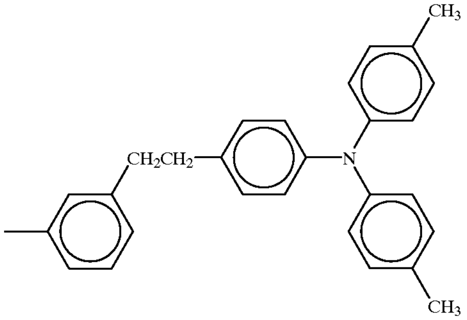

The melting point of the above bisazo compound was 280° C. or more.

The results of the elemental analysis of the thus obtained bisazo compound were as follows:

| | % C | % H | % N |
|---|---|---|---|
| Calculated | 75.85 | 4.61 | 8.97 |
| Found | 75.15 | 4.34 | 9.13 |

Figure 19:
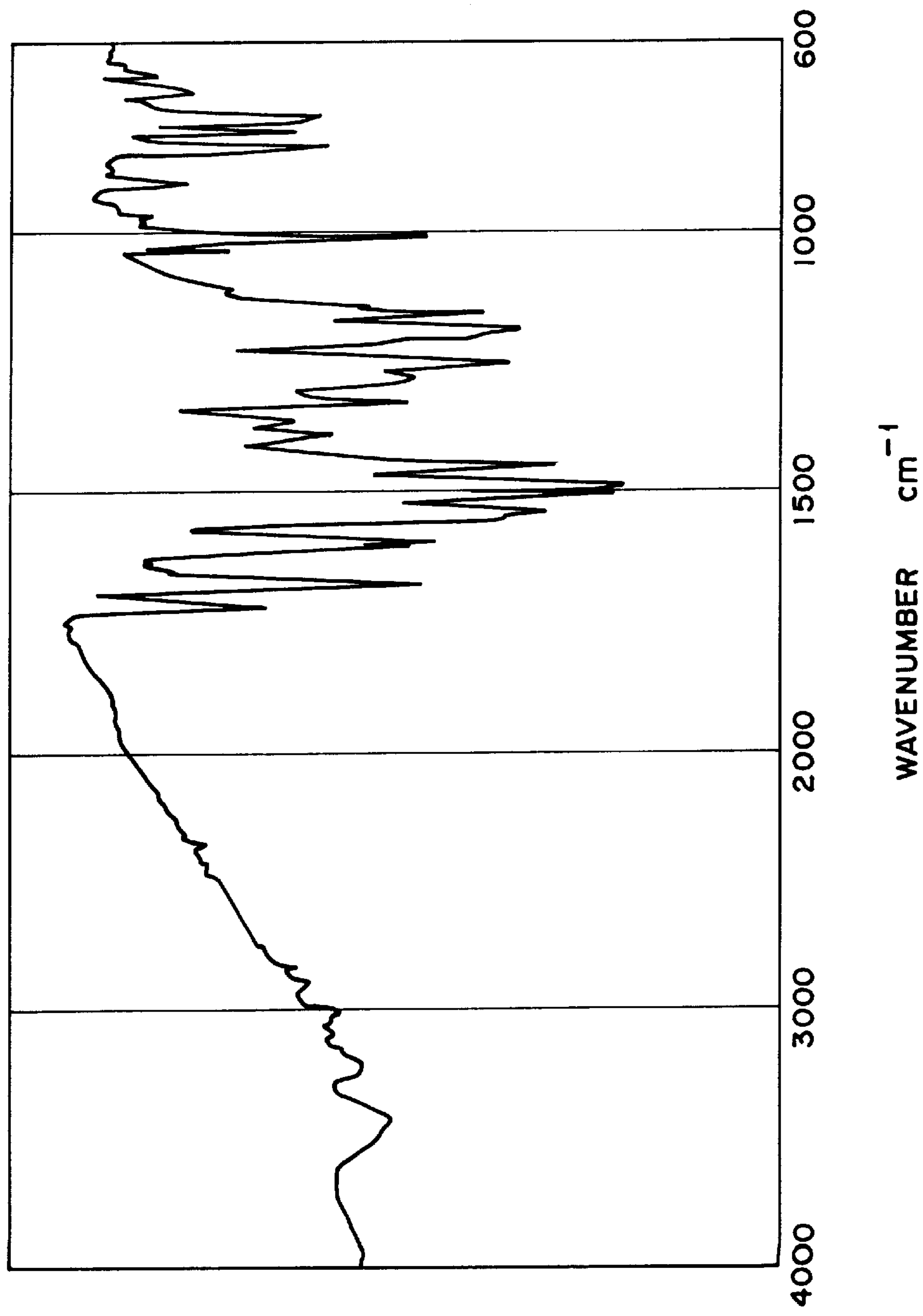

FIG. 19 shows an infrared spectrum of the above prepared bisazo compound, taken by use of a KBr tablet.

PREPARATION EXAMPLES 18 AND 19

Preparation of Bisazo Compounds Nos. 3 and 4

Bisazo compounds Nos. 3 and 4 of formulae (207) and (208) were obtained similarly in accordance with the method as described in Preparation Example 16 or 17.

(207)

[Bisazo compound No. 3]

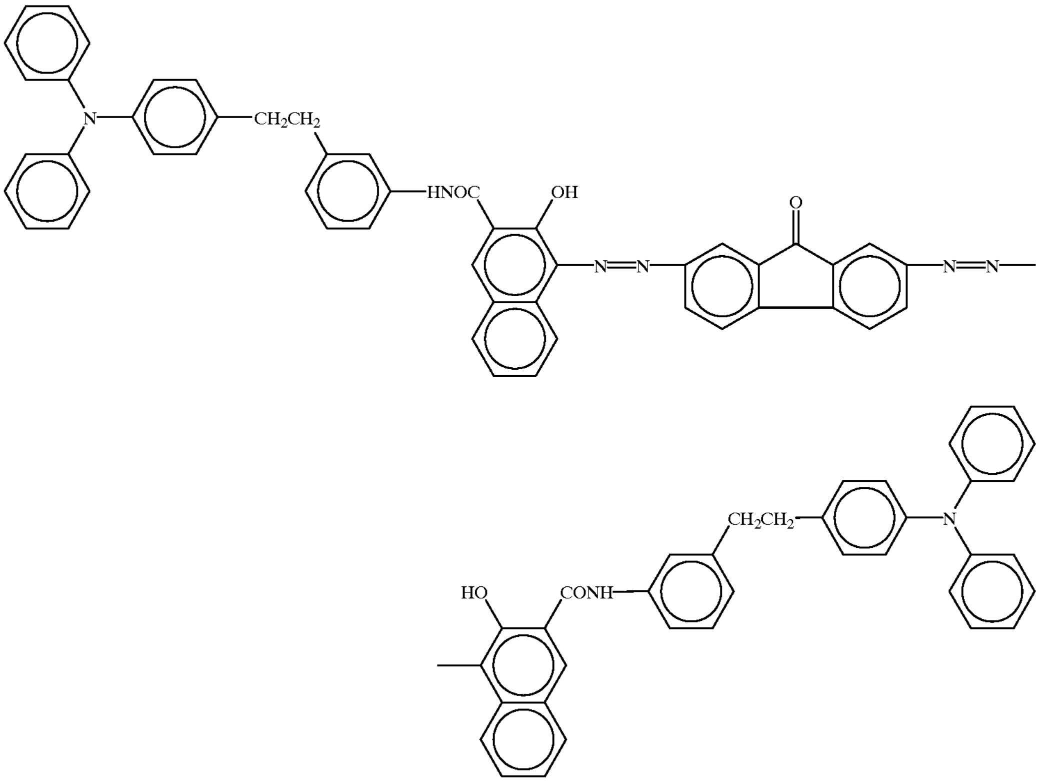

-continued (208)

[Bisazo compound No. 4]

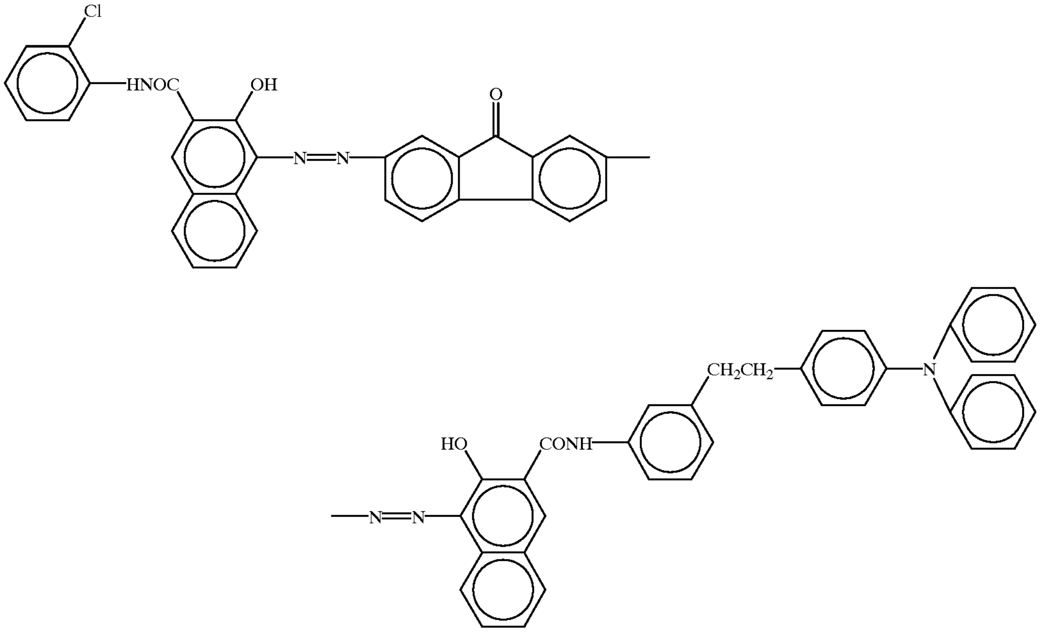

The yields, the melting points, and the results of the elemental analysis of the bisazo compounds Nos. 3 and 4 are shown in Table 19.

TABLE 19

| Preparation Example No. | Bisazo Compound No. | Yield (%) | Melting Point (° C.) | Elemental Analysis Found (Calculated) % C | % H | % N |
|---|---|---|---|---|---|---|
| 18 | 3 | 72 | >280 | 80.72 (80.29) | 4.41 (4.96) | 8.30 (8.61) |
| 19 | 4 | 60 | >280 | 74.84 (75.59) | 3.61 (4.36) | 9.07 (9.21) |

Figure 20:
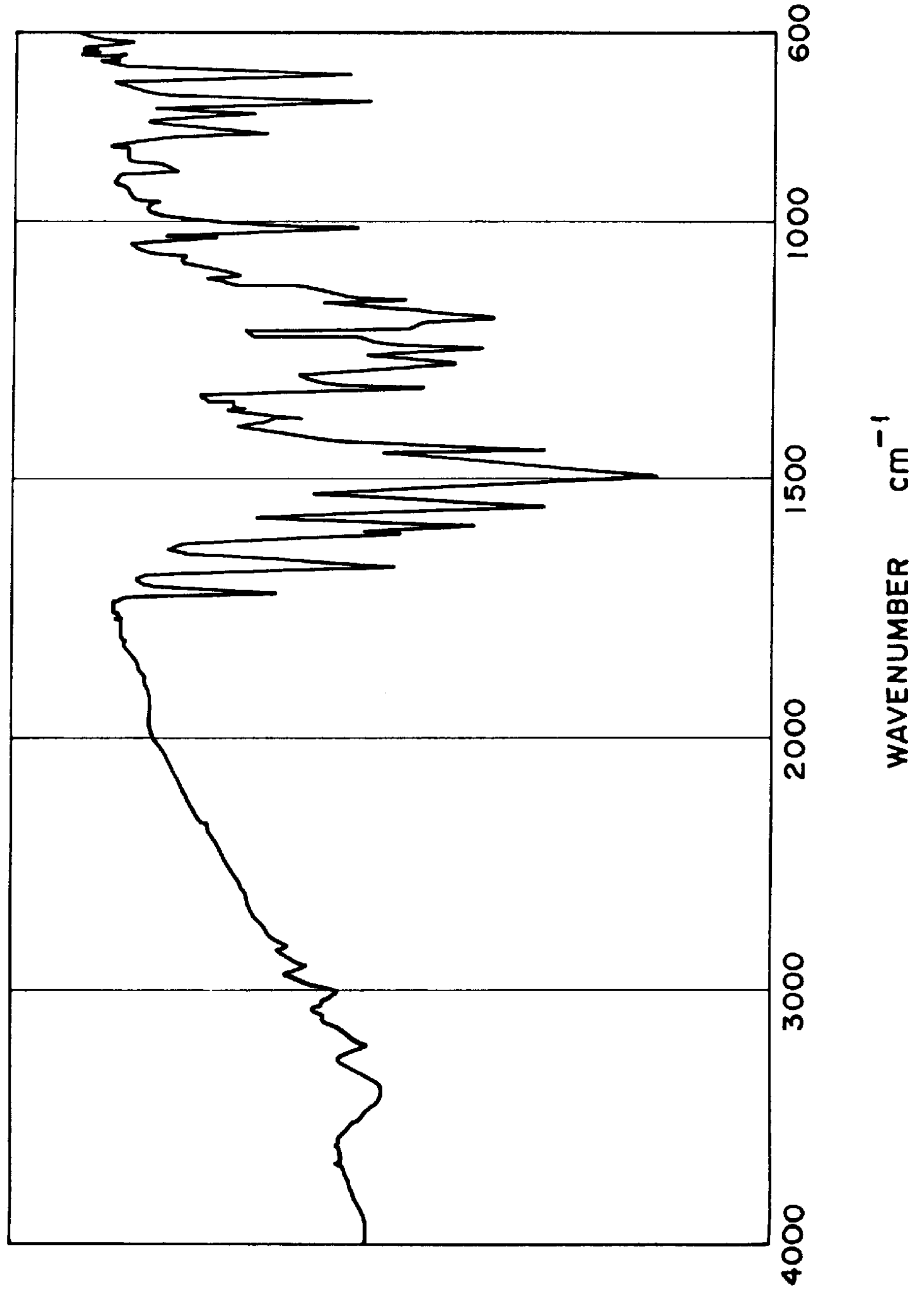
Figure 21:
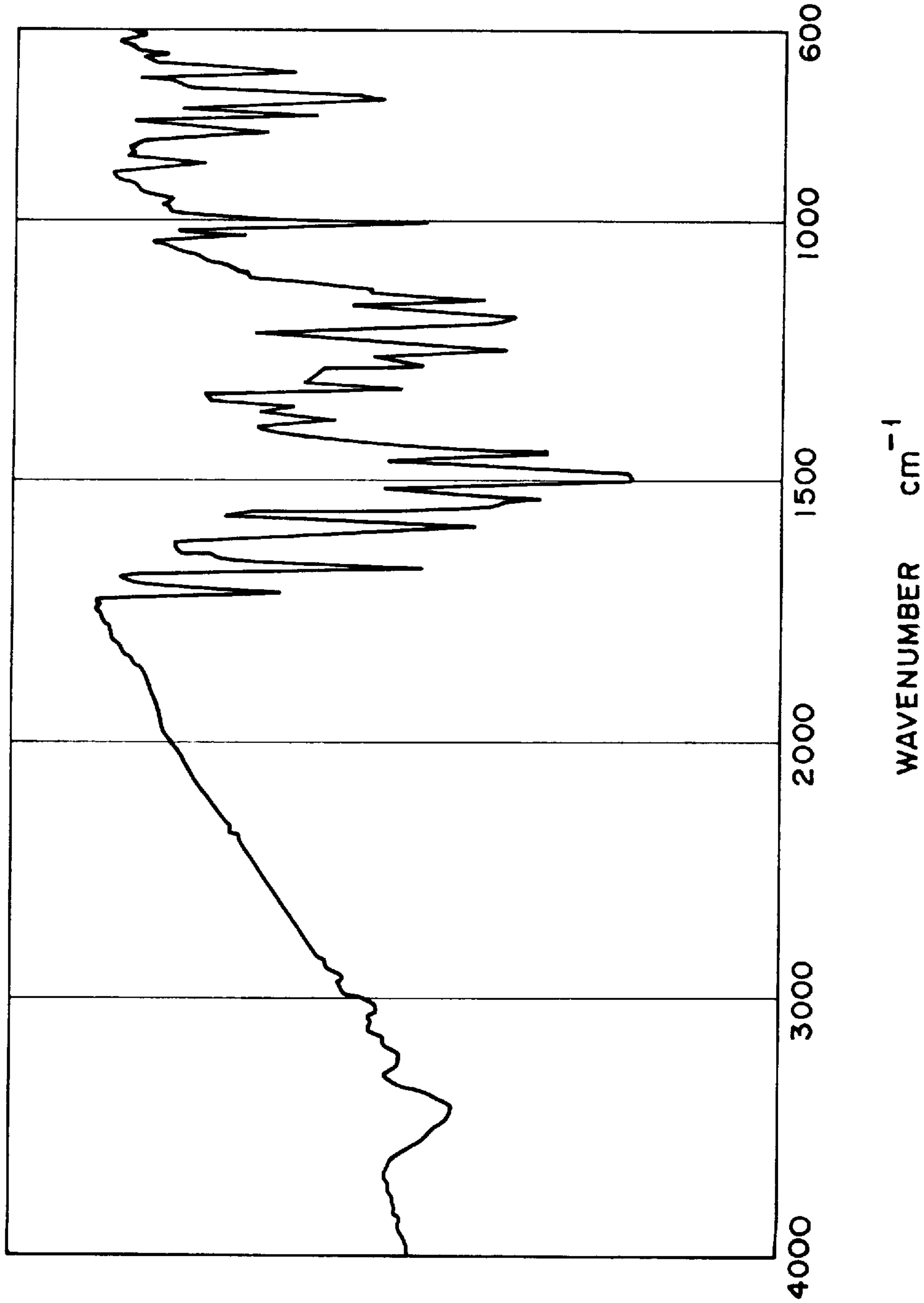

FIGS. 20 and 21 respectively show infrared spectra of the above prepared bisazo compounds No. 3 and No. 4, taken by use of a KBr tablet.

PREPARATION EXAMPLES 20 AND 21

Preparation of Bisazo Compounds Nos. 5 and 6

Bisazo compounds Nos. 5 and 6 of formulae (209) and (210) were obtained similarly in accordance with the method as described in Preparation Example 16 or 17.

(209)

[Bisazo compound No. 5]

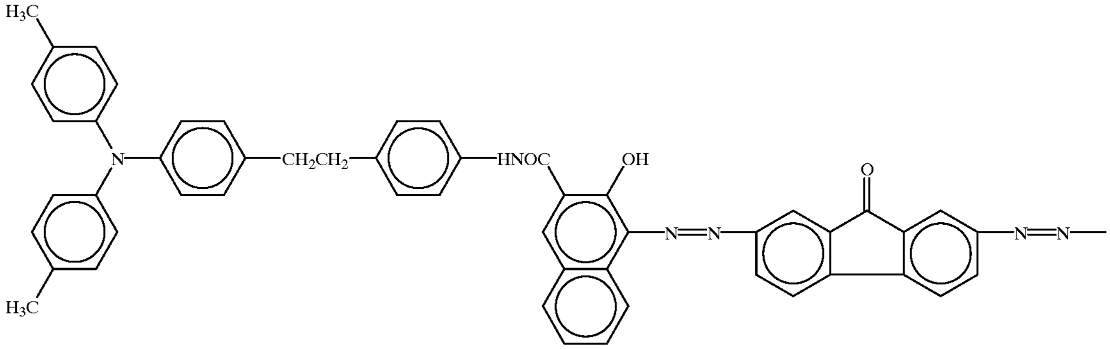

-continued

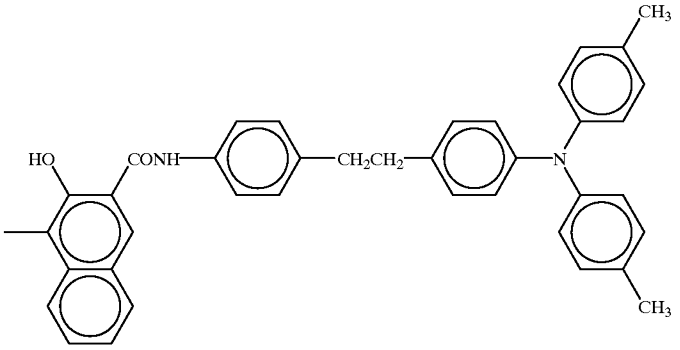

(210)

[Bisazo compound No. 6]

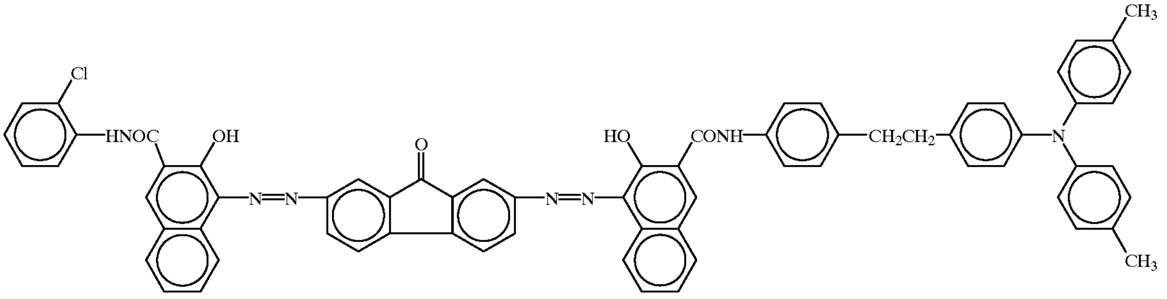

The yields, the melting points, and the results of the elemental analysis of the bisazo compounds No. 5 and of formulae (209) and (210) are shown in Table 20.

Figure 22:
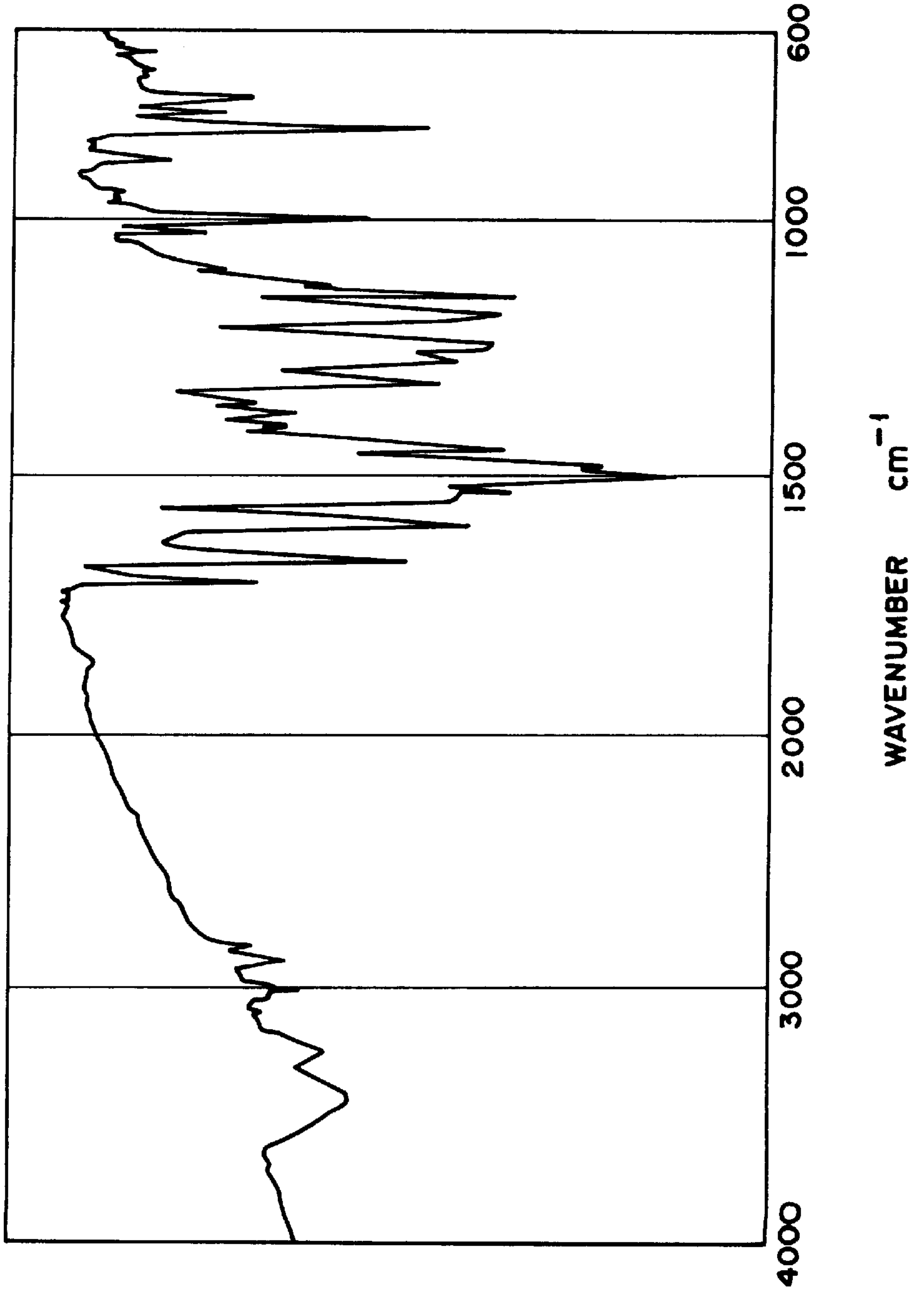
Figure 23:
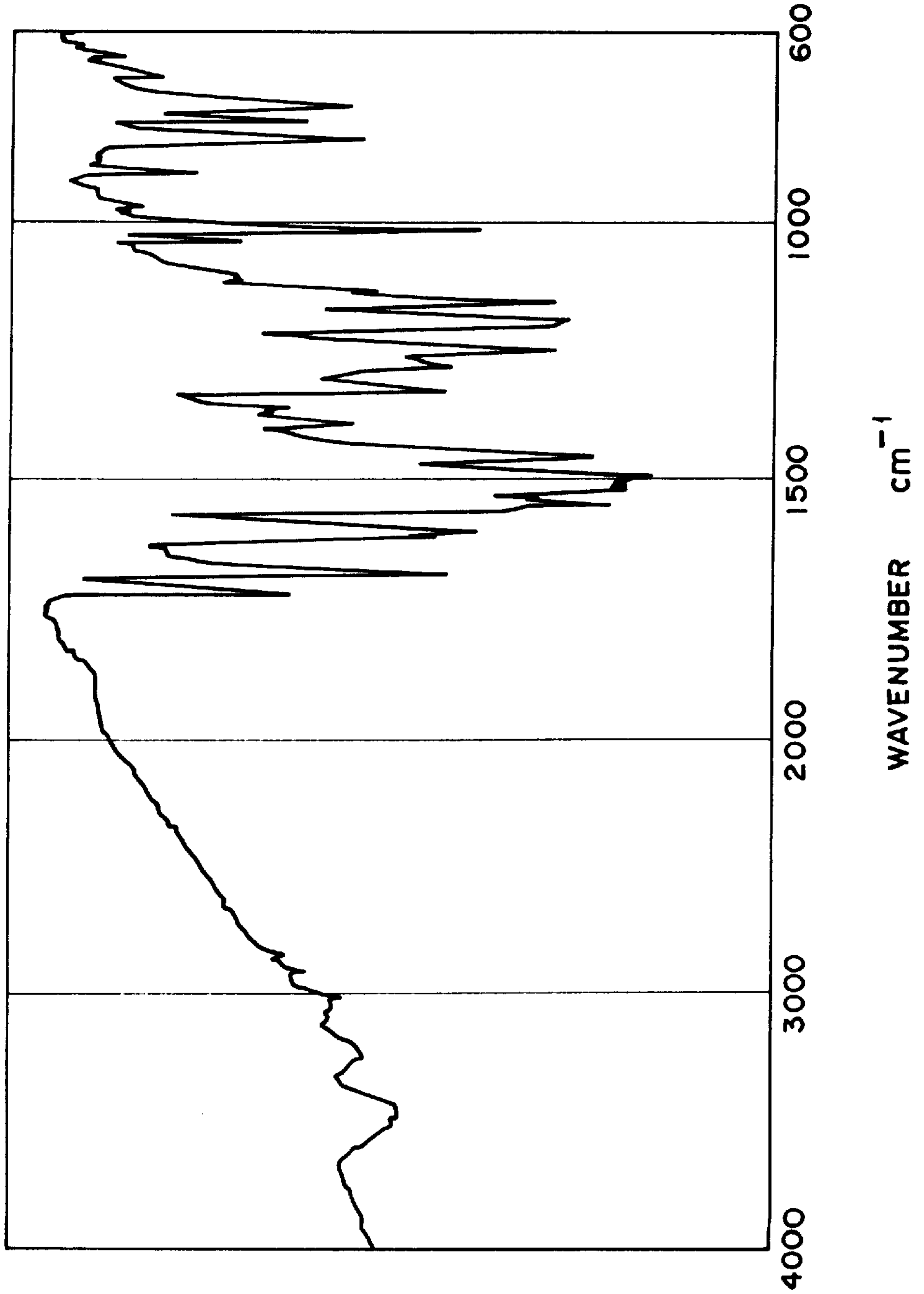

FIGS. 22 and 23 respectively show infrared spectra the above prepared bisazo compounds No. 5 and No. 6, ken by use of a KBr tablet.

PREPARATION EXAMPLES 22 AND 23

Preparation of Bisazo Compounds Nos. 7 and 8

Bisazo compounds Nos. 7 and 8 of formulae (211) and (212) were obtained similarly in accordance with the method as described in Preparation Example 16 or 17.

(211)

[Bisazo compound No. 7]

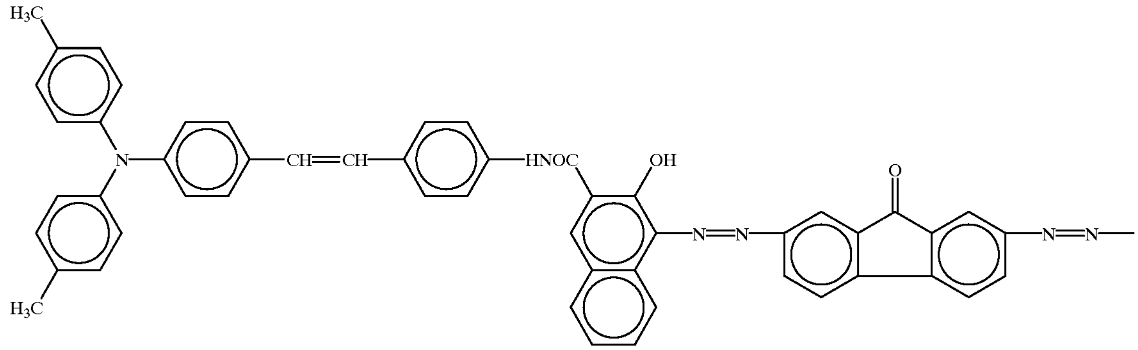

-continued

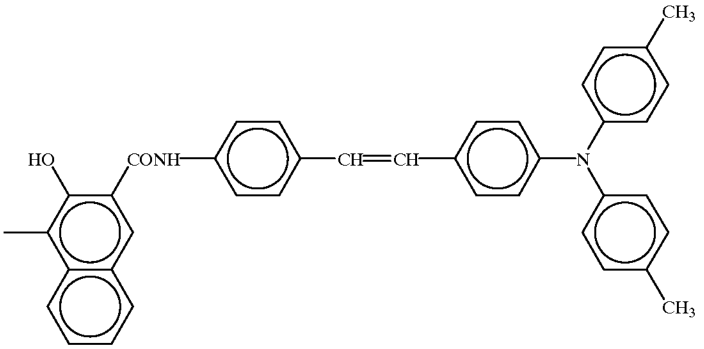

(212)

[Bisazo compound No. 8]

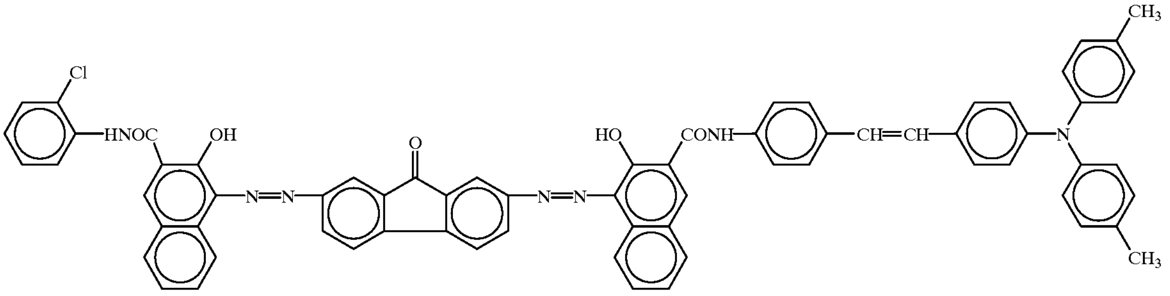

The yields, the melting points, and the results of the elemental analysis of the bisazo compounds Nos. 7 and 8 of formulae (211) and (212) are shown in Table 20.

Figure 24:
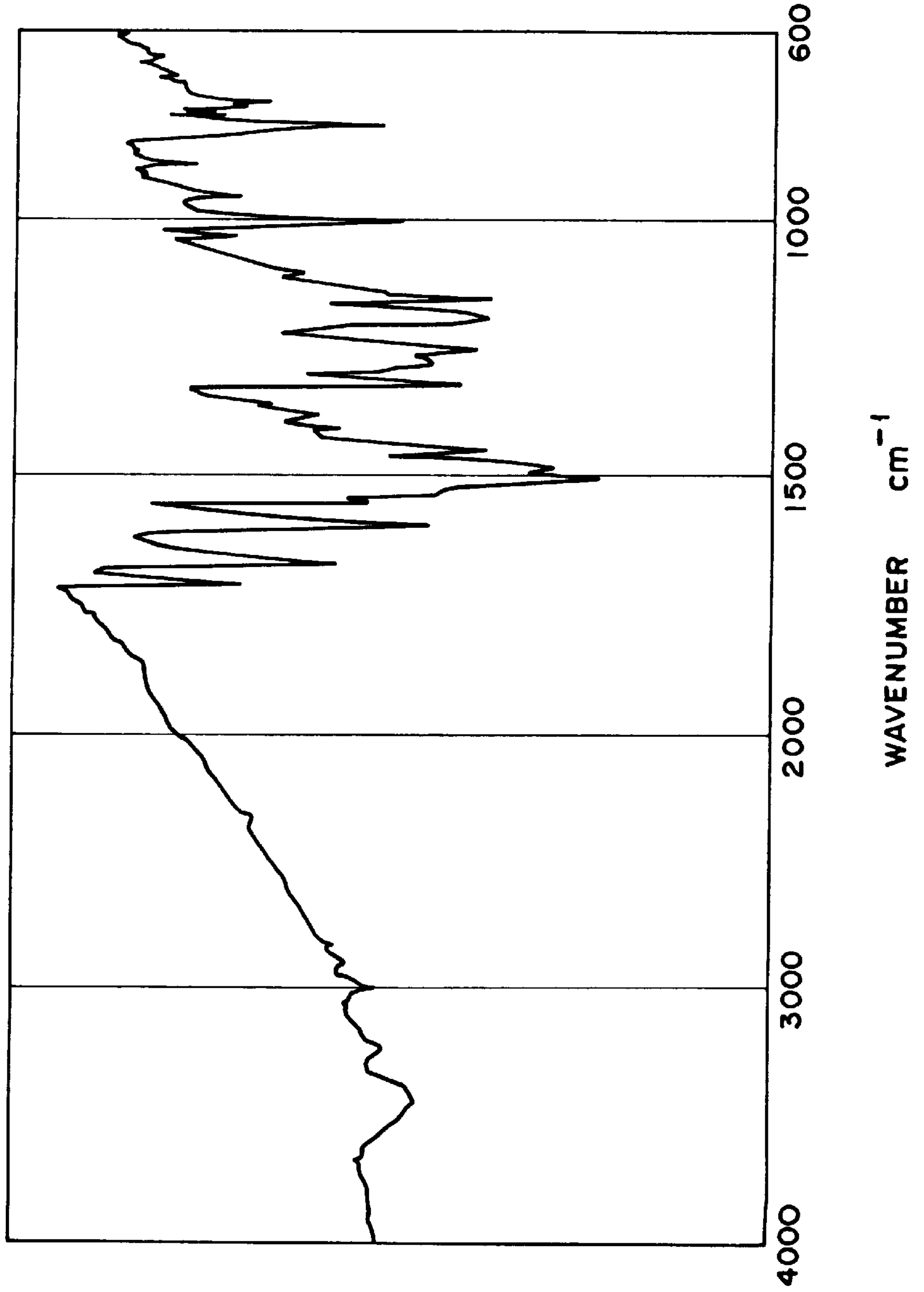
Figure 25:
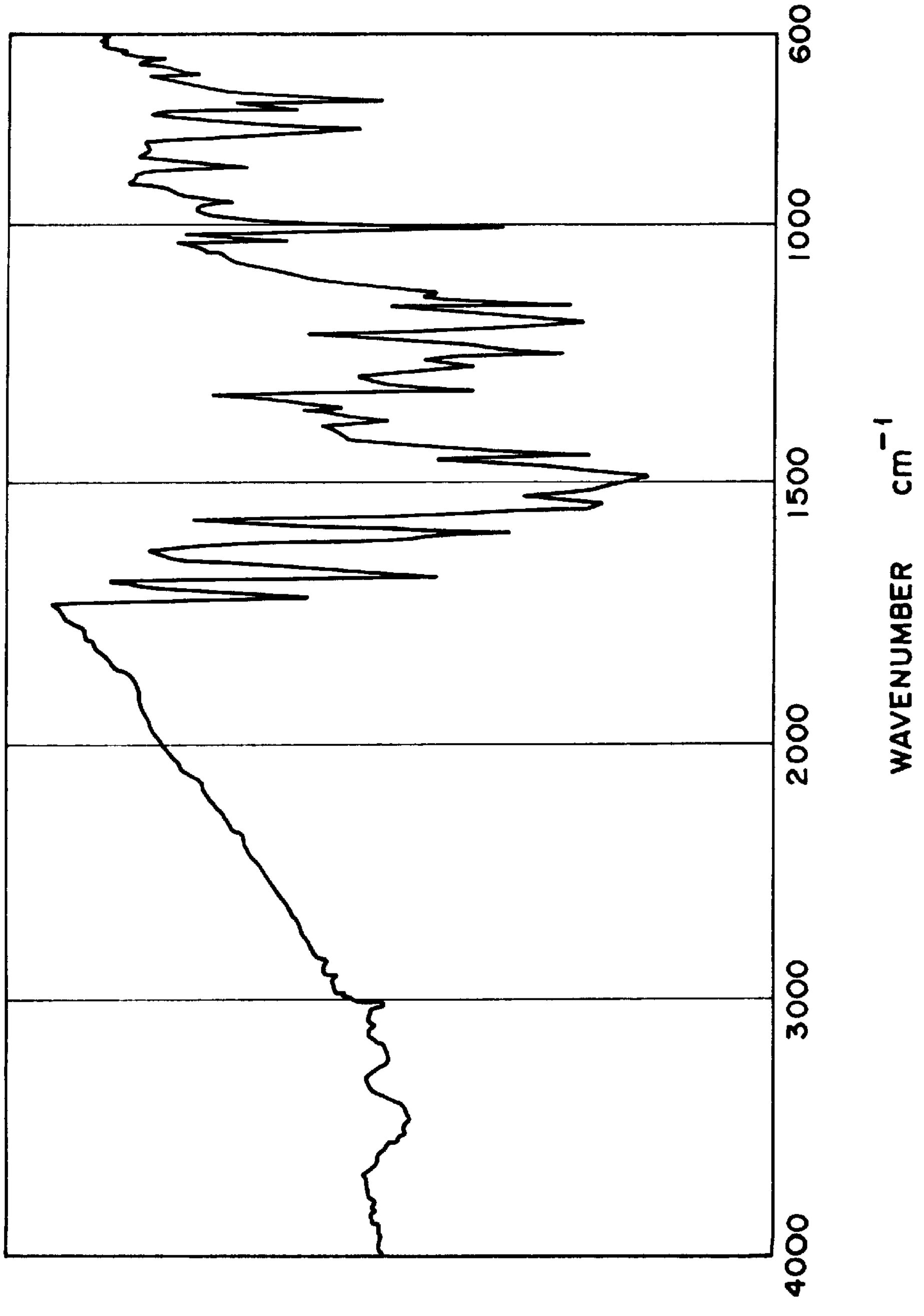
Figure 26:
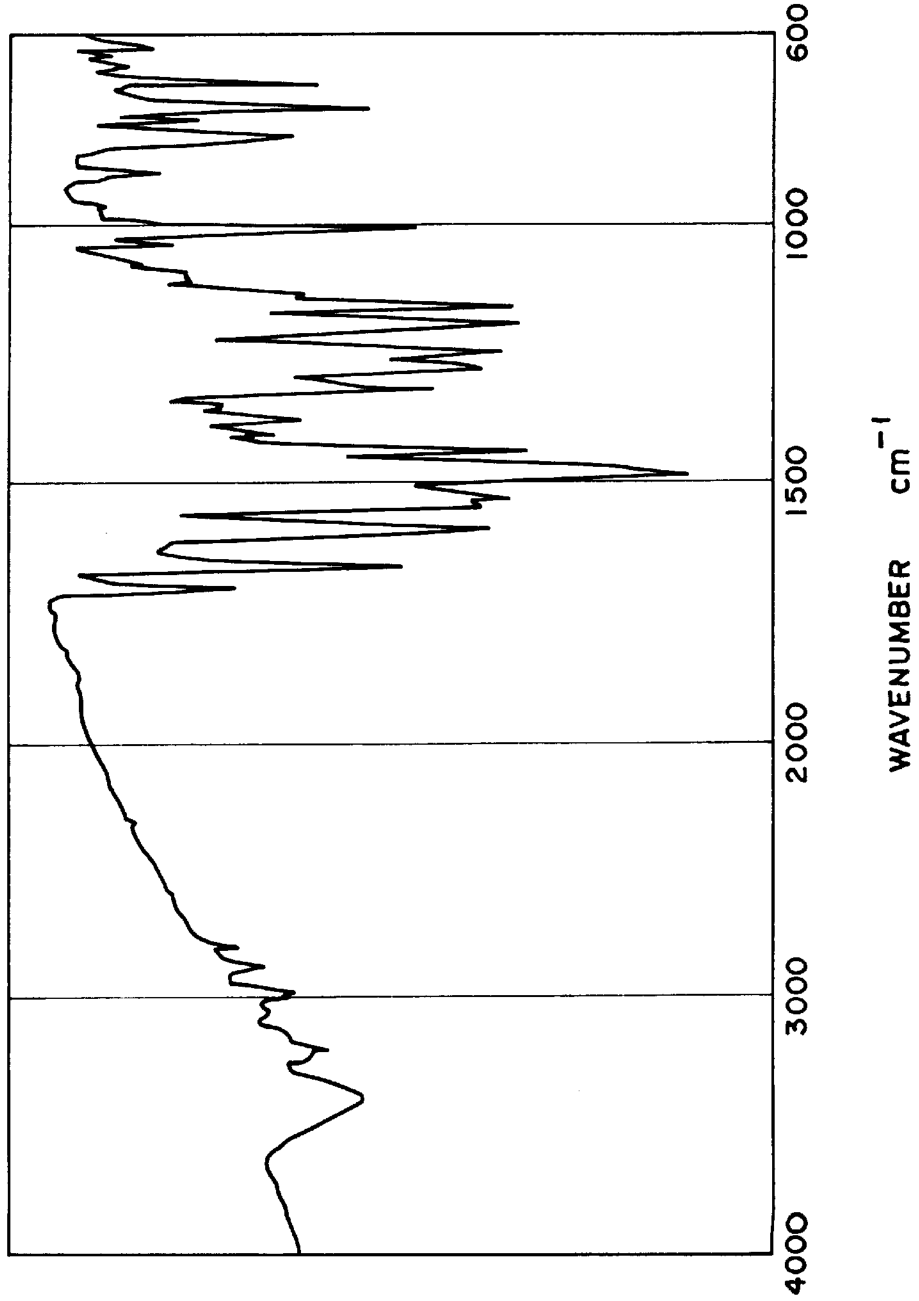
Figure 27:
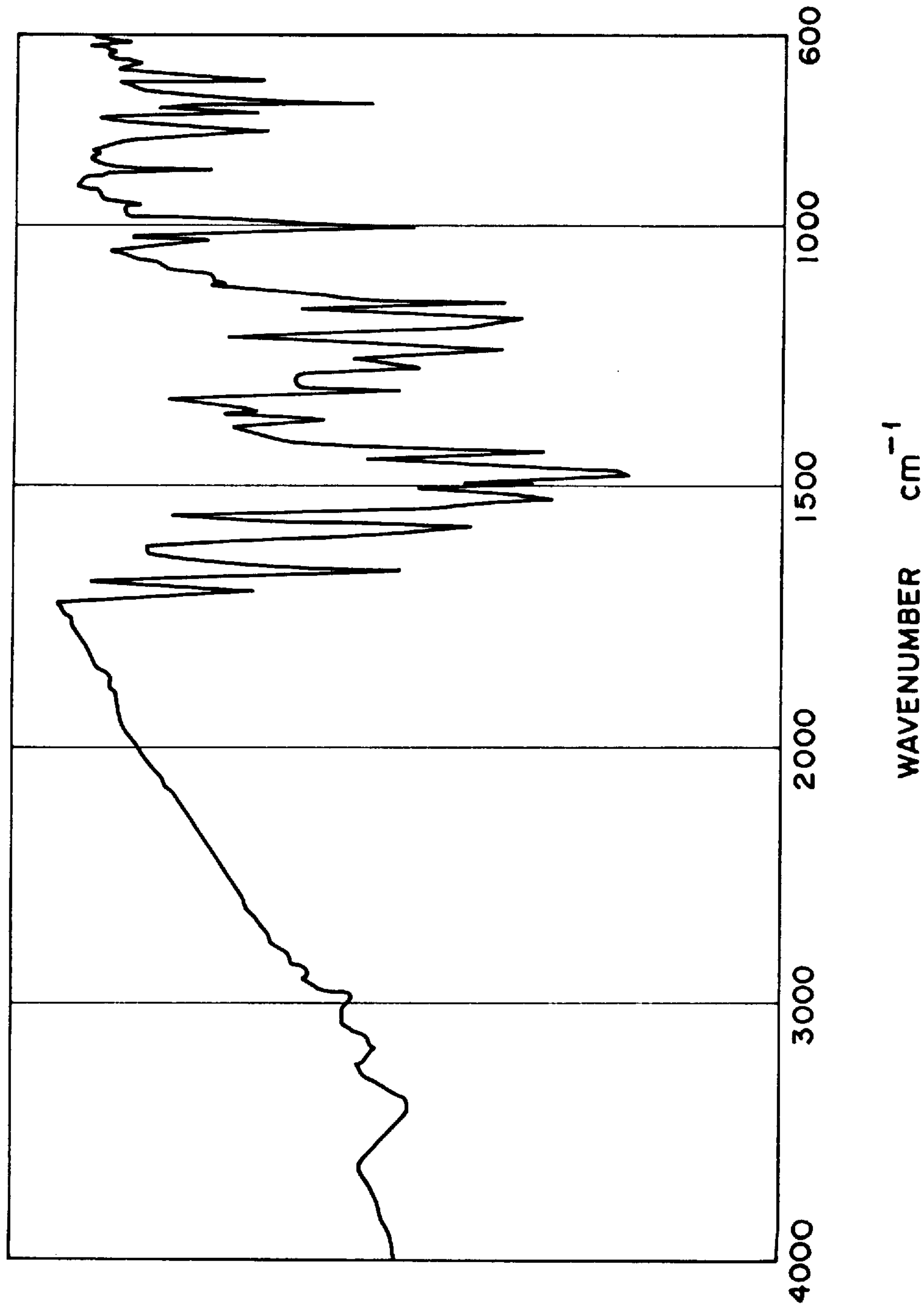
Figure 28:
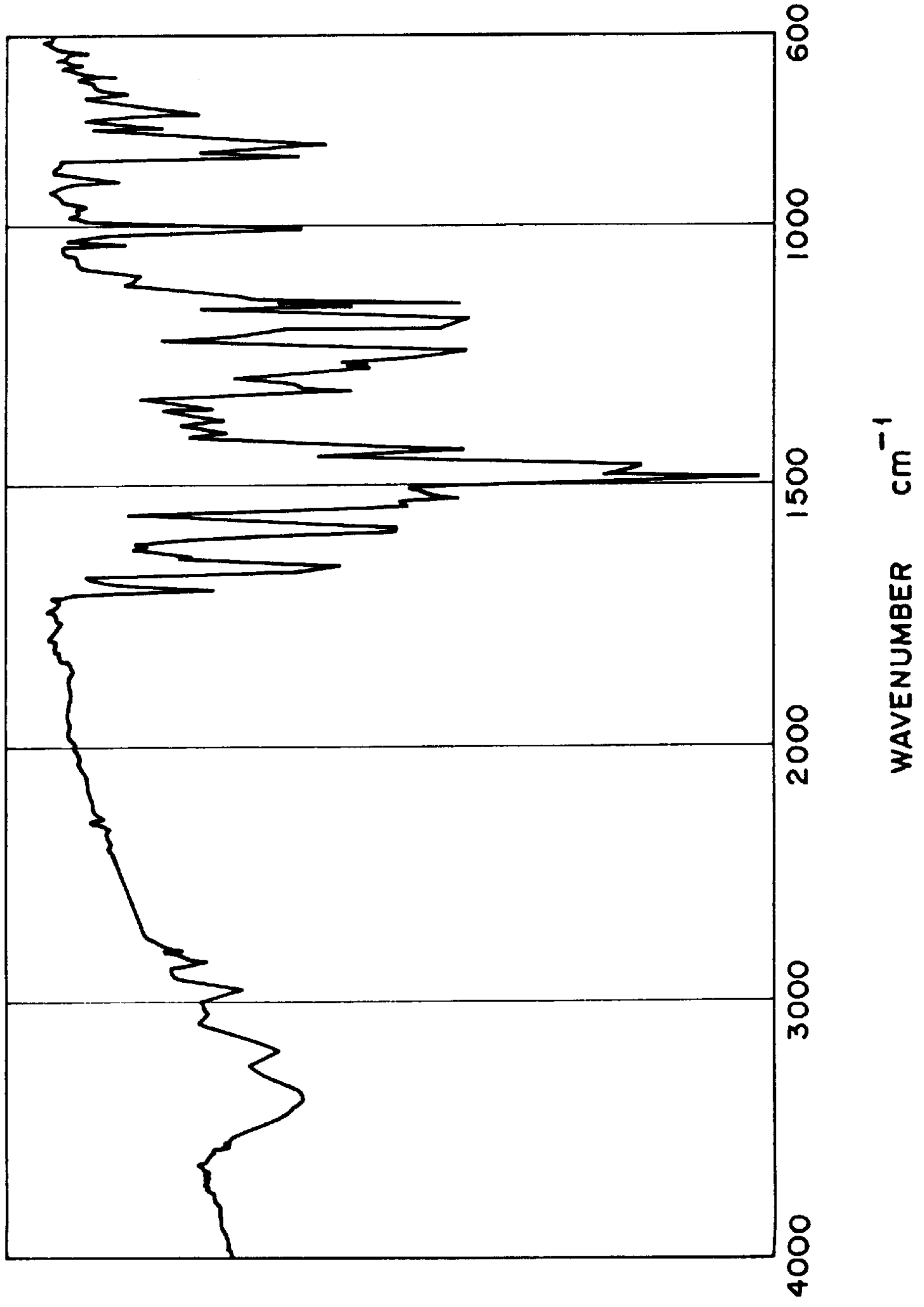
Figure 29:
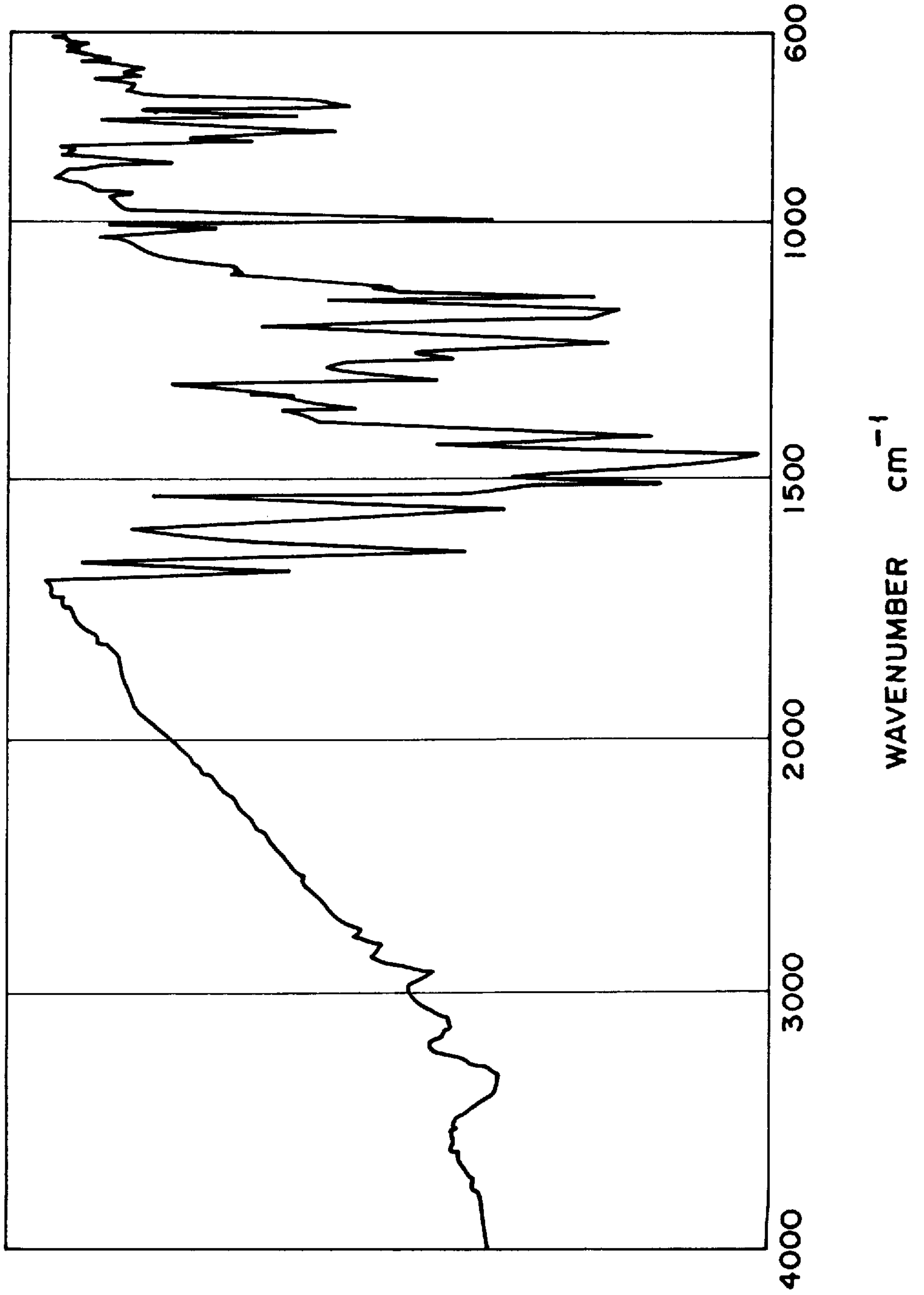

FIGS. 24 and 25 respectively show infrared spectra of the above prepared bisazo compounds No. 7 and No. 8, taken by use of a KBr tablet.

PREPARATION EXAMPLES 24 TO 27

Preparation of Bisazo Compounds Nos. 9 to 12

Bisazo compounds Nos. 9 to 12 of formulae (213) to (216) were obtained similarly in accordance with the method as described in Preparation Example 16 or 17.

(213)

[Bisazo compound No. 9]

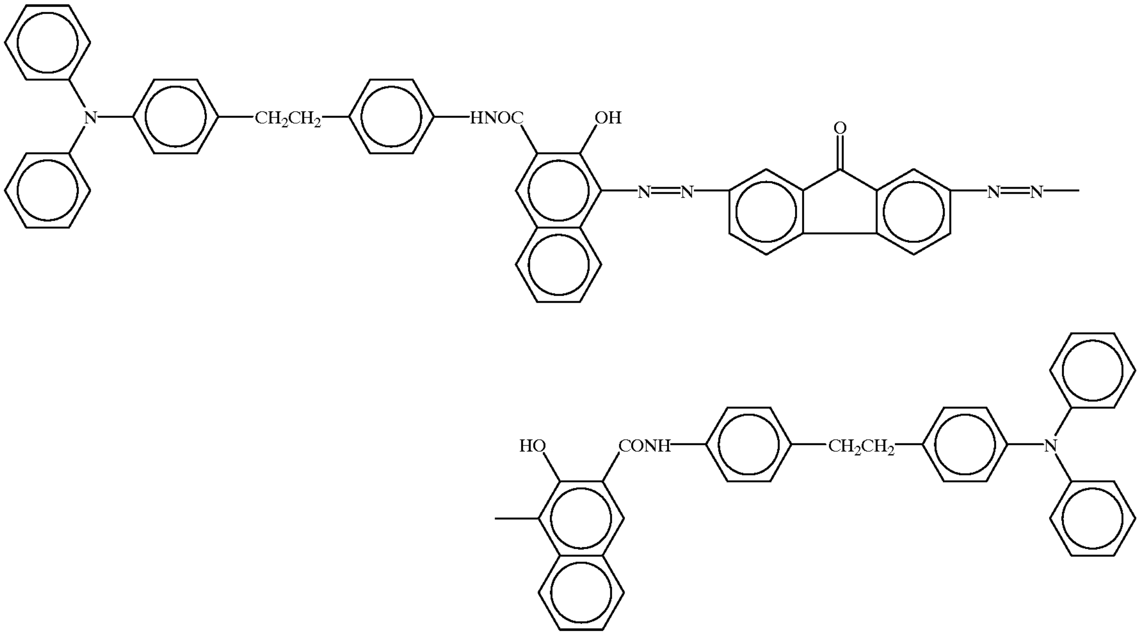

-continued
(214)
[Bisazo compound No. 10]
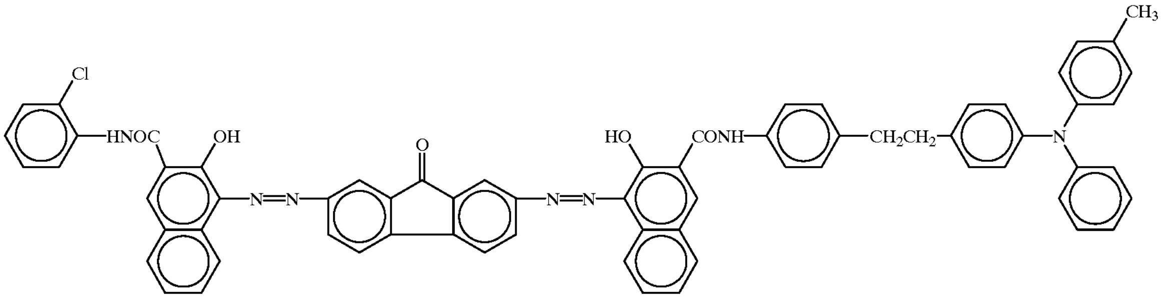
(215)
[Bisazo compound No. 11]
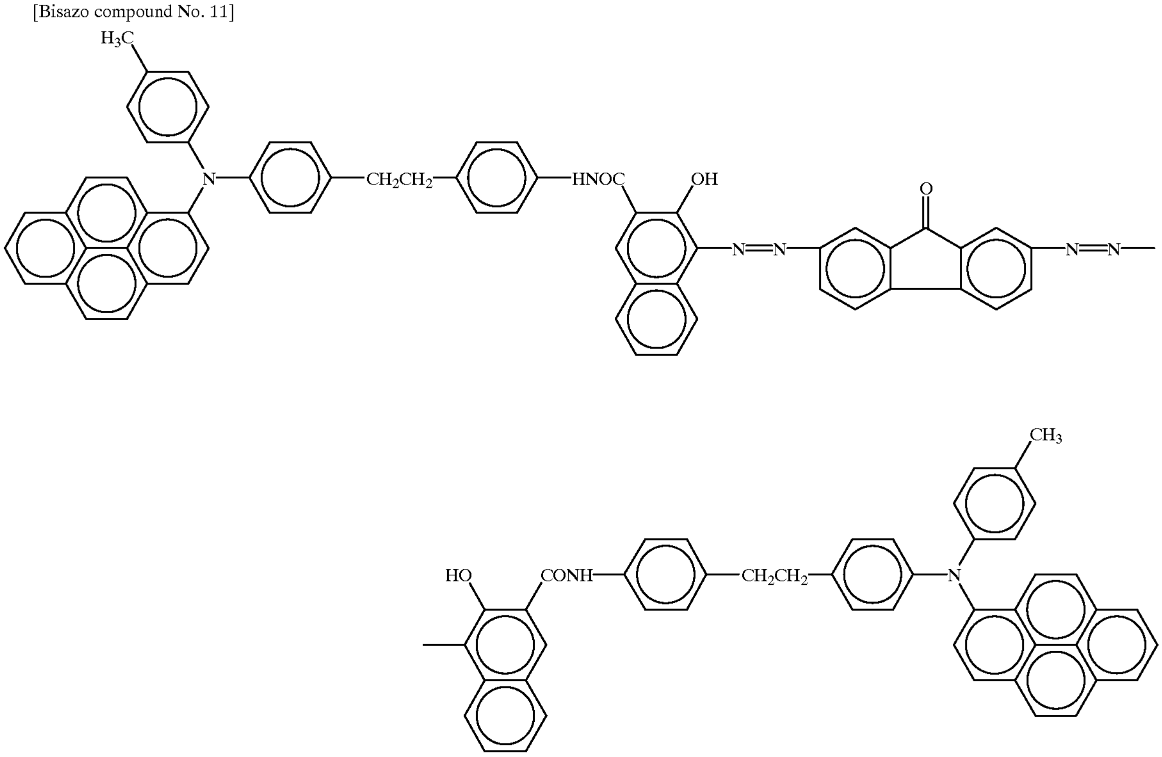
(216)
[Bisazo compound No. 12]
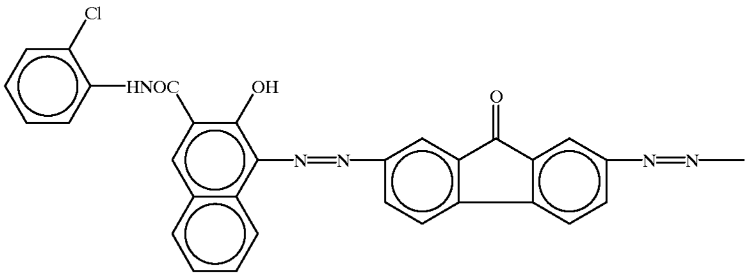

-continued

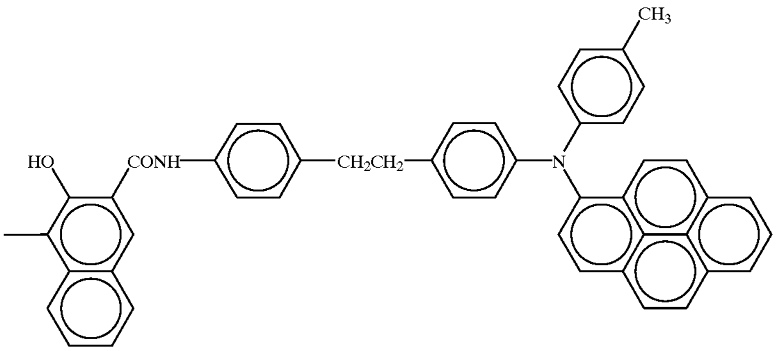

The yields, the melting points, and the results of the elemental analysis of the bisazo compounds Nos. 9 to 12 of formulae (213) to (216) are shown in Table 20.

FIGS. 26 to 29 respectively show infrared spectra of the above prepared bisazo compounds Nos. 9 to 12, taken by use of a KBr tablet.

TABLE 20

| Preparation Example No. | Bisazo Compound No. | Yield (%) | Melting Point (° C.) | Elemental Analysis Found (Calculated) % C | % H | % N |
|---|---|---|---|---|---|---|
| 20 | 5 | 53 | >280 | 80.65 (80.51) | 5.22 (5.35) | 8.07 (8.25) |
| 21 | 6 | 58 | >280 | 74.39 (75.85) | 4.24 (4.61) | 8.98 (8.97) |
| 22 | 7 | 15 | >280 | 80.32 (80.75) | 4.87 (5.06) | 8.38 (8.28) |
| 23 | 8 | 45 | >280 | 73.70 (75.99) | 3.99 (4.44) | 9.25 (8.99) |
| 24 | 9 | 72 | >280 | 80.70 (80.29) | 4.83 (4.96) | 8.56 (8.61) |
| 25 | 10 | 70 | >280 | 75.10 (75.59) | 4.07 (4.36) | 9.16 (9.21) |
| 26 | 11 | 29 | >280 | 83.03 (82.97) | 4.72 (4.86) | 7.02 (7.10) |
| 27 | 12 | 56 | >280 | 78.10 (77.89) | 4.22 (4.36) | 8.09 (8.15) |

EXAMPLE 1

7.5 parts by weight of the trisazo compound No. 1 obtained in Preparation Example 1 serving as a charge generating material and 500 parts by weight of a 0.5% tetrahydrofuran solution of a polyester resin (Trademark "Vylon 200" made by Toyobo Company, Ltd.) were dispersed and ground in a ball mill.

The thus obtained dispersion was coated on an aluminum surface of an aluminum-deposited polyester film by a doctor blade, and dried at room temperature, so that a charge generation layer having a thickness of about 1 μm was formed on the aluminum-deposited polyester film.

One part by weight of 1-phenyl-3-(4-diethylaminostyryl)-5-(4-diethylaminophenyl)pyrazoline serving as a charge transporting material, 1 part by weight of polycarbonate resin (Trademark "Panlite K-1300" made by Teijin Limited.), and 8 parts by weight of tetrahydrofuran were mixed and dissolved, so that a coating liquid for a charge transport layer was obtained. This coating liquid was coated on the above formed charge generation layer by a doctor blade and then dried at 80° C. for 2 minutes, and at 120° C. for 5 minutes, so that a charge transport layer having a thickness of about 20 μm was formed on the charge generation layer.

Thus, a two-layered electrophotographic photoconductor No. 1 according to the present invention as shown in FIG. 1 was prepared.

EXAMPLES 2 to 6

The procedure for preparation of the two-layered electrophotographic photoconductor No. 1 in Example 1 was repeated except that the trisazo compound No. 1 for use in the coating liquid for the charge generation layer in Example 1 was replaced by the trisazo compounds Nos. 2 to 6 respectively prepared in Preparation Examples 2 to 6, whereby two-layered electrophotographic photoconductors No. 2 to No. 6 according to the present invention were prepared.

EXAMPLE 7

The procedure for preparation of the two-layered electrophotographic photoconductor No. 1 in Example 1 was repeated except that 1-phenyl-3-(4-diethylaminostyryl)-5-(4-diethylaminophenyl)pyrazoline for use in the coating liquid for the charge transport layer in Example 1 was replaced by 9-ethylcarbazole-3-aldehyde-1-methyl-1-phenylhydrazone, whereby a two-layered electrophotographic photoconductor No. 7 according to the present invention was prepared.

EXAMPLES 8 TO 12

The procedure for preparation of the two-layered electrophotographic photoconductor No. 7 in Example 7 was repeated except that the trisazo compound No. 1 for use in the coating liquid for the charge generation layer in Example 7 was replaced by the trisazo compounds Nos. 2 to 6 respectively prepared in Preparation Examples 2 to 6, whereby two-layered electrophotographic photoconductors No. 8 to No. 12 according to the present invention were prepared.

EXAMPLE 13

The procedure for preparation of the two-layered electrophotographic photoconductor No. 1 in Example 1 was repeated except that 1-phenyl-3-(4-diethylaminostyryl)-5-(4-diethylaminophenyl)pyrazoline for use in the coating liquid for the charge transport layer in Example 1 was replaced by α-phenyl-4'-diphenylaminostilbene, whereby a two-layered electrophotographic photoconductor No. 13 according to the present invention was prepared.

EXAMPLES 14 TO 18

The procedure for preparation of the two-layered electrophotographic photoconductor No. 13 in Example 13 was repeated except that the trisazo compound No. 1 for use in the coating liquid for the charge generation layer in Example 13 was replaced by the trisazo compounds Nos. 2 to 6 respectively prepared in Preparation Examples 2 to 6, whereby two-layered electrophotographic photoconductors No. 14 to No. 18 according to the present invention were prepared.

EXAMPLE 19

The procedure for preparation of the two-layered electrophotographic photoconductor No. 1 in Example 1 was repeated except that 1-phenyl-3-(4-diethylaminostyryl)-5-(4-diethylaminophenyl)pyrazoline for use in the coating liquid for the charge transport layer in Example 1 was replaced by a-phenyl-4'-bis(4-methylphenyl)aminostilbene, whereby a two-layered electrophotographic photoconductor No. 19 according to the present invention was prepared.

EXAMPLES 20 TO 24

The procedure for preparation of the two-layered electrophotographic photoconductor No. 19 in Example 19 was repeated except that the trisazo compound No. 1 for use in the coating liquid for the charge generation layer in Example 19 was replaced by the trisazo compounds Nos. 2 to 6 respectively prepared in Preparation Examples 2 to 6, whereby two-layered electrophotographic photoconductors No. 20 to No. 24 according to the present invention were prepared.

Each of the electrophotographic photoconductors No. 1 through No. 24 according to the present invention prepared in Examples 1 to 24 was charged negatively in the dark under application of −6 kV of corona charge for 20 seconds, using a commercially available electrostatic copying sheet testing apparatus ("Paper Analyzer Model SP-428" made by Kawaguchi Electro Works Co., Ltd.). Then, each electrophotographic photoconductor was allowed to stand in the dark for 20 seconds without applying any charge thereto, and the surface potential Vpo (V) of the photoconductor was measured. Each photoconductor was then illuminated by a tungsten lamp in such a manner that the illuminance on the illuminated surface of the photoconductor was 4.5 lux, and the exposure $E_{1/2}$ (lux•sec) required to reduce the initial surface potential Vpo (V) to ½ the initial surface potential Vpo (V) was measured. The results are shown in Table 21.

TABLE 21

| Photoconductor No. | Trisazo Compound No. | Vpo (V) | E1/2 (lux · sec) |
|---|---|---|---|
| 1 | 1 | −438 | 2.12 |
| 2 | 2 | −749 | 1.68 |
| 3 | 3 | −777 | 1.26 |
| 4 | 4 | −289 | 2.95 |
| 5 | 5 | −116 | 1.38 |
| 6 | 6 | −158 | 0.70 |
| 7 | 1 | −1279 | 4.55 |
| 8 | 2 | −1148 | 6.95 |
| 9 | 3 | −789 | 0.40 |
| 10 | 4 | −309 | 17.41 |
| 11 | 5 | −325 | 7.06 |
| 12 | 6 | −397 | 0.37 |
| 13 | 1 | −1198 | 2.98 |
| 14 | 2 | −1021 | 15.07 |
| 15 | 3 | −970 | 0.43 |

TABLE 21-continued

| Photoconductor No. | Trisazo Compound No. | Vpo (V) | E1/2 (lux · sec) |
|---|---|---|---|
| 16 | 4 | −424 | 14.01 |
| 17 | 5 | −542 | 13.60 |
| 18 | 6 | −483 | 0.38 |
| 19 | 1 | −1144 | 2.51 |
| 20 | 2 | −1109 | 7.82 |
| 21 | 3 | −842 | 0.34 |
| 22 | 4 | −384 | 11.66 |
| 23 | 5 | −457 | 8.99 |
| 24 | 6 | −484 | 0.31 |

Furthermore, each of the electrophotographic photoconductors No. 2, No. 19 and No. 21 was placed in a commercially available copying machine "Ricopy FT-5500" (Trademark), made by Ricoh Company, Ltd., and then, image formation was repeatedly carried out 10,000 times. As a result, any photoconductors did not deteriorate during the repeated copying processes, and clear images were obtained.

EXAMPLE 25

7.5 parts by weight of the bisazo compound No. 1 obtained in Preparation Example 16 serving as a charge generating material and 500 parts by weight of a 0.5% tetrahydrofuran solution of a polyester resin (Trademark "Vylon 200", made by Toyobo Company, Ltd.) were dispersed and ground in a ball mill.

The thus obtained dispersion was coated on an aluminum surface of an aluminum-deposited polyester film by a doctor blade, and dried at room temperature, so that a charge generation layer having a thickness of about 1 μm was formed on the aluminum-deposited polyester film.

Two parts by weight of 9-ethylcarbazole-3-aldehyde-1-methyl-1-phenylhydrazone serving as a charge transporting material, 2 parts by weight of polycarbonate resin (Trademark "Panlite K-1300" made by Teijin Limited.), and 16 parts by weight of tetrahydrofuran were mixed and dissolved, so that a coating liquid for a charge transport layer was obtained. This coating liquid was coated on the above formed charge generation layer by a doctor blade and then dried at 80° C. for 2 minutes, and at 120° C. for 5 minutes, so that a charge transport layer having a thickness of about 20 μm was formed on the charge generation layer.

Thus, a two-layered electrophotographic photoconductor No. 25 according to the present invention as shown in FIG. 1 was prepared.

EXAMPLES 26 TO 28

The procedure for preparation of the two-layered electrophotographic photoconductor No. 25 in Example 25 was repeated except that the bisazo compound No. 1 for use in the coating liquid for the charge generation layer in Example 25 was replaced by the bisazo compounds Nos. 2 to 4 respectively prepared in Preparation Examples 8 to 10, whereby two-layered electrophotographic photoconductors No. 26 to No. 28 according to the present invention were prepared.

EXAMPLE 29

The procedure for preparation of the two-layered electrophotographic photoconductor No. 25 in Example 25 was repeated except that 9-ethylcarbazole-3-aldehyde-1-methyl-1-phenylhydrazone for use in the coating liquid for the charge transport layer in Example 25 was replaced by α-phenyl-4'-bis(4-methylphenyl)aminostilbene, whereby a two-layered electrophotographic photoconductor No. 29 according to the present invention was prepared.

EXAMPLES 30 TO 32

The procedure for preparation of the two-layered electrophotographic photoconductor No. 29 in Example 29 was repeated except that the bisazo compound No. 1 for use in the coating liquid for the charge generation layer in Example 29 was replaced by the bisazo compounds Nos. 2 to 4 respectively prepared in Preparation Examples 8 to 10, whereby two-layered electrophotographic photoconductors No. 30 to No. 32 according to the present invention were prepared.

EXAMPLE 33

The procedure for preparation of the two-layered electrophotographic photoconductor No. 25 in Example 25 was repeated except that 9-ethylcarbazole-3-aldehyde-1-methyl-1-phenylhydrazone for use in the coating liquid for the charge transport layer in Example 25 was replaced by α-phenyl-4'-diphenylaminostilbene, whereby a two-layered electrophotographic photoconductor No. 33 according to the present invention was prepared.

EXAMPLES 34 TO 36

The procedure for preparation of the two-layered electrophotographic photoconductor No. 33 in Example 33 was repeated except that the bisazo compound No. 1 for use in the coating liquid for the charge generation layer in Example 33 was replaced by the bisazo compounds Nos. 2 to 4 respectively prepared in Preparation Examples 8 to 10, whereby two-layered electrophotographic photoconductors No. 34 to No. 36 according to the present invention were prepared.

EXAMPLE 37

The procedure for preparation of the two-layered electrophotographic photoconductor No. 25 in Example 25 was repeated except that 9-ethylcarbazole-3-aldehyde-1-methyl-1-phenylhydrazone for use in the coating liquid for the charge transport layer in Example 25 was replaced by 1-phenyl-3-(4-diethylaminostyryl)-5-(4-diethylaminophenyl)pyrazoline, whereby a two-layered electrophotographic photoconductor No. 37 according to the present invention was prepared.

EXAMPLES 38 TO 40

The procedure for preparation of the two-layered electrophotographic photoconductor No. 37 in Example 37 was repeated except that the bisazo compound No. 1 for use in the coating liquid for the charge generation layer in Example 37 was replaced by the bisazo compounds Nos. 2 to 4 respectively prepared in Preparation Examples 17 to 19, whereby two-layered electrophotographic photoconductors No. 38 to No. 40 according to the present invention were prepared.

EXAMPLES 41 AND 42

The procedure for preparation of the two-layered electrophotographic photoconductor No. 25 in Example 25 was repeated except that the bisazo compound No. 1 for use in the coating liquid for the charge generation layer in Example 25 was replaced by the bisazo compounds Nos. 5 and 6 respectively prepared in Preparation Examples 20 and 21, whereby two-layered electrophotographic photoconductors No. 41 and No. 42 according to the present invention were prepared.

EXAMPLES 43 AND 44

The procedure for preparation of the two-layered electrophotographic photoconductors No. 41 and No. 42 in Examples 41 and 42 was independently repeated except that 9-ethylcarbazole-3-aldehyde-1-methyl-1-phenylhydrazone for use in the coating liquid for the charge transport layer was replaced by α-phenyl-4'-bis(4-methylphenyl) aminostilbene, whereby two-layered electrophotographic photoconductors No. 43 and No. 44 according to the present invention were prepared.

EXAMPLES 45 AND 46

The procedure for preparation of the two-layered electrophotographic photoconductors No. 41 and No. 42 in Examples 41 and 42 was independently repeated except that 9-ethylcarbazole-3-aldehyde-1-methyl-1-phenylhydrazone for use in the coating liquid for the charge transport layer was replaced by α-phenyl-4'-diphenylaminostilbene, whereby two-layered electrophotographic photoconductors No. 45 and No. 46 according to the present invention were prepared.

EXAMPLES 47 AND 48

The procedure for preparation of the two-layered electrophotographic photoconductors No. 41 and No. 42 in Examples 41 and 42 was independently repeated except that 9-ethylcarbazole-3-aldehyde-1-methyl-1-phenylhydrazone for use in the coating liquid for the charge transport layer was replaced by 1-phenyl-3-(4-diethylaminostyryl)-5-(4-diethylaminophenyl)pyrazoline, whereby two-layered electrophotographic photoconductors No. 47 and No. 48 according to the present invention were prepared.

EXAMPLES 49 AND 50

The procedure for preparation of the two-layered electrophotographic photoconductor No. 25 in Example 25 was repeated except that the bisazo compound No. 1 for use in the coating liquid for the charge generation layer in Example 25 was replaced by the bisazo compounds Nos. 7 and 8 respectively prepared in Preparation Examples 22 and 23, whereby two-layered electrophotographic photoconductors No. 49 and No. 50 according to the present invention were prepared.

EXAMPLES 51 AND 52

The procedure for preparation of the two-layered electrophotographic photoconductors No. 49 and No. 50 in Examples 49 and 50 was independently repeated except that 9-ethylcarbazole-3-aldehyde-1-methyl-1-phenylhydrazone for use in the coating liquid for the charge transport layer was replaced by a-phenyl-4'-bis(4-methylphenyl)-aminostilbene, whereby two-layered electrophotographic photoconductors No. 51 and No. 52 according to the present invention were prepared.

EXAMPLES 53 AND 54

The procedure for preparation of the two-layered electrophotographic photoconductors No. 49 and No. 50 in Examples 49 and 50 was independently repeated except that 9-ethylcarbazole-3-aldehyde-1-methyl-1-phenylhydrazone for use in the coating liquid for the charge transport layer was replaced by α-phenyl-4'-diphenylaminostilbene, whereby two-layered electrophotographic photoconductors No. 53 and No. 54 according to the present invention were prepared.

EXAMPLES 55 AND 56

The procedure for preparation of the two-layered electrophotographic photoconductors No. 49 and No. 50 in Examples 49 and 50 was independently repeated except that 9-ethylcarbazole-3-aldehyde-1-methyl-1-phenylhydrazone for use in the coating liquid for the charge transport layer was replaced by 1-phenyl-3-(4-diethylaminostyryl)-5-(4-diethylaminophenyl)pyrazoline, whereby two-layered electrophotographic photoconductors No. 55 and No. 56 according to the present invention were prepared.

EXAMPLES 57 TO 60

The procedure for preparation of the two-layered electrophotographic photoconductor No. 25 in Example 25 was repeated except that the bisazo compound No. 1 for use in the coating liquid for the charge generation layer in Example 25 was replaced by the bisazo compounds Nos. 9 to 12 respectively prepared in Preparation Examples 24 to 27, whereby two-layered electrophotographic photoconductors No. 57 to No. 60 according to the present invention were prepared.

EXAMPLES 61 TO 64

The procedure for preparation of the two-layered electrophotographic photoconductors No. 57 to No. 60 in Examples 57 to 60 was independently repeated except that 9-ethylcarbazole-3-aldehyde-1-methyl-1-phenylhydrazone for use in the coating liquid for the charge transport layer was replaced by a-phenyl-4'-bis(4-methylphenyl)-aminostilbene, whereby two-layered electrophotographic photoconductors No. 61 to No. 64 according to the present invention were prepared.

EXAMPLES 65 TO 68

The procedure for preparation of the two-layered electrophotographic photoconductors No. 57 to No. 60 in Examples 57 to 60 was independently repeated except that 9-ethylcarbazole-3-aldehyde-1-methyl-1-phenylhydrazone for use in the coating liquid for the charge transport layer was replaced by α-phenyl-4'-diphenylaminostilbene, whereby two-layered electrophotographic photoconductors No. 65 to No. 68 according to the present invention were prepared.

EXAMPLES 69 TO 72

The procedure for preparation of the two-layered electrophotographic photoconductors No, 57 to No. 60 in Examples 57 to 60 was independently repeated except that 9-ethylcarbazole-3-aldehyde-1-methyl-1-phenylhydrazone for use in the coating liquid for the charge transport layer was replaced by 1-phenyl-3-(4-diethylaminostyryl)-5-(4-diethylaminophenyl)pyrazoline, whereby two-layered electrophotographic photoconductors No. 69 to No. 72 according to the present invention were prepared.

Each of the electrophotographic photoconductors No. 25 through No. 72 according to the present invention prepared in Examples 25 to 72 was charged negatively in the dark under application of −6 kV of corona charge for 20 seconds, using a commercially available electrostatic copying sheet testing apparatus ("Paper Analyzer Model SP-428" made by Kawaguchi Electro Works Co., Ltd.). Then, each electrophotographic photoconductor was allowed to stand in the dark for 20 seconds without applying any charge thereto, and the surface potential Vpo (V) of the photoconductor was measured. Each photoconductor was then illuminated by a tungsten lamp in such a manner that the illuminance on the illuminated surface of the photoconductor was 4.5 lux, and the exposure $E_{1/2}$ (lux•sec) required to reduce the initial surface potential Vpo (V) to ½ the initial surface potential Vpo (V) was measured. The results are shown in Table 22.

TABLE 22

| Photoconductor No. | Bisazo Compound No. | Vpo (V) | E1/2 (lux · sec) |
|---|---|---|---|
| 25 | 1 | −1278 | 3.01 |
| 26 | 2 | −926 | 1.24 |
| 27 | 3 | −1264 | 1.91 |
| 28 | 4 | −714 | 1.10 |
| 29 | 1 | −1288 | 2.53 |
| 30 | 2 | −986 | 0.74 |
| 31 | 3 | −1193 | 1.43 |
| 32 | 4 | −971 | 0.67 |
| 33 | 1 | −1313 | 2.62 |
| 34 | 2 | −1122 | 0.91 |
| 35 | 3 | −1321 | 1.62 |
| 36 | 4 | −1134 | 0.78 |
| 37 | 1 | −1086 | 1.11 |
| 38 | 2 | −621 | 0.67 |
| 39 | 3 | −1026 | 1.29 |
| 40 | 4 | −191 | 0.65 |
| 41 | 5 | −471 | 4.93 |
| 42 | 6 | −1036 | 0.96 |
| 43 | 5 | −1059 | 4.59 |
| 44 | 6 | −1172 | 0.65 |
| 45 | 5 | −1150 | 7.57 |
| 46 | 6 | −1273 | 0.74 |
| 47 | 5 | −1012 | 2.03 |
| 48 | 6 | −593 | 0.58 |
| 49 | 7 | −490 | 2.56 |
| 50 | 8 | −560 | 1.18 |
| 51 | 7 | −463 | 2.63 |
| 52 | 8 | −608 | 1.24 |
| 53 | 7 | −495 | 2.01 |
| 54 | 8 | −659 | 1.89 |
| 55 | 7 | −218 | 1.72 |
| 56 | 8 | −319 | 0.98 |
| 57 | 9 | −1408 | 6.84 |
| 58 | 10 | −992 | 1.15 |
| 59 | 11 | −1353 | 1.77 |
| 60 | 12 | −1020 | 1.07 |
| 61 | 9 | −1342 | 5.46 |
| 62 | 10 | −1072 | 0.72 |
| 63 | 11 | −1173 | 1.81 |
| 64 | 12 | −1052 | 0.68 |
| 65 | 9 | −1510 | 5.41 |
| 66 | 10 | −1268 | 0.85 |
| 67 | 11 | −1322 | 2.35 |
| 68 | 12 | −1236 | 0.76 |
| 69 | 9 | −1060 | 2.39 |
| 70 | 10 | −158 | 0.70 |
| 71 | 11 | −1133 | 1.33 |
| 72 | 12 | −124 | 0.62 |

Furthermore, each of the electrophotographic photoconductors No. 31 and No. 36 was placed in a commercially available copying machine "Ricopy FT-5500" (Trademark), made by Ricoh Company, Ltd., and then, image formation was repeatedly carried out 10,000 times. As a result, any photoconductors did not deteriorate during the repeated copying processes, and clear images were obtained.

As is apparent from the results shown in Tables 21 and 22, the photoconductors of the present invention exhibit high sensitivities within the visible region. In addition, the durability of the photoconductors of the present invention is excellent.

As previously explained, the photoconductive layer of the photoconductor according to the present invention comprises a compound which comprises a charge generating moiety and a charge transporting moiety in the molecule thereof, so that the photoconductor obtained exhibits high sensitivities in a range from the visible region to the wavelength of the semiconductor laser beam, and the durability of the photoconductor is improved. In addition, the photoconductor of the present invention is advantageous in terms of the manufacturing conditions, because it can be obtained without the process of deposition or without the use of organic amine.

The bisazo and trisazo compounds according to the present invention, which serve as the compounds comprising a charge generating moiety and a charge transporting moiety in the molecule thereof, can be obtained easily. Those bisazo and trisazo compounds of the present invention can be regarded as remarkably useful charge generating materials in the electrophotographic photoconductor, in particular, the high-sensitivity electrophotographic photoconductor practically employed for the high speed copying machine.

Japanese Patent Application No. 6-164535 filed Jun. 23, 1994, Japanese Patent Application No. 6-206820 filed Aug. 31, 1994, Japanese Patent Application No. 6-315723 filed Nov. 25, 1994, Japanese Patent Application No. 6-303602 filed Dec. 7, 1994, Japanese Patent Application No. 7-024679 filed Jan. 19, 1995, Japanese Patent Application No. 7-024681 filed Jan. 19, 1995, Japanese Patent Application No. 7-1539540 filed May 29, 1995, Japanese Patent Application No. 7-153954 filed May 29, 1995, Japanese Patent Application No. 7-135186 filed Jun. 1, 1995, and Japanese Patent Application No. 7-159789 filed Jun. 2, 1995 are hereby incorporated by reference.

What is claimed is:

1. A bisazo compound with formula (13):

(13)

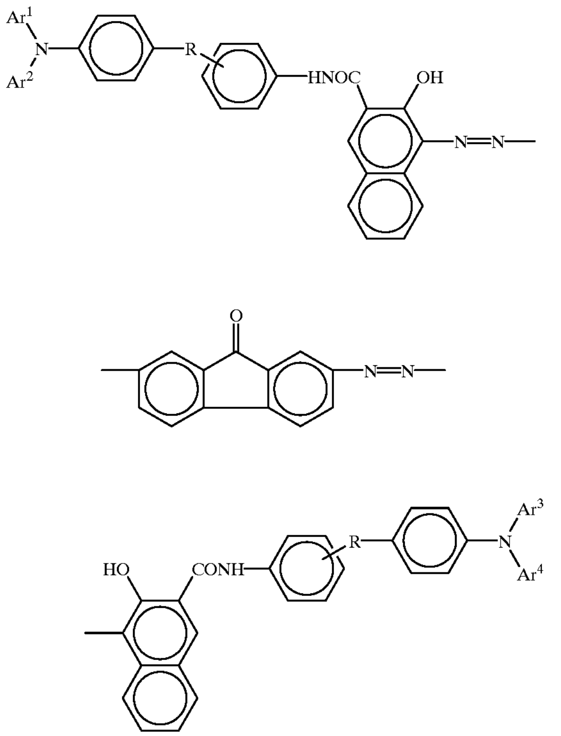

wherein $Ar^1$, $Ar^2$, $Ar^3$ and $Ar^4$ are each independently an aryl group which may have a substituent;. and R is an ethylene group or a vinylene group.

2. A bisazo compound with formula (14):

(14)

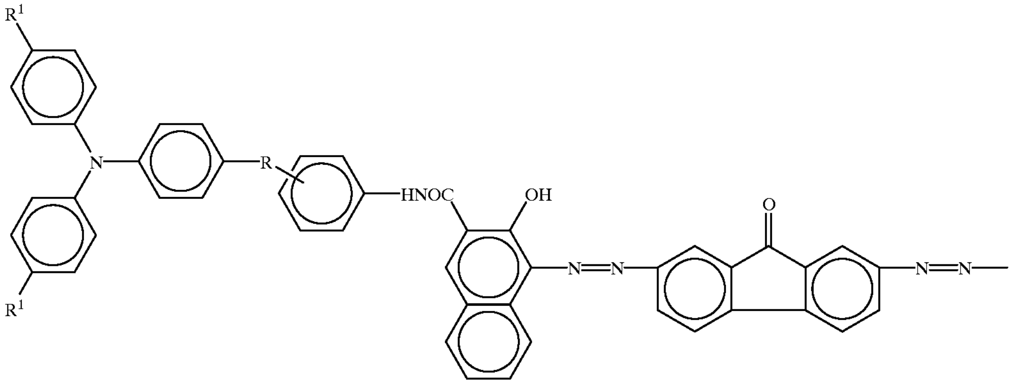

-continued

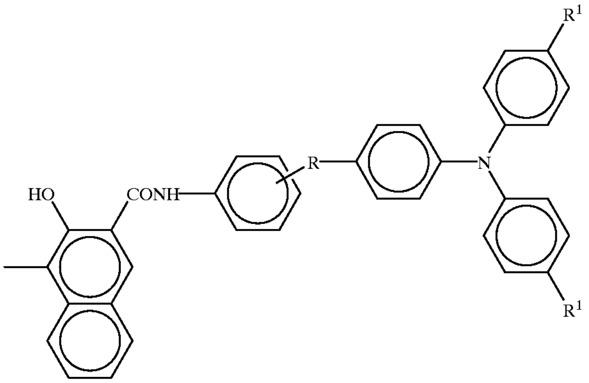

wherein $R^1$ is a hydrogen atom or an alkyl group having 1 to 4 carbon atoms; R is an ethylene or vinylene group.

3. A bisazo compound with formula (15):

(15)

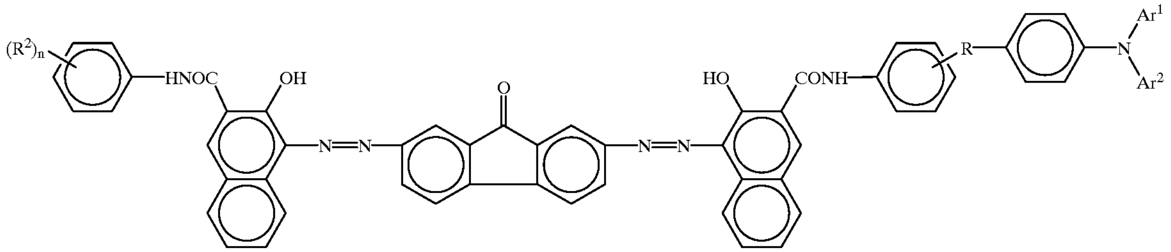

wherein $Ar^1$ and $Ar^2$ are each independently an aryl group which may have a substituent; $R^2$ is a hydrogen atom, an alkyl group having 1 to 4 carbon atoms, an alkoxyl group having 1 to 4 carbon atoms, a halogen atom, nitro group, or a dialkylamino group having 2 to 8 carbon atoms; R is an ethylene group or a vinylene group; when $R^2$ is not a hydrogen atom, n is an integer of 1 to 3, and each $R^2$ may be the same or different when n is 2 or 3.

4. A bisazo compound with formula (16):

(16)

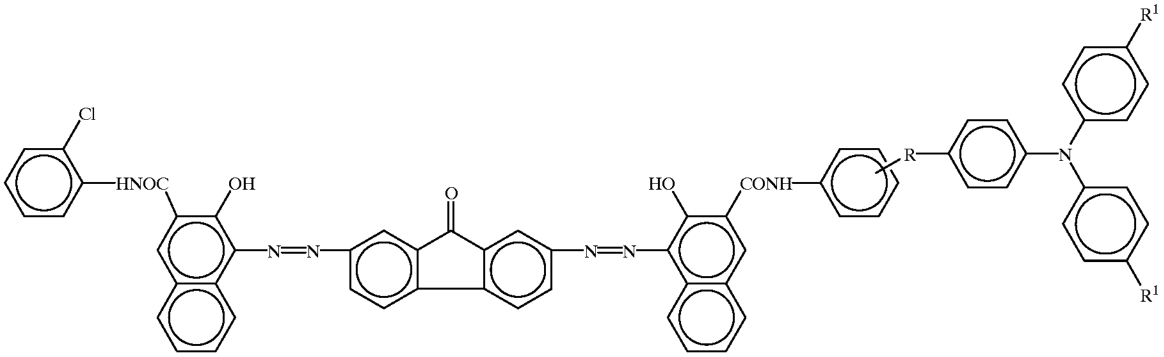

wherein $R^1$ is a hydrogen atom or an alkyl group having 1 to 4 carbon atoms; and R is an ethylene group or a vinylene group.

* * * * *

UNITED STATES PATENT AND TRADEMARK OFFICE

CERTIFICATE OF CORRECTION

PATENT NO. : 6,184,362 B1
DATED : February 6, 2001
INVENTOR(S) : Tomoyuki Shimada et al.

It is certified that error appears in the above-identified patent and that said Letters Patent is hereby corrected as shown below:

Column 2,
Line 21, "following Laminated" should read -- following laminated --;
Line 62, "page 2397", the" should read -- page 239", the --.

Column 4,
Line 49,
"

$$[Cp^2 - N{=}N \text{-}[_j X ]\text{-} N{=}N\text{-}Cp^1\text{-}]_i$$

"
should read --

$$[Cp^2 - N{=}N \text{-}]_j X [\text{-} N{=}N\text{-}Cp^1\text{-}]_i$$

--.

Column 5,
Line 1,
"

$$[Cp^2 - N{=}N \text{-}[_m X - ,$$

"
should read --

$$[Cp^2 - N{=}N \text{-}]_m X - ,$$

--.

Column 6,
Line 31, "is a n aryl group" should read -- is an aryl group --.

Column 8,
Line 24, "integer 0to 2;" should read -- integer 0 to 2; --.

Column 19,
Line 41, "(4-3) A 2-hydroxy-3-phenylcarbamoyl-11H-benzo ]a-"
should read -- (4-3) A 2-hydroxy-3-phenylcarbamoyl-11H-benzo [a] --.

Column 23,
Line 49, "having I to 4 carbon" should read -- having 1 to 4 carbon --.

UNITED STATES PATENT AND TRADEMARK OFFICE
CERTIFICATE OF CORRECTION

PATENT NO. : 6,184,362 B1
DATED : February 6, 2001
INVENTOR(S) : Tomoyuki Shimada et al.

It is certified that error appears in the above-identified patent and that said Letters Patent is hereby corrected as shown below:

Column 29,
Line 28, "4-methoxybenzaldehyde-1-methyl-1-phenylhytirazone," should read -- 4-methoxybenzaldehyde-1-methyl-1-phenylhydrazone, --.
Line 55, "and 4,-bis(4-" should read -- and 4'-bis(4- --.

Column 30,
Line 21, "aminostyryl)pyrene." should read -- aminostyryl]pyrene. --;
Line 65, " $[Cp^2—N=N\text{-}[_j X]\text{-}N=N\text{-}Cp^1\text{-}]_i$ "

should read-- $[Cp^2—N=N\text{-}]_j X[\text{-}N=N\text{-}Cp^1\text{-}]_i$ --.

Column 31,
Line 17, "$[Cp^2$—N=N-[-$_m$X—," should read -- $[Cp^2$—N=N-]-$_m$X—, --.

Column 32,
Line 15, "and Z is ay,. atomic" should read -- and Z is an atomic --.

Column 35,
Formula (1-7), "

(1-7)

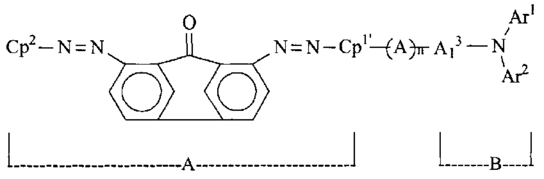

"

should read

--

(1-7)

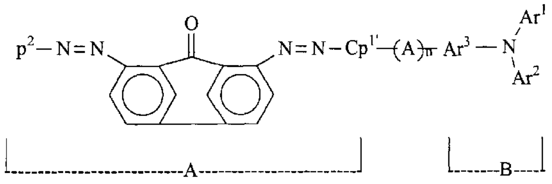

--.

UNITED STATES PATENT AND TRADEMARK OFFICE

CERTIFICATE OF CORRECTION

PATENT NO. : 6,184,362 B1 
DATED : February 6, 2001
INVENTOR(S) : Tomoyuki Shimada et al.

It is certified that error appears in the above-identified patent and that said Letters Patent is hereby corrected as shown below:

Column 39,
Line 67, "(N) and (0) are" should read -- (N) and (O) are --.

Column 44,
Line 19, "108.5~209.0" should read -- 208.5~209.0 --.

Column 60,
Line 47, "(iuinoxalyl group," should read -- quinoxalyl group, --.

Column 61,
Line 21,

" $X\!-\!(N_2^{\oplus}.W^{\ominus})_i$ (101) "

should read -- $X\!-\!(N_2^{\oplus}\cdot W^{\ominus})_i$ (101) --;

Line 43,

" $(W^{\ominus}.N_2^{\oplus}\!-\!)_jX\!-\!N{=}N\text{-}Cp^1\!-\!(Y)_k]_i$ (104) "

should read -- $(W^{\ominus}\cdot N_2^{\oplus}\!-\!)_jX\!-\!N{=}N\text{-}Cp^1\!-\!(Y)_k]_i$ (104) --;

UNITED STATES PATENT AND TRADEMARK OFFICE
CERTIFICATE OF CORRECTION

PATENT NO. : 6,184,362 B1
DATED : February 6, 2001
INVENTOR(S) : Tomoyuki Shimada et al.

It is certified that error appears in the above-identified patent and that said Letters Patent is hereby corrected as shown below:

Column 61 cont'd,
Line 47,

"

$$[Cp^2\text{-}N{=}N\}_j X(N_2^{\oplus}\cdot W^{\ominus})_i \quad (105)$$

"

should read --

$$[Cp^2\text{-}N{=}N]_j X(N_2^{\oplus}\cdot W^{\ominus})_i \quad (105)$$

--;

Line 54,

"

$$(W^{\ominus}\cdot N_2^{\oplus}-)_m X-(Y)_l \quad (106)$$

"

should read --

$$(W^{\ominus}\cdot N_2^{\oplus}-)_m X-(Y)_l \quad (106)$$

--;

Line 57, "m and l are" should read -- m and ℓ are --.

Column 62,
Line 33, "potential 7 an be" should read -- potential can be --;
Line 34, "of tie photoconductor" should read -- of the photoconductor --;
Line 44, "that the 5', amount" should read -- that the amount --.

UNITED STATES PATENT AND TRADEMARK OFFICE
CERTIFICATE OF CORRECTION

PATENT NO. : 6,184,362 B1
DATED : February 6, 2001
INVENTOR(S) : Tomoyuki Shimada et al.

It is certified that error appears in the above-identified patent and that said Letters Patent is hereby corrected as shown below:

Column 80,
Line 6, "each R may" should read -- each $R^3$ may --.

Column 83,
Line 10, "alkoxyl croup" should read -- alkoxyl group --;
Line 11, "are ,ethoxy group," should read -- are methoxy group, --.

Column 119,
Line 39, "compounds No. 5 and of" should read -- compounds No. 5 and 6 of --;
Line 42, "No. 6, ken by" should read -- No. 6, taken by --.

Column 133,
Line 41, "No. 7-1539540 filed" should read -- No. 7-153949 filed --.

Signed and Sealed this

Twenty-first Day of January, 2003

JAMES E. ROGAN
*Director of the United States Patent and Trademark Office*